United States Patent
Gribetz et al.

(10) Patent No.: US 10,540,014 B2
(45) Date of Patent: Jan. 21, 2020

(54) EXTRAMISSIVE SPATIAL IMAGING DIGITAL EYE GLASS APPARATUSES, METHODS, AND SYSTEMS FOR VIRTUAL OR AUGMEDIATED VISION, MANIPULATION, CREATION, OR INTERACTION WITH OBJECTS, MATERIALS, OR OTHER ENTITIES

(71) Applicant: Meta View, Inc., San Mateo, CA (US)

(72) Inventors: Meron Gribetz, Belmont, CA (US); W. Steve G. Mann, Toronto (CA)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 16/156,798

(22) Filed: Oct. 10, 2018

(65) Prior Publication Data
US 2019/0278379 A1 Sep. 12, 2019

Related U.S. Application Data

(63) Continuation of application No. 15/653,719, filed on Jul. 19, 2017, now Pat. No. 10,168,791, which is a (Continued)

(51) Int. Cl.
*G06F 3/01* (2006.01)
*G06F 3/0484* (2013.01)
(Continued)

(52) U.S. Cl.
CPC ........... *G06F 3/017* (2013.01); *G02B 27/017* (2013.01); *G06F 3/011* (2013.01); *G06F 3/013* (2013.01);
(Continued)

(58) Field of Classification Search
CPC ........ G06F 3/017; G06F 3/0482; G06F 3/013; G06F 3/04842; G06F 3/011;
(Continued)

(56) References Cited

U.S. PATENT DOCUMENTS 7,921,376 B2 * 4/2011 Robertson ............. G06F 3/0481
715/782
8,933,876 B2 1/2015 Galor et al.
(Continued)

FOREIGN PATENT DOCUMENTS

CN 102591449 A 7/2012
EP 2615523 7/2013
(Continued)

OTHER PUBLICATIONS

Steve Mann, "Wearable Tetherless Computer-Mediated Reality: Wear Cam as wearable face-recognizer, and other applications for the disabled," AAAI Technical Report FS-96-05, 1996.
(Continued)

*Primary Examiner* — Andrew Sasinowski
(74) *Attorney, Agent, or Firm* — Andrew Bodendorf

(57) ABSTRACT

A sensing and display apparatus, comprising: a first phenomenon interface configured to operatively interface with a first augmediated-reality space, and a second phenomenon interface configured to operatively interface with a second augmediated-reality space, is implemented as an extramissive spatial imaging digital eye glass.

23 Claims, 35 Drawing Sheets

Related U.S. Application Data continuation of application No. 14/147,199, filed on Jan. 3, 2014, now Pat. No. 9,720,505.

(60) Provisional application No. 61/916,773, filed on Dec. 16, 2013, provisional application No. 61/748,468, filed on Jan. 3, 2013.

(51) Int. Cl.
*G06F 3/0482* (2013.01)
*G06F 3/0481* (2013.01)
*G02B 27/01* (2006.01)

(52) U.S. Cl.
CPC ........ *G06F 3/0482* (2013.01); *G06F 3/04815* (2013.01); *G06F 3/04842* (2013.01); *G02B 2027/014* (2013.01); *G02B 2027/0178* (2013.01); *G02B 2027/0187* (2013.01)

(58) Field of Classification Search
CPC .............. G06F 3/04815; G02B 27/017; G02B 2027/0178; G02B 2027/014; G02B 2027/0187
See application file for complete search history.

(56) References Cited

U.S. PATENT DOCUMENTS

| | | |
|---|---|---|
| 9,092,600 B2 | 7/2015 | Scavezze et al. |
| 9,720,505 B2 | 8/2017 | Gribetz et al. |
| 10,168,791 B2 | 1/2019 | Gribetz et al. |
| 2004/0128012 A1 | 7/2004 | Lin |
| 2005/0271279 A1 | 12/2005 | Fujimura et al. |
| 2007/0132721 A1 | 1/2007 | Glomski et al. |
| 2008/0150899 A1 | 6/2008 | Lin |
| 2008/0284729 A1 | 11/2008 | Kurtenbach et al. |
| 2009/0077504 A1 | 3/2009 | Bell et al. |
| 2009/0215533 A1 | 8/2009 | Zalewski et al. |
| 2010/0040238 A1 | 2/2010 | Jang et al. |
| 2010/0066662 A1 | 3/2010 | Tomisawa et al. |
| 2011/0007138 A1 | 1/2011 | Zhang et al. |
| 2011/0096381 A1 | 1/2011 | Leister et al. |
| 2011/0066658 A1* | 3/2011 | Rhoads ............... G06F 3/017 707/803 |
| 2011/0185309 A1* | 7/2011 | Challinor ............ G06F 3/011 715/784 |
| 2011/0205341 A1 | 8/2011 | Wilson et al. |
| 2011/0273540 A1* | 11/2011 | Lee ................. G06F 3/0346 348/51 |
| 2011/0283238 A1* | 11/2011 | Weising ............. G06F 9/451 715/852 |
| 2012/0105473 A1 | 5/2012 | Bar-Zeev et al. |
| 2012/0113223 A1 | 5/2012 | Hilliges et al. |
| 2012/0198389 A1* | 8/2012 | Audet ............... G06F 3/0482 715/853 |
| 2012/0236025 A1* | 9/2012 | Jacobsen ............ G06F 3/011 345/629 |
| 2012/0249741 A1* | 10/2012 | Maciocci ............ G06F 3/011 348/46 |
| 2012/0262558 A1 | 10/2012 | Boger et al. |
| 2013/0002591 A1 | 1/2013 | Whytock et al. |
| 2013/0004060 A1 | 1/2013 | Bell et al. |
| 2014/0015794 A1 | 1/2014 | Yashiro et al. |
| 2014/0310595 A1 | 10/2014 | Acharya et al. |
| 2015/0077326 A1 | 3/2015 | Kramer et al. |

FOREIGN PATENT DOCUMENTS

| | | |
|---|---|---|
| JP | WO2008041314 | 2/2010 |
| JP | 2011065652 | 3/2011 |
| JP | 2011515736 | 5/2011 |
| JP | 2011175617 | 9/2011 |
| JP | 2012203737 | 10/2012 |
| WO | 2011132373 | 10/2011 |

OTHER PUBLICATIONS

"SixthSense," https://en.wikipedia.org/wiki/SixthSense#cite_ref8, Wikipedia encyclopedia, Apr. 17, 2016.

R. Lo, A. Chen, V. Rampersad, J. Huang, H. Wu and S. Mann, "Augmediated reality system based on 3D camera selfgesture sensing," Technology and Society (ISTAS), 2013 IEEE International Symposium on, Toronto, ON, 2013, pp. 20-31.

R. Lo, V. Rampersad, J. Huang and S. Mann, "Three dimensional high dynamic range veillance for 3D range-sensing cameras," Technology and Society (ISTAS), 2013 IEEE International Symposium on, Toronto, ON, 2013, pp. 255-265.

R. Hill, J. Fung and S. Mann, "A parallel mediated reality platform," Image Processing, 2004. ICIP '04. 2004 International Conference on, 2004, pp. 2865-2868 vol. 5.

S. Mann, "Humanistic computing: 'WearComp' as a new framework and application for intelligent signal processing," in Proceedings of the IEEE, vol. 86, No. 11, pp. 2123-2151, Nov. 1998.

S. Mann, M. A. Ali, R. Lo and Han Wu, "FreeGlass for developers, "haccessibility", and Digital Eye Glass + Lifelogging research in a (sur/sous)veillance society," Information Society (i-Society), 2013 International Conference on, Toronto, ON, 2013, pp. 48-53.

S. Mann, "Wearable computing: a first step toward personal imaging," in Computer, vol. 30, No. 2, pp. 25-32, Feb. 1997.

Felix Tang, Chris Aimone, James Fung, Andrej Marjan, Steve Mann, "Seeing Eye to Eye: a shared mediated reality using EyeTap devices and the VideoOrbits Gyroscopic Head Tracker," Proceedings of the International Symposium on Mixed and Augmented Reality ISMAR 2002, pp. 267-268, 2002.

Steve Mann, Jason Huang, Ryan Janzen, Raymond Lo, Valmiki Rampersad, Alexander Chen, Taqveer Doha "Blind Navigation with a Wearable Range Camera and Vibrotactile Helmet," Proceedings of the 19th ACM international conference on Multimedia, pp. 1325-1328, Nov. 2011.

S. Mann, R. Janzen, Tao Ai, S. N. Yasrebi, J. Kawwa and M. A. Ali, "Toposculpting: Computational lightpainting and wearable computational photography for abakographic user interfaces," Electrical and Computer Engineering (CCECE), 2014 IEEE 27th Canadian Conference on, Toronto, ON, 2014, pp. 1-10.

European Supplemental Search Report and Written Opinion, EP Application 14 735 321.3, dated Jul. 19, 2016, 8 pages.

Dan Costa, "Sorry Kinect: Apple Wins Gesture-Control Patent," PCMag Digital Group; Jan. 13, 2015, http://www.pcmag.com/article2/0,2817,2475085,00.asp,.

International Search Report, PCT/IB2014/058042, dated Sep. 25, 2014, 7 Pages.

Written Opinion, PCT/IB2014/058042, dated Sep. 25, 2014, Sep. 16, 2014, 9 Pages.

Second Office Action, CH Application 2014800122952, dated Feb. 7, 2018, 7 pages.

First Office Action, CH Application 2014800122952, dated May 9, 2017, 7 pages.

Office Action, JP Application 2015-551242, dated Feb. 20, 2018, 12 pages.

Communication, EP Application 14 735 321.3, dated Sep. 22, 2017, 7 pages.

First Office Action Search Report, CH Application 2014800122952, dated May 9, 2017, 7 pages.

Saba et al., "Dante Vision: In-Air and Touch Gesture Sensing for Natural Surface Interaction with Combined Depth and Thermal Cameras," Emerging Signal Processing Applications (ESPA), 2012 IEEE International Conference, Jan. 12, 2012, pp. 167-170.

Seung-Hwan et al., "3D-Position Estimation for Hand Gesture Interface Using a Single Camera" Human-Computer Interaction. Interaction Techniques and Environments 14th International Conference, HCI International 2011, Orlando, FL, USA, Jul. 9-14, 2011, Proceedings, Part II, pp. 231-237.

Koh et al., "Vision-Based Virtual Touch Screen Interface," Consumer Electronics, 2008, ICCE 2008, Digest of Technical Papers, International Conference on, IEEE, Piscataway, NJ, Jan. 9, 2008, 2 pages.

Lahamy et al., "Real-Time Hand Gesture Recognition Using Range Cameras," Oct. 18, 2012, 6 pages.

(56) References Cited

OTHER PUBLICATIONS

Summons, European Application No. EP Application 14 735 321.3, Oct. 17, 2018, 9 pages.
Brief Communication in response to Letter, European Application No. EP Application 14 735 321.3, dated Mar. 25, 2019, 3 pages.
Provision of Minutes of Oral Proceedings, European Application No. EP Application 14 735 321.3, May 31, 2019, 7 pages.
Ha et al., "Digilog book for temple bell tolling experience based on interactive augmented reality." Virtual Reality, 2011, 15 pages.
Final Decision, JP Application 2015-551242, Jan. 15, 2019, 3 pages.

\* cited by examiner

EXTRAMISSIVE SPATIAL IMAGING DIGITAL EYE GLASS APPARATUSES, METHODS, AND SYSTEMS FOR VIRTUAL OR AUGMEDIATED VISION, MANIPULATION, CREATION, OR INTERACTION WITH OBJECTS, MATERIALS, OR OTHER ENTITIES

PRIORITY CLAIMS AND CROSS-REFERENCE TO RELATED APPLICATIONS

This application is a continuation of U.S. patent application Ser. No. 15/653,719 titled "EXTRAMISSIVE SPATIAL IMAGING DIGITAL EYE GLASS APPARATUSES, METHODS AND SYSTEMS FOR VIRTUAL OR AUGMEDIATED VISION, MANIPULATION, CREATION, OR INTERACTION WITH OBJECTS, MATERIALS, OR OTHER ENTITIES" filed Jul. 19, 2017, which is a continuation of U.S. patent application Ser. No. 14/147,199 titled "EXTRAMISSIVE SPATIAL IMAGING DIGITAL EYE GLASS APPARATUSES, METHODS AND SYSTEMS FOR VIRTUAL OR AUGMEDIATED VISION, MANIPULATION, CREATION, OR INTERACTION WITH OBJECTS, MATERIALS, OR OTHER ENTITIES" filed Jan. 3, 2014, which claims the benefit under 35 U.S.C. § 119(e) of U.S. Provisional Patent Application Ser. No. 61/748,468 titled "HEAD MOUNTED DISPLAY CONNECTED WITH COMPUTATIONAL DEVICE AND DEPTH-SENSOR WITH SOFTWARE APPLICATIONS AND USER INTERFACE" filed on 3 Jan. 2013 and U.S. Provisional Patent Application Ser. No. 61/916,773 titled "VIRTUAL OR AUGMEDIATED TOPOLOGICAL SCULPTING, MANIPULATION, CREATION, OR INTERACTION WITH DEVICES, OBJECTS, MATERIALS, OR OTHER ENTITIES" filed Dec. 16, 2013, and all of the aforementioned applications are herein expressly incorporated by reference in their entirety for all purposes.

BACKGROUND

Sensor technology is employed in contexts to monitor and/or measure information about an environment, such as the use of temperature sensors in industrial processes. Mobile devices employ increasingly powerful processing capabilities to support various applications, such as telephony and other mobile communications.

SUMMARY

In accordance with an aspect, there is provided a sensing and display apparatus, including: an interface assembly including: a first interface module configured to interface with a first computationally mediated space (for example, a scene, subject matter, or the like), the first interface module configured to exchange sensor signals and effector signals with the first space; and a second interface module configured to interface with a second computationally mediated space (for example, a user's own personal viewing space in or around their digital eye glass space), the second interface module configured to provide or exchange effector signals, and, in some embodiments, also sensor signals (for example, an eye-tracker, or the like) with the second space, and the effector signals being user presentable, at least in part, in any one of the first space and the second space.

In accordance with an aspect, there is provided a sensing and display apparatus, including: an interface assembly, including: a first interface module configured to interface with sensor signals representing a sensory phenomenon and/or phenomena, the signals and/or phenomena received, in one implementation, from a first reality space, e.g., a visual-reality space, and in one implementation also representing sensory phenomena received from a second visual-reality space; and a second interface module configured to interface with effector signals representing, displaying, presenting, providing, and/or the like sensory phenomena to the first visual-reality space and/or to the second visual-reality space.

In accordance with an aspect, there is provided a method, including: an operation, including receiving a sensor signal representing sensory phenomena received from a first space and from a second space.

In accordance with an aspect, there is provided a sensing and display apparatus, including: an interface assembly configured to interface with a first space and with a second space, and the interface assembly configured to convey sensor signals and effector signals associated with the first space and the second space; a processing apparatus operatively coupled to the interface assembly, and the processing apparatus configured to process the sensor signals and the effector signals conveyed by the interface assembly; and a memory assembly configured to tangibly embody a processing program, including a sequence of programmed instructions configured to direct the processing apparatus to execute operations on the sensor signals and the effector signals.

In accordance with an aspect, there is provided a user interface, including: a first interface section configured to display phenomena derived from a first space; and a second interface section configured to display phenomena derived from a second space.

In accordance with an aspect, there is provided a sensing and display apparatus, including: a first phenomenon interface configured to operatively interface with a phenomenon and/or phenomena in a first space; and a second phenomenon interface configured to operatively interface with a phenomenon and/or phenomena in a second space.

In accordance with an aspect, there are provided other aspects as identified in the claims.

Other aspects and features of the non-limiting embodiments (examples, options, etc.) may now become apparent upon review of the following detailed description of the non-limiting embodiments with the accompanying drawings.

DETAILED DESCRIPTION OF THE DRAWINGS

The non-limiting embodiments may be more fully appreciated by reference to the following description of the non-limiting embodiments when taken in conjunction with the accompanying drawings, in which:

FIG. 1A depicts a schematic example of a sensor and display apparatus 1300 in one embodiment;

FIG. 1AA depicts a schematic example of a method associated with the sensory and display apparatus 1300 of FIG. 1A in one embodiment;

Figure 1A:
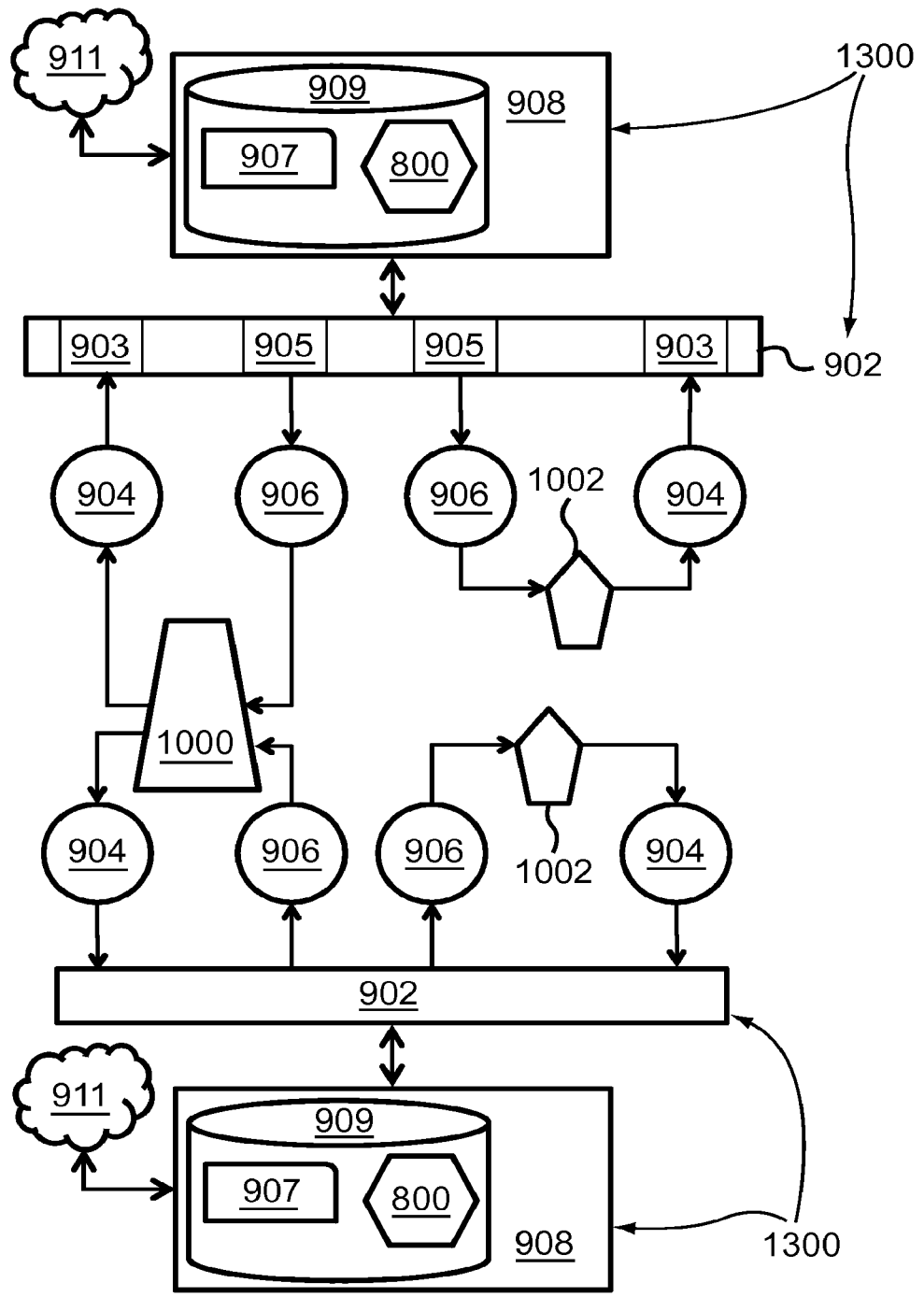
FIG. 1B depicts a schematic example of a sensory and display apparatus 1300 in one embodiment.
FIG. 1C depicts a schematic example of a sensory and display apparatus 1300 in one embodiment.
FIG. 1D depicts a schematic example of a sensory and display apparatus 1300 in one embodiment.
FIG. 1E depicts a schematic example of a sensory and display apparatus 1300 in one embodiment.
Figure 1A:
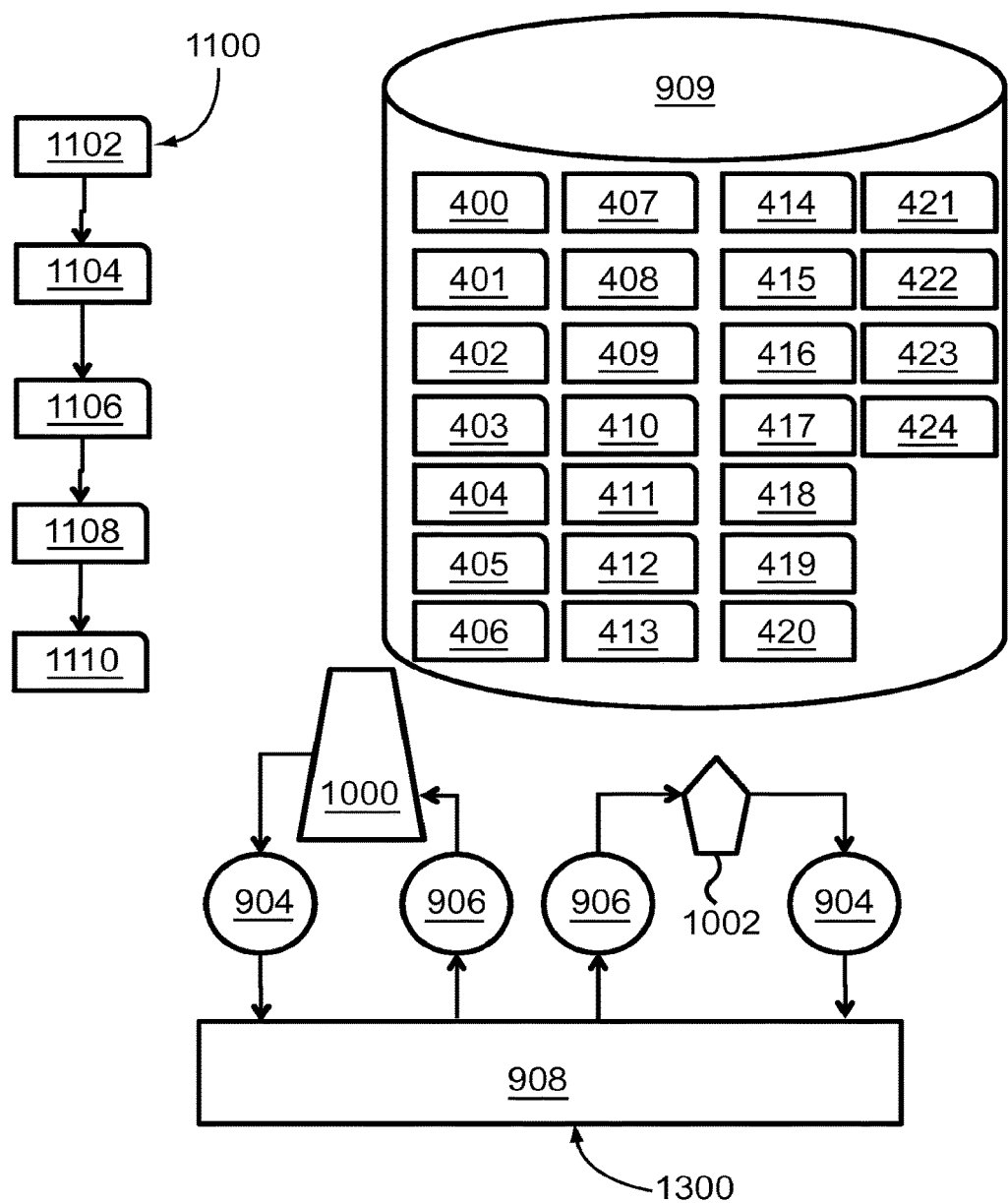
Figure 1B:
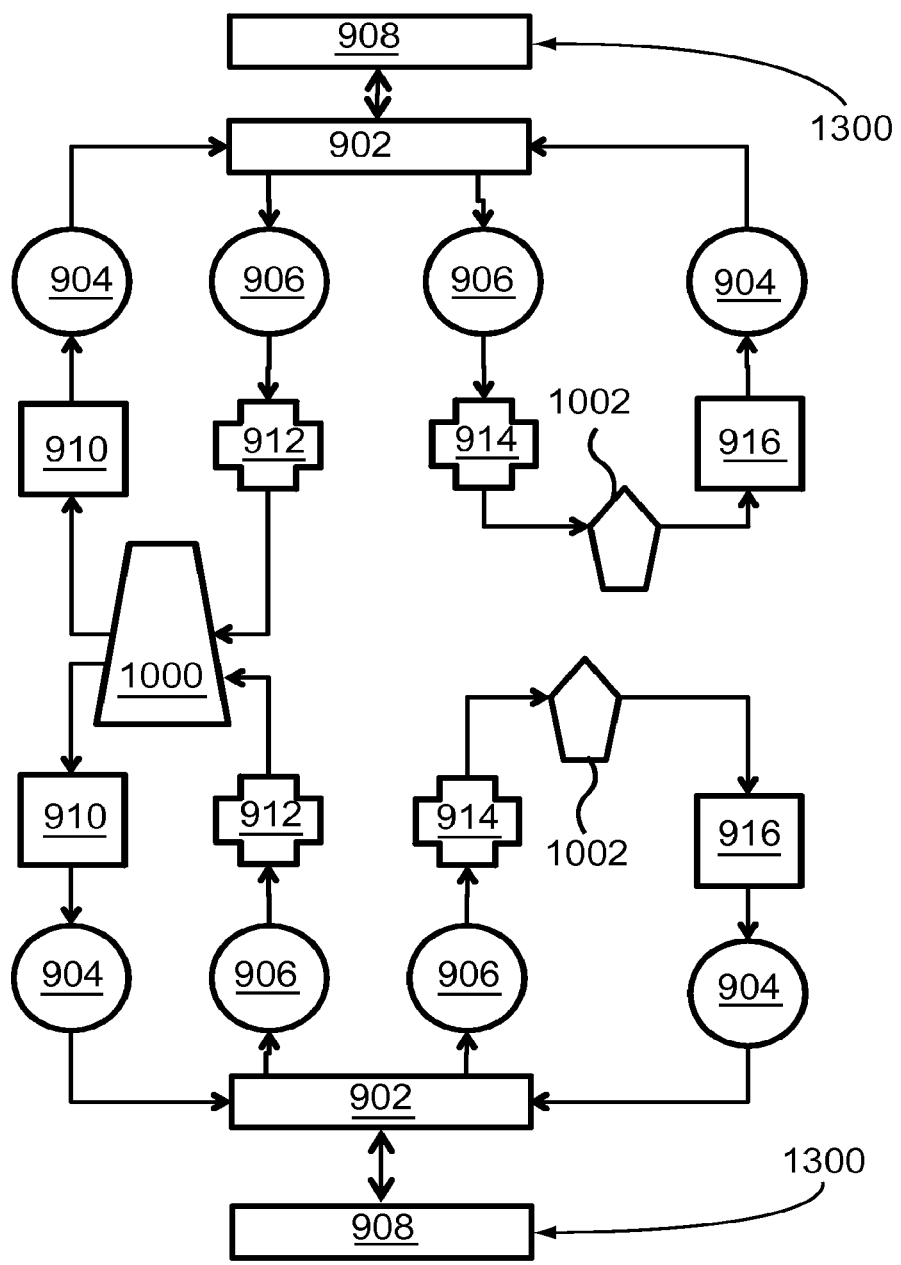
Figure 1C:
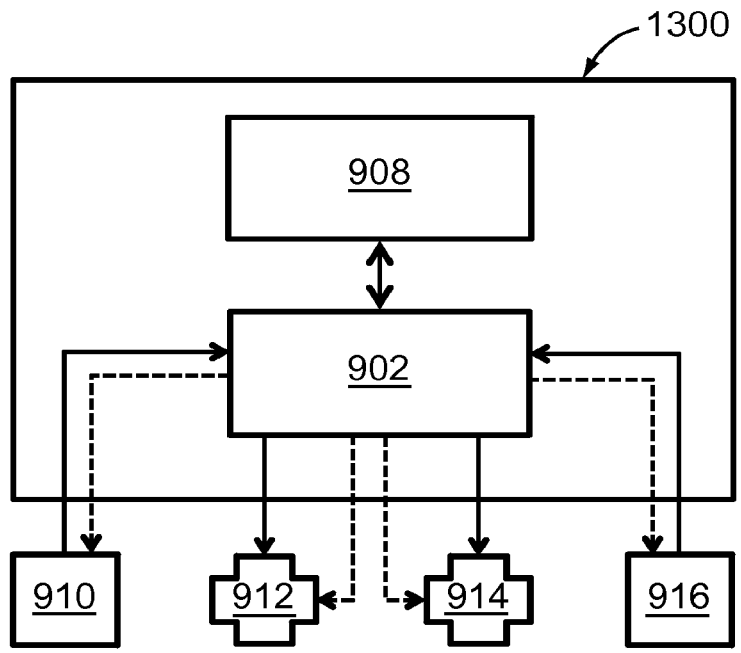
Figure 1D:
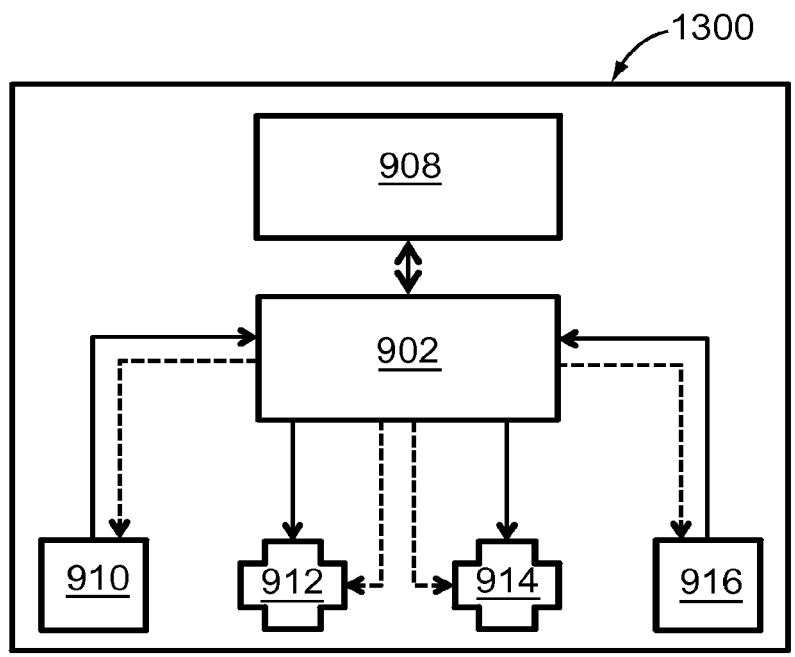
Figure 1E:
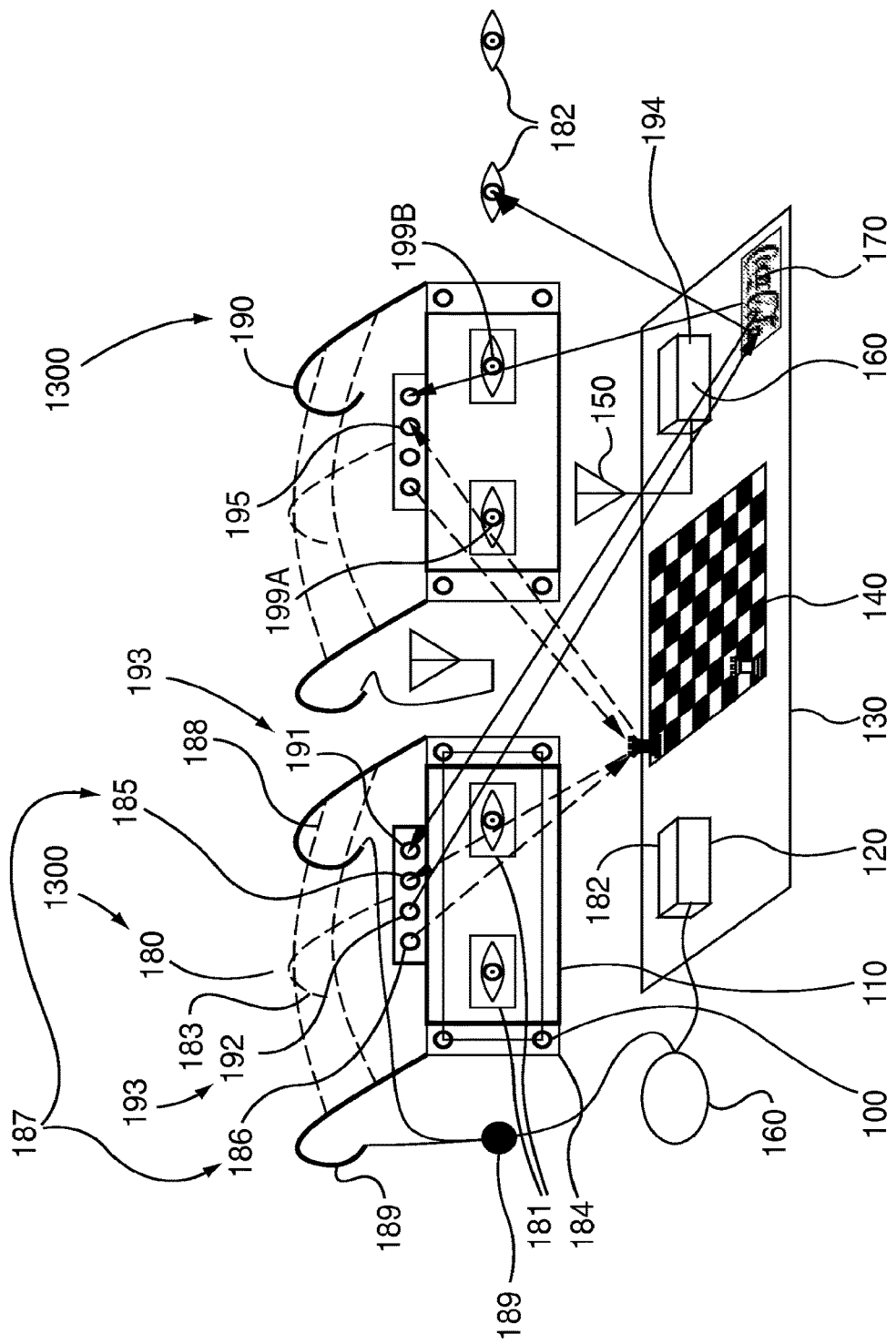
Figure 1E:
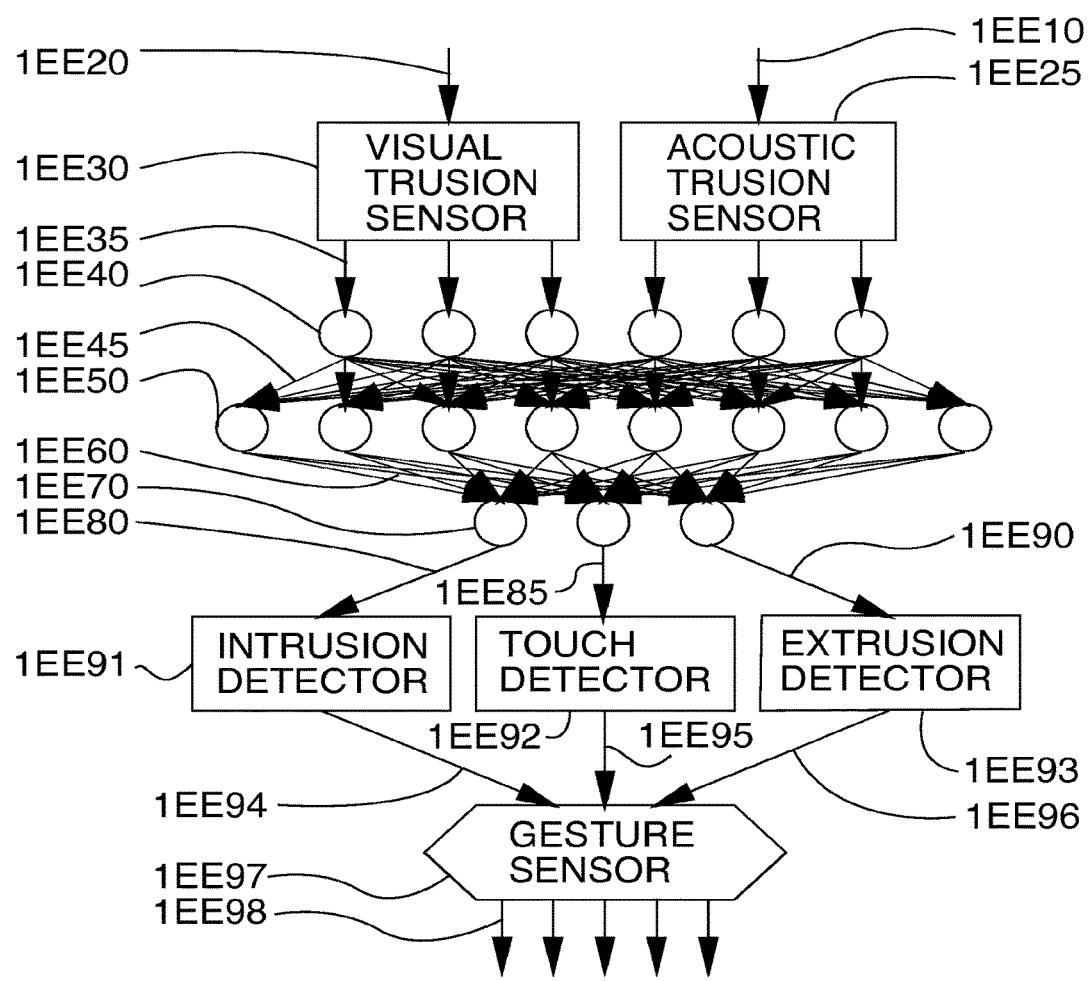
Figure 1F:
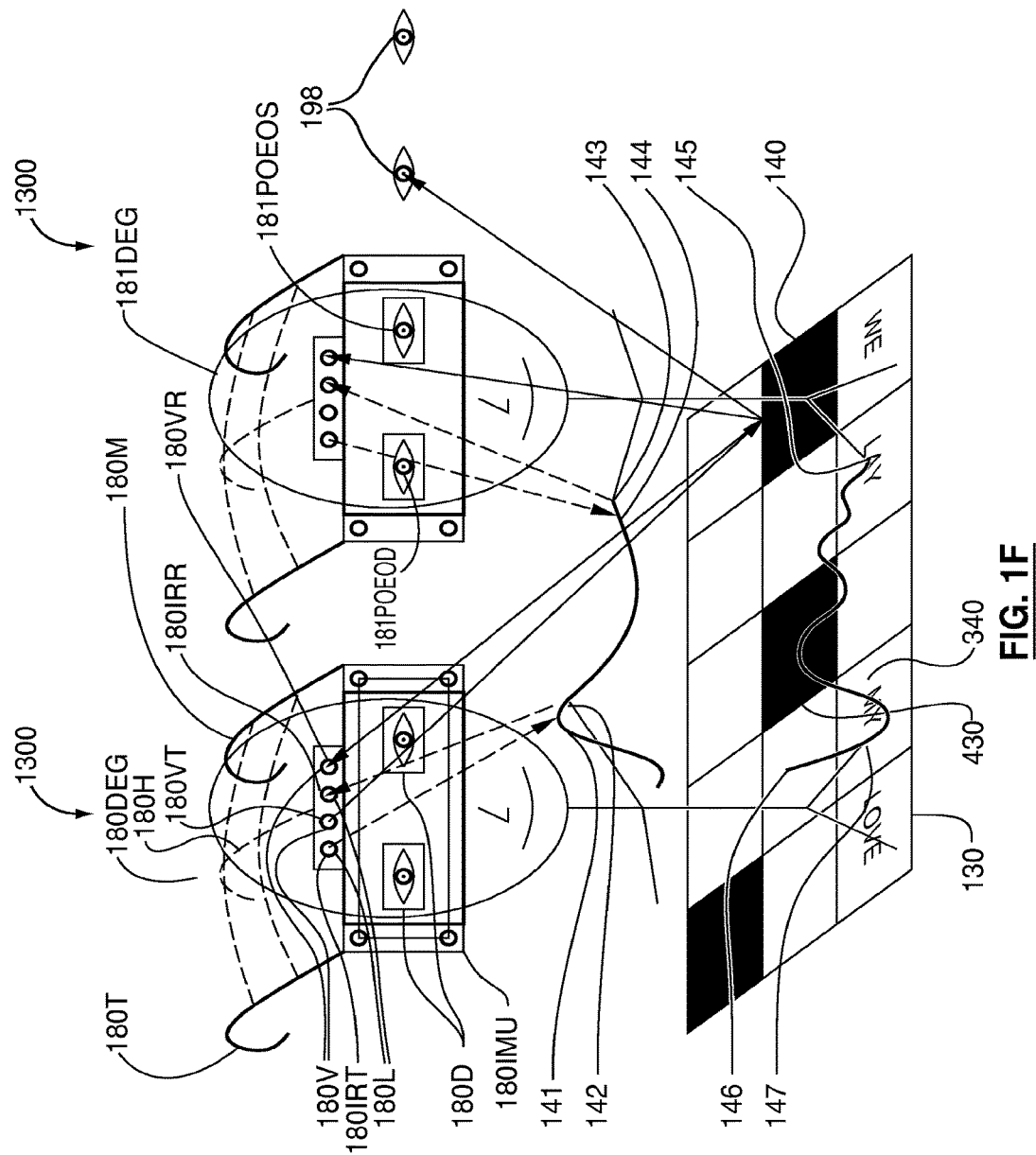
Figure 1G:
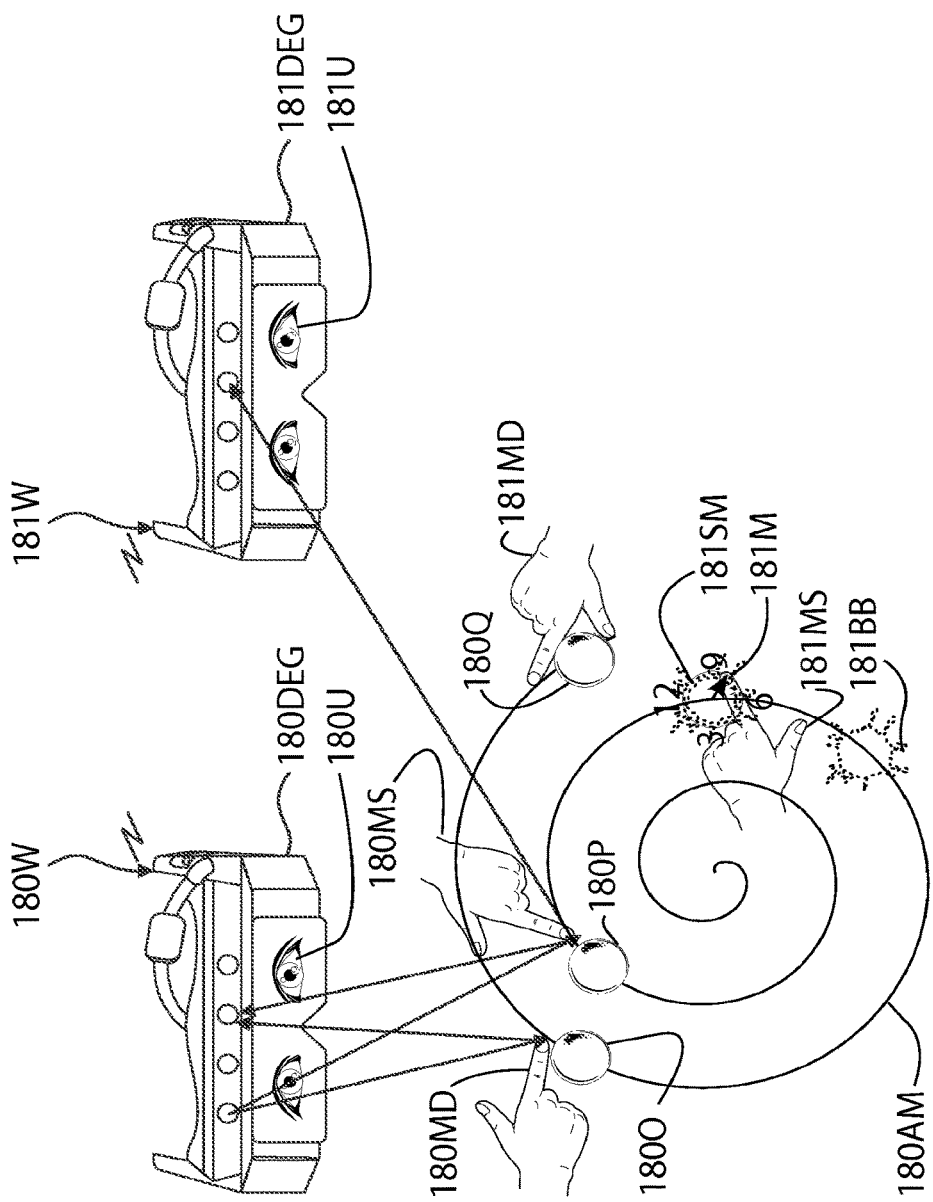
Figure 1H:
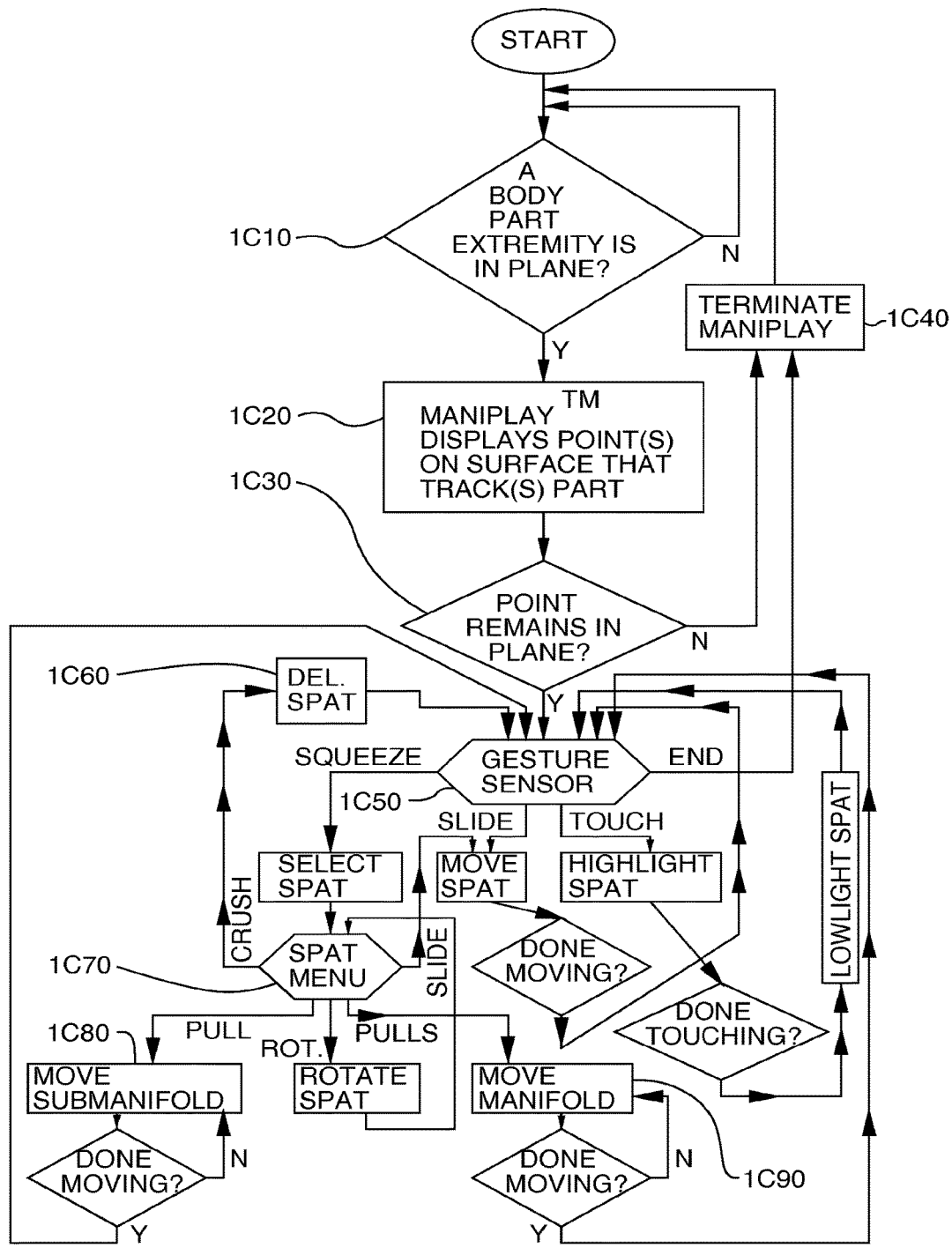
Figure 2A:
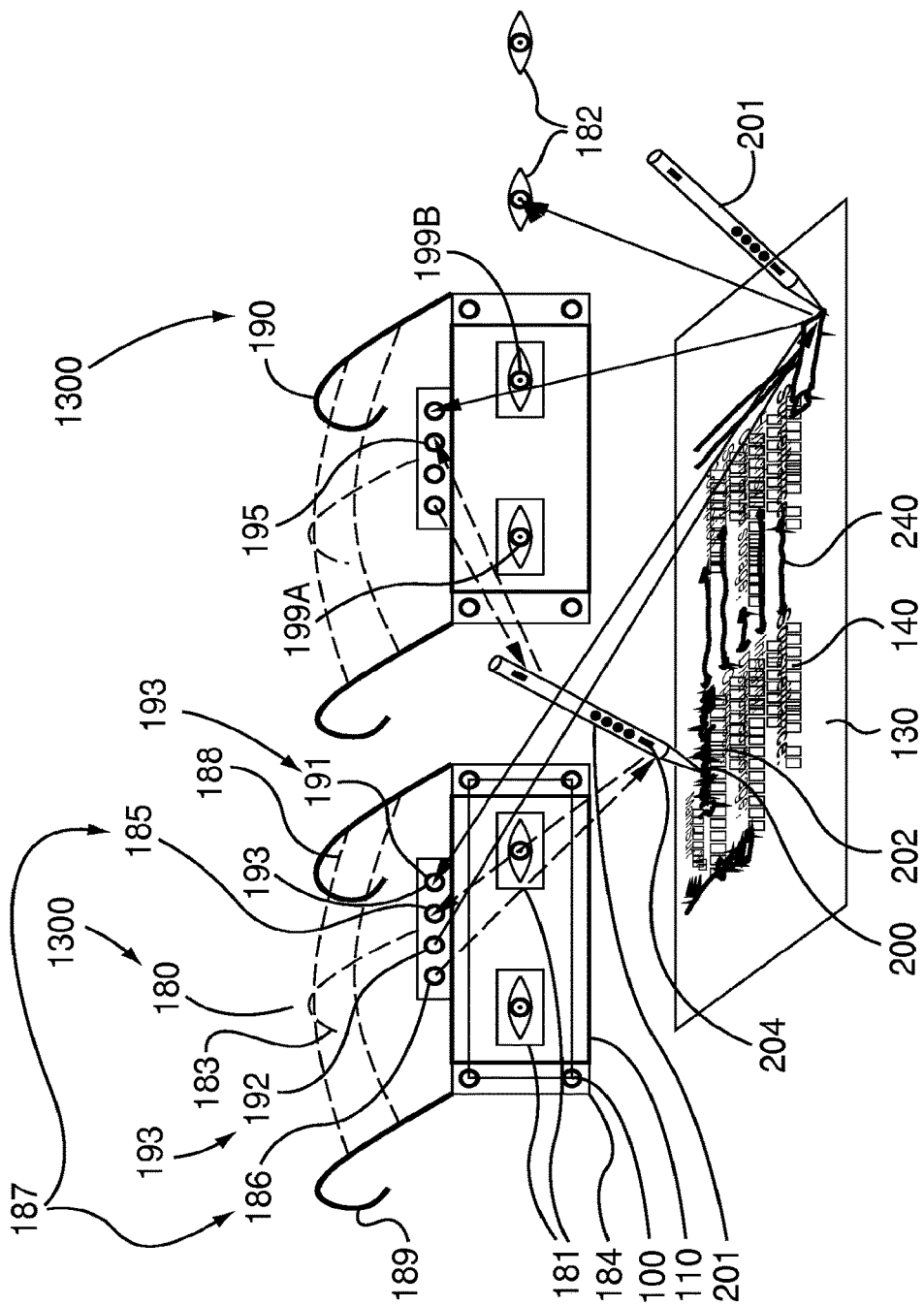
Figure 2B:
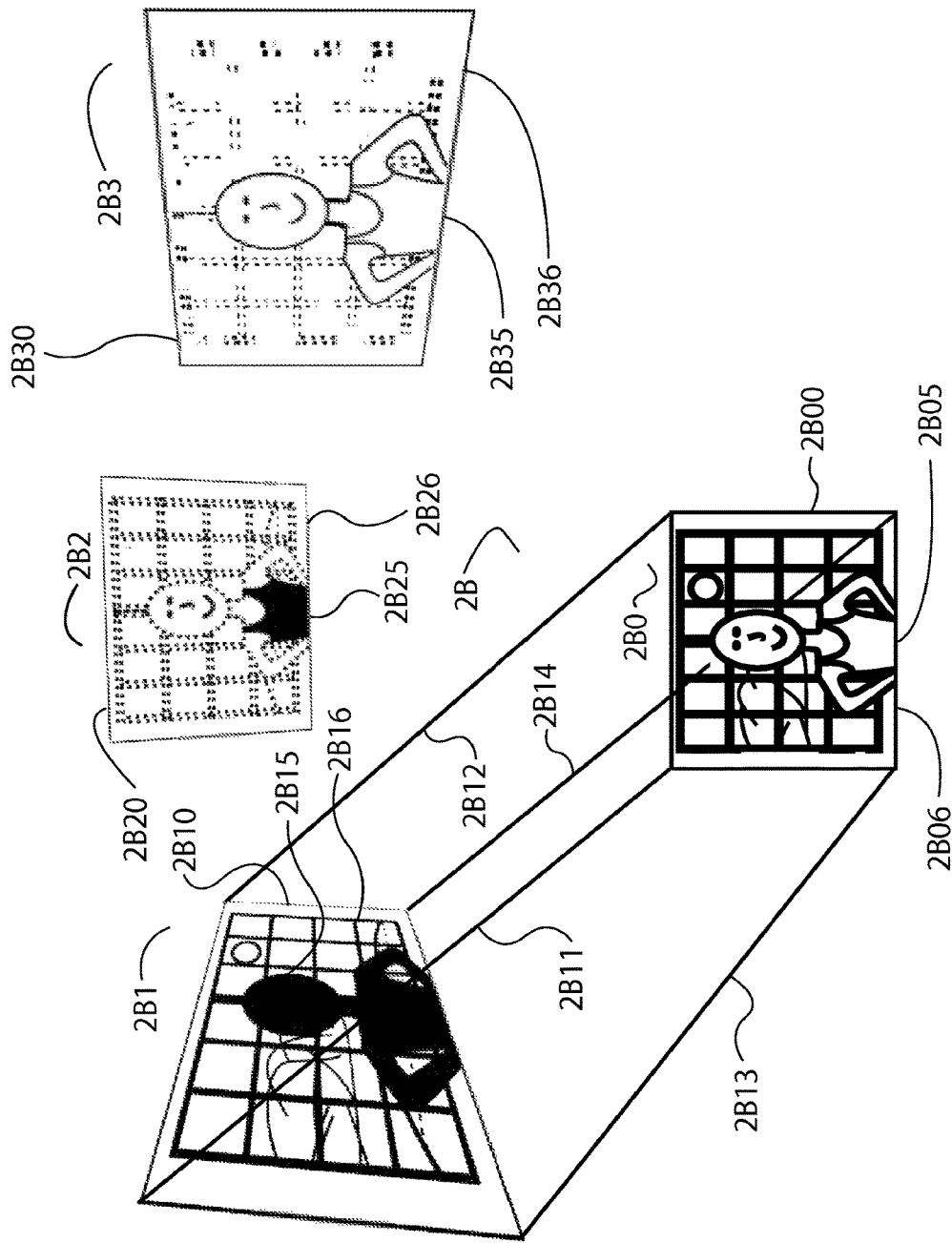
Figure 2C:
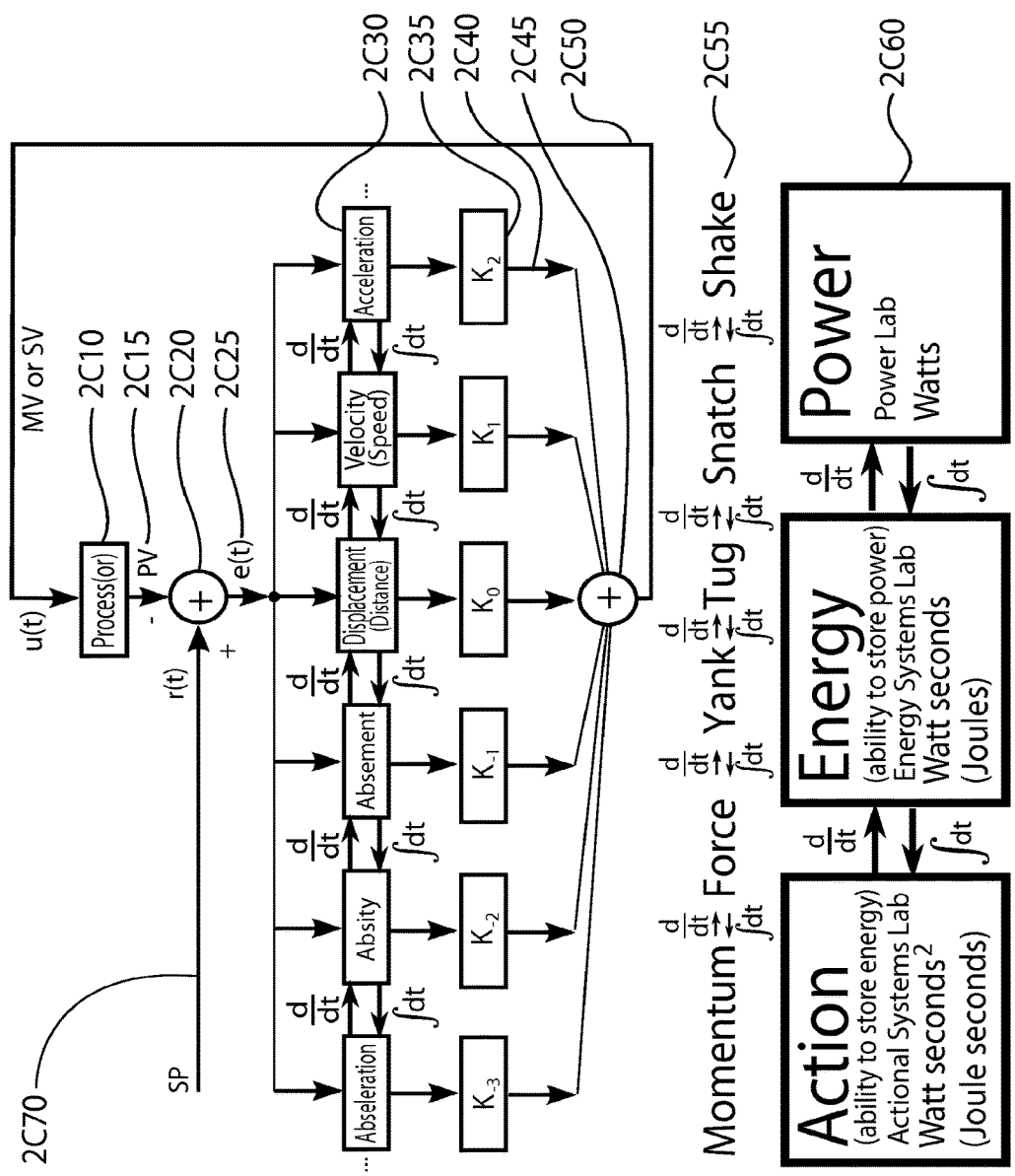
Figure 2D:
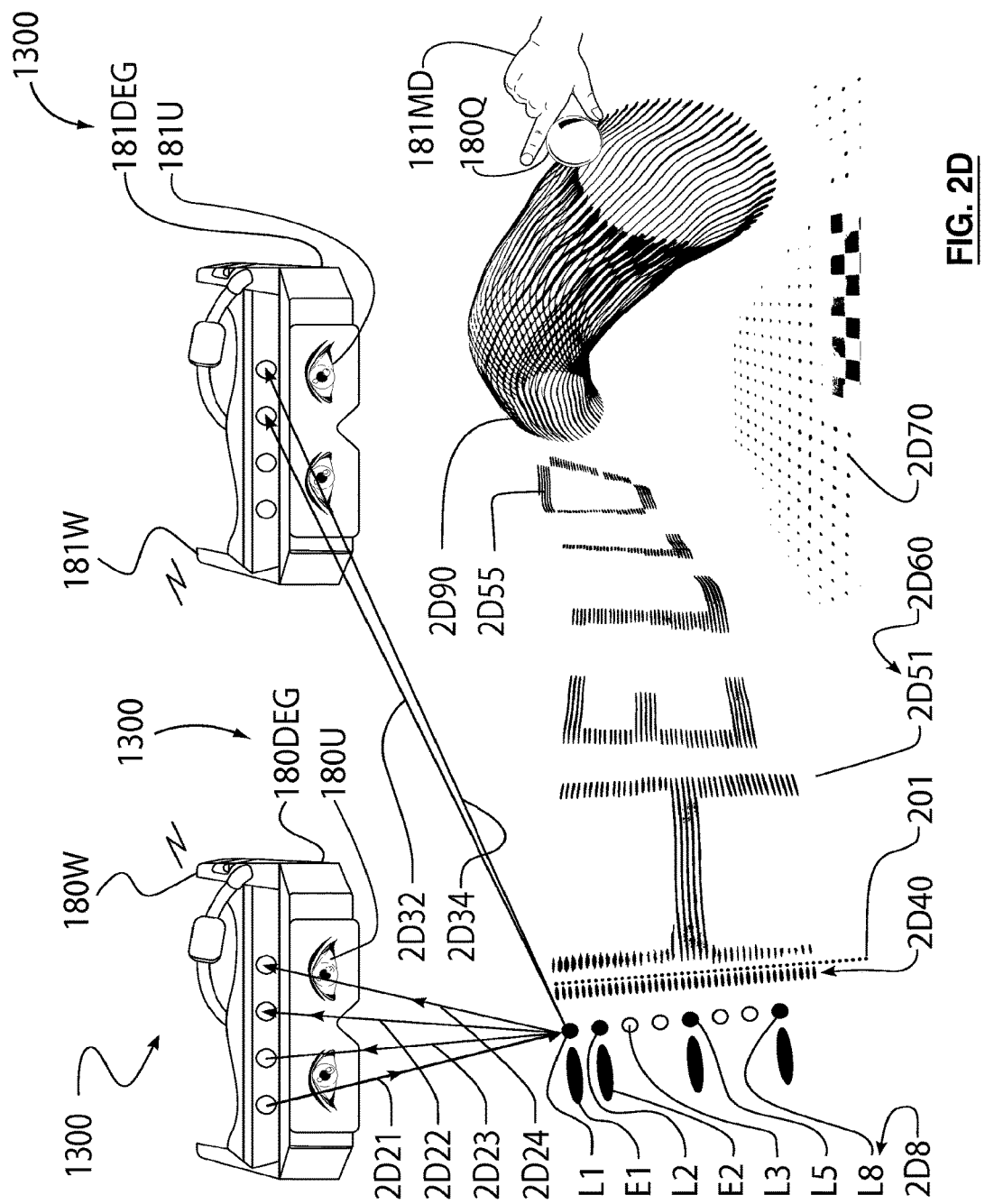
Figure 2E:
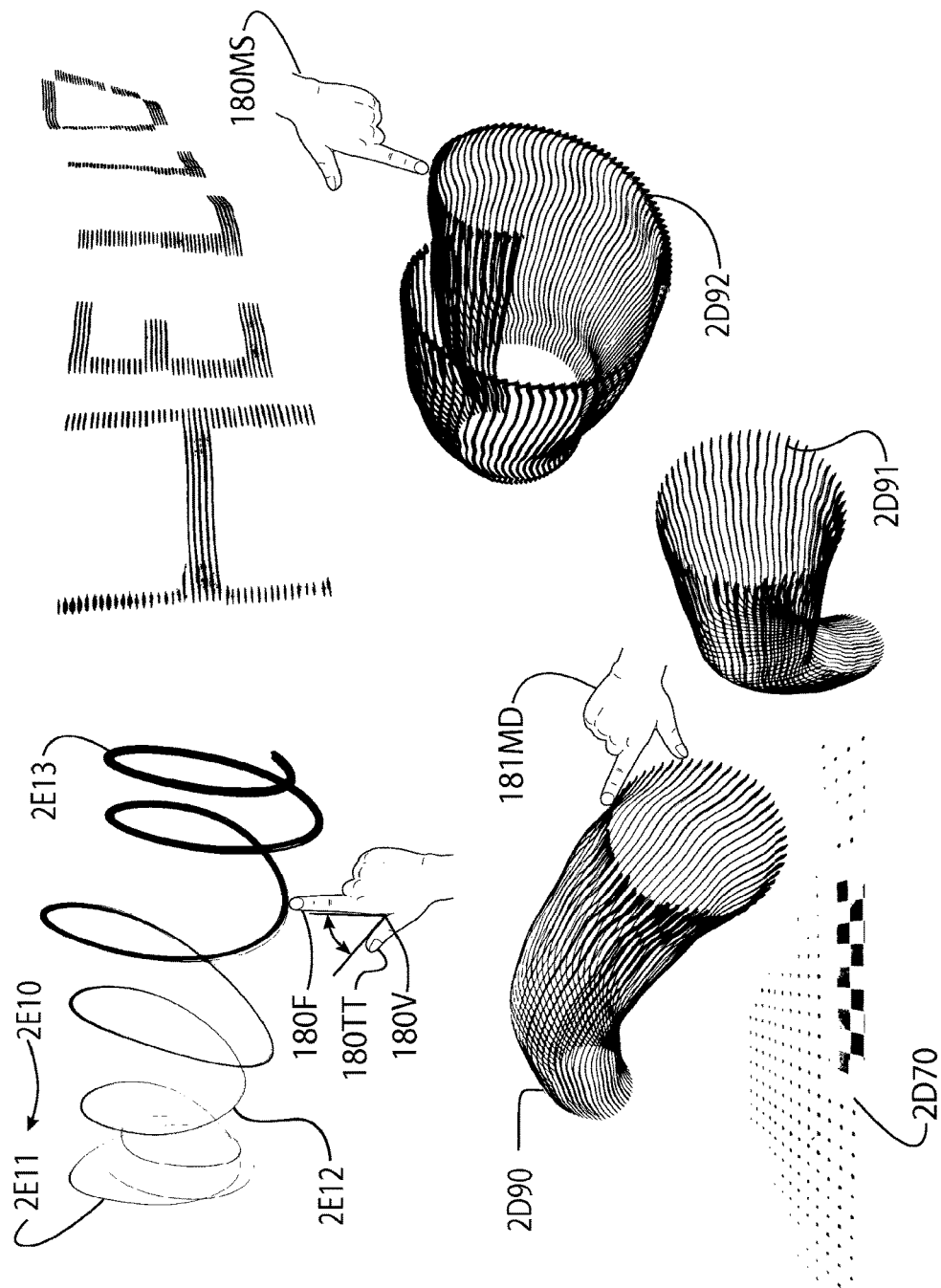
Figure 2F:
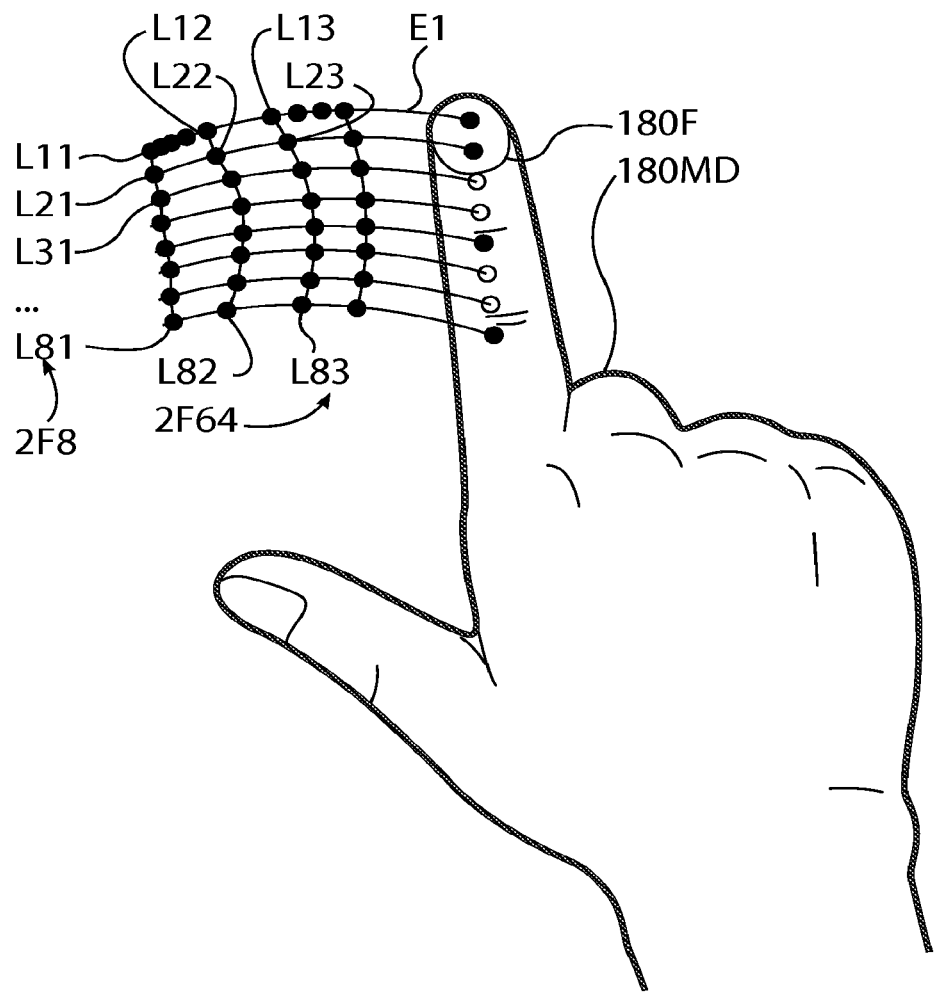
Figure 2G:
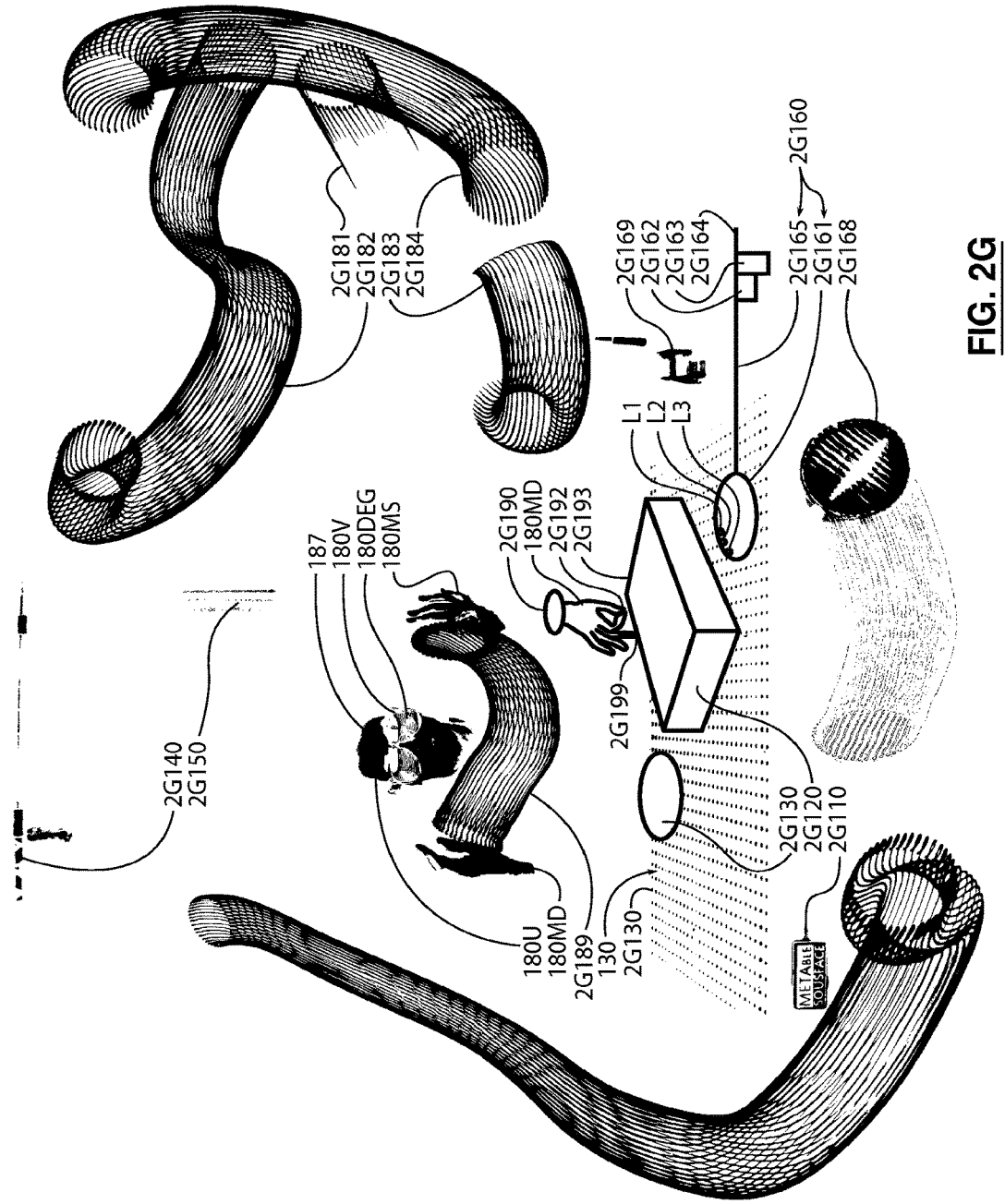
Figure 3:
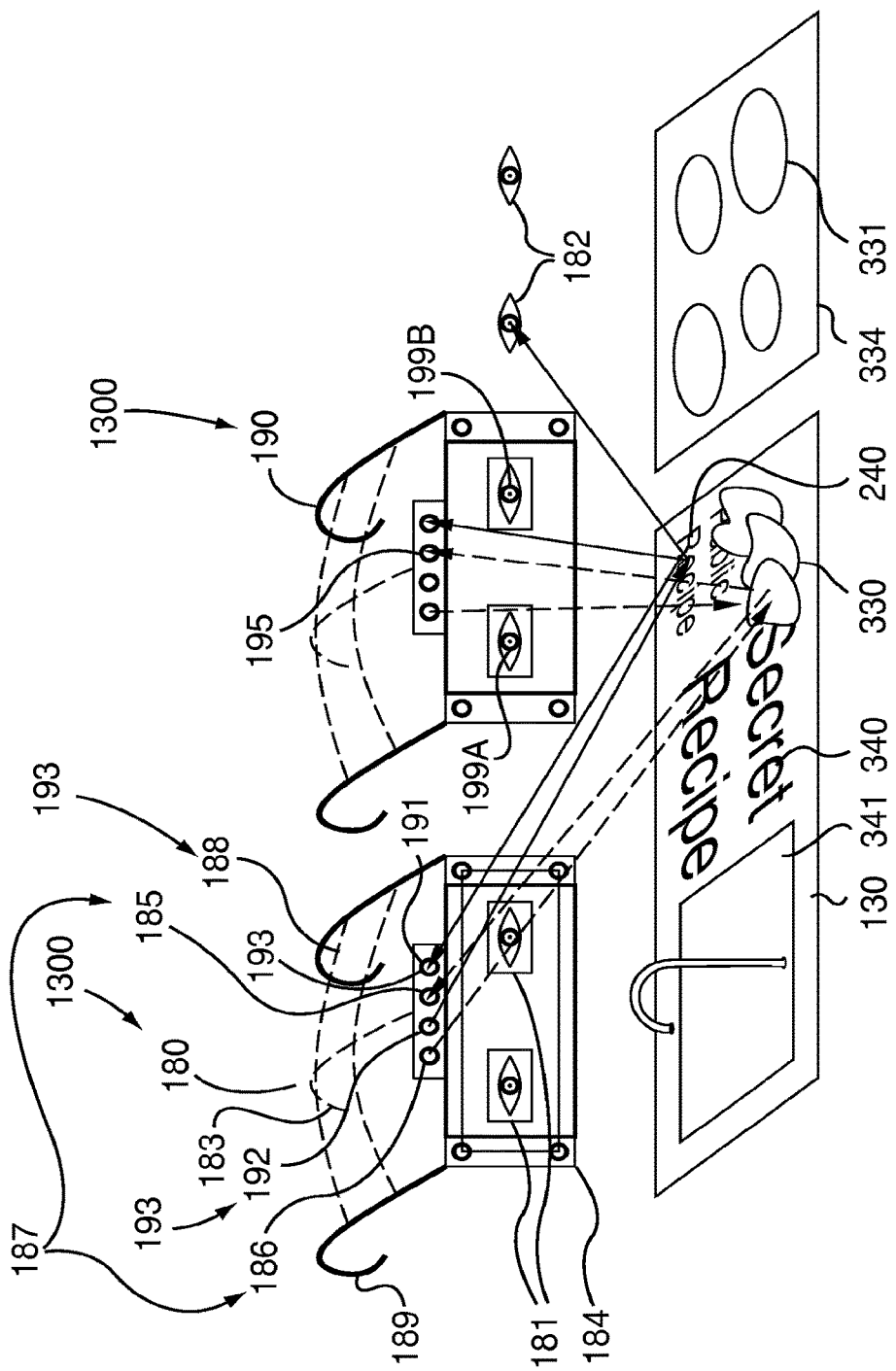
Figure 4:
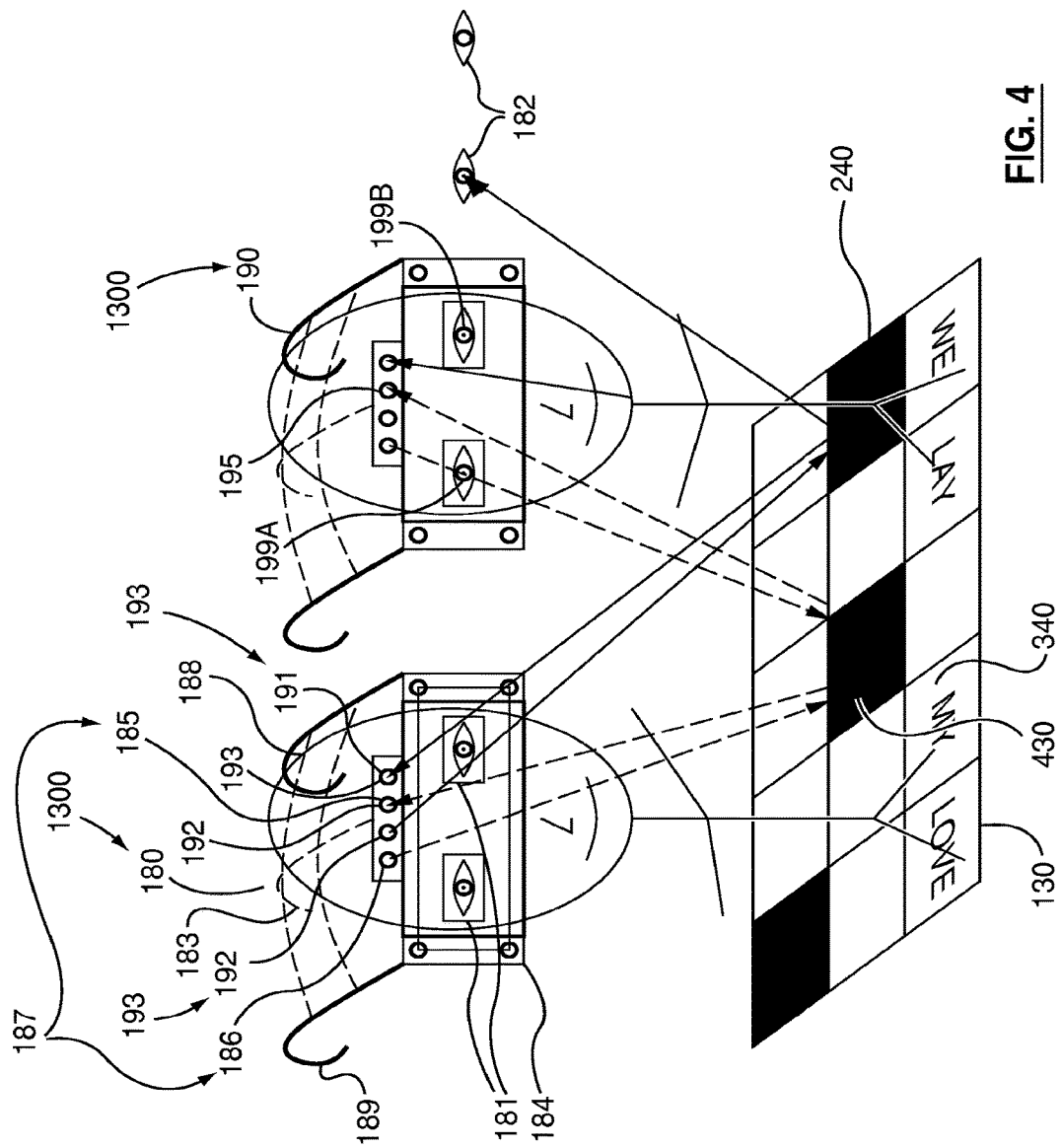
Figure 5:
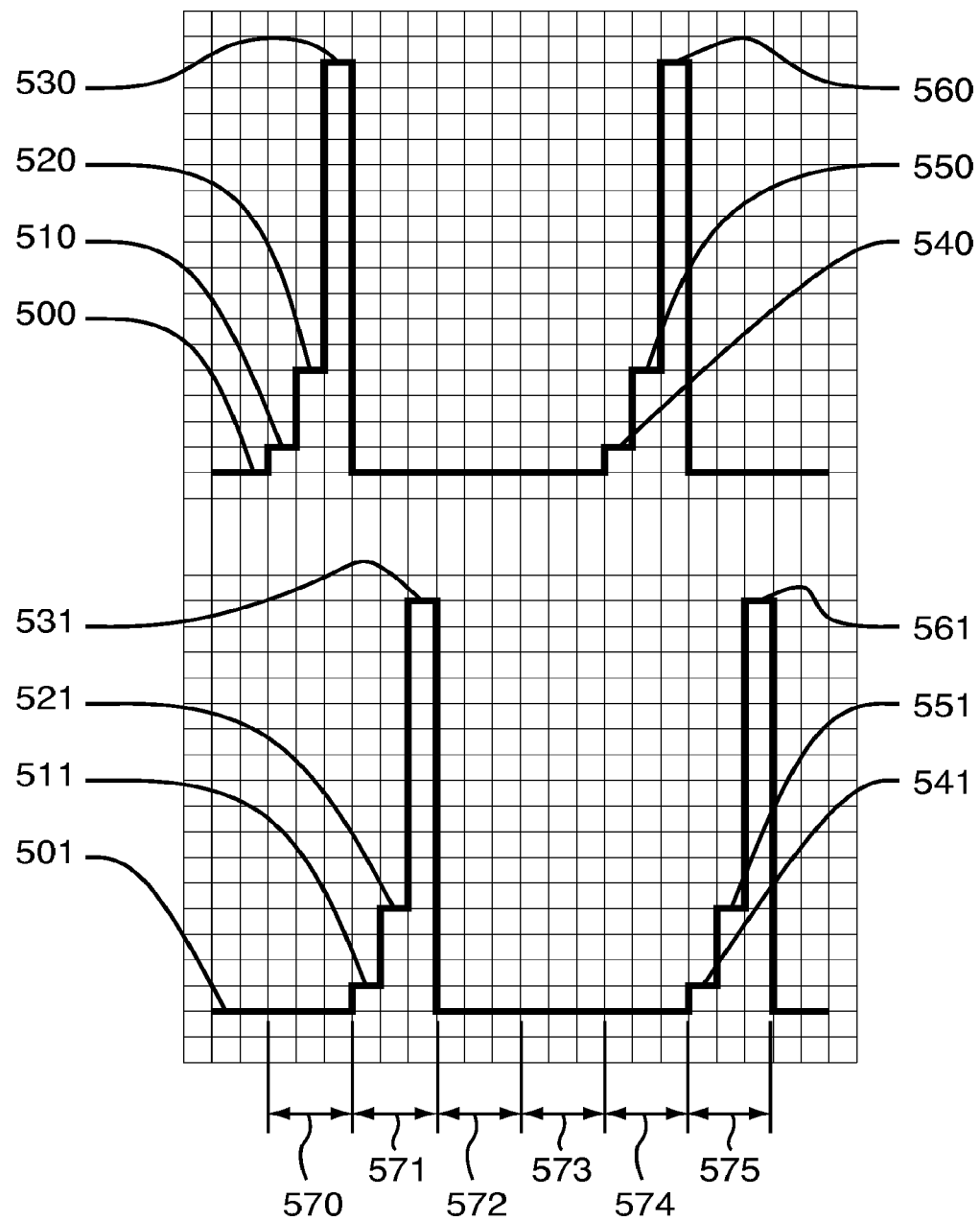
Figure 5A:
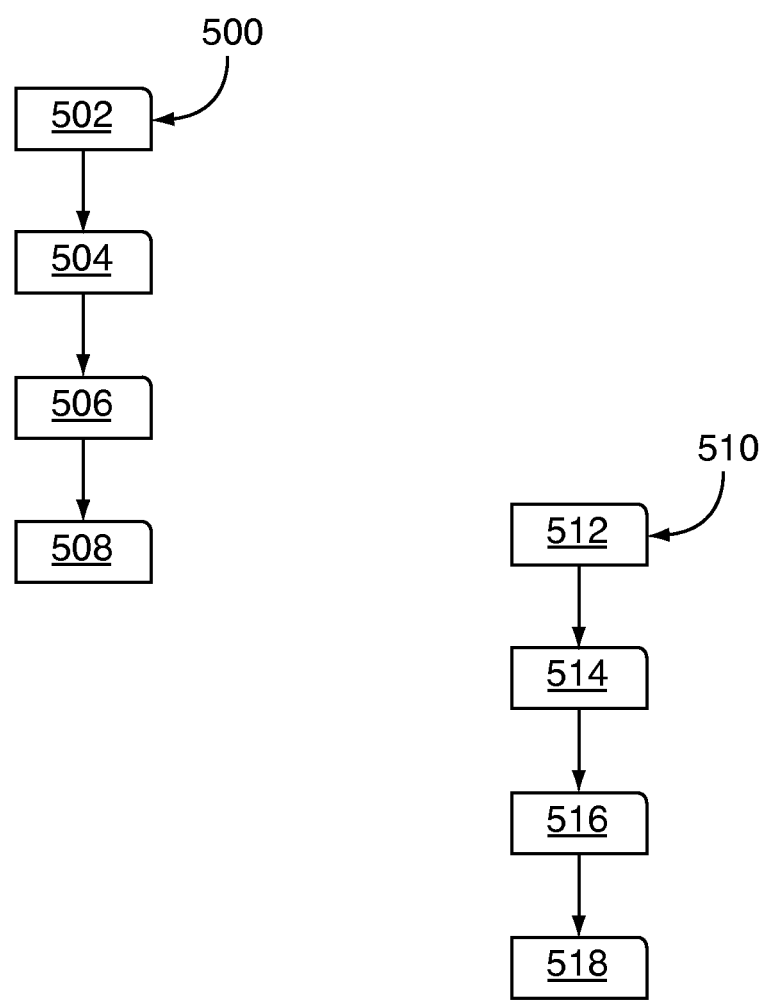
Figure 6:
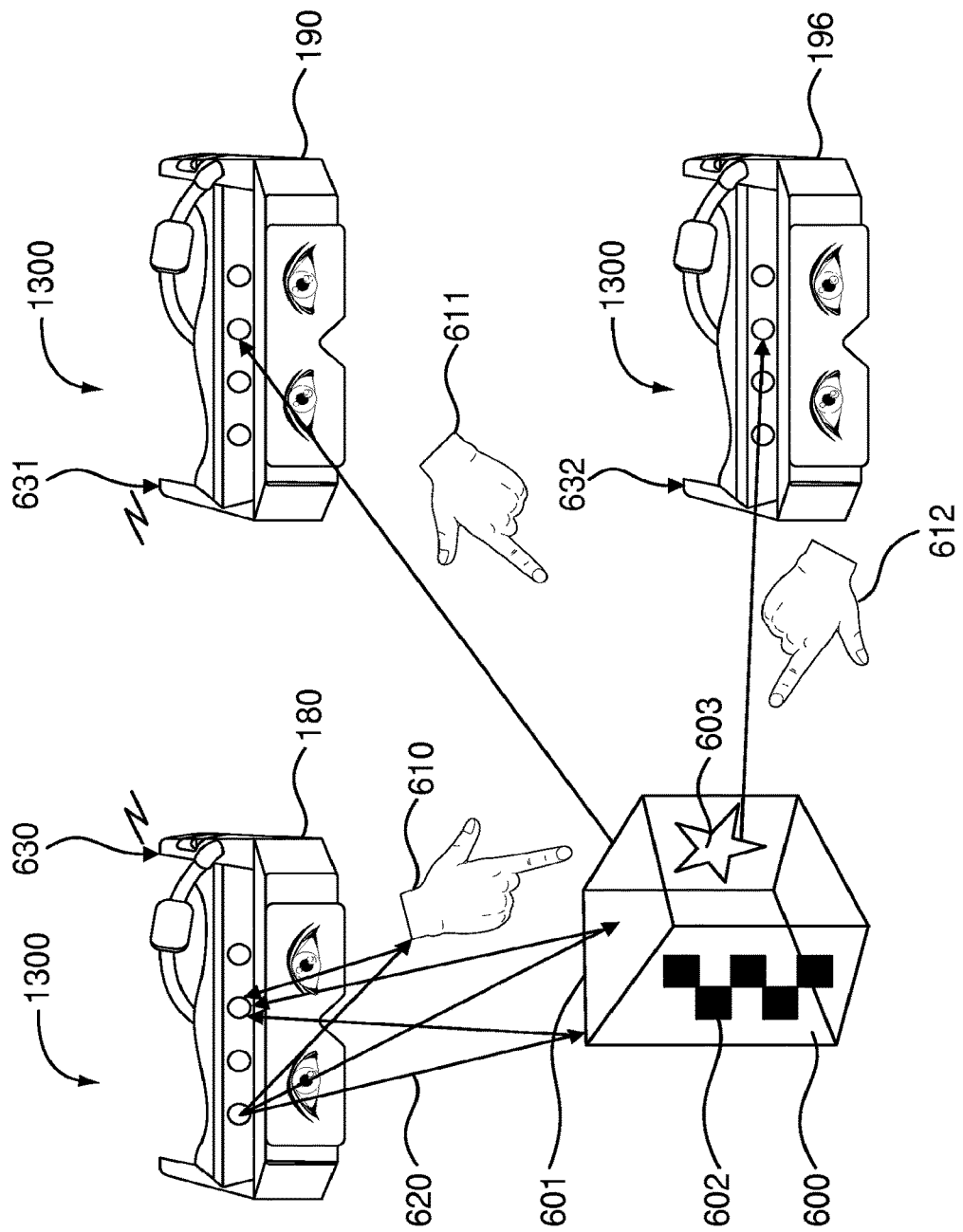
Figure 7:
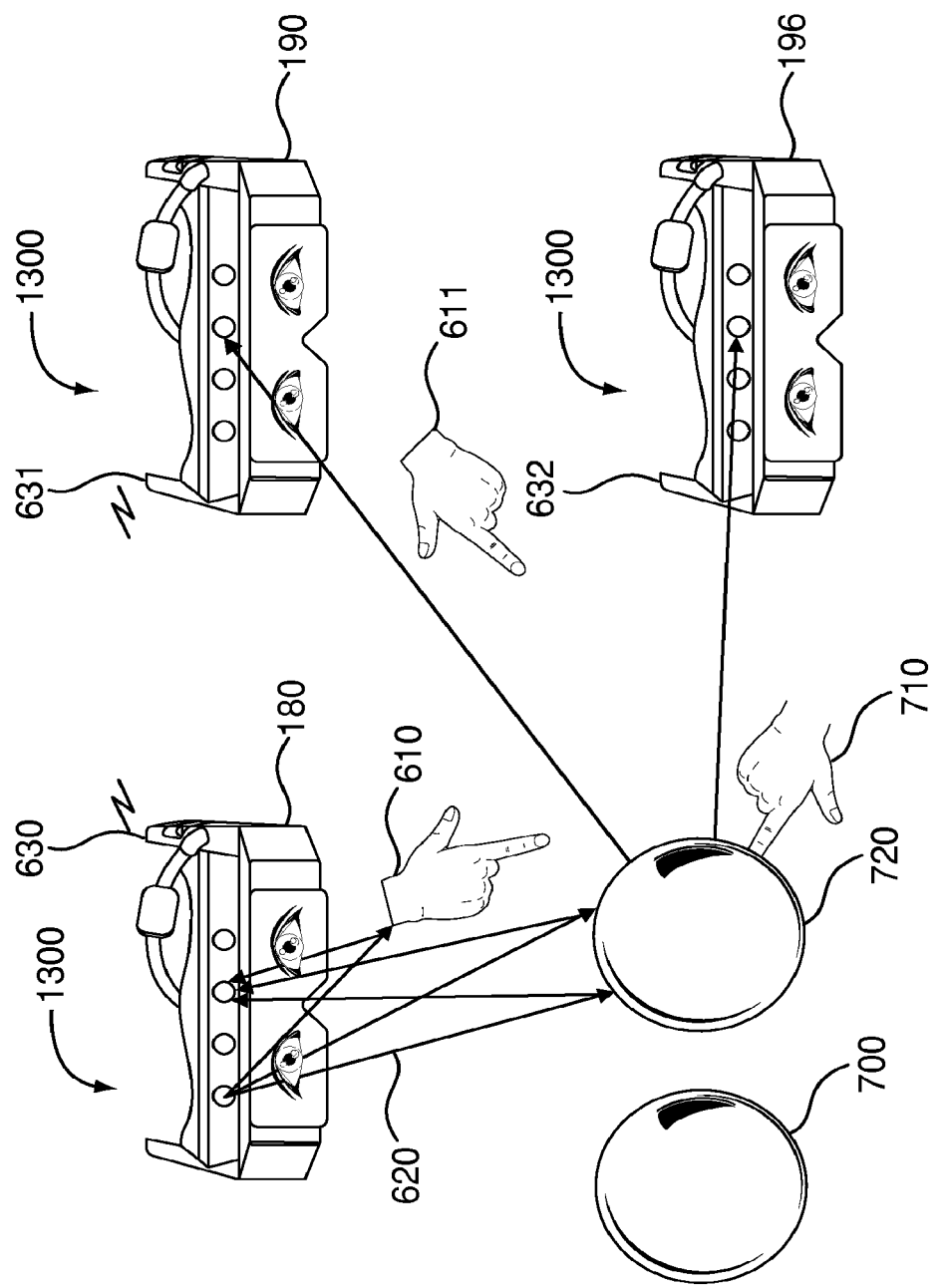
Figure 8A:
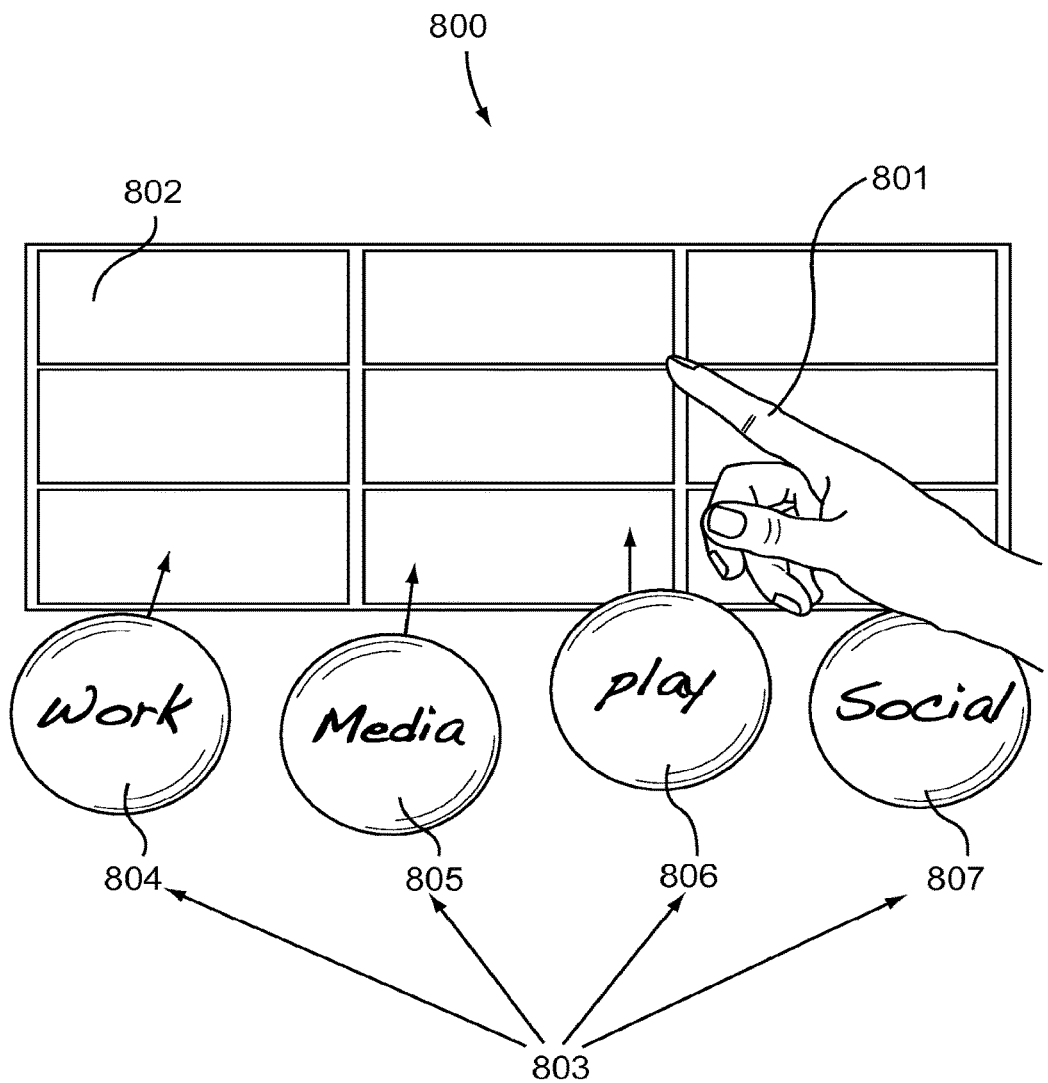
Figure 8B:
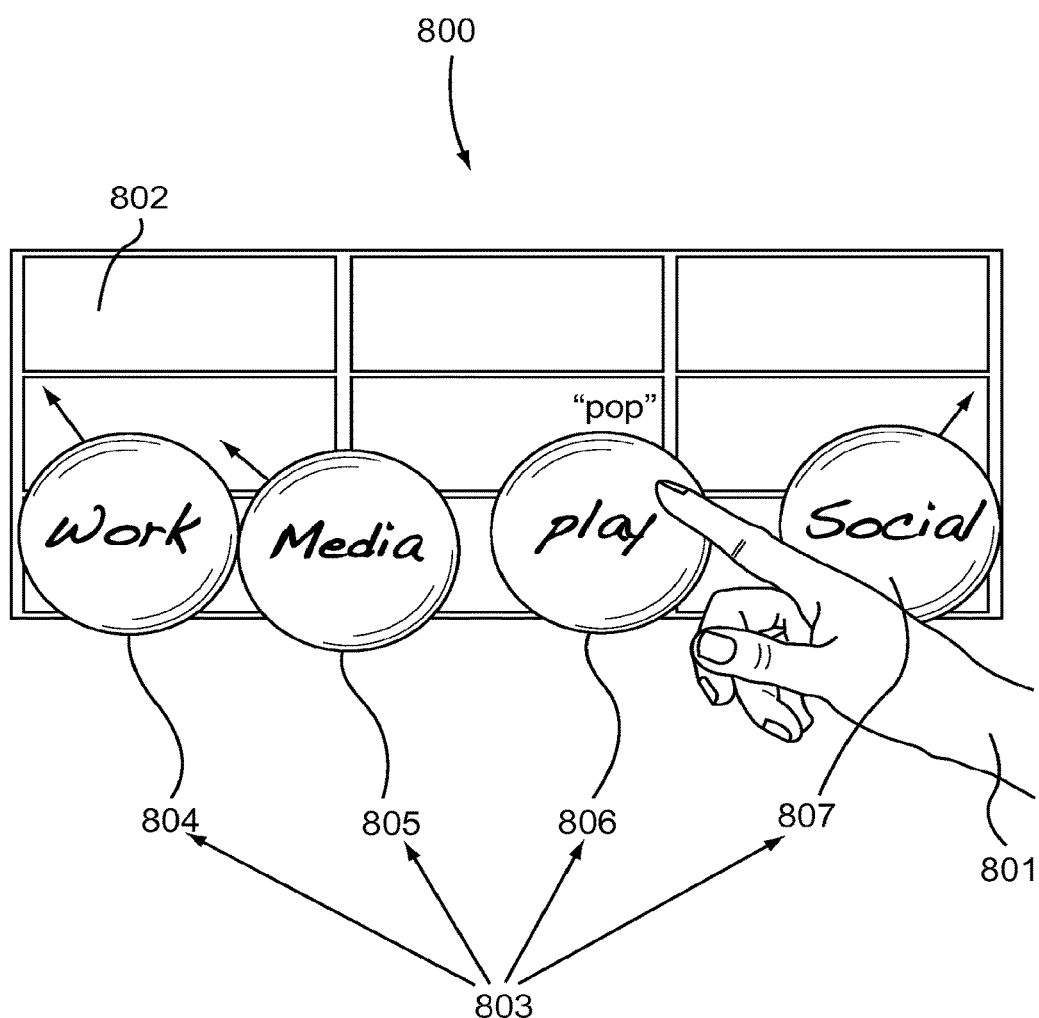
Figure 8C:
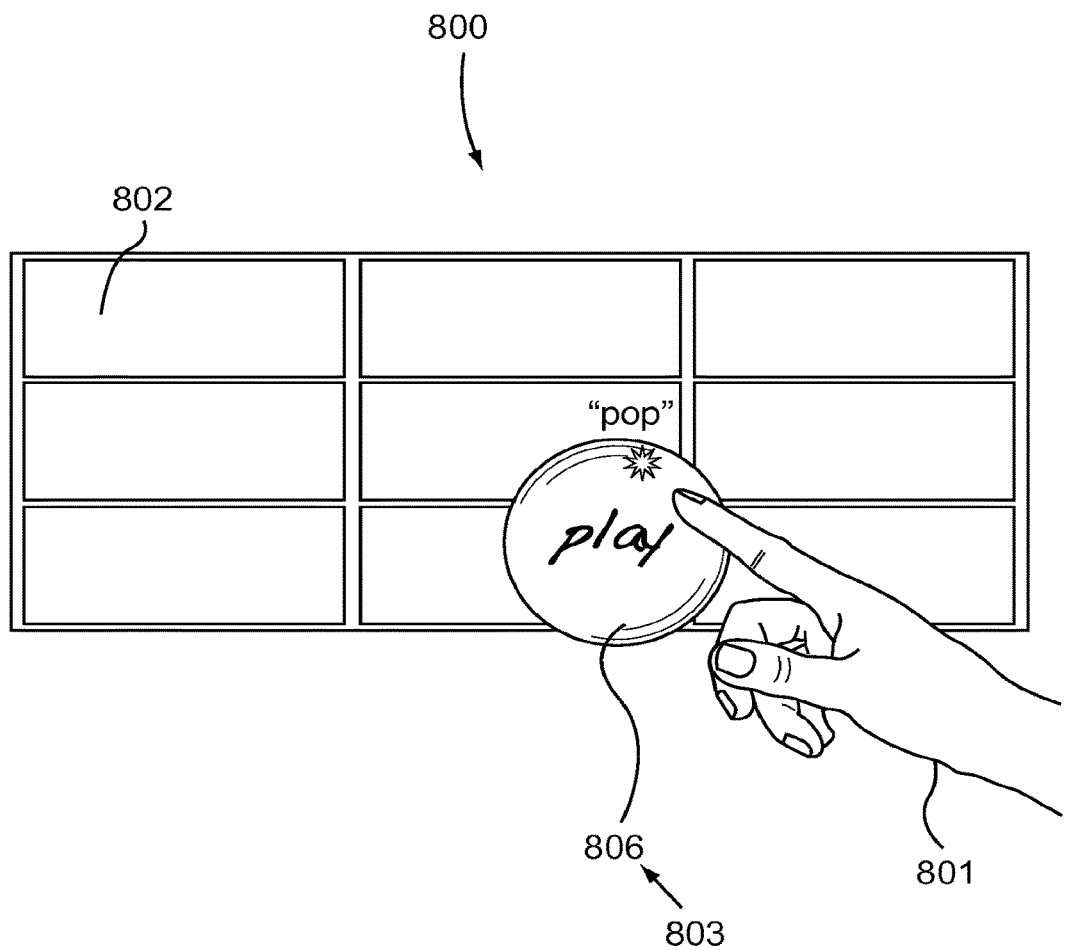
Figure 9A:
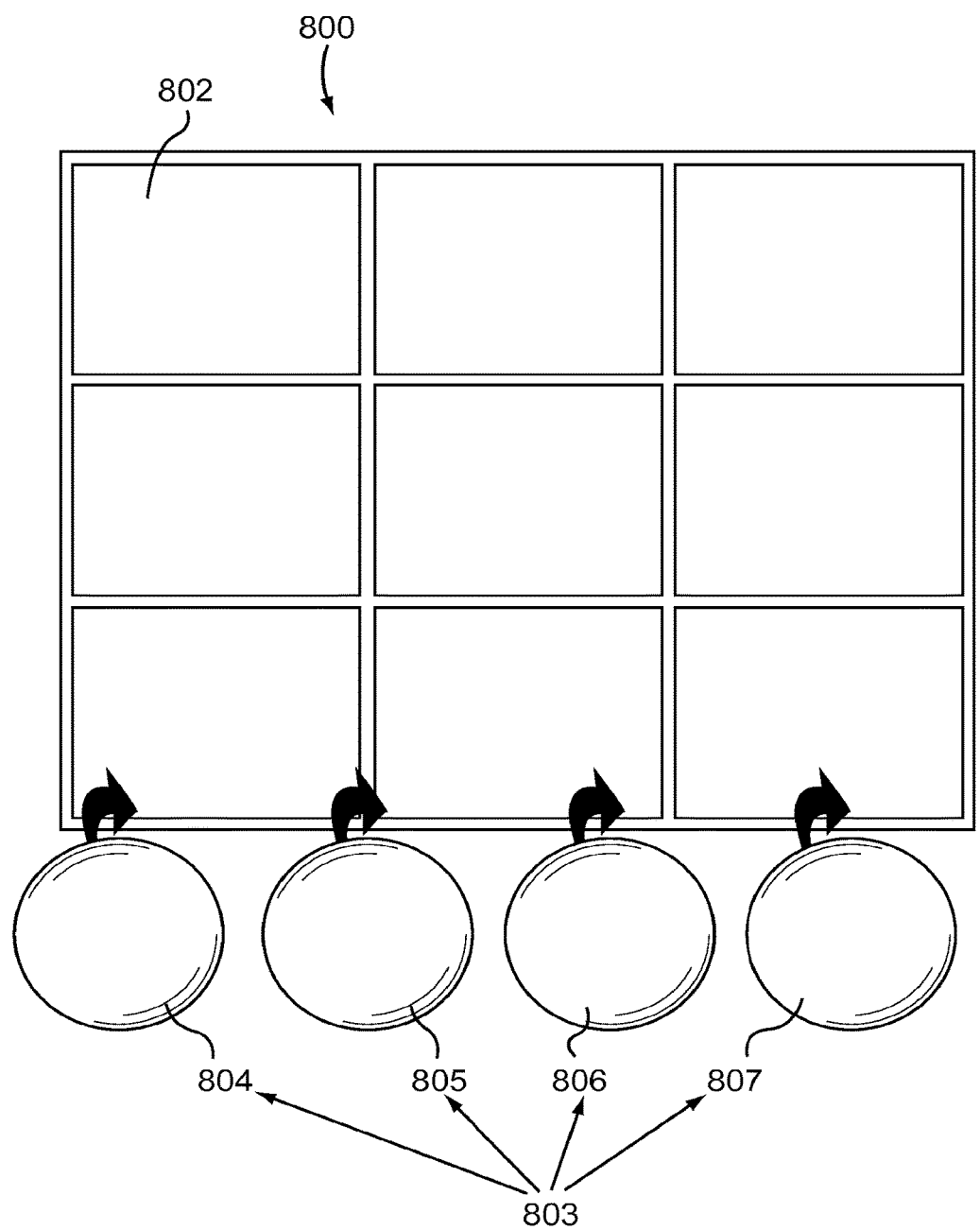
Figure 9B:
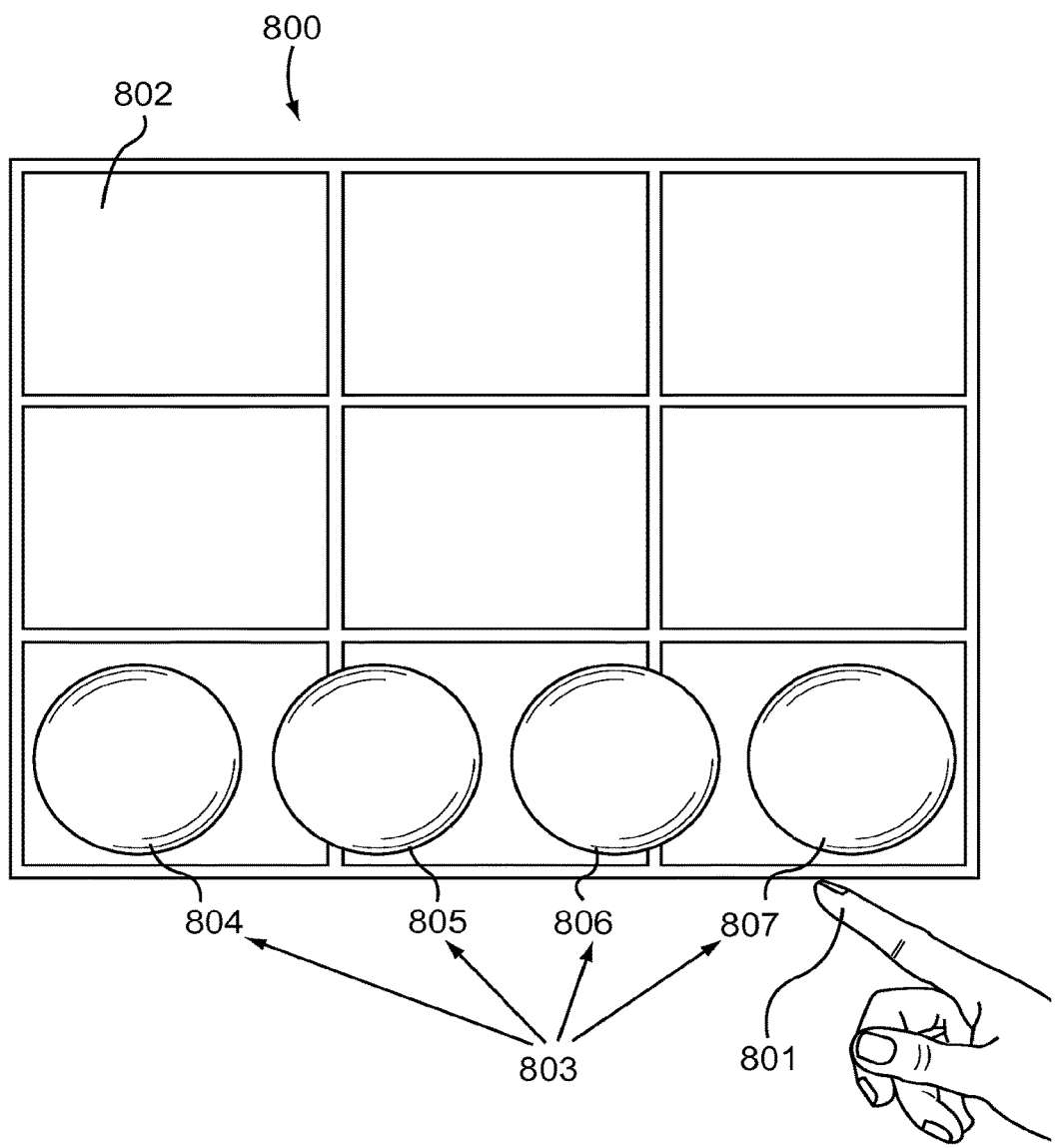
Figure 10A:
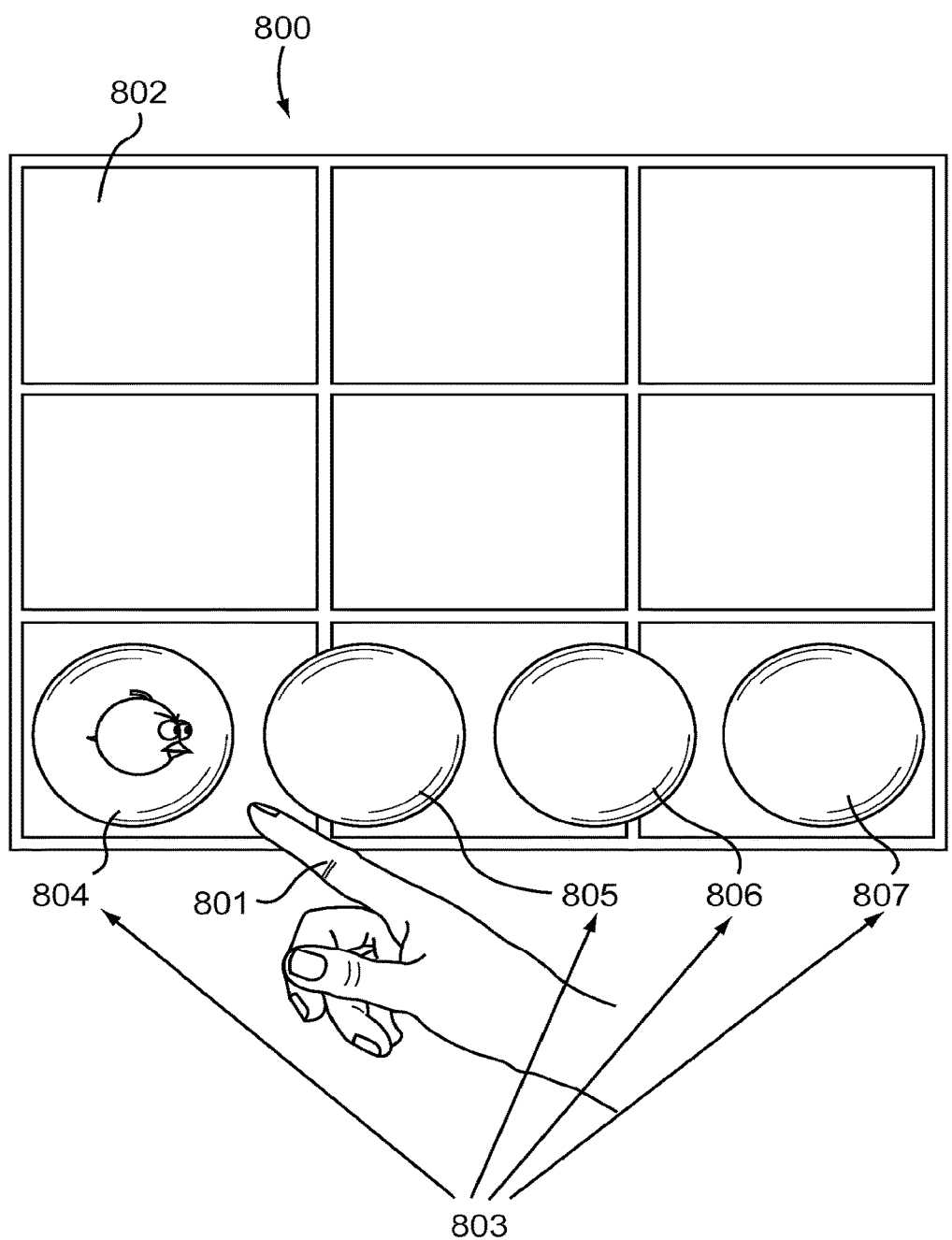
Figure 10B:
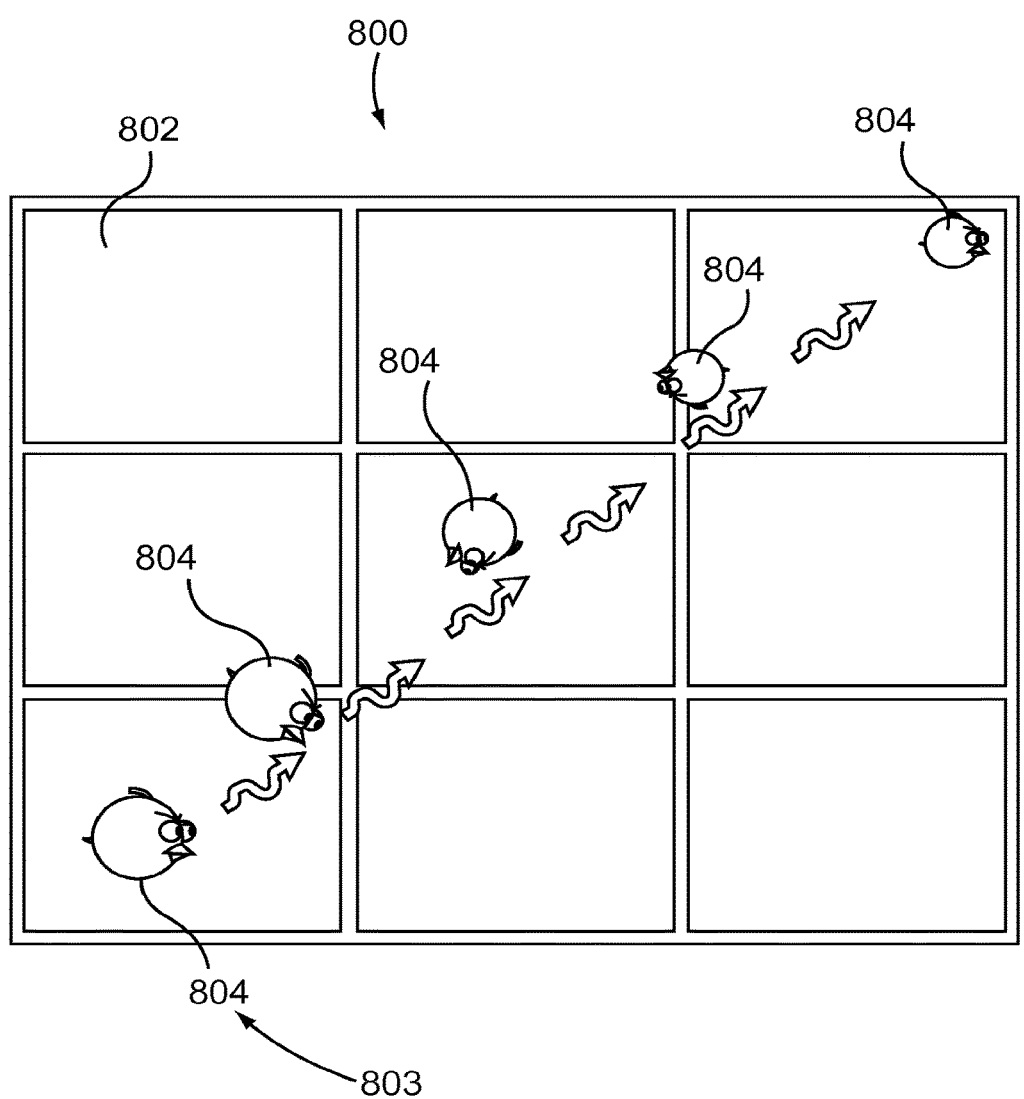
Figure 11A:
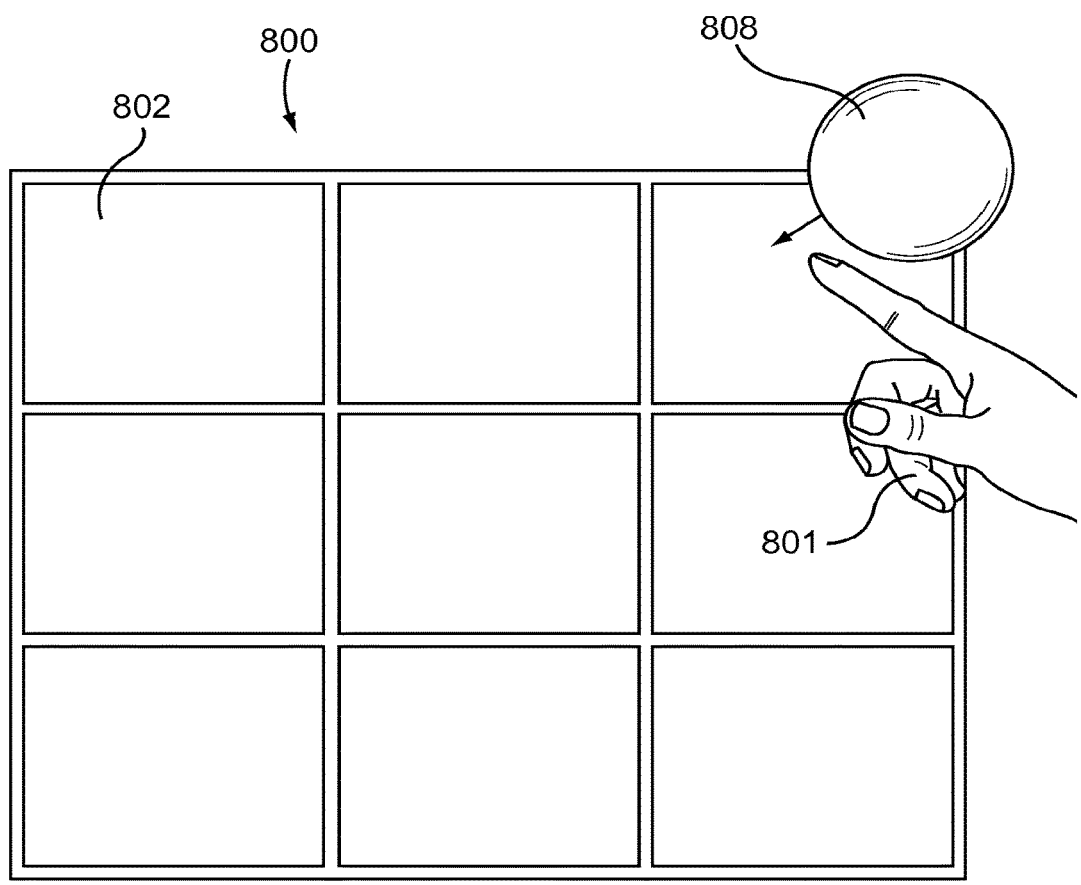
Figure 11B:
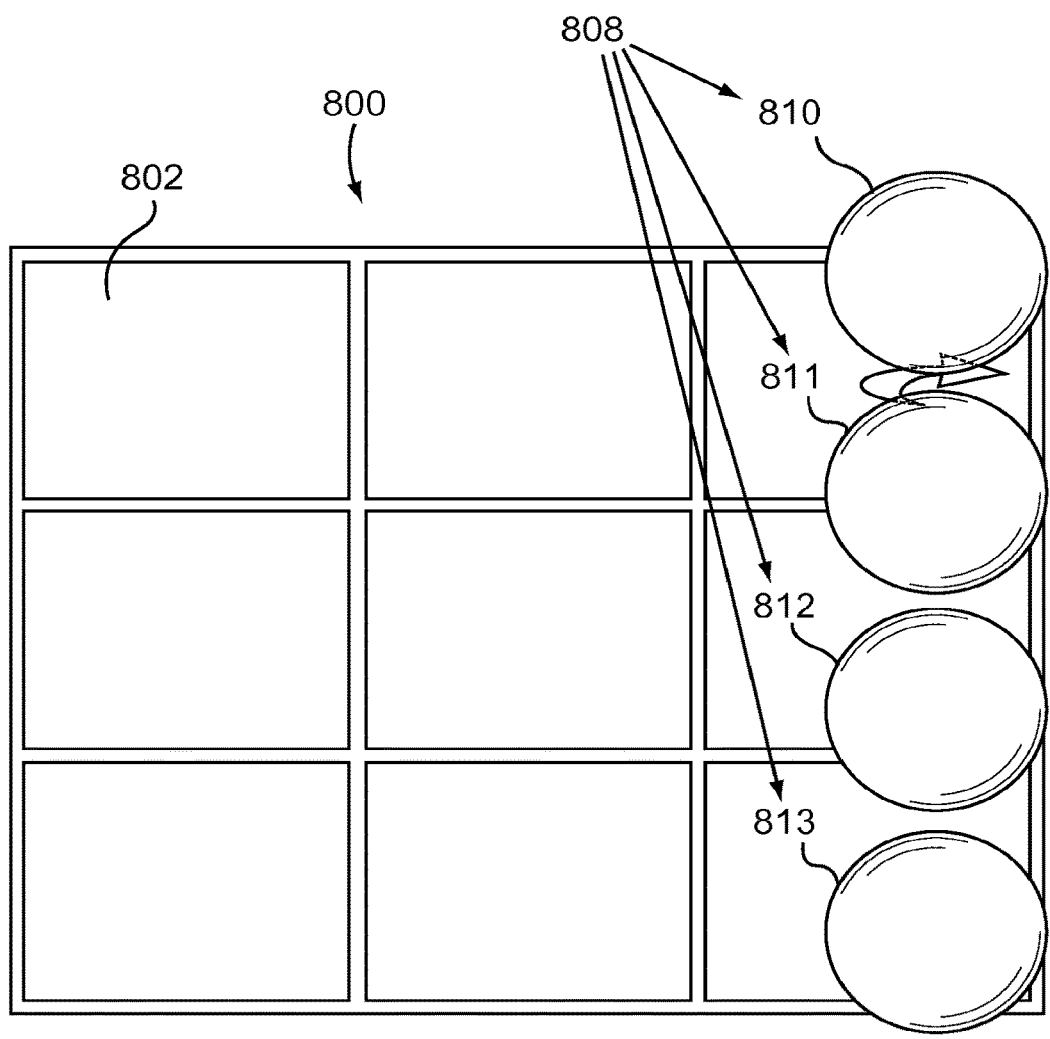
Figure 11C:
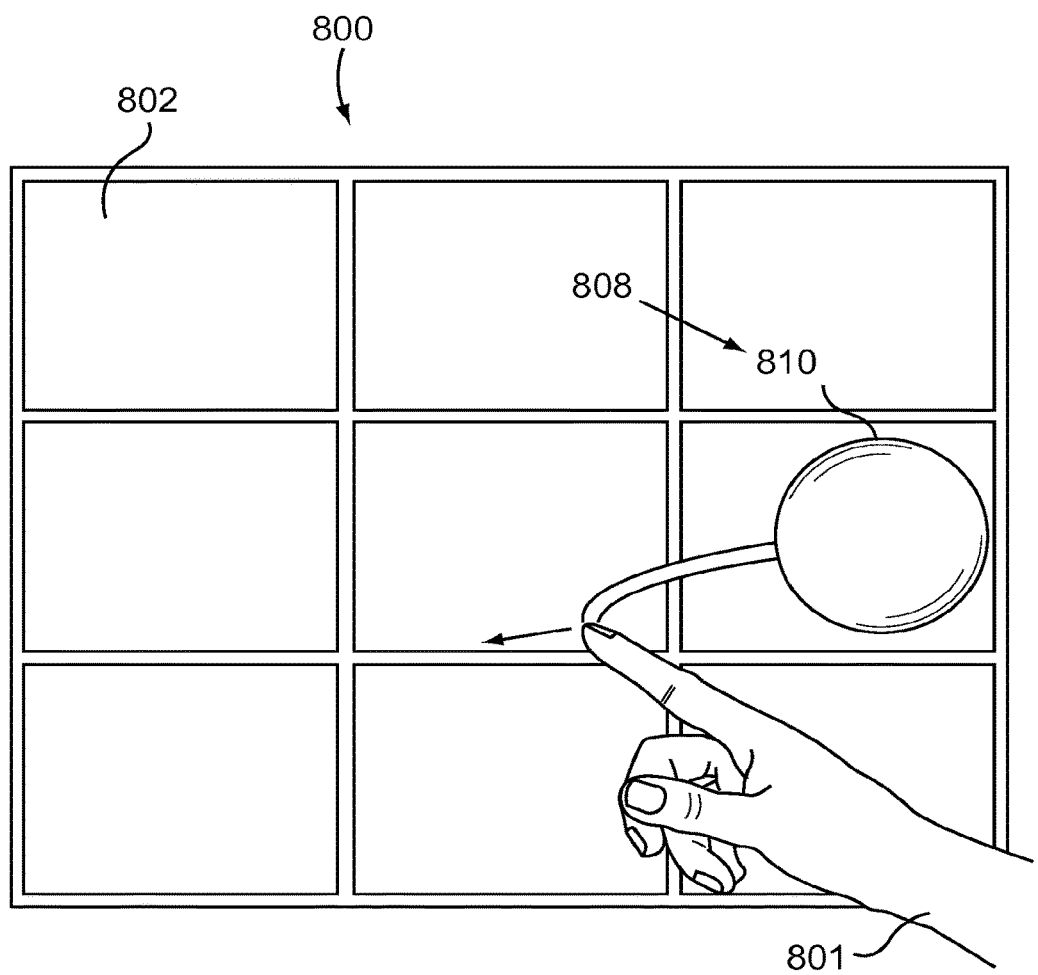
Figure 12:
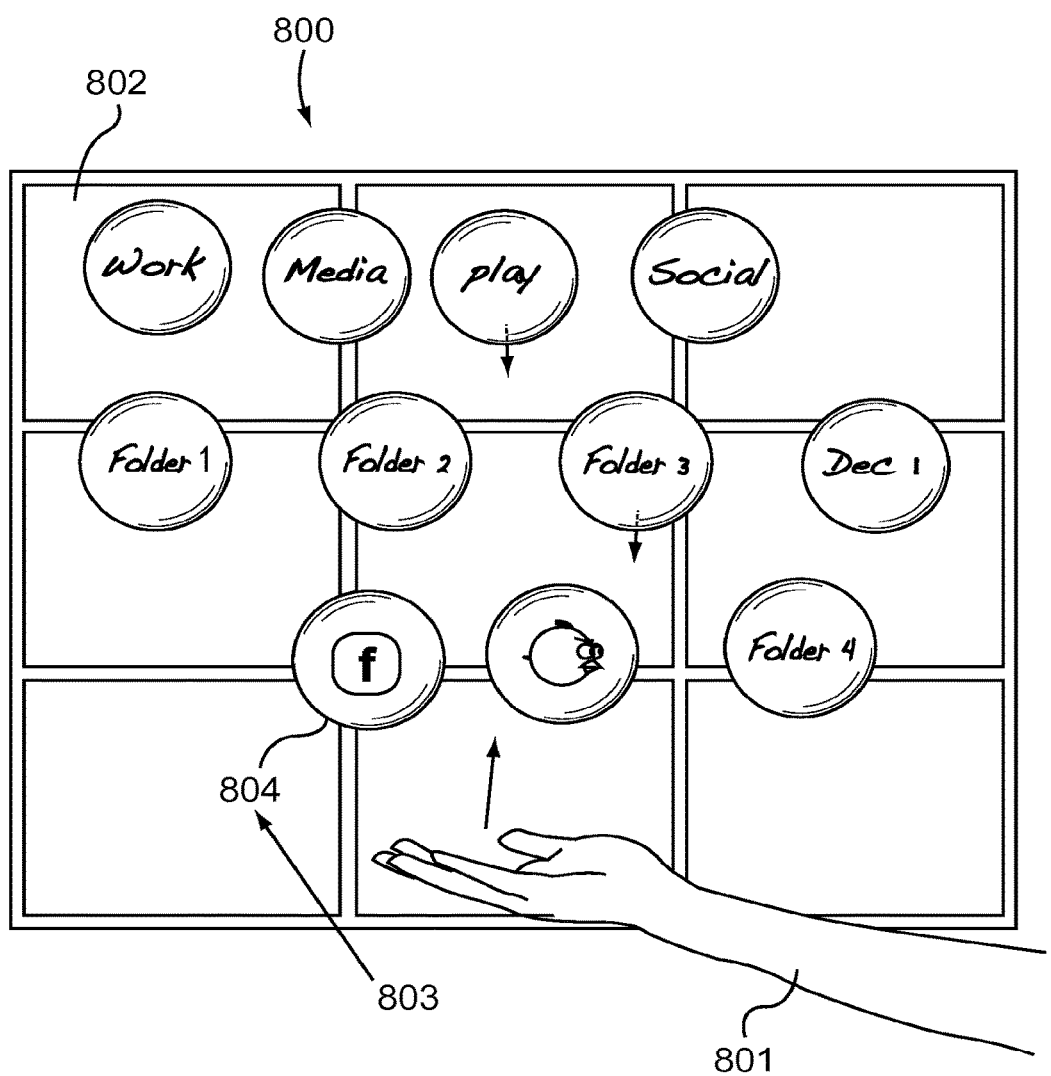
Figure 13:
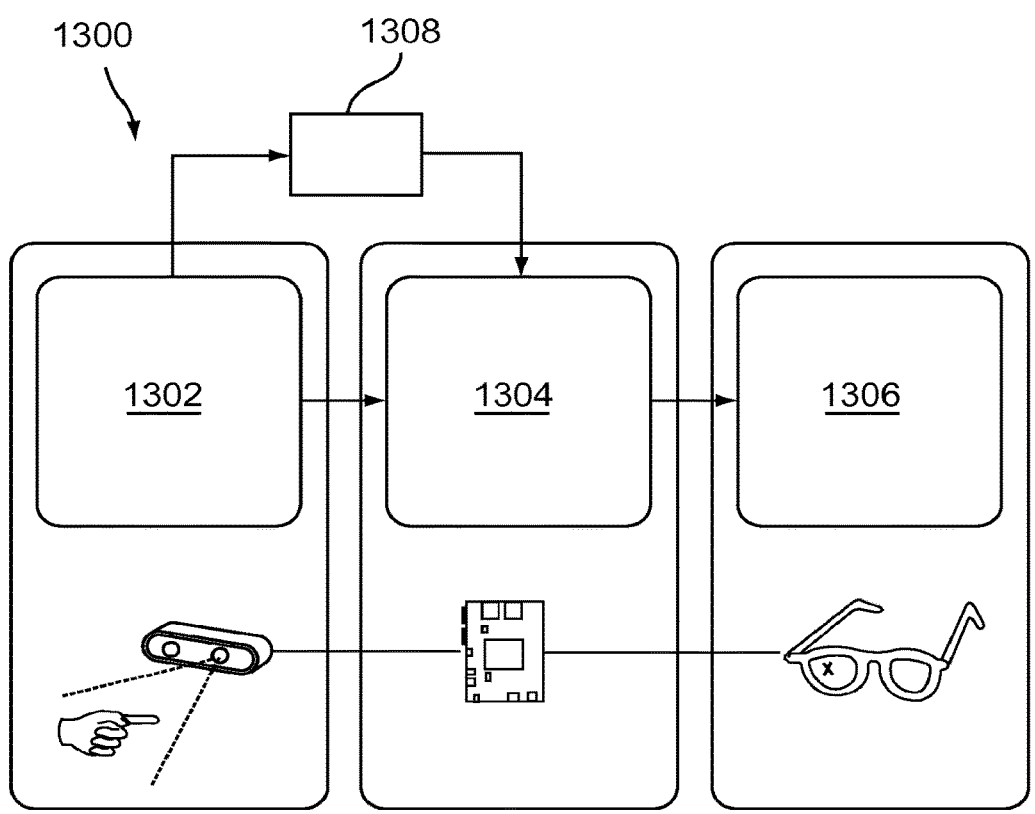
Figure 14:
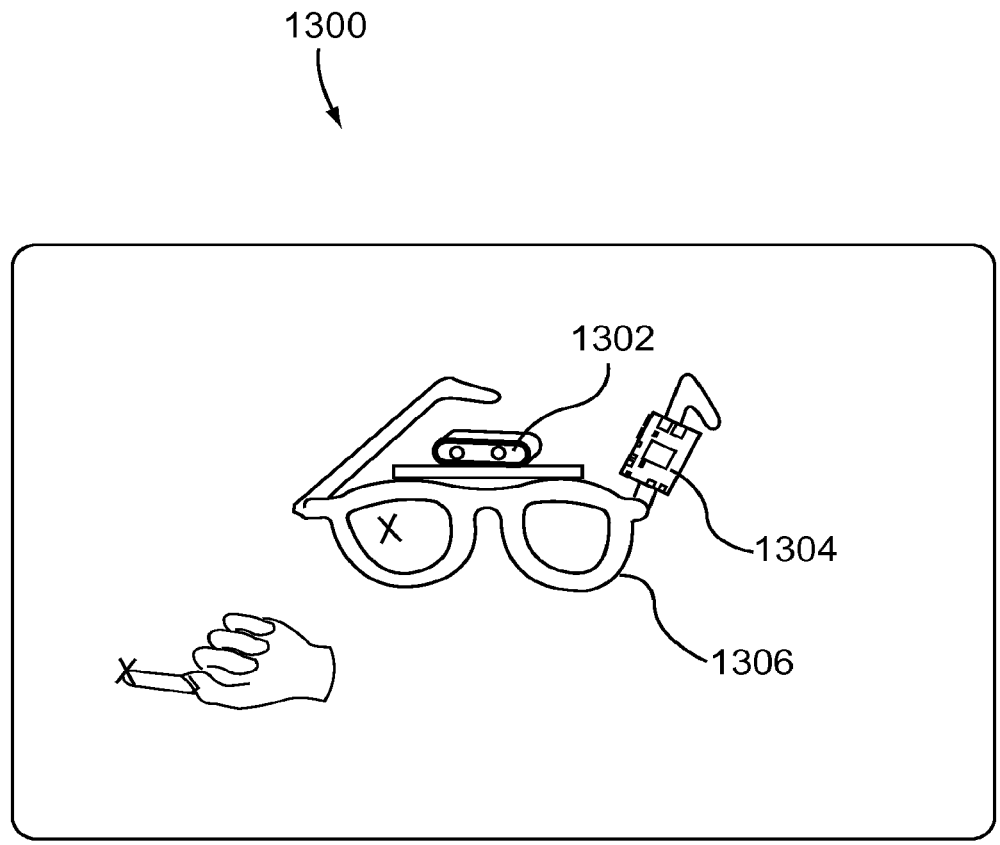

FIG. 1EE depicts a signal processing system in one embodiment that accepts input from a light sensing or light sensing and effectory (luminary) apparatus, as well as from an acoustic sensing or acoustic sensing and effectory (e.g., sonar) apparatus;

FIG. 1F depicts examples of interacting with shared objects using an embodiment of the sensory and display apparatus 1300 of FIG. 1E;

FIG. 1G depicts an example of interacting with shared objects along an abakographic trajectory in one embodiment using the sensory and display apparatus 1300 of FIG. 1E;

FIG. 1H depicts an example of a method for interacting with shared objects using the sensor and display apparatus 1300 of FIG. 1E;

FIG. 2A depicts another schematic example of the sensory and display apparatus 1300 of FIG. 1E;

FIG. 2B depicts Video Orbits stabilization and comparametric alignment, and the like in one embodiment;

FIG. 2C depicts an absement-based signal processor in one embodiment;

FIG. 2D depicts a toposculpting system in one embodiment;

FIG. 2E depicts further details of the toposculpting system in one embodiment;

FIG. 2F depicts a hand-based toposculpting mesher in one embodiment;

FIG. 2G depicts an embodiment of an inverse surface and a meta table, which in some implementations may be referred to as a METAtable Sousface (TRADEMARK) system;

FIG. 3 depicts another schematic example of the sensory and display apparatus 1300 of FIG. 1E in one embodiment;

FIG. 4 depicts another schematic example of the sensory and display apparatus 1300 of FIG. 1E in one embodiment;

FIG. 5 depicts an example of a diagram indicating timing and sequencing operations of the sensory and display apparatus 1300 of FIG. 1E in one embodiment;

FIG. 5A depicts an example of a method of the sensory and display apparatus 1300 of FIG. 1E in one embodiment;

FIG. 6 depicts an example of a real-time augmediated reality shared among multiple participants (users) using the sensory and display apparatus 1300 of FIG. 1E in one embodiment;

FIG. 7 depicts another example of a real-time augmediated reality shared among multiple participants (users) using the sensory and display apparatus 1300 of FIG. 1E in one embodiment;

FIG. 8A depicts a schematic example of a user interface 800 for use with the sensory and display apparatus 1300 of FIG. 1E in one embodiment;

FIG. 8B depicts a schematic example of a user interface 800 for use with the sensory and display apparatus 1300 of FIG. 1E in one embodiment;

FIG. 8C depicts a schematic example of a user interface 800 for use with the sensory and display apparatus 1300 of FIG. 1E in one embodiment;

FIG. 9A depicts a schematic example of a user interface 800 for use with the sensory and display apparatus 1300 of FIG. 1E in one embodiment;

FIG. 9B depicts a schematic example of a user interface 800 for use with the sensory and display apparatus 1300 of FIG. 1E in one embodiment;

FIG. 10A depicts a schematic example of a user interface 800 for use with the sensory and display apparatus 1300 of FIG. 1E in one embodiment;

FIG. 10B depicts a schematic example of a user interface 800 for use with the sensory and display apparatus 1300 of FIG. 1E in one embodiment;

FIG. 11A depicts a schematic example of a user interface 800 for use with the sensory and display apparatus 1300 of FIG. 1E in one embodiment;

FIG. 11B depicts a schematic example of a user interface 800 for use with the sensory and display apparatus 1300 of FIG. 1E in one embodiment;

FIG. 11C depicts a schematic example of a user interface 800 for use with the sensory and display apparatus 1300 of FIG. 1E in one embodiment;

FIG. 12 depicts a schematic example of a user interface 800 for use with the sensory and display apparatus 1300 of FIG. 1E in one embodiment;

FIG. 13 depicts a schematic example of a sensory and display apparatus 1300 of FIG. 1E in one embodiment; and FIG. 14 depicts a schematic example of the sensory and display apparatus 1300 of FIG. 13 in one embodiment.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the drawings. Elements in the several figures are illustrated for clarity and have not necessarily been drawn to scale. For example, the dimensions of some of the elements in the figures may be emphasized relative to other elements for facilitating understanding of the various presently disclosed embodiments.

LISTING OF REFERENCE NUMERALS USED IN THE DRAWINGS 2B subject matter, or true subject matter
100 optical sensor
110 removable shade
120 sensor-interface unit
130 surface
140 public subject matter
141 manifold
142 body part
143 body part
144 trace
145 body part
145 manifold
146 manifold
147 body part
150 network connection
160 computer
170 projection
180AM abakographic manifold, or manifold
180DEG digital eye glass, or glass, or spatial imaging glass
180D display, or display units, or stereo display
180F finger
180G geophone
180H head strap
180IMU inertial sensor
180IRR infrared receiver
180IRT infrared transmitter
180L LiDAR unit
180MD hand
180MS hand 180M mindstrap
180O object
180P object
180Q object
180T tether clip
180TT thumb
180U user
180VR visible light receiver
180VT visible light transmitter
180V vision system
180 digital eye glass
180U user
181BB object
181DEG glass, or digital eye glass, or spatial imaging glass
181G geophone
181IRR receiver
181L LiDAR unit
181MD hand
181MS hand
181M menu selection
181SM spat menu
181U user
181 display unit, or display units
182 geophone
183 head-mountable assembly
184 inertial measurement unit
185 infrared receiver
186 infrared transmitter
187 LiDAR unit
188 back-of-head band
189 clip
190 digital eye glass
191 visible-light receiver
192 visible-light transmitter
193 vision system
194 geophone
195 infrared receiver
196 digital eye glass
197 LiDAR unit
198 eyes, or naked eyes
199A oculus dexter point-of-eye
199B oculus sinister point-of-eye
200 tool point
201 drawing tool
202 virtual subject matter
203 geophonic sensor
204 inertial measurement unit
240 public subject matter
2D8 lamps
2F8 lamps
330 food items
331 burners
334 cooktop
340 secret subject matter
341 sink
400 taction detector
401 homography intrusion detector
402 confluence sensor
403 video-orbits stabilization program
404 comparametric compositor
405 superposimetric compositor
406 comparametric analysis program
407 superposimetric analyzer
408 superposimetric spatial imaging program
409 comparametric compositor
410 spatial-imaging multiplexer
411 time-division multiplexer
412 collaborative gesture-based interface
413 gesture-tracking detector
414 neural network
415 best-fit optimizer
416 gradient descenter
417 regularizer
418 overflow penalizer
419 human-gesture recognition program
420 bubble-metaphor generator
421 spherical volumetric intrusion estimator
422 volume-intrusion detector
423 bubble-bursting program
424 learning software
430 pattern
500 pulse train signal
502 operation
504 operation
506 operation
508 operation
509 pulse train signal
510 weaker illumination signal
511 weaker illumination signal
513 method
520 medium illumination signal
521 medium illumination signal
530 stronger illumination signal
531 stronger illumination signal
540 weaker illumination signal
541 weaker illumination signal
550 medium illumination signal
551 medium illumination signal
560 stronger illumination signal
561 stronger illumination signal
570 first time slot
571 second time slot
572 third time slot
573 fourth time slot
574 fifth time slot
575 sixth time slot
580 method
582 operation
584 operation
586 operation
588 operation
600 object
601 surfaces
602 recognizable surface texture
603 image icon
610 gesture input
611 gesture input
612 gesture input
630 wireless communications module
631 wireless communications module
632 wireless communications module
700 real object
710 hand
720 bursting bubble
800 user interface
801 user
802 view
803 bubble set
804 work bubble
805 media bubble
806 play bubble
807 social bubble
808 settings bubble 810 setting type
811 setting type
812 setting type
813 setting type
8x8 eight
902 interface assembly
903 first interface module
904 sensor signal, or sensor signals
905 second interface module
906 effector signal, or effector signals
907 processing program, or program
908 processing apparatus
909 memory assembly, or non-transitory machine-readable storage medium
910 first sensory-phenomenon sensor, or sensory-phenomenon sensor
911 electronic network connection
912 first sensory-phenomenon effector, or sensory-phenomenon effector
914 second sensor-phenomenon effector, or sensory-phenomenon effector
916 second sensory-phenomenon sensor, or sensory-phenomenon sensor
1000 first augmediated-reality space
1002 second augmediated-reality space
1100 method
1102 operation
1104 operation
1106 operation
1108 operation
1110 operation
1300 apparatus, or display apparatus
1302 first phenomenon interface
1304 processing assembly
1306 second phenomenon interface
1308 depth map
1C10 topological sensor
1C20 maniplay
1C30 sustainment detector
1C40 maniplay terminator
1050 gesture sensor
1060 object deleter
1C70 spat menu
1C80 submanifold mover
1C90 manifold mover
2B00 subject matter
2B05 subject matter
2B06 subject matter
2B10 subject matter
2B11 corner
2B12 corner
2B13 corner
2B14 corner
2B15 subject matter
2B16 subject matter
2B20 subject matter
2B25 subject matter
2B26 subject matter
2B30 subject matter
2B35 subject matter
2B36 subject matter
2C10 process
2C15 process variable
2C20 adder
2C25 error signal
2C30 kinematic processors
2C35 processor
2C40 processed kinematics signals
2C45 adder
2C50 signal
2C55 quantities
2C60 quantities
2C70 signal
2D21 rays
2D22 rays
2D23 visible rays
2D24 rays
2D32 ray
2D34 ray
2D40 exposure
2D51 character exposure
2D55 character exposure
2D60 character exposure
2D70 tabletop surface
2D90 exposure
2D91 abakograph
2D92 abakograph
2E10 abakograph
2E11 weak exposure
2E12 exposure
2E13 exposure
2F64 lamps
1EE10 acoustic trusion input
1EE20 visual trusion input
1EE25 acoustic trusion sensor
1EE30 visual trusion sensor
1EE35 multidimensional trusion signal
1EE40 node
1EE45 connection
1EE50 node
1EE60 connection
1EE70 node
1EE80 taction signal
1EE85 taction signal
1EE90 taction signal
1EE91 intrusion detector
1EE92 touch detector
1EE93 extrusion detector
1EE94 signal
1EE95 signal
1EE96 signal
1EE97 gesture sensor
1EE98 various output signals
2G110 metable label
2G120 object
2G130 metable circular object
2G140 objects
2G150 objects
2G160 toposculpting wand
2G161 ring
2G162 trigger
2G163 detacheable grip
2G164 handle
2G165 shaft
2G168 abakograph
2G169 additional apparatus, or apparatus
2G181 manifold
2G182 manifold
2G184 manifold
2G189 manifold
2G190 gesture band
2G193 object
2G199 middle finger

DETAILED DESCRIPTION

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a". The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized, and functional, logical, organizational, structural and/or topological modifications may be made without departing from the scope and/or spirit of the disclosure.

FIG. 1A depicts a schematic example of a sensing and display apparatus 1300 in one embodiment.

In accordance with FIG. 1A, the sensing and display apparatus 1300 includes (and is not limited to) an interface assembly 902. In one implementation, the interface assembly 902 is configured to interface with sensor signals 904 representing sensory phenomena received from and/or detected in a first augmediated-reality space 1000. The first augmediated-reality space 1000 may be called an augmented reality space and/or a mediated-reality space). The sensor signals 904 may also, in one implementation, represent sensory phenomena received from and/or detected in one or more additional spaces, such as a second augmediated-reality space 1002. In one implementation, the first augmediated-reality space 1000 and the second augmediated-reality space 1002 are exclusive (e.g., do not overlap each other), while in another implementation, all or part of the first augmediated-reality space 1000 and the second augmediated-reality space 1002 may be overlapping, coincident, coextensive, and/or the like. In some implementations, the first augmediated-reality space 1000 and the second augmediated-reality space 1002 may be alternately exclusive and/or coextensive depending on various factors, such as the identity of users, the identity of one or more software applications running on the device, the character and/or value of detected and/or measured ambient factors (e.g., light levels, time, GPS, and/or the like), and/or the like. The interface assembly 902 may also be configured, in one implementation, to interface with effector signals 906 representing, effecting, displaying, providing, and/or the like sensory phenomena to the first augmediated-reality space 1000 and to the second augmediated-reality space 1002. As used herein in various implementations, to interface may include to exchange, convey, receive, and/or the like.

In accordance with another example, the sensing and display apparatus 1300 includes (and is not limited to) the interface assembly 902 including a first interface module. In one implementation, the first interface module may be configured to interface (or to be oriented toward or face) a first augmediated-reality space 1000. In another implementation, the first interface module may be configured to interact in other ways with the first augmediated-reality space 1000. For example, in audio embodiments, the first interface module may include one or more microphones that may, in some implementations, be orientable towards sound sources. The first interface module may be configured to convey and/or exchange the sensor signals 904 and effector signals 906 with the first augmediated-reality space 1000. The interface assembly 902 may also include a second interface module in one implementation. The second interface module may be configured to interface face (or be oriented toward or face) a second augmediated-reality space 1002. The second interface module may be configured to convey and/or exchange the sensor signals 904 and effector signals 906 with the second augmediated-reality space 1002. In one implementation, the effector signals 906 (and/or representations of the effector signals 906) may be user presentable, at least in part, in one or both of the first augmediated-reality space 1000 and the second augmediated-reality space 1002.

The sensor signals 904 and the effector signals 906 are presentable in various forms, at least in part, for user-sensory presentation and/or consumption, such as by way of visual display, audio presentation, user manipulation, and/or any other form of user consumption in one or both of the first augmediated-reality space 1000 and the second augmediated-reality space 1002.

In accordance with an option, the sensing and display apparatus 1300 may also include a processing apparatus 908 configured to operatively couple to the interface assembly 902. In one implementation, the processing apparatus 908 may be configured to process the sensor signals 904 interfaced with and/or otherwise in association with the interface assembly 902, and/or to process the effector signals 906 interfaced with and/or in association with the interface assembly 902. The processing apparatus 908 may include processing (e.g., augmenting, modifying, and/or the like) the sensor signals 904 and/or the effector signals 906.

In accordance with an option, the sensing and display apparatus 1300 may include an interface assembly 902. In one implementation, the interface assembly 902 may include a first interface module 903 configured to interface with sensor signals 904, such as representing sensory phenomena received from a first augmediated-reality space 1000, and/or also representing sensory phenomena received from the second augmediated-reality space 1002. In one implementation, the interface assembly 902 may also include a second interface module 905 configured to interface with effector signals 906 representing, displaying, providing, projecting, and/or the like sensory phenomena to the first augmediated-reality space 1000 and to the second augmediated-reality space 1002. Other configurations of the interface assembly 902 are possible in view of the description provided herein.

For example, the first augmediated-reality space 1000 is an augmented or mediated-reality environment (space) configured to be a space that is shared among two or more users (a publicly shared space). The second augmediated-reality space 1002 is an augmented or mediated-reality environment (space) configured to be a space used by a user (e.g., a personal space), or a space that may be shared (e.g., for use) by a limited number of users (e.g., a private space), or a space that may be shared by all users of the first augmediated-reality space 1000.

For example, the second augmediated-reality space 1002 is configured to provide (to the user or the users) a live (direct or indirect) view of the first augmediated-reality space 1000. In one implementation, the first augmediated-reality space 1000 includes a physical (real world) environment having physical elements that may be augmented, supplemented and/or mediated, (e.g., augmediated) by computer-generated sensory phenomena (such as sound, video, graphics, tactile elements, and/or the like), such as may be projected onto the physical elements contained in the first augmediated-reality space 1000, or sensory phenomena that are modified (e.g., by computer) with the modified version presented to the user (for example, diminished reality to help the user sense and understand the world better by removal of "clutter", such a diminished reality being another example of an augmediated reality). The apparatus 1300 thus may be configurable, in some implementations, to incorporate any combination of physical elements and/or information, virtual elements and/or information, and/or elements that are effected, projected, subtracted, and/or the like onto or from the environment, into displayable subject matter for presentation via an output display, e.g., to a user of the device. In some implementations, effector signals and/or other computer-generated sensory phenomena may be employed for any of a variety of uses beyond and/or in addition to illumination, augmentation and/or demarcation of subject matter in the environment. For example, in one implementation, effector signals and/or other computer-generated sensory phenomena may include red-eye reduction flash capabilities, wherein a flash is preceded by a series of low-power flashes to trigger contraction of the pupil. In another example, in one implementation, effector signals and/or other computer-generated sensory phenomena may include a flash, strobe, and/or the like for alerting, warning, blinding, disabling, disorienting, and/or the like.

In one implementation, the first augmediated-reality space 1000 may be a shared space, shared by multiple users. In one implementation, users sharing a first augmediated-reality space 1000 may be located near each other, for example, e connecting via any type of network connection, such as (and not limited to) a local area network, the Bluetooth (TRADEMARK) network, the WiFi (TRADEMARK) network, and/or the like, while in another implementation, users may be located remotely from each other, for example, and are connected via a wide area network, cellular network, TCP/IP network, and/or the like. The second augmediated-reality space 1002 may be a shared space as well and may include options for limited sharing with other users. The second augmediated-reality space 1002 may, in one implementation, belongs to and/or be assigned to a predetermined and/or selected user drawn from a group of users. In this sense, the second augmediated-reality space 1002 is a personal space of a predetermined user. The user of the second augmediated-reality space 1002 may permit access to the second augmediated-reality space 1002 to no users, to a subset of the users or all of the users associated with the first augmediated-reality space 1000 (e.g., in accordance with the desire or control of the user assigned to the second augmediated-reality space 1002). In various implementations, one or both of the first augmediated-reality space 1000 and one or more instances of the second augmediated-reality space 1002 may be network accessible, such as via any type of network, such as (and not limited to) a local area network, a wide area network, a cellular network, a WiFi (TRADEMARK) network, a Bluetooth (TRADEMARK) network, a TCP/IP enabled network, and/or the like. The Internet protocol suite is the networking model and a set of communications protocols used for the Internet and similar networks. The Internet protocol suite is commonly known as TCP/IP, because its most important protocols, the Transmission Control Protocol (TCP) and the Internet Protocol (IP), were the first networking protocols defined in this standard.

For example, for the case where there are seven users associated with the first augmediated-reality space 1000, each member of that group of users has access to the first augmediated-reality space 1000, and in this way, the first augmediated-reality space 1000 is treated as a communal space (e.g., a public space). The phenomena (sensory phenomena) associated with the first augmediated-reality space 1000 may be experienced or shared, in a communal way, by the users who access the first augmediated-reality space 1000 by way of each user's respective instance of the sensory and display apparatus 1300.

In one implementation, each user may be assigned their own instance of a second augmediated-reality space 1002 via their respective instance of the sensory and display apparatus 1300. The apparatus 1300 is configured to permit the user of the apparatus 1300 access to the first augmediated-reality space 1000, and access to their instance of the second augmediated-reality space 1002. The apparatus 1300 is configured to allow the user to permit a degree of access (e.g., no access, limited access, full access) to their instance of the second augmediated-reality space 1002 to the other users of the first augmediated-reality space 1000. In one implementation, ranges of access may be applied and/or enforced, such as access for set and/or limited times and/or locations; profile, permissions and/or role-based access; task and/or accomplishment-based access; and/or the like. Such ranges of access may be enforced, in one implementation, based on access records linked to data records associated with access triggers and/or parameter values. In an implementation of shared access, a first user's instances of the second augmediated-reality space 1002, shared to the first augmediated-reality space 1000 of one or more other users, may be annotated, tagged, and/or otherwise labeled. For example, a second augmediated-reality space 1002 instance may include one or more characteristic annotations, logos, watermarks, drawings, graphics, photos, names, labels, tags, colors, shapes, sounds, and/or the like, such as may identify the first user as associated with the second augmediated-reality space 1002. In one implementation, a user with access privileges to two or more instances of the second augmediated-reality space 1002 may select viewing options and/or direct views of the plurality of the second augmediated-reality space 1002, such as by opening, closing, moving, resizing, maximizing, minimizing, orienting, squeezing, stretching, sculpting, and/or the like selected shared second space views. In one implementation, a user with access privileges to at least one shared second space may be presented conflicting and/or inconsistent views of the same object and/or physical space between the first augmediated-reality space 1000, the second augmediated-reality space 1002 and, in some instances, one or more additional shared second spaces. For example, in a game scenario, a virtual object may appear to some users but not others based on game parameters. A user viewing two shared second spaces, one with the virtual object and one without, may thus perceive different views of the same physical space (e.g., one with the virtual object and one without). In one implementation, views of the second augmediated-reality space 1002 may be overlaid with each other and/or with the views of the first augmediated-reality space 1000. In one implementation, subsets of objects, virtual objects, and/or other display components may be presented within particular shared views of a given second augmediated-reality space 1002, such as based on the roles, privileges, settings, and/or the like of the receiving user.

For instance, a first user, by way of a configuration setting provided by the sensory and display apparatus 1300, may be able to restrict access to their instance of the second augmediated-reality space 1002 so that no other users of the first augmediated-reality space 1000 (accessed by way of respective instances of the sensing and display apparatus 1300) may have access or shared access to the second augmediated-reality space 1002 of the first user. The first user has decided to make his instance of the second augmediated-reality space 1002 (via the sensing and display apparatus 1300) private and inaccessible to the other users having their own instance of the apparatus 1300.

In an example, a second user of the first augmediated-reality space 1000, by way of the configuration setting in their instance of the apparatus 1300, permits a third user and a fourth user to access the second augmediated-reality space 1002 assigned to the second user. The third user and the fourth user may decide whether to share their own respective instances of the second augmediated-reality space 1002 with the second user.

The remaining users (associated with the first augmediated-reality space 1000) may set up access of their instance of the second augmediated-reality space 1002 (via their respective instances of the sensing and display apparatus 1300) in accordance with their respective needs, choices, roles, privileges, and/or the like, as indicated above (for example).

For instance, in one embodiment, an electronic game (such as an augmented or mediated reality game) may be set up, in which two opposing teams of users match up their skills in a team effort. Therefore, a first team of users of the first augmented or first augmediated-reality space 1000 may configure their instance of the sensing and display apparatus 1300 in such a way that each member of the team has access to each respective instance of the second augmediated-reality space 1002 of each member of the first team. This way, the team members may chat (exchange user communications) amongst themselves while they play the game and strategize for victory over the second team of users while the game is played out in the first augmediated-reality space 1000. In the first augmediated-reality space 1000, all users have access to the first augmediated-reality space 1000 and may interact while the game is played out. The electronic game may be a war game, a chess game, and any other sort of game that engages team players, etc. The size of a team may be at least one user. The users may, in one example, be physically located in remote locations.

In accordance with an option, multiple users, each wearing an instance of the sensing and display apparatus 1300, may experience a shared computer-mediated reality (e.g., in the first augmediated-reality space 1000 and/or in the second augmediated-reality space 1002). In another option, users not wearing the sensing and display apparatus 1300 may even share some elements of the computer-mediated reality in the first augmediated-reality space 1000 and may also participate within the first augmediated-reality space 1000.

More than one user may wear their instance of the sensing and display apparatus 1300 while viewing the same subject matter. In the case of multiple instances of the apparatus 1300, each instance of the sensing and display apparatus 1300 may, in one implementation, be configured to perform spatial-imaging functions (operations) while sharing data (phenomenon signals, for example) with one or more other instances of the sensing and display apparatus 1300 in the first augmediated-reality space 1000 and/or the second augmediated-reality space 1002.

The sensing and display apparatus 1300 may be configured to provide an augmediated reality environment (e.g., augmediated reality, a mediated reality experience) via the first augmediated-reality space 1000 and/or via the second augmediated-reality space 1002, which may be controllable through the movements of the appendages of the user (hands, fingers, arms, legs, feet, etc.) interacting either in free-space, with one or more virtual objects, and/or interacting with a tangible (physical) object, such as a flat surface (e.g., a table, a countertop, a cooktop, the floor, the ground, and/or the like).

In one implementation, the first augmediated-reality space 1000 and the second augmediated-reality space 1002 may be configured to provide imagery, such as three-dimensional imagery, to the user or users. The first augmediated-reality space 1000 and the second augmediated-reality space 1002 may, in some implementations, be referred to as a cyborg space and/or a mediated reality environment. The first augmediated-reality space 1000 and the second augmediated-reality space 1002 may be configured to provide access (e.g., a view) to a reality that may be modified (e.g., diminished, augmediated, and/or the like) by the processing apparatus 908. The processing apparatus 908 may, in one implementation, be configured to enhance perception of reality for the user and/or users. In one implementation, the processing apparatus 908 is configured to provide and/or facilitate the first augmediated-reality space 1000 and the second augmediated-reality space 1002 in real-time and in a semantic context with environmental elements, such as sports scores of sporting events during a match. For example, by adding and/or using computer-vision devices and/or object-recognition devices, the information about the surrounding real world of the user or users becomes interactive and may be manipulated digitally by the processing apparatus 908 of the sensing and display apparatus 1300. In one implementation, meta (e.g., artificial, virtual, additional, augmediating, and/or the like) information about the first augmediated-reality space 1000 and the second augmediated-reality space 1002 may be overlaid on the physical elements associated with (e.g., located in) the first augmediated-reality space 1000. By way of example, the first augmediated-reality space 1000 may be configured to be accessible by users (e.g., more than two users), and the second augmediated-reality space 1002 may be configured to be accessible by a single user or by any number of users as desired by the user of their instance of the second augmediated-reality space 1002. Additional examples of the first augmediated-reality space 1000 and the second augmediated-reality space 1002 are described below in connection with the figures. In accordance with an option, the first augmediated-reality space 1000 includes a spatial augmediated reality environment configured to augment real world objects and scenes by using a digital projector (an example of an effector assembly) configured to display graphical information onto physical objects located in the first augmediated-reality space 1000. The spatial augmediated reality environment may be configured to accommodate access to a group of users, thus allowing for collocated collection and/or collaboration between users of the spatial augmediated reality environment.

The sensor signal 904 is generated and/or provided by a sensor and/or sensor assembly in response to receiving, at least in part, one or more sensory phenomena (such as, visual phenomena, auditory phenomena, tactile phenomena, and/or the like). The sensor assembly is configured to be sensitive to the receipt of, at least in part, the sensory phenomena (also called sensory stimuli). The sensor assembly is configured to detect a physical quality and/or quantity (e.g., associated with one or more sensory phenomena), and to convert and/or manifest the physical quality and/or quantity into the sensor signal 904. The sensor signal 904 is configured to be readable by an electronic apparatus (such as, the processing apparatus 908 of FIG. 1A, etc.). The sensor signal 904 may, for example, be an electrical signal, an optical signal, or any type of signal embodied in any suitable medium. An example of the sensor assembly includes a thermometer, or a thermocouple. In another example, the sensor assembly may include a tactile-based sensor. Other examples of the sensor assembly are identified below in connection with FIG. 1E (and other figures).

The effector signal 906 is a signal provided by (transmitted by) an effector and/or effector assembly. The effector assembly is configured to produce a desired (predetermined) change in an object (such as an image) in response to receiving an input (e.g., input signal, sensory phenomena). An example of an effector assembly includes an optical-projection system. The object may be an optical object, image object, video object, and/or the like\, and may include an image based on visible light. In one implementation, the effector assembly may include an actuator configured to actuate or control. In one implementation, an actuator is the mechanism by which a control system acts upon an environment. Further examples of the effector assembly are identified below in connection with FIG. 1E (and other figures).

Referring to FIG. 1B, in accordance with an option, the sensing and display apparatus 1300 may be configured to include the first sensory-phenomenon effector 912 and the second sensory-phenomenon effector 914, which may, in some instances, be referred to as spatial-imaging devices. Examples of the first sensory-phenomenon effector 912 and the second sensory-phenomenon effector 914 include (and are not limited to): an image or video camera and/or projector, a holographic imaging device, a three-dimensional imaging device, a laser-imaging device, a LiDAR device, a time-of-flight imaging device, a RaDAR device, a SoNAR device, a depth camera, a depth sensor, a visible light-based device, an infrared-based device, a microwave-based device, a sound-based device, a holography device, a stereoscopy device, a three-dimensional imaging device (in any form), a depth-sensing device, a vision-based device, a shape-from-X device, and/or the like. LiDAR stands for Light Detection And Ranging. RaDAR stands for Radio Detection And Ranging. SoNAR stands for Sound Navigation And Ranging.

In one implementation, the interface assembly 902 is configured to provide a point of interaction and/or communication between the processing apparatus 908 (such as, a computer) and any other entity, such as a printer or a human operator (user).

The processing apparatus 908 is configured to receive and/or read one or more inputs (e.g., data and/or information), and is also configured to produce (e.g., provide, write) one or more outputs based on the defined input received. The processing apparatus 908 is configured to interpret the defined inputs and the defined outputs as data, facts, information, and/or the like. By way of example (and not limited thereto), the processing apparatus 908 may include a combination of: a conversion module configured to convert data to another format; a validation module configured to ensure that supplied data is clean, correct and useful; a sorting module configured to arrange items in some sequence and/or in different sets; a summarization module configured to reduce detail data to its main points; an aggregation module configured to combine multiple pieces of data; an analysis module configured to collect, organize, analyze, interpret and present data and/or information; and a reporting module configured to display or list detail or summary data or computed information. There are many assemblies and/or components of the processing apparatus 908, that may be utilized to implement the processing apparatus 908 of FIG. 1A and/or FIG. 1B.

Referring back to FIG. 1A, the processing apparatus 908 may include, for example, a central processing unit, a processing unit, a microprocessor, a microcomputer, an array processor, and/or a vector processor (and any equivalent thereof). The processing apparatus 908 may include a hardware circuit within a computer that carries out the instructions of a computer program by performing arithmetical, logical, and/or input/output operations. The processing apparatus 908 may include one or more instances of a processing unit (this case is called multiprocessing). The array processor and/or the vector processor includes multiple parallel computing elements, with no one processing unit considered the center. In the distributed computing model, operations are executed by a distributed interconnected set of processors. In one implementation, the processing apparatus 908 may include a set of dedicated circuits that replace any instructions operated or executed by the processing apparatus 908; such dedicated circuits may include a programmable logic array (PLA) (and any equivalent thereof) configured to implement combinational logic circuits. The PLA has a set of programmable AND gate planes, which link to a set of programmable OR gate planes, which can then be conditionally complemented to produce an output.

The processing apparatus 908 may include a non-transitory machine-readable storage medium 909, hereafter referred to as the memory assembly 909. The memory assembly 909 is configured to store data and executable programs (programmed instructions) in a format readable by the processing apparatus 908. Examples of the memory assembly 909 may include computer readable and/or computer writable media, magnetic media such as magnetic disks, cards, tapes, and drums, punched cards and paper tapes, optical disks, barcodes and magnetic ink characters, and/or the like. Examples of machine-readable technologies include magnetic recording, processing waveforms, barcodes, and/or the like. In one implementation, optical character recognition (OCR) can be used to allow the processing apparatus 908 to read information, such as information that is readable by humans. Any information retrievable by any form of energy can be machine-readable.

In one implementation, the processing apparatus 908 may be configured to interface with an electronic network connection 911. The electronic network connection 911 (or network access), such as an Internet connection (or access), may be configured to connect instances of the processing apparatus 908 (such as, computer terminals, computers, mobile devices, cell phones, computer networks, and/or the like) to one or more electronic networks thus allowing users to access network services (for example, e-mail, the World Wide Web, etc.). In some implementations, the processing apparatus 908 may be implemented as a remote processing apparatus or a distributed processing apparatus, and may, in whole or part, be communicatively coupled to one or more instances of the apparatus 1300 via one or more wireless and/or wired communication networks.

In some implementations, the processing apparatus 908 may be configured to include a user-input assembly (such as, a mouse device, a keyboard device, a camera, a touch sensitive display screen, microphone, retina reader, accelerometer, ambient light sensor, GPS, antenna, and/or the like). The processing apparatus 908 may further be configured to include a user-output assembly (such as, a computer terminal, a television screen or other video-display interface, a projector, a touch sensitive screen, and/or the like).

The memory assembly 909 is configured to tangibly embody a processing program 907, hereafter referred to as the program 907. The program 907 includes a sequence of programmed instructions configured to direct the processing apparatus 908 to perform (execute) specified operations (tasks, such as reading, writing, processing). The processing apparatus 908 executes the program 907, such as by using a processor assembly. The program 907 has an executable form that the processing apparatus 908 may use to execute the programmed instructions provided by the program 907. The program 907 may be used in its human-readable source code form, from which executable programs are derived (e.g., compiled), to configure programmed instructions to be used or included in the program 907. The program 907 is a collection of program instructions and/or related data and may be referred to as the software (code). The program 907 directs the processing apparatus 908 to perform, for example, image-processing operations, such as of the type described in a wearable computing textbook authored by S. Mann, entitled "Intelligent Image Processing", published by John Wiley and Sons, through Wiley Interscience, and IEEE Press, 2001 (incorporated herein by reference).

The memory assembly 909 may be configured to tangibly manifest a user interface 800, of which an example is depicted in FIG. 8A. The user interface 800 may, in one implementation, be displayed or provided to the user of the sensing and display apparatus 1300 (e.g., via the second augmediated-reality space 1002). If the user of the second augmediated-reality space 1002 desires to set up the configuration of the sensing and display apparatus 1300 to share their instance and/or instances of the second augmediated-reality space 1002 with other users, the configuration of the sensing and display apparatus 1300 may allow the user to permit access (e.g., to the other users) to the user interface 800. The user interface 800 may, in one implementation, include a layout of control elements (e.g., graphic-control elements and/or textual-control elements) in conjunction with the way the program 907 of FIG. 1A used by the processing apparatus 908 of FIG. 1A responds to user activities. In one implementation, the user interface 800 is a component facilitating interaction between the user of the sensing and display apparatus 1300 and the sensing and display apparatus 1300 itself. The user interface 800 may be used, in some implementations, for effective operation and control of the processing apparatus 908 on the user's end, and feedback from the processing apparatus 908 may assist the user of the processing apparatus 908 in making operational decisions (e.g., decisions on how to operate the processing apparatus 908). The user interface 800 may include hardware components (physical components) and/or software components (logical components or virtual components). The user interface 800 is configured, in one implementation, to provide: a user input (e.g., a field) configured to allow the user to control or manipulate the processing apparatus 908, and an output (e.g., a field) configured to allow the processing apparatus 908 to display and/or indicate, to the user, the effects of the user manipulation via the user input. The user interface 800 may, in some implementations, also be referred to as a graphical user interface and/or a human-machine interface. Other terms for the user interface 800 may include human-computer interface (HCI) and man-machine interface (MMI). The user interface 800 is configured to be displayed for viewing by a user via the sensing and display apparatus 1300. In one implementation, the user interface 800 may be presented to the user via a second sensory-phenomenon effector 914 (e.g., such as depicted in FIG. 1B). The user interface 800 may be configured to provide or display to the user one or more fields. In one implementation, a field is a space allocated for a particular item of information, such as a user name. Fields may be configured to have certain attributes associated with them. For example, some fields may be numeric whereas others may be textual. In some implementations, every field may have a name, called the field name. In one implementation, a collection of fields may be referred to as a record. The user may interact with the fields provided by the user interface 800 via interfaced circuits or elements.

In accordance with an option, the sensing and display apparatus 1300 may include (and is not limited to) a combination of an interface assembly 902, a processing apparatus 908, and a memory assembly 909. The interface assembly 902 may be configured, in one implementation, to interface with a first augmediated-reality space 1000 and with a second augmediated-reality space 1002. The interface assembly 902 may be configured, in one implementation, to convey sensor signals 904 and effector signals 906 associated with the first augmediated-reality space 1000 and the second augmediated-reality space 1002. The processing apparatus 908 may be configured, in one implementation, to operatively couple to the interface assembly 902. The processing apparatus 908 may be further configured to process the sensor signals 904 and the effector signals 906 conveyed by the interface assembly 902. The memory assembly 909 may be configured, in one implementation, to tangibly embody a processing program 907 including a sequence of programmed instructions configured to direct the processing apparatus 908 to execute operations on the sensor signals 904 and/or the effector signals 906.

FIG. 1AA depicts a schematic example of a method 1100 associated with the sensing and display apparatus 1300 of FIG. 1A. The method 1100 may be implemented as programmed instructions to be included in the program 907 of FIG. 1A; the method 1100 includes the examples of executable operations (programmed instructions) to be executed by the processing apparatus 908 via the program 907.

The method 1100 includes (and is not limited to) an operation 1102, including receiving (reading) the interfaced instances of the sensor signals 904 representing sensory phenomena received from a first augmediated-reality space 1000, and receiving (reading) the interfaced instances of the sensor signals 904 representing sensory phenomena received from a second augmediated-reality space 1002. The interfaced instances of the sensor signals 904 are received by the processing apparatus 908, such as from the interface assembly 902. Operational control is passed on to operation 1104.

The method 1100 further includes (and is not limited to) an operation 1104, including providing (transmitting, writing) the interfaced instances of the effector signals 906 representing sensory phenomena to the first augmediated-reality space 1000, and providing (e.g., transmitting, writing) interfaced instances of the effector signals 906 to the second augmediated-reality space 1002. The interfaced instances of the effector signals 906 are provided by the processing apparatus 908 to the interface assembly 902. Operational control is passed on to operation 1106.

The method 1100 further includes (and is not limited to) an operation 1106, including processing the sensor signals 904 (received from the interface assembly 902), and further including processing the effector signals 906 (received from the interface assembly 902). Processing of sensor signals may include, but is not limited to, modifying, augmenting, supplementing, complementing, enhancing, diminishing, obscuring, blocking, and/or the like sensor signal data. Operational control is passed on to other operations associated with the processing apparatus 908.

In some implementations, the method 1100 may include additional operations to be executed by the processing apparatus 908. The programmed instructions for the program 907 are derived from the method 1100.

For example, the method 1100 further includes (and is not limited to) an operation 1108, including routing (e.g., switching, mixing, and/or the like) the sensor signals 904 between the first augmediated-reality space 1000 and the second augmediated-reality space 1002. Operational control is passed on to operation 1110. For example, switching may occur between two sensors of different accuracy and/or precision; between sensors located in different environments, between a given sensor at different times (e.g., based on measured values stored in a sensor record); sensors sensitive to different and/or complementary sensory phenomena (e.g., color and intensity; pitch and volume; thermal and visible; and/or the like); sensors associated with different users and or apparatus 1300 instances; and/or the like.

For example, the method 1100 further includes (and is not limited to) an operation 1110, including routing (e.g., switching, mixing and/or the like) the effector signals between the first augmediated-reality space 1000 and the second augmediated-reality space 1002. Operational control is passed on to other operations of the processing apparatus 908. For example, switching may occur between two effectors in different locations; having different and/or complementary outputs, products, and/or the like (e.g., visible-light versus infrared light; illumination vs. sound); associated with different users and or apparatus 1300 instances; and/or the like.

It will be appreciated that additional operations of the processing apparatus 908 may be provided for a multitude of combinations and/or permutations (of the programmed instructions), such as depending on the number of users involved in the first augmediated-reality space 1000, and/or depending on which users share their instance of the second augmediated-reality space 1002 with selected other users of the first augmediated-reality space 1000 of FIG. 1A, and in association with the operations described in association with the figures.

It will be appreciated that the order of operations in the method 1100 depicted in FIG. 1AA do not have to be executed in a sequential manner, and any execution order of the operations of the method 1100 and/or of the program 907 of FIG. 1A may be used via programmed computer instructions. In some implementations, all or any subset of the aforementioned operations, and/or the like, may be performed in parallel, partial sequence, series, and/or any combination thereof in accordance with a given embodiment, implementation and/or application.

FIG. 1AA also depicts a data flow diagram in one embodiment, that depicts the processing apparatus 908 configured to route (e.g., switch, mix, and/or the like) the sensor signals 904 between the first augmediated-reality space 1000 and the second augmediated-reality space 1002. The processing apparatus 908 is configured to route (e.g., switch, mix, and/or the like) the effector signals between the first augmediated-reality space 1000 and the second augmediated-reality space 1002. In addition, the processing apparatus 908 may be configured to route the sensor signals 904 received from the first augmediated-reality space 1000 (such as via a first sensory-phenomenon sensor 910 depicted in FIG. 1B) to the second augmediated-reality space 1002 (such as via the second sensory-phenomenon effector 914 depicted in FIG. 1B). In accordance with an option, the processing apparatus 908 is configured to route the sensor signals 904 received from the second augmediated-reality space 1002 (such as via a second sensory-phenomenon sensor 916 depicted in FIG. 1B) to the first augmediated-reality space 1000 (such as via a first sensory-phenomenon effector 912 depicted in FIG. 1B). It will be appreciated that other options are possible for routing the sensor signals and/or the effector signals.

FIG. 1AA also depicts a variety of programs (e.g., programmed instructions), data tables, and/or the like for use, in some embodiments, with the sensing and display apparatus 1300 depicted in the figures. The programs may include, but are not limited to: a taction detector 400, a homography intrusion detector 401, confluence sensor 402, a video-orbits stabilization program 403, a comparametric compositor 404, a superposimetric compositor 405, a comparametric analysis program 406, a superposimetric analyzer 407, a superposimetric spatial imaging program 408, a comparametric compositor 409, a spatial-imaging multiplexer 410, a time-division multiplexer 411, a collaborative gesture-based interface 412, a gesture-tracking detector 413, a neural network 414, a best-fit optimizer 415, a gradient descenter 416, a regularizer 417, an overflow penalizer 418, a human-gesture recognition program 419, a bubble-metaphor generator 420, a spherical volumetric intrusion estimator 421, a volume-intrusion detector 422, a bubble-bursting program 423, learning software 424, and/or the like. These programs are stored in the memory assembly 909 of FIG. 1A and/or FIG. 1B and are executable by the processing apparatus 908 of FIG. 1A and/or FIG. 1B. These programs are described below in more detail.

FIG. 1B depicts a schematic example of a sensing and display apparatus 1300.

In accordance with the example depicted in FIG. 1B, the sensing and display apparatus 1300 includes (and is not limited to) sensory-phenomenon sensors (910, 916) configured to transmit sensor signals 904 derived from sensory phenomena received from the first augmediated-reality space 1000. The sensory-phenomenon sensors (910, 916) may also, in one implementation, be configured to transmit sensor signals 904 derived from sensory phenomena received from the second augmediated-reality space 1002.

The sensing and display apparatus 1300 further includes sensory-phenomenon effectors (912, 914) configured to transmit effector signals 906 associated with sensory phenomena to the first augmediated-reality space 1000. The sensory-phenomenon effectors (912, 914) may also, in one implementation, be configured to transmit effector signals 906 associated with sensory phenomena to the second augmediated-reality space 1002. For example, in one implementation, the sensory-phenomenon effectors (912, 914) may be configured to display any one of a holographic video display, a stereoscopic video display, and/or the like. The sensory-phenomenon effectors (912, 914) may, in one example, include a three-dimensional camera, such as a structured-light or time-of-flight camera.

In one implementation, the sensing and display apparatus 1300 also includes the interface assembly 902 configured to interface (e.g., convey, receive) the sensor signals 904 representing sensory phenomena received, via the sensory-phenomenon sensors (910, 916), from the first augmediated-reality space 1000, and the sensor signals 904 also representing sensory phenomena received from the second augmediated-reality space 1002. The interface assembly 902 may also be configured to interface (e.g., convey, transmit) the effector signals 906 representing sensory phenomena, via the sensory-phenomenon effectors (912, 914), to the first augmediated-reality space 1000 and to the second augmediated-reality space 1002.

In one implementation, the sensing and display apparatus 1300 may also include the processing apparatus 908 operatively coupled to the interface assembly 902. In one implementation, the processing apparatus 908 is configured to process the sensor signals 904 interfaced with (in association with) the interface assembly 902, and to process the effector signals 906 interfaced with (in association with) the interface assembly 902.

By way of example, in various implementations, the sensor signals 904 may be derived from one or more of an audio sensory phenomenon, a visual sensory phenomenon, a tactile sensory phenomenon, and/or the like. In various implementations, the effector signals 906 may be derived from one or more of an audio sensory phenomenon, a visual sensory phenomenon, a tactile sensory phenomenon, and/or the like.

In accordance with an option, the sensory-phenomenon sensors (910, 916) and the sensory-phenomenon effectors (912, 914) may further include a first sensory-phenomenon sensor 910 and a first sensory-phenomenon effector 912. The first sensory-phenomenon sensor 910 is configured to transmit a sensor signal 904 derived from sensory phenomena from the first augmediated-reality space 1000. The first sensory-phenomenon effector 912 is configured to transmit an effector signal 906 associated with sensory phenomena to the first augmediated-reality space 1000.

In accordance with an option, the sensory-phenomenon sensors (910, 916) and the sensory-phenomenon effectors (912, 914) may include a second sensory-phenomenon effector 914 and a second sensory-phenomenon sensor 916. The second sensory-phenomenon effector 914 is configured to transmit an effector signal 906 having sensory phenomena to the second augmediated-reality space 1002. The second sensory-phenomenon sensor 916 is configured to transmit a sensor signal 904 derived from the sensory phenomena from the second augmediated-reality space 1002. An example of the second sensory-phenomenon sensor 916 includes an eye tracker device configured to track the pupil of an eye of the user. In one implementation, eye tracking is the process of measuring either the point of gaze (where the user is looking) or the motion of an eye relative to the head of the user. An eye tracker is configured to measure eye positions and eye movement. Eye movement may be measured in a variety of ways, such as using video images from which the eye position is extracted, using search coils, or using an electrooculogram.

For the case where the user wears the sensing and display apparatus 1300, the first sensory-phenomenon sensor 910 and/or the first sensory-phenomenon effector 912 may, in one implementation, face (e.g., be oriented toward) a direction of a field of view of the user (e.g., in the first augmediated-reality space 1000). The field of view of the user may, for example, be a view in an eye forward viewing direction. For example, the field of view of the user may include a direction in which the user may be able to view the location of the user's fingers, provided the fingers are not positioned out of the user's field of view. For the case where the user is typing on a virtual keyboard, the user's fingers may be tracked by a first sensory-phenomenon effector 912, even if the user is looking elsewhere. In one implementation, the second sensory-phenomenon effector 914 and the second sensory-phenomenon sensor 916 face a direction toward (e.g., are oriented toward) the eyes of the user (the second augmediated-reality space 1002). In some implementations, one or more of the first sensory-phenomenon sensor 910, the first sensory-phenomenon effector 912, the second sensory-phenomenon sensor 916, and/or the second sensory-phenomenon effector 914 may be oriented in a direction other than facing the field of the view of the user. For example, sensors and/or effectors associated with auditory phenomena, and/or sensors for sensing audio and/or inserting audio into an environment and/or into an ear of one or more users of apparatus 1300, may be oriented in a direction of a "field of sound," e.g., a direction oriented toward one or both ears of a user, away from one or both ears of the user, omnidirectional, geophonically and/or hydraulophonically coupled to the apparatus 1300 (e.g., touching the skull and/or impedance matched for water when the user is underwater), and/or the like. In another example, sensors and/or effectors may be configured to engage peripheral portions of the environment, back portions (e.g., behind the user), blind spots, and/or the like.

In accordance with an example, the interface assembly 902 includes: (A) a first interface module 903 configured to interface with the first sensory-phenomenon sensor 910; (B) a second interface module 905 configured to interface with a first sensory-phenomenon effector 912; (C) a third interface module configured to interface with a second sensory-phenomenon effector 914; and (D) a fourth interface module configured to interface with a second sensory-phenomenon sensor 916. Other interface modules for the interface assembly 902 may be added or removed as may be required and/or desired to accommodate any number of sensors and/or effectors.

FIG. 1C depicts a schematic example of a sensing and display apparatus 1300 in one embodiment.

As depicted in FIG. 1C, the sensing and display apparatus 1300 includes, in one embodiment, a combination of the interface assembly 902 and the processing apparatus 908. The first sensory-phenomenon sensor 910, the first sensory-phenomenon effector 912, the second sensory-phenomenon effector 914 and the second sensory-phenomenon sensor 916 are provided as separate items to be integrated with the interface assembly 902, either by the user or by the manufacturer of the sensing and display apparatus 1300. In accordance with a distributed-control option, the processing apparatus 908 is configured to control set up and operation of the first sensory-phenomenon sensor 910, the first sensory-phenomenon effector 912, the second sensory-phenomenon effector 914 and the second sensory-phenomenon sensor 916. In accordance with an option, the processing apparatus 908 may include instances of a processor unit dedicated for and/or distributed amongst two or more of the first sensory-phenomenon sensor 910, the first sensory-phenomenon effector 912, the second sensory-phenomenon effector 914 and the second sensory-phenomenon sensor 916. In one implementation, the processing apparatus 908 may be configured to act as a supervising controller while the dedicated processors on each of the sensors and on the effectors may be configured to manage operation of a sensor or an effector (such as depicted in FIG. 1B).

FIG. 1D depicts a schematic example of a sensing and display apparatus 1300.

As depicted in FIG. 1D, the sensing and display apparatus 1300 includes, in one embodiment, a combination of the interface assembly 902, the processing apparatus 908, the first sensory-phenomenon sensor 910, the first sensory-phenomenon effector 912, the second sensory-phenomenon effector 914 and the second sensory-phenomenon sensor 916, all combined and/or integrated as a single unit to be provided to users as such.

In one implementation, expansion slots or room may be provided (and any equivalent thereof) to accommodate installation of additional sensors and/or effectors to display apparatus 1300. In one implementation, one or more sensors and/or effectors may be external to display apparatus 1300 and/or interface therewith, such as via one or more wired or wireless communication networks.

With reference to FIG. 1A, FIG. 1B, 1C and FIG. 1D, in accordance with an option, the sensing and display apparatus 1300 (also depicted in FIG. 13 and FIG. 14) is configured to scan spatial subject matter and/or three-dimensional spatial subject matter. By way of suitable sensor assemblies and/or effector assemblies, the sensing and display apparatus 1300 is also configured to provide and/or display to a user, an image of the subject matter, e.g., as a computer-generated version, a computer-enhanced version, a computer-mediated version of the subject matter, and/or the like (by way of suitable sensor assemblies and/or effector assemblies) and identified in association with the figures.

In accordance with an option, the sensing and display apparatus 1300 may include a user-wearable interface configured to facilitate a user's wearing of the sensing and display apparatus 1300. For example, in one implementation, the sensing and display apparatus 1300 is configured to be user wearable (such as, worn on the head of the user). It will be appreciated that the other options may be accommodated for the manner in which the sensing and display apparatus 1300 is interfaced with the user. For example, the user may wear a helmet (e.g., hockey, football, and/or the like) to which the sensing and display apparatus 1300 may be mounted. In this way, members of sporting teams may use the sensing and display apparatus 1300, e.g., as a training tool in preparation for a sporting game, as an integral part of actual game play, for evaluating and selecting potential members to be included in a team, and/or the like.

In accordance with an option, the sensing and display apparatus 1300 is configured to be worn in front of the eye of the user. The sensing and display apparatus 1300 may, for example, be mounted to the head of the user. The sensing and display apparatus 1300 may be configured to record (such as via a camera) a scene available to the eye of the user from the first augmediated-reality space 1000 and/or the second augmediated-reality space 1002. The sensing and display apparatus 1300 may be configured to display and/or superimpose a computer-generated image on the original scene available to the eye of the user.

In accordance with an option, the sensing and display apparatus 1300 may be configured to accommodate one or both eyes of a wearer (e.g., both eyes look through the sensing and display apparatus 1300). In one implementation, separate instances of the sensing and display apparatus 1300 may be configured to accommodate each eye of the user. The sensing and display apparatus 1300 may be configured to be viewed by one or both eyes of a wearer of the sensing and display apparatus 1300. In one implementation, the sensing and display apparatus 1300 may be configured to provide a two-eye view (e.g., views from two eyes viewing a single space, with the same or similar sensors and/or with different and/or complementary sensors; views from two eyes, each viewing a different space, and/or the like) to a single-eye display within the apparatus 1300. Additional views may also be provided to a single-eye display in some implementations.

In accordance with an option, the sensing and display apparatus 1300 is configured to provide access through whichever one or both eyes of a wearer which may be used to look and see. In one implementation, the sensing and display apparatus 1300 may be referred to as an extramissive spatial imaging digital eye glass, an extramissive spaceglass (TRADEMARK) system, a spatial imaging glass, a digital eye glass, a computer eye glass, an EyeTap, a computer-vision system, a seeing aid, a vision aid, and/or the like. In some instances, the sensing and display apparatus 1300 may be referred to as a digital eye glass (DEG); it should be understood that any reference to the digital eye glass does not limit the examples to merely the digital eye glass, and the examples apply to the sensing and display apparatus 1300. The extramissive spatial imaging digital eye glass is configured to receive and to transmit light (such as visible light) to and from the user or the users of the first augmediated-reality space 1000 and the second augmediated-reality space 1002.

In accordance with an option, the sensing and display apparatus 1300 is configured to: (A) display an image to the user (e.g., to operate as a monitor and/or a display device) in the first augmediated-reality space 1000 and/or in the second augmediated-reality space 1002; (B) to intake (e.g., to operate as a camera) an image of the environment in the first augmediated-reality space 1000 and/or in the second augmediated-reality space 1002; and (C) to process (e.g., augment, analyze, modify, and/or the like) the image displayed to the user in the first augmediated-reality space 1000 and/or in the second augmediated-reality space 1002. To augment the image includes, in one implementation, overlaying computer-generated information (e.g., data and/or images) on top of the image of the normal world (e.g., the original scene in the first augmediated-reality space 1000 of FIG. 1B) the sensing and display apparatus. The sensing and display apparatus 1300 is configured to augment and mediate the reality the user perceives in the first augmediated-reality space 1000 and/or the second augmediated-reality space 1002.

In some implementations, user input is by way of self-gesturing (e.g., by the user) to the sensing and display apparatus 1300. The sensing and display apparatus 1300 may include a computer vision system, such as a three-dimensional computer vision system, which may work with or without tactile feedback in association with a physical object (e.g., a desktop or similar surface). In one implementation, the sensing and display apparatus 1300 may also include an auxiliary sensor (such as, a three-dimensional tactile acoustic gesture or a vibration gesture and/or acoustic multimodal gesture input device) in which hitting or striking or rubbing or touching a surface or object is in view of the three-dimensional computer vision system.

In one implementation, the program 907 of FIG. 1A may be configured to direct the processing apparatus 908 to execute spatial imaging operations and/or the sensing and display apparatus 1300 may be configured to execute spatial imaging operations by auxiliary instructions. The spatial imaging operations may include, in one implementation, the holographic display of subject matter, for example, real-time video e real time video chats and/or discussions, such as with three-dimensional projections of subject matter (e.g., people). As used herein, the term "spatial imaging" may include, in various implementations, any image-scanning device, including, but not limited to, three-dimensional cameras, three-dimensional sensors, depth cameras, depth sensors, any device configured to use spatial imaging technology, such as: a holographic-imaging device, a three-dimensional imaging device, a laser-imaging device, a LiDAR (Light Detection And Ranging) device, a time-of-flight imaging device, a RaDAR (Radio Detection And Ranging) device, a SoNAR (Sound Navigation And Ranging) device, a depth-camera device, a depth-sensor device, a visible light-based device, an infrared-based device, a microwave-based device, a sound-based device, and/or the like.

In accordance with an option, the sensing and display apparatus 1300 may be configured to be miniaturized, and the sensing and display apparatus 1300 may be integrated into an existing or new eye glass frame.

In accordance with an option, the sensing and display apparatus 1300 may include other sensors, such as an audio sensor (a microphone and/or an earphone), and/or the like. In various aspects of the sensing and display apparatus 1300, a microphone includes an assembly configured to sense or determine sound pressure, or changes in sound pressure, or flow, or changes in flow, in any medium (solid, liquid, or gas) and any equivalent thereof.

In one implementation, the sensing and display apparatus 1300 may be used with and/or integrated with a personal computer (such as a desktop computer, a laptop computer, a cell phone, a smart phone, a camera phone, a tablet computer, and/or the like), and may, in one implementation, be configured to appear as an eye glass.

FIG. 1E depicts a schematic example of a sensing and display apparatus 1300 in one embodiment.

More specifically, FIG. 1E illustrates an example of a sensing and display apparatus 1300 through which one or both eyes of the wearer may see subject matter; the sensing and display apparatus 1300 may also provide an extramissive vision that may be visible and/or invisible to others (e.g., other users) in the first augmediated-reality space 1000 of FIG. 1A. The first augmediated-reality space 1000 depicted in the example of FIG. 1E includes a virtual game board of the type used to play a game of chess. FIG. 1E, FIG. 2A, FIG. 3 and FIG. 4 depict examples of the sensory-phenomenon sensor (910, 916) and the sensory-phenomenon effector (912, 914) associated with FIG. 1B. It will be appreciated that FIGS. 1E-1G, FIG. 2A, FIG. 3, FIG. 4 depicts instances of the effector assembly and the sensor assembly that may share the same position on the sensing and display apparatus 1300, and that this arrangement is for illustrative purposes and for the sake of clarity.

It will be appreciated that the sensing and display apparatus 1300 may be simply referred to as a display apparatus or even more simply as an apparatus; generally, the apparatus 1300 may be configured to display images (to the user and/or users), may be configured to interface with a display assembly, may be configured to sense, and/or may be configured to interface with a sensing device.

In accordance with an option, the sensing and display apparatus 1300 includes, for example, a visible-light receiver 191, which is an example of the first sensory-phenomenon sensor 910 (of FIG. 1B) and/or of the second sensory-phenomenon sensor 916 (of FIG. 1B), and/or a visible-light transmitter 192, which is an example of the first sensory-phenomenon effector 912 (of FIG. 1B), or of the second sensory-phenomenon effector 914 (of FIG. 1B).

In accordance with an option, the sensing and display apparatus 1300 includes a head-mountable assembly 183 configured to facilitate secured connection of the sensing and display apparatus 1300 to the head of the user. In one implementation, the head-mountable assembly 183 may include a back-of-head band 188 configured to secure the sensing and display apparatus 1300 to the head of the user, such as may be positioned on the back of the user's head. In one implementation, the back-of-head band 188 may include a sensor configured to sense the zone behind the user's head. The sensor located on the back-of-head band 188 may, for example, be shared with other users associated with the first augmediated-reality space 1000 of FIG. 1A.

In one implementation, the sensing and display apparatus 1300 includes the digital eye glass 180 including various components such as an orientation and inertial measurement unit 184, a LiDAR unit 187, a vision system 193, an optical sensor 100, a display unit 181, a removable shade 110, and/or the like. In one implementation, the removable shade 110 may be a two inches by 4.25 inches (approximately 51 millimeters by 108 millimeters) standard size welding shade. The removable shade may allow the display unit 181 to be visible in bright sunlight (e.g., using ANSI Shade numbers 5 to 7) or on a bright but cloudy day (e.g., using ANSI Shade numbers 2 to 4), or for using the sensing and display apparatus 1300 for welding (e.g., using a darker shade), while seeing the electric arc using HDR (High Dynamic Range) imaging.

In accordance with an option, the digital eye glass 180 is configured to include a singular glass through which both eyes see, such as in the configuration of a welder's helmet. In accordance with a variation, a separate display or mediation zone may be provided for each eye, within the one glass, or a separate glass for each eye, or a monocular glass for one eye.

In one implementation, the digital eye glass 180 may be configured to function as a seeing aid, a vision aid, and/or the like, and may be configured to provide high dynamic range (HDR) vision, e.g., in which the wearer may see in complete darkness while also looking into an electric arc, or looking into bright car headlights in a dark alley and still being able to clearly see the car's license number and the driver's face.

In accordance with an option, the removable shade 110 is electrochromic, and is configured to be controllable by the optical sensor 100 and/or the LiDAR unit 187 and/or the vision system 193 and/or by any combination and permutation thereof. For this case, the digital eye glass 180 is configured to adapt to a wide range of vision conditions, such as change from indoors to outdoors, sun, cloud, electric arc welding, bright lights, etc., as might occur, or provide protection from deliberate or lighting attacks such as from laser pointers or other sources of lights, to which the digital eye glass 180 may afford eye protection for the user.

In accordance with an option, the optical sensor 100 is located around the periphery of the removable shade 110 of the digital eye glass 180 or incorporated directly therein. The optical sensor 100 may also, or additionally, be located above the removable shade 110. When the removable shade 110 is removed, this may be considered as Shade 0 (e.g., the setting of the removable shade 110 becomes Shade 0).

In accordance with an option, the sensors are positioned above the removable shade 110. In accordance with an option, the sensors include an infrared transmitter 186 and/or an infrared receiver 185. In one implementation, an infrared receiver 195 is installed to the digital eye glass 190. The infrared receiver 185 may, in some implementations, be referred to as an infrared detector. The infrared transmitter 186 and the infrared receiver 185 may, in one implementation, be configured to cooperate as a range-sensing vision system, such as an infrared LiDAR or other three-dimensional infrared camera system, and/or the like.

In accordance with an option, a visible-light receiver 191 is provided and may, in one implementation, be configured as a visible-light camera (e.g., for providing photographic images having color), and may, in one implementation, be assembled together with a range map or range image formed by the infrared transmitter 186 and the infrared receiver 185.

In accordance with an option, a visible-light transmitter 192 is provided, and is configured to operate in the visible-light spectrum to illuminate subject matter, such as the surface 130 (e.g., a tabletop) with visible content such as an advertisement, a sponsor notice, a counter, a time/date indicator, or other indicia such as a projection 170, which is visible to wearers of the digital eye glass 180. In one implementation, such projection may also be visible as well as to the naked eyes 198 of any users (persons) not equipped with their instance of the digital eye glass 180.

In one implementation, the sensors and the effectors used in the sensing and display apparatus 1300 may be fixedly attached and/or mounted to a peripheral frame (which is an example of a frame assembly) positioned (e.g., on the head of the user) around the eyes of the user. The digital eye glass 180 affords (for two eyes) a spatial image that may, in some implementations, have a horizontal-parallax-only image and/or a stereoscopic image. This may be done, for example, using two separate instances of the display unit 181 or a stereo instance of the display unit 181 in a single glass through which both eyes of the user may see, or in separate glasses. The interpupillary distance (IPD) values from the 1988 Army Survey indicate an average of 64.7 millimeters (mm) for men, and an average of 62.3 millimeters for women. If the average is computed for these two (e.g., for both genders), the result is a total of 64.7+62.3=127.0 millimeters and dividing by two gives a result of 127/2=63.5 millimeters and is equal to is 2.5 inches. Thus, the instances of the display unit 181 may be positioned, for example, about 2.5 inches apart at their eye points. In some implementation, instances of display unit 181 may be positioned adjustably and/or dynamically, such as based on a prior, concurrent and/or real-time measurement of the IPD of a given user. For example, in one implementation, a sensor directed toward the user's face may detect and/or measure an IPD for the user, and the distance between display units 181 for each eye may be adjusted on that basis. In another implementation, an active display area of each display unit 181 may be adjusted based on a measured user IPD, e.g., so as to present the displayed content in appropriate regions of the display area based on particular user IPD.

In accordance with an option, the sensing and display apparatus 1300 may include the digital eye glass 180 configured to provide a two-eyed display, a monocular display, and/or the like. In the case of a two-eyed view, there is provided an oculus dexter point-of-eye 199A, and an oculus sinister point-of-eye 199B (that is, the right EyeTap point and the left EyeTap point).

In one implementation, the capacity to capture true (or near true) three-dimensional images may be used to create a lightspace collinearizer configured to create a synthetic effect for the sensing and display apparatus 1300. For example, the rays of eye-ward bound light may be diverted through an imaging system, processed, and re-rendered to be substantially collinear with the original rays. The lightspace collinearizer (which may, in some implementations, be referred to as a synthetic collinearizer) may be configured to capture a true or near true three-dimensional model, and to calculate the image that would have arisen by a camera as if the three-dimensional model were actually to have been placed inside the wearer's view with the center of the lens (iris, nodal point, optical center, or the like) of the camera at the center of the lens of the eye of the user.

In one implementation, a three-dimensional camera may be used and/or configured to synthesize the effect of a spatial imaging device, and may include a lightspace-analysis glass, passing over the wearer's eyes; for example, the entire visor of the sensing and display apparatus 1300 may be configured to act as a lightspace-analysis glass. In one implementation, the three-dimensional camera may be configured to generate the lightspace, lightfield, plenoptic, holographic, and/or the like image of all rays of light passing through the sensing and display apparatus 1300. The processing apparatus 908 of FIG. 1A may be configured to be responsive to an output of the (e.g., virtual) lightspace-analysis glass, and the processing apparatus 908 may be configured to compute rays for a lightspace synthesis glass. In such an implementation, the combination of a three-dimensional camera, a processor, and a display may embody a lightspace collinearizer.

Because of the true three-dimensional nature in implementations of the vision system, the digital eye glass 180 and the digital eye glass 190 may each be configured to capture a true three-dimensional image of the public subject matter 140, such as a shared gaming table (e.g., a real or imagined or virtual chessboard, or the table surface 130), and render this real view, or a computer-modified view of the table 130, or any combination of these, as if the image were captured by a camera where the camera itself, a lens of the camera, a film of the camera, a CCD of the camera, and/or the is located exactly at and/or substantially near the center of the lens of the oculus dexter (right eye), as well as another view as if the image were captured by a camera located exactly at and/or substantially near the center of the lens of the oculus sinister (left eye) of the wearer of the sensing and display apparatus 1300. CCD stands for charge-coupled device.

In one implementation, each of the digital eye glass 180 (for the first user) and the digital eye glass 190 (for the second user) may use its own vision system plus information received from the digital eye glass 190 to construct an even more detailed, true and/or accurate three-dimensional model of reality than its own vision system alone. In this sense, in one implementation, a number of different participants may share a computer-mediated reality in which the real (physical) world (the first augmediated-reality space 1000) is captured with relatively higher detail, precision, and/or accuracy, and/or including data associated with additional and/or supplementary perspectives, directions, views, and/or the like.

In accordance with an option, the sensing and display apparatus 1300 may be configured to operate in a multiplexed manner, and/or may be configured to execute multiplexing. For example, the digital eye glass 180 and the digital eye glass 190 may be configured to cooperate, such as by time-division multiplexing, and thereby alternately illuminating the scene to sense and/or understand the objects located in the first augmediated-reality space 1000. The multiplexing may be effectuated, for example, by using code-division multiplexing (e.g., using different spreading sequences or spread spectrum or spread spatialization patterns), and/or by collaborative sensing. In the latter case, the digital eye glass 180 and the digital eye glass 190 are configured to work together to illuminate and sense the public subject matter 140 and the surface 130. For example, while the infrared transmitter 186 illuminates the scene (the first augmediated-reality space 1000) with infrared light, the infrared receiver 185 and the infrared receiver 195 both sense the reflected infrared light reflected from physical objects in the scene (the first augmediated-reality space 1000). The cross-sensing between the digital eye glass 180 and the digital eye glass 190 provides additional scene information through the extreme parallax that exists owing to the longer baseline between the digital eye glass 180 and the digital eye glass 190 in the first augmediated-reality space 1000. In one implementation, the program 907 of FIG. 1A (used in an instance of the sensing and display apparatus 1300) is configured to execute the multitasking operations with other instances of the sensing and display apparatus 1300.

The result, in one implementation, is a Synthetic Aperture LiDAR, or the like, having a resolving power that may be mathematically broken down into a separate small-parallax inter-glass baseline, and a large-parallax intra-glass baseline.

In accordance with an option, the digital eye glass 180 may include a computer 160 (which is an example of the processing apparatus 908 of FIG. 1A). The computer 160 may be either built into (integrated with) the digital eye glass 180 or may be separate from the digital eye glass 180, and/or may be configured, for example, to fit in a shirt pocket of the user. In accordance with an option, the computer 160 includes a network connection 150, such as a wireless connection, WLAN (Wireless Local Area Network), a WiFi (TRADEMARK) network, PSA (Personal Area Network), a Bluetooth (TRADEMARK) network, a cellular connection, CDMA (Code Division Multiple Access), HSPA (High Speed Packet Access), HSDPA (High-Speed Downlink Packet Access), GSM (Global System for Mobile Communications), and/or the like. For some implementations where the computer 160 is used in connection with the digital eye glass 180, the computer 160 may be integrated with the geophone 182.

In accordance with an option, the digital eye glass 180 is self-contained. In accordance with an option, the digital eye glass 180 is tethered to the computer 160, and the digital eye glass 180 may be placed in a pocket of a shirt of a wearer, such as for storage. For some implementations where the digital eye glass 180 is tethered, the wiring may be concealed inside cloth pipes, cloth tubing, and/or the like, having the appearance of ordinary eyeglass safety straps. For example, the eyeglass safety straps may include a clip 189 configured to securely clip onto an article of clothing of the user to provide strain relief of the eyeglass tether. By way of example, the clip 189 may be a "crocodile clip", an "alligator clip", a spring clip, a spring-loaded clamp of the kind that are used for headsets, lavalier microphones, and the like, e.g., to grip the wearer's clothing, thus providing, for example, a form of strain relief.

In some situations, the computer 160 (which is an example of the processing apparatus 908 of FIG. 1A) may be placed on the floor or table in an office or home space when the user is positioned in a seated position. For some such implementations, the computer 160 may be housed inside a sensor-interface unit 120 (e.g., a tabletop unit), which includes the geophone 182 and in this way the sensor-interface unit 120 is geophonic enabled. The sensor-interface unit 120 includes a sensor interface assembly configured to interface the sensory inputs to be provided to the computer 160. In one implementation, the sensor-interface unit 120 is configured to listen geophonically to sound vibrations in the table surface, such as when chess pieces are slid across the table (or touch the table), when someone taps their finger on the table, and/or the like.

The term geophone may, in various implementations, refer to any of a variety of pressure transducers, pressure sensors, velocity sensors, flow sensors, and/or the like that convert changes in pressure, velocity, movement, compression, rarefaction, and/or the like, such as in solid matter, to electrical signals. Geophones may include differential pressure sensors, absolute pressure sensors, strain gauges, flex sensors on solid surfaces like tabletops, and the like. Thus, a geophone may have a single listening port or dual ports, one on each side of a glass or ceramic plate, stainless steel diaphragm, or the like, or may also include pressure sensors that respond only to discrete changes in pressure, such as a pressure switch which may be regarded as a 1-bit geophone. Moreover, the term geophone may also be used in reference to devices that only respond to changes in pressure or pressure difference, i.e. to devices that cannot convey a static pressure. In one implementation, the term geophone is used to describe pressure sensors that sense pressure or pressure changes in any frequency range whether or not the frequency range is within the range of human hearing, or subsonic (including, in one implementation, all the way down to zero cycles per second) or ultrasonic. Moreover, the term geophone may be used, in some implementations, to describe any kind of contact microphone or similar transducer configured to sense vibrations or pressure or pressure changes, such as in solid matter. Thus, the term geophone may be used in reference to contact microphones that work in audible frequency ranges as well as other pressure sensors that work in any frequency range, not just audible frequencies. A geophone may be configured, for example, to sense sound vibrations in a tabletop, scratching, pressing downward pressure, weight on the table (e.g., via DC or Direct Current offset), as well as small-signal vibrations (e.g., via AC or Alternating Current signals). In some implementations, the term "Natural User Interface" may be used in reference to this and other similar forms of interaction using physical media such as real-world objects and eliminating the indirection of metaphors. In accordance with an option, the digital eye glass 180 embodies a Natural User Interface, particularly with the assistance of the sensor-interface unit 120.

In addition, in one implementation, the LiDAR unit 187 and the LiDAR unit 197, which are configured to sense the three-dimensional object positions, and the like, provide data to the computer 160 along with the sensor-interface unit 120, to provide multimodal sensory tactile feedback by way of the geophone 182 and other sensors.

In accordance with an option, the geophone 182 in the sensor-interface unit 120 is configured to transmit and receive and may be fixedly attached to a tabletop to provide transmission of vibrotactile energy to the tabletop that may be felt by the user, such as a click or touch or taction by a user's fingers. Alternatively, in one implementation, this force and/or vibrotactile energy may be used semi-destructively, such as for dramatic effect.

For example (as depicted in FIG. 1E), in a game of "augmediated chess", the geophone 182 may be configured to shake the table and knock over real chess pieces when one player wins the game, thus creating a dramatic visual effect even visible to the naked eye 198 of a non-glass-wearing participant (e.g., a user who does not use the sensing and display apparatus 1300).

Moreover, if multiple participants set their respective instances of the sensor-interface unit 120 and the computer 160 on a surface 130, such as a tabletop, there may be multiple instances of the geophone 182 and the geophone 194 in a respective instance of the sensor-interface unit 120 and the computer 160, such as to form an array of geophones. An inertial measurement unit 184, accelerometer, and/or the like in each instance of the sensor-interface unit 120 and the computer 160, and/or other additional sensors may be used in one implementation to compute the relative position of the sensor-interface unit 120 and the computer 160, such as to form a phased array of sensors that may localize acoustic and/or other physical disturbances in the surface 130.

The digital eye glass 180 and the digital eye glass 190 are, in some implementations, each configured to sense and/or emit light, such as visible light. In implementations of the fully bidirectional instances, the digital eye glass 180 DEG may be configured to sense and emit light in both directions, affording the following: extramissive active vision forward-looking, and extramissive active vision inward-looking, such as to the eye itself. This may include eye-tracking (e.g., as sensing) and display (effecting), as well as spatial imaging of the environment (e.g., as sensing) of the first augmediated-reality space 1000 of FIG. 1A, and projection to the environment (e.g., as effecting). In this sense, the digital eye glass 180 sends and receives light to and from the eye, and the digital eye glass 180 also sends and receives light to and from subject matter in view (e.g., of the eye of the user).

In accordance with an option, the digital eye glass 180 is configured to sense the environment around the user and/or to sense the user. The spatial-imaging sensor assembly, such as the LiDAR unit 187, may, in one implementation, be configured to provide a depth map 1308 (depicted in one example in FIG. 13), such as to determine the spatial coordinates, positions, orientations, and/or the like of the user's arms, hands, fingers, and/or the like. The spatial-imaging sensor assembly may also be configured to provide a depth map to determine the spatial coordinates, positions, orientations, and/or the like of the user's legs, feet, and/or the like, such as for the case where the user looks down at the ground. In one implementation, the two kinds of scannable subject matter may be separated out, for example, as non-self subject matter (e.g., other objects in the room), and self. When the two meet, the meeting may be detected and/or tracked, and the situation may be referred to in some implementations as "physical contact" or "taction".

In accordance with an option, the processing apparatus 908 of FIG. 1A may, in one implementation, include a taction detector. The taction detector is configured to detect taction (e.g., physical contact between the human body and another object, between two objects, and/or the like) and responds accordingly. The taction detector may, for example, include program instructions configured to detect the occurrence of taction. In accordance with an option, the taction detector includes the geophone 182 configured to pick up and/or otherwise detect the sound of taction, and the vision system (the sensing and display apparatus 1300) is configured to observe the occurrence of taction by three-dimensional scanning of a surface (such as a tabletop), and determining when and if the hands, fingers, and/or the like touched the surface. In one implementation, this may be accomplished via a point cloud, and when the point cloud of the hands or the fingers intrude upon the homography of the plane, such as manifested by the group action, (1). Formula {1} may be used by the processing apparatus 908 of FIG. 1A, in one implementation, to detect the occurrence of taction by a taction detector 400, such as depicted in one example in FIG. 1AA.

$$f(x) = \frac{Ax+b}{c\dagger x + d} \quad \text{FORMULA \{1\}}$$

Any two images of the same planar surface in space are related by a homography (assuming a pinhole camera model). This allows many practical applications, such as image rectification, image registration, computation of camera motion (rotation and translation) between two images, and/or the like. Once camera rotation and translation have been extracted from an estimated homography matrix, this information may be used, such as for navigation, to insert models of three-dimensional objects into an image or video, and/or the like, so that they are rendered with the correct perspective and appear to have been part of the original scene.

In one implementation, [A] is a 2 by 2 (2×2) linear operator, [b] is a 2 by 1 (2×1) translation, [c] is a 2 by 1 (2×1) chirp (projective), [d] is a scalar constant, and [x] is a 2 by 1 (2×1) spatial coordinate, and $[x]=[x1,x2]^T$, with T indicating transposition.

In one implementation, a statistical significance test may be performed upon the degree of homographic intrusion detected by the taction detector. An apparatus configured to perform a measure of the degree of homographic intrusion may, in some implementations, be referred to as a homography intrusion estimator or a homographic-intrusion estimator. In an implementation where such an estimator is thresholded, used as a trigger for another action, and/or the like, the apparatus may be referred to as a homography intrusion detector. In one implementation, detection and estimation theory, such as Neyman-Pearson theory, or the like, may be applied to a homography intrusion detector 401 depicted in FIG. 1AA.

For the case where a combination of vision, audition (e.g., through the geophone 182), and/or other sensory input is employed, a confluence sensor 402 (depicted in FIG. 1AA) may be used to fuse these two modes of sensing.

A confluence sensor may, in one implementation, may be built from a combination of a visual trusion sensor and/or an acoustic trusion sensor, such as shown in the example of FIG. 1EE. In one implementation, such sensors may use a neural network configured to estimate trusiveness (intrusiveness, extrusiveness, or both), taction, and/or the like.

In one implementation, the digital eye glass 180 may be supported on the head (of the user) by a frame, such as with the head-mountable assembly 183 (referred to in some implementations as a head strap). In one implementation, the head-mountable assembly 183 may be split so that a portion of (e.g., half of) the head-mountable assembly 183 is aligned, positioned, and/or the like below the occipital lobe, another portion (e.g., the other half) is aligned, positioned, and/or the like above the occipital lobe, thus making the digital eye glass 180 stay on the head of the user during intense physical activity such as gymnastics, yoga, and/or swimming where water currents might otherwise brush the digital eye glass 180 away from the face of the user. For instance, a front planar surface of a sealed (water tight instance) of the digital eye glass 180 may be configured to operate above and/or below water.

Aspects of the disclosed apparatuses, methods and systems may include a visual intrusion detector, which detects intrusion into a space (plane/homography, spherical object, or the like), or more generally, a trusion estimator, which can estimate the degree of trusion (either intrusion or extrusion, or both simultaneously), and, subsequently (or directly) detect trusion by way of some kind of threshold, or the like (e.g., gesture sensing, estimation, detection, and gesture classification).

In some implementations, trusion sensors can also be confluence-based, e.g., a result of a confluence of multi-modal trusion sensing. Examples include a trusion sensor that senses by way of electromagnetic radiation (a first mode) and acoustic radiation (a second mode).

FIG. 1EE depicts a signal-processing system in one embodiment that accepts input from a light sensing or light sensing and effectory (luminary) apparatus, as well as from an acoustical-sensing apparatus, or an acoustical sensing and effectory (e.g., sonar) apparatus.

FIG. 1EE illustrates a confluence sensor, including a visual trusion input 1EE20 and an acoustic trusion input 1EE10. In one implementation, there are two kinds of trusion: intrusion (as we observe when, for example, a burglar or "intruder" enters into a premises) and extrusion (as we observe, for example, when an aluminum "I" beam is made by "extruding" metal in the shape of the letter "I").

Intrusion means, in one implementation, to "thrust" or "push" into or onto or against something, or to enter into the vicinity of something. Intrusion may be binary on/off, e.g., "triggers" when an intruder enters a premises, and/or can occur by degrees. For example, one can intrude the personal space of another by getting close to a person's "personal bubble", e.g., without even touching the person.

We can intrude onto the surface of a table, e.g., to draw virtual objects on the surface of the table, by, for example, coming close to the table, hovering over it, touching It, and/or the like. We can push against a table lightly. We can also push harder against the table. Thus, in one implementation, the degree of intrusion can vary from coming near the tabletop, to touching the table top very lightly, to pressing lightly, to pushing, to pushing very hard, emphatically pounding the table with one's fist, and/or the like. Thus, the system can sense trusion and taction (e.g., tactile elements like touch, tapping, rubbing, hitting, and the like).

We can also pull away from the table (extrusion). A wearable vision system such as a visual trusion sensor 1EE30 can sense touch with the table, the degree of intrusion or extrusion, and/or the like. In one implementation, a touch sensor may be configured to engage multimodal sensing by a plurality of modes, such as, for example, also sensing using an acoustic trusion sensor 1EE25.

As used herein, an acoustic signal may include a sound level all the way down to DC (zero cycles per second). In one implementation, the acoustic trusion sensor 1EE25 may be a strain gauge in or on the table, which senses flexion of the table, and/or a "bender" or "bend sensor" in the table, and/or sensors on the legs of the table that sense weight or force upon the table.

In one implementation, the acoustic trusion sensor 1EE25 and the visual trusion sensor 1EE30 are configured to supply trusion metrics and/or a multidimensional trusion signal 1EE35 that may be considered a feature vector of a neural network formed by the node 1EE40, the node 1EE50, the node 1EE70, or the like, together with connection by "neurons" or weights or elements. The connection 1EE45 and the connection 1EE60, or the like, together with the nodes, form a neural network that is trained to recognize intrusion, touch, and extrusion.

In one implementation, the taction signal 1EE80 detects and/or provides a degree of intrusion, which may be configured as a single floating-point number, a feature vector richly capturing the essence of the intrusion, and/or the like.

In one implementation, the taction signal 1EE85 captures a degree of touch, and conveys information about touch, such as how much touch there is. In one implementation, it conveys information about how many fingers are touching, which fingers are touching, and/or the like in relation to a real physical object such as a tabletop or the like, or a virtual object such as a shared virtual object that one or more people can experience together.

In one configuration, the taction signal 1EE80, the taction signal 1EE85, and the taction signal 1EE90, respectively, passes into the intrusion detector 1EE91, the touch detector 1EE92, and the extrusion detector 1EE93. Detected signals, respectively, the signal 1EE94, the signal 1EE95, and the signal 1EE96, are supplied to a gesture sensor 1EE97 which senses the gesture being performed in association with a real or virtual object upon which taction and/or trusion are to be sensed.

The gesture sensor 1EE97 may provide various output signals 1EE98, such as where each is indicative of a particular gesture.

Intrusion sensing may be performed against various objects, real and/or virtual. For example, intrusion may be sensed with respect to planar and/or approximately planar surfaces like walls, tables, floors, building faces, and the like. Thus, a homography (algebraic projective geometry on a planar surface, under for example, the orbit of the projective group of coordinate transformations) can be defined on a plane, and an intrusion detection performed thereupon, as shall be illustrated, by way of example, in the context of FIG. 2B. Intrusion detection thereupon provides information about gestures that operate upon this planar surface.

In one implementation, any manifold may be configured as a surface upon which users can interact, as a "string" in space upon which users can interact, and/or the like.

Accordingly, the trusion and taction sensor of FIG. 1EE may be configured as a manifoldizer-based interactor (the "Interactor") for wearable interaction and interaction design through the toposculpting (TRADEMARK) system (e.g., topological sculpting).

Apparatuses, methods and systems for interaction, or interaction design comprise, in some embodiments, the creation or editing of a virtual topological space, topological sculpting or the toposculpting (TRADEMARK) system, that is locally homeomorphic to Euclidean space, or approximately so, thus going beyond homographies of rigid planar patches to also include interaction with other objects like spheres, virtual bubbles, polygons, pipes, curved pipes, lights, points, icons, letters, irregular shapes, curved lines and surfaces, blobs, and the like.

(An n-dimensional topological manifold is a second countable Hausdorff space that is locally homeomorphic to n-dimensional Euclidean space.)

For example, a rope or wire or cable held or visualized in 3-dimensional (3D) space may be represented as a second countable Hausdorff space that is locally homeomorphic to a 1-dimensional Euclidean space. (Colloquially, it "behaves like a line in a small neighborhood of a point along curve" defined therein.) In one embodiment, this forms a basis for spatial interaction in an AR environment. AR stands for Augmediated Reality.

The term "manifold" may be used herein in a wide and non-limiting sense, e.g., to include partial manifolds, such as a "figure-8" shape which is not a manifold but includes pieces of manifolds "stuck together" beyond the point of intersection (i.e. the point of "non-manifoldness").

Likewise, interaction with a folded subway map falls within the scope of implementations of the disclosed apparatuses, methods and systems, whether or not it contains portions (e.g., sharp folds) that are mathematically less well-behaved. Interaction with a computer screen (real or virtual) is also included in some implementations, regardless of overall topological or non-topological structure(s).

As a second example of a manifold interaction, Alice, a woman with autism, enters a subway station and picks up a map. She is confused by all the lines on the map, but her Spaceglass (spatial imaging glass) assists her by, in one implementation, using its "holographic vision" that can "see" and "understand" the map and help her navigate it. The Spaceglass recognizes that it is looking at a surface (e.g., a second countable Hausdorff space that is locally homeomorphic to a 2-dimensional Euclidean space, i.e. the surface behaves like a plane in a small neighborhood of a point on the paper surface).

In one embodiment, the Spaceglass (TRADEMARK) system may achieve this by way of an extramissive spatial imaging system that emits light toward objects in the environment around it, and then senses the returned light, as well as ambient or natural light. It can include a lock-in camera that distinguishes (using Lightspace) spatializations that are due to light emitted from it, from light that returns from elsewhere (e.g., ambient light).

The Spaceglass may thus be configured to distinguish auto light sources from allolight sources (Greek prefixes "auto" meaning "self", i.e. light due to illumination from the Spaceglass itself, and "allo", meaning the opposite of self, i.e. light due to sources other than the Spaceglass).

In one implementation, the device or mechanism that allows this distinction is called a "Lightspacer". A lock-in camera is one embodiment of the lightspacer, but it might also include, in some implementations, a timing circuit that flashes the light brightly on every second frame of video and compares autolumination images with allolumination images, as distinct lightvectors, or the like, using the theory and praxis of lightspace.

Alice's Spaceglass begins to recognize some of the subway routes shown on her map. Although the map is folded, and even the parts that are seemingly "flat" are somewhat curved, due to sagging of the map, her Spaceglass can sense that the map defines a locally 2-dimensional subspace of the 3-dimensional space it is in. Moreover, the subway routes themselves are manifolds: one-dimensional manifolds within the two-dimensional surface of the map: itself a manifold in the three-dimensional space around it.

As she touches the map, her Spaceglass recognizes the touching gesture, according to the taction/trusion sensor of FIG. 1EE. A contact-sensor or touch sensor in the Spaceglass, or its processor, senses touch and contact with the map's surface, generating a taction signal, as well as contact with the one-dimensional manifold of a subway route, also generating another taction signal. The taction signal 1EE80, the taction signal 1EE85, and the taction signal 1EE90 work together, i.e. there being two instances of the taction/trusion sensor of FIG. 1EE, one responsible for sensing taction with the paper of the map, and the other responsible for sensing taction/trusion with the subway route shown thereupon. The first sensor senses taction/trusion ("tusion") with the two-dimensional manifold of the paper, whereas the second senses tusion with the one dimensional manifold of the subway map drawn on that paper.

The touch-sensor may, in various implementations, include one or both levels of touch sensing: first when the paper is touched, and second when the path, or curve, or other manifold on the paper is touched. In each case, a response may be generated in the form of an augmediated display, or display media, rendered as if emanating from a manifold such as the paper surface or subway route thereupon.

In addition to reading the map in an augmediated sense, she can also propose a design for a new subway by manipulating the design and moving stops around along the one-dimensional manifolds as if they were beads on a wire. As she touches a stop, it may be configured to light up with information about the stop rendered as if upon the page of the map. Then with a particular gesture, such as a "pinching" gesture (e.g., a sensing of when her thumb and index finger touch, after approaching a subway stop or other map point from opposite directions), the selected object or point-of-interest may be highlighted in the virtual space and can be slid back and forth along the submanifold of the subway route. This may, in one implementation, be called a "planifoldizer", e.g., a manifold planning system that allows a manifold to be "edited" or "sculpted" ("toposculpted") in real time, as a form of interaction design.

In one embodiment, the planifoldizer may combine tactile feedback of a real physical object, like a piece of paper, with an editable virtual manifold.

In one implementation, the planifoldizer may be configured with a dimensional hierarchy. Sliding the thumb and forefinger along the sheet of paper is recognized as a gesture that can select a point in a different way than doing so in 3D space off the page. Thus, the dimensional hierarchy recognizes gestures that are confined to the 2D manifold as different than those in 3D (three dimensional) space not on 2D (two dimensional) manifold. Moreover, another class of gestures is those confined to the one dimensional (1D) manifold, e.g., running the thumb and forefinger along the subway route, to approach a particular subway stop from either side, the thumb on one side and the forefinger on the other side, and then bring the thumb and forefinger together to select a particular stop. This gesture, for example, invokes a move-along-the-route operation, whereas doing the gesture in the 2D paper plane but off the route invokes a move-the-route operation (to move the whole route and not just the stop).

In some implementations, the planifoldizer can be used for route planning on any map or even on a blank sheet of paper which paper is used as a user-interface to a planifoldizer to give an otherwise "airy" user-interface the power of tactile feedback. Such a paper sheet, in this context, may be called a "planifold" (interactive manifold for planning a route, for example).

In one embodiment, a manifoldizer synthesizes an interactive input device in which the user is invited to generate a manifold in virtual space. Examples include a gesture-controlled string generator, and a gesture-controlled surface generator.

In some embodiments, through gestures, the user creates a manifold that follows approximately the time-integral of the user's gesture along a tangent-line of the manifold to thereby define it. For example, a virtual string, rope, or wire, is generated by moving a finger through space, while the manifoldizer synthesizes a time-integral of the movement. The result is akin to a long-exposure photograph as if a light bulb were moved through it (accumulative lightvectoring). This form of toposculpting may be referred to as the abakosculpting (TRADEMARK) system. "Abakosculpting" is from the Hebrew form "abaq", meaning "dust"—the same root word from which the word "abacus" is derived. In some sense, abakosculpting is like working an abacus, i.e. moving points-of-interest along virtual ropes, strings, wires, or the like, as if they were beads on an abacus. The abakography (TRADEMARK) system can also be referred to as the Dusting (TRADEMARK) system, and it can be said that we "Dust" an object when we use it as a guide to construct an abakograph of the object, or of a roulette involving the object, or otherwise involve the object in the making of an abakograph. One method of dusting is to sprinkle or throw retroreflective powder in the air, and blow it around, while a camera and projector sharing a common optical axis illuminate this dust. In one embodiment of "Dusting", a long exposure video summation, the "dust" traces out streaks of light that may be regarded, metaphorically, as the wires on an abacus. In another embodiment, some of the powder is deposited on a user's hand so that hand gestures generate abakographs. In another embodiment the powder is not required because the computer vision algorithms are sufficiently advanced as to be able to simulate the process using computer vision alone.

In another example, a two-dimensional manifold is generated in three-dimensional virtual or augmediated space, as a tangent surface to a user's hand or other body part.

Such devices may be referred to as "input manifoldizers".

In one embodiment, a manifold is displayed in virtual or augmediated space, or by way of an augmediator, apparatus, or the like, and the user can interact with the pre-displayed manifold.

Such devices may be referred to as "output manifoldizers" or "manifoldized displays".

In one embodiment, an input manifoldizer may be used to generate an output "manifoldizer".

Examples include the generation of a 1-dimensional manifold display by moving the finger through space, resulting in something having the general appearance of "light rope" or a string of LEDs (Light Emitting Diodes), that grows longer as the finger moves more through space. The resulting "light rope"-like manifoldizer is a one-dimensional manifold synthesized in three-dimensional space, which is interactional in the sense that it behaves as would a touch-rope.

In one implementation, objects may be synthesized along the 1D manifold as if beads on a string, for example. These objects correspond, for example, to subway stops along a subway route. In this sense, we call these objects "spats", as per the British unit of solid angle (1 spat is equal to 4 pi steradians of solid angle). A spat can be selected or created or deleted along the path of the 1D manifold. Spats may also, in one implementation, correspond to real-world panoramas when desired. Clicking a spat along the virtual string may, for example, bring up a panoramic vista of a particular subway stop. A subsystem of the disclosed apparatuses, methods and systems, which we call the interactor, senses gestures and synthesizes responses due to those sensed gestures. It can distinguish between gestures acted along the 1D manifold, as compared with gestures acted in the plane of the page but not along the 1D manifold, as compared with gestures acted outside the plane. Thus, grasping an object from within the page, for example, gives a different result than grasping it from off the page (i.e. approaching a spat from off-page, such that the initial point-of-contact with the page is the spat itself, versus touching the page elsewhere and then sliding to the spat).

In various embodiments, other gestures may be used and also disambiguated. For example, in one implementation, touching the page on the 1D manifold but away from the spat will select the manifold, and then allow a constrained-slide along that manifold. Touching the page elsewhere allows a slide of the manifold itself, or a slide to the manifold—a distinct gesture from the first one.

In the next dimension, the input/output manifoldizer behaves, in one implementation, as would a touch-screen, being therefore a two-dimensional manifold (locally Euclidean 2-dimensional space) synthesized in three-dimensional space.

The disclosed apparatuses, methods and systems may also be configured for higher dimensions, e.g., a hypercube display in a higher dimensional embedding space synthesized as a manifoldizer-based interactor.

In some embodiments, the manifoldizer may be configured for visual interaction design (e.g., virtual screen interaction, or sculpting 3-dimensional objects), but the disclosed apparatuses, methods and systems are not limited to visual interaction design. For example, embodiments may be configured for manipulation of other media such as sound files (e.g., as one-dimensional manifoldized waveforms) or other media such as symplectic and metaplectic manifolds for interaction with phase spaces of Hamiltonian and classical Lagrangian mechanics. Examples include manipulation of metaplectomorphisms of the Time-Frequency plane (e.g., chirplets and the chirplet transform), such that parts of objects or media may be manipulated in phase space.

In one implementation, images can be edited such as in their four-dimensional phase space, through the manifoldizer.

The manifoldizer, as a form of interaction-design in one embodiment, can also be used to manipulate action, to take action, or to edit action, thus not being limited to the principle of stationary action, but, rather, affording curatorial manipulation of action in spatialized augmediated reality.

In this way devices like rockets, and the like, can be designed and manipulated, amid a virtual environment that provides and creates real-time analysis, Lagrangian (or Hamiltonian) modeling, and the like. Additionally, in one implementation, a part can be sculpted amid an interactional environment in which real-time CFD (Computational Fluid Dynamics) is running while the part is being manipulated. For example, one can shape a rocket surface, while watching the "would-be" flow of air currents and seeing the effects of real-time solutions to the Navier Stokes equations, such that the shape is guided by more than mere aesthetics.

Thus, in some embodiments, the fluid flow itself can form part of the interaction, e.g., a person can hold a part in a real wind tunnel, and sensors then sense the actual flow of fluid over the part and bring this actual flow into the simulation.

FIG. 1F depicts examples of interacting with shared objects using an embodiment of the sensory and display apparatus 1300 of FIG. 1E.

FIG. 1F depicts one embodiment of the manifoldizer, showing a shared manifoldized interactional space and manifoldized display embedded in 3-dimensional space, as well as a shared manifoldized interactor and display embedded in another manifold (which may be a physical surface such as a desktop, wall, or floor).

FIG. 1F illustrates an embodiment of the manifoldizer running with two wearable eyeglass devices (digital eye glass), the glass 180DEG and the glass 181DEG. The glass 180DEG and the glass 181DEG are extramissive space-glasses (e.g., spatial imaging glasses). A DEG (digital eye glass), denoted as the glass 180DEG and the glass 181DEG, may include various elements in various implementations, such as but not limited to orientation and an inertial sensor 180IMU, a LiDAR unit 180L, a vision system 180V, optical sensors, and display units 180D. LiDAR stands for Light Direction And Ranging.

The eyeglass device(s), or DEGs, of FIG. 1F may include a shade, to help improve eyesight, help increase contrast of view, or also to conceal the apparatus. In one implementation, single shade or two separate shades (one for each eye) may be used.

An example implementation of the shade as shown in FIG. 1F as a two inches by 4.25 inches (approximately 51 millimeters by 108 millimeters) standard-size welding shade. This allows the display 180D to be visible in bright sunlight (e.g., using an ANSI Shade 5 to 7) or on a bright but cloudy day (e.g., using ANSI Shade 2 to 4), or for using the digital eye glass for welding (e.g., using a darker shade), while seeing the electric arc, such as by using HDR (High Dynamic Range) imaging.

The glass 180DEG can, in one implementation, include a singular glass through which both eyes see (like a welder's helmet). In one implementation, the glass 180DEG may further include a separate display or mediation zone for each eye, within the one glass, or a separate glass for each eye, or a monocular glass for one eye.

The glass 180DEG may be supported on the head by a frame, such as may include a head strap 180H and/or a mindstrap 180M. The mindstrap 180M may be split so that half of it goes below the occipital lobe and half above, thus making the eyeglass stay on during intense physical activity such as gymnastics, yoga, or swimming where water currents might otherwise "brush" the digital eye glass off the wearer's face. A front planar surface of appropriately sealed instance of the glass 180DEG is operational above or below water.

The digital eye glass 180DEG may be employed for a variety of uses and/or applications, such as but not limited to functioning as a seeing aid, vision aid, or the like, and may allow HDR vision, e.g., in which the wearer can see in relative darkness (or even in complete darkness, e.g., by way of a high dynamic range bolometer) while also looking into an electric arc, or looking into bright car headlights in a dark alley and still being able to clearly see the car's license number and the driver's face.

In one implementation, removable shade 110 may be electrochromic and be controlled by sensors, or the LiDAR unit 180L or a vision system 180V or by a combination of these. In this way, the glass 180DEG can adapt to a wide range of vision conditions, such as change from indoors to outdoors, sun, cloud, electric arc welding, bright lights, etc., as might naturally occur, or even protection from deliberate or malicious lighting attacks such as laser pointers or other sources of lights, to which the digital eye glass 180DEG can afford protection.

In one implementation, sensors may be located around the periphery of the removable shade 110 of the glass 180DEG, and/or incorporated directly therein. Sensors may also, or additionally, be located above removable shade 110, whether or not the removable shade 110 is present. When removable shade 110 is removed, this is considered as Shade 0, e.g., the setting of the removable shade 110 becomes Shade 0.

In various implementations, sensors above the removable shade 110 can take the form of an infrared transmitter 180IRT, and an infrared receiver 180IRR (detector or receiver). In one implementation, the infrared transmitter 180IRT and the infrared receiver 180IRR work together as a range-sensing vision system, such as an infrared LiDAR or other type of 3D infrared camera system.

In one implementation, a vision sensor may be formed as a visible light camera denoted as visible light receiver 180VR. This allows for a photographic image, perhaps a full color image, to be assembled together with a range map or range image formed by infrared transmitter 180IRT and infrared receiver 180IRR. Likewise, a visible light transmitter 180VT may be used to project onto subject matter in such a way as to be visible by others, even those not wearing a digital eye glass.

In one implementation, a vision transmitter may operate in the visible light spectrum to illuminate subject matter such as surface 130 (e.g., a tabletop) with visible content such as an advertisement, sponsor notice, counter, time/date, and/or other indicia such as a projection, which is visible to wearers of DEG as well as to the naked eyes 198 of persons not equipped with DEG.

In some implementations, the glass 180DEG affords two eyes a spatial image, such as having horizontal parallax only, stereoscopic, and/or the like. This may be done, in one implementation, using two separate instances of the display 180D or a stereo display 180D in a single glass through which both eyes can see, or in separate glasses. The inter-pupillary distance (IPD) values from the 1988 Army Survey indicate an average of 64.7 millimeters for men, and an average of 62.3 millimeters for women.

If we compute the average these two (e.g., for both genders), we get 64.7+62.3=127.0 millimeters total, and dividing by two gives 127/2=63.5 millimeters. This is equal to 63.5/25.4 inches which is 2.5 inches. In one implementation, displays 180D are about 2.5 inches apart at their eye points in a mass-produced system, and may, in some implementations, provide for some degree of adjustment by the end user.

In some implementations, there may be a plurality of DEGs (digital eye glasses) such as the glass 180DEG and the glass 181DEG, providing a two-eyed, or monocular display capacity. In the case of a two-eyed view, there is provided an OD (Oculus Dexter) Point of Eye, 181POEOD, and an OS (Oculus Sinister) Point of Eye, 181PEOOS, e.g., "right EyeTap point" and "left EyeTap point".

This capacity to capture true 3D images may be used in one implementation to create a lightspace collinearizer, which creates a synthetic EyeTap effect. In particular, in a true EyeTap system, rays of eyeward bound light are diverted through an imaging system, processed, and re-rendered to be collinear with the original rays.

The synthetic collinearizer (lightspace collinearizer) works, in one implementation, by capturing a true 3D model and calculating the image that would have arisen by a camera if it were actually to have been placed inside the wearer's eye with the center of the lens (iris, nodal point, optical center, or the like) of the camera at the center of the lens of the eye.

Moreover, a 3D camera may be used in one implementation to synthesize the effect of a spatial imaging device including a lightspace analysis glass, passing over the wearer's eyes, e.g., the entire visor of the Spaceglass can become effectively a lightspace analysis glass. This 3D camera thus generates the lightspace, lightfield, plenoptic, and/or holographic image of all rays of light passing through the Spaceglass. A processor is therefore able to be responsive to an output of this (virtual) "lightspace analysis glass", and the processor can further compute rays for a "lightspace synthesis glass" responsive to an output of the processor.

In one implementation, the combination of 3D camera, processor, and display effects a lightspace collinearizer.

Because of the true 3D nature in implementations of the vision system of the glass DEG180 and the glass DEG181, each instance of the glass is configurable to capture a true 3D image of the public subject matter 140 such as a shared gaming table (e.g., a real or imagined or virtual chessboard, or the table surface 130 itself), and render this real view, or a computer-modified view of it, or any combination of these, as if it were captured by a camera located at and/or substantially near the center of the lens of the Oculus Dexter (right eye), as well as another view as if it were captured by a camera located at and/or substantially near the center of the lens of the Oculus Sinister (left eye) of the wearer of the DEG (glass).

In one implementation, the glass 180DEG and the glass 181DEG can each function as a Generation-5 glass. Moreover, the glass 180DEG can use its own vision system plus information received from the glass 181DEG to construct an even more detailed, true and accurate 3D model of reality than its own vision system alone. In this sense, a number of different participants can share a computer-mediated reality in which the real world is captured with high detail, precision, and accuracy.

In one implementation, two DEGs can cooperate, such as by time-division multiplexing (e.g., alternately illuminating the scene to understand the world), by code-division multiplexing (e.g., using different spreading sequences or spread spectrum or spread spatialization patterns), by collaborative sensing, and/or the like. In the latter case, the two or more DEGs can be working together to illuminate and sense the public subject matter 140 and the surface 130. For example, while the infrared transmitter 180IRT illuminates the scene, the infrared receiver 180IRR and the receiver 181IRR both sense the scene. The cross-sensing between the glass 180DEG and the glass 181DEG provides additional scene information through the extreme parallax that exists owing to the longer baseline between the glass 180DEG and the glass 181DEG.

In one implementation, the result is a Synthetic Aperture LiDAR, or the like, having a resolving power that may be mathematically broken down into a separate small-parallax inter-glass baseline, and a large-parallax intra-glass baseline.

In one implementation, the glass 180DEG may comprise or include or be a wearable computer, or the wearable computer may be a separate unit, such as that fits in a shirt pocket. In some covert embodiments of the glass 180DEG, the apparatus may be totally self-contained, or it may be tethered to a wearable computer for being placed in a pocket of a shirt of a wearer of the glass 180DEG. If it is tethered, the wiring may be concealed, such as inside cloth pipes or cloth tubing, or the like, having the appearance of the Croakies (TRADEMARK) eyeglass safety straps. In one implementation, the eyeglass safety straps have a tether clip 180T that clips onto an article of clothing to provide strain relief of the eyeglass tether. The tether clip 180T can be a standard "crocodile clip", an "alligator clip", and/or a spring-loaded clamp, such as may be used for headsets, lavalier microphones, and/or the like.

In some implementations, the wearable computer may be placed on the floor or table in an office or home space when the glass 180DEG is for being used in a seated position. In this case wearable computer might be housed inside the sensor-interface unit 120 (also called a tabletop unit), which includes a geophone 180G. The geophonic enabled instances of the sensor-interface unit 120 (implemented as a tabletop unit) may be configured with sensors in it that sense and help with the process of sensory input the wearable computer. In this case, sensor-interface unit 120 can "listen" geophonically to sound vibrations in the table, such as when chess pieces are slid across the table or touched to the table, or when someone taps their finger on the table.

In one implementation, the LiDAR unit 180L and the LiDAR unit 181L, which sense the 3D object positions, and the like, provide data to the wearable computer along with sensor-interface unit 120, to provide multimodal sensory tactile feedback by way of geophone 180G and other sensors.

In one implementation, the geophone 180G in the sensor-interface unit 120 can be a transmit and receive geophone, such as a unit made by Clarke Synthesis which can even be bolted to the tabletop to provide transmission of a large amount of vibrotactile energy to the table that can be felt as a "click" or touch or taction by a user's fingers.

Alternatively, this force and/or vibrotactile energy can be used semi-destructively, such as for dramatic effect.

For example, in a game of "Augmediated Chess" the geophone 180G can shake the table and knock over real chess pieces when one player wins the game, thus creating a dramatic visual effect even visible to the naked eye 198 of a non glass-wearing participant.

Moreover, if multiple participants set their interface units down upon a surface 130, such as a tabletop, there can be multiple instances of the geophone 180G and the geophone 181G in these respective units, such as to form an array of geophones. In one implementation, an additional IMU (Inertial Measurement Unit) in each of these units, and/or other additional sensors may be used to compute the relative position of these units, so as to form a phased array of sensors that can localize acoustic or other disturbances in the surface 130.

In regard to human vision, as well as in regard to cameras, rays of light are traced from their source, (e.g., a light bulb or other light source, or subject matter illuminated therefrom), to their destination, including through reflection, refraction, diffraction, and/or the like. This conceptualization of light may be referred to as the "intramission theory" of light. An alternative conceptualization may be referred to as "extramission theory", such as with light as rays emanating from the eyes.

In one embodiment, "active vision" may be implemented through a special seeing glass, e.g., the Generation-5 digital eye glass, wherein the eye can behave as if it both senses and emits light.

In one embodiment, multiple digital eye glasses may share space, such as by using one or more multiplexers. One example of such a multiplexer is a TDM (Time Division Multiplexer) which is formed, in one embodiment, by taking turns: one person transmits while the other person remains "quiet" (no light output). Then they switch places, taking turns to transmit so they don't interfere with each other. Such transmissions may be energy-optimized in one implementation, so as to adapt more or less energy emissions to satisfy the need to see properly in an adaptive manner. Adaptive active vision may be performed cooperatively, such as for HDR (High Dynamic Range) by utilizing variously exposed gettings of the same subject matter, to save energy, as well as for the vision system to sense and/or see better.

In implementations of the fully bidirectional DEG that senses and emits light in both directions may afford: extramissive active vision forward-looking; extramissive active vision inward-looking, such as to the eye itself. This may include eye-tracking (e.g., as sensing) and display (effecting), as well as spatial imaging of the environment (e.g., as sensing), and projection to the environment (e.g., as effecting).

In this sense the glass 180DEG may send and receive light to and from the eye and may also send and receive light to and from subject matter in view of the eye.

In some embodiments, Spaceglasses, such as the spatial imaging glass 180DEG and the spatial imaging glass 181DEG, sense both the environment around the user, and the user himself or herself. The spatial imaging camera, such as LiDAR unit 180L, may in one implementation provide a depth map, such as to determine the spatial coordinates, positions, orientations, and the like, of the user's arms, hands, fingers, legs, feet, and/or the like, such as may depend on the visual orientation, field of view, and/or the like of the user. In one implementation, two kinds of scannable subject matter may be separately detected: (A) non-self subject matter (e.g., other objects in the room), and (B) self.

When the two meet, the system may track this and, and the situation may be referred to, in some implementations, as "physical contact" or "taction".

In one implementation, the computer 160 (a wearable computer or a WearComp unit) may contain a taction detector component that detects taction (e.g., physical contact between the human body and something) and responds accordingly.

One example of a taction detector is the geophone 180G picking up the sound of taction, but the vision system can also observe this by 3D scanning of a surface like a tabletop and determining when and if the hands or fingers touch it. In one implementation, this may be accomplished by forming a point-cloud and noting when the point cloud of hands or fingers intrudes upon the homography of the plane defined by a group action, such as the example shown in Formula {1}.

In one implementation, a statistical significance test may be performed upon the degree of homographic intrusion to form a visual taction detector. Apparatuses, methods and systems that perform such measure of the degree of homographic intrusion may be referred to as a homography intrusion estimator, or homographic intrusion estimator, and when such an estimator is thresholded or used as a trigger for other action, such a device may be referred to as a homography intrusion detector. In one implementation, detection and estimation theory, such as Neyman-Pearson theory, or the like, may be applied to the creation of a homography intrusion detector.

Some embodiments can be used stand-alone, or in combination with other users, collaboratively. Not all users need be wearing the DEG. For example, a shared computer-mediated reality exists among wearers of the glass 180DEG and the glass 181DEG.

This sharing can occur over a real or virtual manifold, such as an actual surface with the public subject matter 140. The public subject matter 140 can be on a piece of paper on a tabletop, chalkboard, or the like, or it can exist entirely in virtual space as a manifold.

In one implementation, secret subject matter may be created in the virtual world shared by participants wearing the glass 180DEG and the glass 181DEG. The user of the glass 180DEG may, in various implementations, choose to create, mark, annotate, alter, and/or the like, the surface 130, only in virtual cyborgspace, with marking the manifold 146.

In one implementation, this is done by moving a body part 147 along a trajectory of the manifold 146, to create the manifold 146, including, in some implementations, in collaboration with another user of glass 181DEG. The second user's body part 145 also edits and defines the manifold 146.

In FIG. 1F, the manifold is shown as one-dimensional manifold within a two-dimensional instance of a surface 130, itself within a three-dimensional space. In one embodiment, a manifoldizer includes a processor (residing in the glass 180DEG or the glass 180DEG or distributed there between), a sensor such as vision system 180V, and a display such as display 180D. In one implementation, the sensor and/or processor recognizes the position of body part such as the body part 145, and tracks this part, and creates an integrated manifold path as a collection of point positions, such as may be stored in a database, and then displays this path. The user sees, therefore, a time-integrated path that continuously and/or periodically updates as the body part 145 moves through or along space. The manifold 146 can be embedded in a surface like the surface 130, or it can be "floating in space" like the manifold 141. When it is embedded, as is the manifold 146 on a surface like the surface 130, it can be indexed or addressed by touching the surface 130, and a surface contact sensor can comprise a planar homography detection system that determines if the body part 145 is in contact with the surface 130. In this way, the processor can sense whether or not the body part is in the plane of the manifold 146. In some implementations, virtual objects can reside on the manifold 146. For example, a slider rendered as a bead-on-a-wire can appear and can track the body part 145 when it is in the plane of the surface 130, and "disengage" when not. This allows selective adjustment, interaction, or engagement, which may be referred to as multi-dimensional manifolidization (sliding up or down in a multidimensional space, for example).

When the manifold is on a surface, it can be made visible to others even when they are not wearing the digital eye glass (glass or DEG).

In one implementation, a person not wearing the glass can still see the markings, if the participants decide to make them public. In this case, public markings can remain visible by extramissive visual projections from the glass 180DEG or the glass 181DEG, which markings comprise projections, such as may be stabilized by Video Orbits stabilization.

In one implementation, the secret subject matter 340 may only be visible within the database of collaborating users of the glass 180DEG and glass 181DEG. Public subject matter 240 is visible to non-participants such as to the eyes 198 of a person not involved or not wearing DEG (digital eye glass or glass).

The users of the data can decide whether to render the manifold 146 as a shared secret or public.

In various implementations, the surface 130 can be a desk, chalkboard, paper, flat, curved two-dimensional manifold, and/or the like. Alternatively, it can be a smart floor in which the surface 130 is a floor rather than a desk or tabletop. In one implementation, the floor may be configured with a pseudorandom texture upon it which may be deliberately made from pseudorandom tiles, or naturally occurring by way of varied texture, dirt, scuff marks, or the natural texture of wood grain in a hardwood floor or the natural texture of stone or concrete or marble or rubber or carpet. The texture forms a pattern. The homography of that pattern, through algebraic projective geometry, forms a group action under a Video Orbits procedure running on the processor responsive to an output of a 3D camera system formed by the infrared transmitter 180IRT and the infrared receiver 180IRR. The group of coordinate transformations of the floor texture falls in an orbit given by a formula similar to the example shown in Formula {1}.

Since the floor may likely remain in this orbit, as viewed by a plurality of wearers of DEG (digital eye glass or glass), then it can be disambiguated from other matter not in the same plane as the floor.

In one implementation, the true 3D sensing nature puts the floor itself in a true 3D model, and thus points on this 3D plane can be clustered and segmented.

The secret subject matter 340 may comprise, for example, song lyrics displayed upon the surface 130 (also called a floor surface), visible to one or more participants in an andantephonic walk.

Aspects of the disclosed apparatuses, methods and systems may be configured for physical instruction (yoga, dancing, acting, martial arts, running, sports, etc.) by way of a virtual 3D instructor, or through multiple wearers of the spaceglasses. In the case of multiple spaceglasses, one's body movements can be scanned by another spaceglass, or by a spaceglass fixed in the environment, so that an instructor can assist in the collaboration.

Alternatively, the manifold may be a skipping rope or real physical object either laying on the floor like the manifold 146 or moving through free space like the manifold 141.

Alternatively, the manifold can be its own virtual object for which no real-world counterpart exists. In this embodiment, the manifold 141 may float in free space, as an image visible to users of the glass 180DEG and the glass 181DEG, but not visible to the naked eyes 198.

In one implementation, a user of glass 181DEG may use an extremity or body part 143 to abakosculpt a 1D manifold in their shared 3D space. Abakosculpting, in some embodiments, may be performed with a light bulb or LED or other actual light source that draws long-exposure ("painting with lightvectors") 3D photographs, as the trace 144. In other embodiments abakosculpting may be performed with the fingertip as a "draw tool" to leave behind a drawn trace 144. Another user, such as the wearer (user) of glass 180DEG, can "reach out and touch" (using body part 142) the abakograph formed by the wearer (user) of glass 181DEG. In this case the abakograph may begin to glow a different color assigned to the user of the glass 180DEG, while touched with the body part 142, or selected therefrom, so that the user of the glass 181DEG can see that he is sharing the abakograph with another collaborator.

The abakograph is represented as a 1D manifold in their shared 3D space, and either person can edit it, if the creator has given write permission to this object.

In one implementation, a user such as wearer of the glass 181DEG can also give read-only permission to the abakograph while also granting write permission to spats that slide along the abakograph. In this way the abakograph appears as a form of abacus to other users, who can merely slide "beads" or other objects along it, but not otherwise alter it.

FIG. 1G depicts an example of interacting with shared objects along an abakographic trajectory in one embodiment using the sensory and display apparatus 1300 of FIG. 1E.

FIG. 1G illustrates an abakographic manifold 180AM (hereafter referred to as the manifold 180AM) in one implementation. The manifold may be real or virtual. For example, it can be an actual spiral or helix or other curved piece of wire held in the hand 180MD and the hand 180MS of a user 180U, or it can be a totally virtual shared abakograph. Alternatively, it can be a 2D manifold or a 3D manifold, such as a nautilus shell, a piece of paper, a map, or drawing, like a drawing or photograph of a nautilus shell or spiral drawn on flat paper or on a chalkboard or on the floor. It can even be a piece of modeling clay that is held in the hands of the user 180U.

The right hand 180MD ("manus dexter") of the user 180U touches the manifold 180AM (which may have a spiral shape) and the glass 180DEG senses this, in one implementation, through its active vision system by way of sending light to the hand 180MD and receiving the light back, thus determining whether or not the hand 180MD has made contact with the manifold 180AM.

An object 180O (a real object or a virtual object) is present that can also be touched. Here it is presented as a "bead" on a wire, and when the hand contacts its surface, the bead is "highlighted"—rendered in a different color, corresponding to user 180U—let's say, red for the user 180U and blue for the user 181U.

In one implementation, the bead is a spat, meaning that it can represent an environment map when and if desired. Here it represents a panoramic photographic virtual environment as captured from a center-of-projection that aligns with the center of the sphere formed by object the 180O. Here the object is spherical, but it could also be tree-shaped, or clown-nose shaped, labrador-shaped, giraffe-shaped, or anything else.

In some embodiments an object is actually spherical in reality but presented to the viewer as another shape such as a polyhedra or game item, or a photographic spat showing the texture map as if rays of room ward bound light were passed through it and recorded thereupon.

In one implementation, touching an object like the object 180O with the hand 180MD while at the same time touching another object 180P with the hand 180MS associates the two objects with one-another, highlighting both of them, as well as the path there between, in red.

Subsequently when user 181U touches the manifold, his instance of the object 180Q begins to glow blue in both his instance of the glass 181DEG and the first user's instance of the glass 180DEG, and also the path between the object 180O and the object 180Q begins to glow magenta (a summational mixture of red and blue).

These paths, defined along the manifold 180AM, are paths along which the selected objects can be slid in virtual shared space.

Various different kinds of gestures may be employed. These include: touching the manifold 180AM; touching a spat such as the object 180O; grasping the spat such as the object 180Q, between thumb and index finger of the hand 181MD; and touching while punching a spat, with index finger of the hand 181MS, while also pushing the knuckles of the hand 181MS against the spat.

In one implementation, a manifoldization gesture sensor recognizes the difference between a gesture that slides along the manifold and then touches an object, and one that just touches the object after approaching through three-dimensional space but not along the manifold 180AM.

In one implementation, objects like the object 180O may be represented as "fuzzy" clouds that have "snap" properties, allowing near touches to highlight them. These clouds may be displayed around the spats as an aura, for example, which itself gradually and fluidly highlights on approach, thus allowing analog selection, and degrees of selection, such as using actional analytics (e.g., the time-integral of inverse displacement, or presement, where presement is reciprocal absement inside the time integral, in which absement being the time-integral of displacement).

In one implementation, selection is performed by an actional integrator that integrates reciprocal displacement, to determine the strength of the selection aura.

Additionally, an exposure integrator can be used in some implementations to time-integrate exposures or exposers such as hand-gestures used to create selectioners.

In one implementation, a "crush" gesture is one that indicates destruction of an object such as the object 181BB which can "die" like a burst bubble.

In some embodiments, the disclosed apparatuses, methods and systems include the Pi-menu, the Tau-menu, and the Spat-menu.

In one implementation, the Pi-menu is selected by approaching an object from below, in which case the lower half of the object is given the selection aura. A Tau-menu may be selected from multiple directions of approach, such as by grasping (e.g., thumb and index finger). A Spat menu may be selected by crushing into a sousface. A sousface is, in one implementation, the opposite of a surface (French etymology from "soffit"). A touch surface may be created by touching an object, but a reach-into-the-object gesture may be distinguishable from touching and may be effectuated in one implementation by reaching through the object and connecting with its interior. Here we see the spat menu 181SM appear because the hand 181MS reaching into the object, passed through its center, and then came at the inside of the object to touch its sousface.

Once a sousface touch is detected (e.g., a touch that goes through the object, and for example, "pops" the bubble, and grabs onto its "soapy" fragments from the other side), a 3D clock face menu appears in one implementation. This goes beyond a 3D pie menu, because also the spat is used as a framework for 3D selection beyond the decorative. The hands of the clock can also be manipulated separately, in addition to a full 3D spat thereupon. The finger then is tracked in its manner of departure (e.g., direction, velocity, acceleration, jerk, jounce, and/or the like, as well as displacement, absement, absity, abseleration, and/or the like), and the spat is expanded ("pulled apart") to enlarge the menu. Here the index finger of hand 181MS pulls away from the center of the object to select the four-o-clock position as the menu selection 181M, here indicating a moratorium on the process. A four-o-clock gesture is encoded as an end gesture, for an application that is close worthy.

It should be noted that the above is provided merely as one illustrative example and is in no way meant to limit scope. For example, in one implementation, a 3D direction of entry and/or departure of one or more body parts of one or more users in a shared augmediated reality environment may be employed. In various implementations, each of these gestures can be metagestures, autogestures, or the like. By way of example, a user may punch the bubble, poke it with one finger, or touch it with two fingers gently to rotate it as a select-and-rotate gesture, or touch it with the two middle fingers while clenching the index finger and thumb simultaneously, squeezing the index finger and thumb harder or softer to establish a continuous multi-touch autogesture that is continuously variable and evolves dynamically while the gesture is taking place. In some implementations, such dynamic "fluid gestures" can operate continuously and give rise to a continuous rather than discrete "trigger-based" user interface modality. Examples can include an RWM (Reality Window Manager) interface in which windows are touched, rubbed, moved, burst, broken, fixed, repaired, "washed" (with a rubbing motion to erase the text from a text window for example), and the like, all with multi-touch metagestures, multi-touch autogestures, and the like.

The spat menu 181SM is not a mere clock face but is three-dimensional. For example, if the hand pulls straight away toward the user, or away from the user, other actions may be taken.

Embodiments of the disclosed apparatuses, methods and systems may be configured to work in any number of dimensions. Here we see an embodiment employing an abakographic manifold 180AM, but embodiments may also be configured to employ, simulate, and/or manipulate the 3D objects like modeling clay. The user 180U holds clay that is sculpted by the hand 180MD and the user is guided by overlays to make a perfect sculpture in real clay. In one implementation, this may be effectuated via a wearable 3D holographic vision where the clay itself can be an exposer to long-exposure sculpting effects, beyond mere augmediated sculpting. In one implementation, the user may then insert this (virtually) into a 3D printer to be printed.

The clay is not necessary as the action can be performed in open-air, but the clay does provide useful tactile feedback that improves the toposculpting experience and accuracy.

Other embodiments include special shoes with special markers that allow the user 180U and the user 181U to do toposculpting through actions like walking, dancing, or interacting. They can, for example, dance together and generate abakographs with their feet, as an art form, or as a practical way of measuring physical fitness and kinesiological data. Embodiments may be configured to work with dance shoes, yoga shows, mindfulness exercises, aerobic exercise, and bicycling where the abakographs can be used to measure performance and generate performance metrics.

Moreover, in one implementation, a comparametric interaction among multiple users can be used to generate an abakogram or other data structure from which an abakograph can be generated, such as at a later time.

In one implementation, Toposculpting may also be performed in or with fluid, using the fluid as tactile media. For example, compressed or pressurized fluid can be used as a fluid flow field against which to create tactile sculptures.

FIG. 1H depicts an example of a method for interacting with shared objects using the sensor and display apparatus 1300 of FIG. 1E.

FIG. 1H shows a flowchart depicting aspects of the disclosed apparatuses, methods and systems in one embodiment.

FIG. 1H is a flowchart depicting some aspects of the disclosed apparatuses, methods and systems. A topological sensor 1C10 determines if an object is in range of the hand 180MD of the user 180U. If not, It waits until the hand is in range of the object. Once the hand "intrudes" sufficiently into the "space" of an object such as the object 180O, a manifoldization display, begins to play back a recorded or live image of a situation such as live video from the spat so selected.

In this scenario consider a veillance system that is neither watching from above (surveillance, e.g., as police watch prisoners) or watching from below (sousveillance, e.g., as citizens photograph police). Veillance is the act of watching.

The veillance system works within an Internet-of-Things (IoT) or SMARTWORLD framework. Examples include streetlights that have a camera in each light to automate the adjustment of light output. A citizen walking down the street can edit the space (assuming everyone has written permission, so they can request light when needed or, so they can suggest changes) and interact to some degree, with some amount of write permission.

The citizen interacts with a map of the city to select a spat. Once her finger touches the spat, the spat begins to play live video. We call this a maniplayer (TRADEMARK) apparatus, a manifold (dis)player that plays back live video on a globe as if the globe were the very fisheye lens that recorded it. Other projections can include for example a mercator projection on a cylinder.

Consider the sphere of the object 180O as the maniplayer surface, where the maniplay 1C20 beings to play live video from a streetlight camera once the camera has been selected. The user 180U can see herself on the video and locate a problem where the branches of a tree are blowing in the wind and causing the streetlights to come on at full brightness when nobody is on the street, which is wasting a lot of electricity. She captures the live video of the situation and forwards it to a wiki, so she can play it back next time she is attending a City Council meeting to have the problem fixed. Meanwhile she uses the spat menu 181SM to draw a veillance mask with her finger to cover up the tree branches so that they can be ignored. She posts this proposed mask on the wiki.

Such citizen involvement in veillance turns what might otherwise be a surveillance society into a veillance society.

Some embodiments of the disclosed apparatuses, methods and systems may facilitate interaction design with hand gestures at or with real or virtual manifolds—e.g., to shape them—as a way of interacting.

Manifolds are locally planar: the "world is flat" (approximately) if you look at a small enough patch of it. In one implementation, a Lie algebra may be employed to consider the behavior of a topological manifold in the neighborhood of one point such as the identity. Thus, the topological sensor 1C10 is implemented as a local planar comparison at the neighborhood of one point-of-contact with the object 180O regardless of shape (e.g., sphere).

In one implementation, once a body part like the fingertips of the hand 180MD intersects an object like the object 180O, a sustainment detector 1C30 determines if the touch was an accidental brush or a sustained touch. If accidental, the maniplay may be terminated by the maniplay terminator 1C40. In one implementation, sustainment detection may be based on a duration, sequence, pattern, degree, and/or the like of trusion and/or taction.

Otherwise maniplay continues and a gesture sensor 1050 senses from various possible gestures at, with, in, or on the object 180O.

A slide gesture results in the ability to "slide" the spat along a path, for example, to select the next streetlight along the street, or to interpolate camera views between streetlights.

This provides a real-time interactive street view in which the user 180U can see that there is a man with a gun hiding behind a bush further along her route. She slides the spat of the object 180O further along to see better, and then selects the spat between her thumb and index finger and drags it to a Police Box in the lower right hand corner of her virtual page. The gunman is taken into custody while she by then has already begun to take an alternative route to avoid the gunman, meetup with a police cruiser to file a report, and then walk home along a route that is not longer than her original route, owing to the planning function of an embodiment of the disclosed apparatuses, methods and systems, which guides her home efficiently.

Subsequently she provides a close gesture by pulling a clock face to four-o-clock after she has saved the recorded video into the Police Box.

On another occasion she observes a squirrel running along a wire, and sends a cute picture to her weblog, and is able to perform various gestures with the "camera beads" along the street. In one implementation, a touch gesture highlights a spat, and ends to lowlight it when the touch is done. A squeeze gesture selects a spat, which can be crushed with the knuckles, e.g., to close it more permanently, especially true of an app that has excessive advertising, and is truly close worthy.

In this case the spat is deleted from her list, so she doesn't accidentally open it again unless she wants it again and puts it back in her list of cameras. In this way, a "shortlist" of favorite or most useful cameras is retained in one implementation, whereas the less useful ones can be moved off the shortlist by the object deleter 1060.

In one implementation, when a spat is squeezed, e.g., between the thumb and index finger, a special menu may be generated which allows not only the spat itself to be moved like a bead on a wire, but also the whole "wire" itself, e.g., the user can "pull" over to an adjacent street (and see through a new row of cameras on the next street).

A "pull" on spat menu 1C70 may indicate to the system that a change-of-path is requested, not merely a change in position along one path.

This moves a sub-manifold, such as a street line, over to a next street, in-between (e.g., by synthesizing a view of a back alley where no cameras are present, using interpolated views from streets on either side of the alley), and/or the like.

A stronger gesture is a "pulls" gesture which, in one implementation, is a plurality of pull gestures, or is done by more than one finger to "pull" at the "wire".

In one implementation, the pulls gesture is indicating a desire to move up one dimension, and deal with the 2D manifold.

Thus we have a hierarchy of gestures in one embodiment: (A) a OD (zero dimensional) gesture: touch or move spats along a "wire" (e.g., move along a street); (B) a 1D (one dimensional) gesture: move the "wires" themselves (e.g., move across from one street to another); (C) a 2D (two dimensional)gesture: move the manifold of manifolds: e.g., the mesh of the city, or the like; and (D) a 3D (three dimensional) gesture: move the manifold of the manifolds of the manifolds, e.g., move the embedding 3D space itself.

The submanifold mover 1C80 moves, in one implementation, at the street level, whereas the manifold mover 1C90 moves at the map or chart level.

Chart-level mappings and manifold manipulations may be referred to, in some implementations, as the planifolds (TRADEMARK) apparatus, which may be displayed in one implementation like a PPI (Plan-Position-Indicator) of a radar set, with the user in the center, and the city shown radially outwards from the user-centered design perspective.

Planifolds can be grasped and moved like the other manifolds.

Planifolds can be displayed on any piece of scrap paper with any texture on it and be folded and manipulated.

In some implementations, the disclosed apparatuses, methods and systems may be configured for making new parts, using the hands to sculpt in 3D, make objects, modify objects, and the like, in virtual space or augmediated space, e.g., using clay or scraps of paper or any sort of bricolage for rapid tactile prototyping.

In another embodiment, doctors use toposculpting to assist patients. A patient with a wound can be assisted by way of a 3D printer that prints skin or skin like material. The physician uses toposculpting to shape the skin printing to the patient's body.

FIG. 2A depicts another schematic example of the sensing and display apparatus 1300 of FIG. 1E.

More specifically, FIG. 2A illustrates principles of metaphor-free computing and natural user interfaces as used in some embodiments with the sensing and display apparatus 1300 of FIG. 1E. There is depicted a shared computer-mediated reality, such as the first augmediated-reality space 1000 of FIG. 1A, among wearers of the digital eye glass 180 and the digital eye glass 190. The surface 130 is a piece of paper on a tabletop, on which the public subject matter 140 includes printed matter. A participant (user) wearing the digital eye glass 180 may, in one implementation, employ a drawing tool 201, which may be called a drawtool (TRADE-MARK) system. The drawing tool 201 may include an inertial measurement unit 204 and/or the like. The drawing tool 201 may include a tool point 200 configured to be a virtual device or may be configured to include a physical marking tool (having ink or graphite, or other marking material). A geophonic sensor 203 is configured to pick up the sound or other disturbances associated with the drawing tool 201; in this way, the drawing tool 201 is configured to interact responsively, in association with other sensors in the drawing tool 201 that sense contact with the surface 130. The virtual subject matter 202 may remain secret (e.g., not viewable by people not using an instance of the sensing and display apparatus 1300). The virtual subject matter 202 may be created, displayed, presented, and/or the like in the virtual environment in the first augmediated-reality space 1000, and is shared by the participants wearing the digital eye glass 180 and the digital eye glass 190 (in the first augmediated-reality space 1000). The user of the digital eye glass 180 may choose to mark the surface 130 only in first augmediated-reality space 1000 (e.g., cyborg space), or to mark the surface 130 with the physical markings. A person not wearing any instance of the digital eye glass may still see the virtual markings for the situation where the participants (users using their instance of the sensing and display apparatus 1300) decide to make the virtual markings available in a public manner. For this case, the public markings, such as the public subject matter 240, may remain visible, e.g., by extramissive visual projections from the digital eye glass 180 or the digital eye glass 190, which markings include projections, such as may be stabilized by a video-orbits stabilization program 403 depicted in FIG. 1AA. Alternatively, markings may remain visible by way of the marking material such as graphite or ink.

FIG. 2B depicts Video Orbits stabilization and comparametric alignment, and the like in one embodiment.

FIG. 2B depicts the Video-Orbits stabilization system in one embodiment. Video orbits may work in a variety of ways in various implementations; e.g., pixel orbits and/or voxel orbits. In one implementation, pixel orbits may employ the homography of one or more rigid planar patches and/or segment(s) thereof. In one implementation, voxel orbits track the 3D positions of objects, identify planes, and/or track associated point clouds.

In one implementation, pixel orbits may employ 2D cameras while voxel orbits may employ 3D cameras. In one implementation, pixel orbits and voxel orbits may be combined, such as where apparatus 1300 includes both one or more 2D cameras and one or more 3D cameras. For example, where apparatus 1300 includes one 3D camera and two 2D cameras, orbits may be tracked, e.g., using 2D vision, stereovision, true 3D vision, and/or the like and/or may combine these results, such as using a confluence aggregator, certainty combiner, and/or the like, where various estimates (e.g., how a surface texture is manifested in pixels, how a shape is manifested in voxels) may be combined, e.g., through a weighted sum. In one implementation, weights may be certainties as determined, e.g., comparametrically (e.g., via comparametric equations), superposimetricall (e.g., via superposimetric equations), or by any other error estimate. Thus, in one implementation, albedo (lightness, color, texture, etc., of a surface or object or the like), range, and/or the like may be combined, e.g., in an optimal and/or optimized manner. To the extent that albedo and range both give the same motion, a confluence combiner may, in one implementation, be used on the estimate. Sometimes a surface or object will be of uniform albedo with no patterns such that 3D range information may be more accurate. In some implementations and/or uses, such as tracking egomotion against the night stars or sky or distant objects, range measurements are less reliable and the 2D Video Orbits may be employed. In some implementations, 2D Video Orbits and 3D Video Orbits may be combined, making good use of both albedo and range information, for tracking objects such as rigid planer patches.

Implementation of 2D (pixel) orbits, an orbit can be considered as a set of transformations that can occur under a group action.

Consider the comparametric group action given by $g(q)=f(kq)$, defined by the following formula:

$$g(f(q(x))=f(kq((Ax+b)/(cx+d))),$$

where f is the domain of the transformation, and g is the range of the transformation. Notably, f and g are both domains of a photoquantigraphic response function, of which the domain is the photoquantity, q (quantimetric units).

Moreover, q is the range of a mapping from x, where x is a two by one column vector of spatial image coordinates, e.g., x=[x1; x2], its transpose, and/or as x=[x1; x2], using the boldface x.

The matrix A captures scale in x1 and x2, as well as shear in x1 and x2. Together these can also define rotations in x, which are captured when the 2×2 matrix A is a rotation matrix.

The row vector c is of dimension 1×2 and, in one implementation, represents chirp, or chirprate, in x1 and x2 (it has two degrees of freedom, which can be alternately thought of as chirpiness and direction of chirp).

The constant d in the above equation is a scalar constant.

The mappings g form a group, and the group has five real parameters: A, b, c, d, and k, which may, in one implementation, be arranged in a matrix, [A, b, 0; c, d, 0; 0 0 k].

In an implementation, there are only four degrees of freedom (9 scalar degrees of freedom) because we can divide all elements of the matrix by d, whenever d is not zero (or whenever d is not close to zero).

Subject matter in view of a spatial imaging glass, which is also known as the Spaceglass (TRADEMARK) apparatus, e.g., subject matter in view of a sensing and display apparatus, often falls on a flat or somewhat flat, or planar or somewhat planar surface or entity.

When subject matter is sensed, especially in urban or indoor settings, there are often a large number of surfaces that are somewhat flat. Many objects like buildings and furniture are made of somewhat flat surfaces, which may be automatically segmented by the Spaceglass apparatus. Looking, for example, at a window, we can see there is content on a planar surface, but also there may be content behind and/or in front of the window. Consider, for example, a window made of separate panes of glass, or, alternatively, a fence, mesh, screen, jail door, grille, and/or the like, which may have some planar content but also may have objects in front of and/or behind it.

Subject matter, such as the subject matter 2B10, may be viewed from different vantage points, as the subject matter 2B20, and the subject matter 2B30. Some of the subject matter 2B10, the subject matter 2B20, and the subject matter 2B30, respectively, is in the plane defined by the subject matter 2B16 (such as, a plane), the subject matter 2B26 (such as, a plane), and the subject matter 2B36 (such as, a plane), but other of the subject matter, respectively the subject matter 2B15, the subject matter 2B25, and the subject matter 2B35, is out of the plane defined, respectively, by the subject matter 2B16, the subject matter 2B26, and the subject matter 2B36.

Each of these three "gettings" of the same subject matter, are represented as the getting 2B1, the getting 2B2, and the getting 2B3. In some implementations, a getting can be a picture, a set of measurements from an active vision system, such as the measurement to a response, and/or the like. In this sense, a getting can be a comparametric measurement, a picture, video, quantigraph, or the like, or it can also be a superposimetric measurement, or collection thereof, e.g., made in response to a stimulus, or collection of stimuli, such as one or more exposures to electromagnetic radiation.

For example, we can "dust" a tabletop (e.g., abakographically), by firing an electronic flash source at the table while measuring (e.g., capturing, photographing, and/or the like) the response.

In one implementation, the flash is configured as an aremac, such as a structured source of illumination.

An aremac (the etymology of which is "camera" spelled backwards) may act as a source of illumination, and together, the camera and aremac ("aremacamera" or "macam" for short) may, in one implementation, form a superposimetric measurement and response (excitation and sensing) system.

The aremac can provide varying amounts and patterns of illumination for varying exposures.

A sensor, such as a camera, may be configured with varying gain, as may its source of stimulus, such as its illumination, if present. Thus, a camera or macam can provide variously exposed gettings of the same subject matter, such as the getting 2B1, the getting 2B2, and the getting 2B3.

The getting 2B1, the getting 2B2, and the getting 2B3 represent different transformations on the true subject matter 2B. The getting 2B1 was "gotten" (e.g., received) at a low level of exposure or illumination with the subject toward the left side of the field-of-view of the sensor. The getting 2B2 was "gotten" with a moderate (medium) amount of gain or sensitivity or exposure or illumination, with the subject matter approximately in the middle of a field of view, but looking upward a bit. The getting 2B3 was "gotten" with a high amount of light, in other words, "overexposed", with the subject matter toward the right side of a field of view.

These three gettings represent three different interpretations of the reality in the subject matter 2B.

They may be related to one-another, in one implementation, by the transformation of the form $g(f(q(x)))=f(kq((Ax+b)/(cx+d)))$, e.g., comparametrically, projectively, superposimetrically (e.g., where different illuminations were used from one to the other), and/or the like.

In this case one getting may be picked, let's say the middle one, the getting 2B2, and the others may be expressed in terms of the getting 2B2. There will be one transformation, given by A12, b12, c12, d12, and k12, that will relate the getting 2B1 to the getting 2B2, and another transformation, given by A23, b23, c23, d23, k23, that will relate the getting 2B2 to the getting 2B3.

The "truth" about what is happening in a scene may, in one implementation, be reconstructed by constructing estimated composite getting 2B0 from the getting 2B1, the getting 2B2, and the getting 2B3. The getting 2B0 represents everything the Spacelgass "knows" about the subject matter 2B.

In this sense, a de-chirped representation of the subject matter 2B06 may be provided that falls in a plane such that points in the plane are uniformly spaced.

In one implementation, a chirp is like the sound a bird makes, e.g., a note or tone or periodic waveform where the frequency increases or decreases. In the case of vision, a chirp is a something that goes up or down in frequency as we move across it. Subject matter of the getting 2B1, for example, is "up-chirped" in the sense that the subject matter 2B16 (planar content matter) has spatial frequencies that start out low (e.g., the window muntin or grille) and increase in spatial frequency as we move from left to right (e.g., in increasing dimensions along x).

In one implementation, the subject matter 2B36 of the getting 2B3 is "down-chirped", e.g., it starts out at a high pitch, and goes down to a lower pitch as we move from left to right in increasing x.

In one implementation, the subject matter 2B06 of the getting 2B0 (the composite getting) is de-chirped, so that units of the plane are uniformly spaced in an internally stored array in the Spaceglass system.

In one implementation, each plane from reality may be stored into a de-chirped quantigraph $q(x,y)$ in the Spaceglass, such as by segmenting planes from reality and applying transformations such as indicated by the corner 2B11, the corner 2B12, the corner 2B13, and the corner 2B14 that map directly from the getting 2B1 to the getting 2B0 rather than first to one of the gettings like the getting 2B2.

This may be achieved, in one implementation, by applying transformations of the form A1, b1, c2, d1, k1, to the getting 2B1 toward the getting 2B0, and of the form A2, b2, c2, d2, k2, to the getting 2B2 toward the getting 2B0, and of the form A3, b3, c3, d3, k3, to the getting 2B3 toward the getting 2B0, each of these three transformations providing an estimate of the getting 2B0. These three estimates are then combined together as a combined the getting 2B0, according to the certainty rules of comparametric image compositing.

The subject matter 2B16, the subject matter 2B26, and the subject matter 2B36 will align in confluence to the subject matter 2B06, whereas the subject matter 2B15, the subject matter 2B25, and the subject matter 2B35 will misalign in fewer confluences to the subject matter 2B05, because this subject matter is off-plane.

Likewise, clouds in the background seen through the window will misalign.

The result is a confluence composite of the mullion and muntins of the window and the window frame, and the glass (e.g., dust on the glass, texture, pattern, and/or the like, of the plane).

When we look at subject matter with a window in the field of view, we see the subject matter of the foreground, e.g., darkly, in silhouette, and/or the like. As we look to one side, when the window goes to one side of our view, e.g., when looking down toward the floor, the AGC (Automatic Gain Control) of some cameras will "gain up" rendering some but not much detail in the face of a person standing in front of a window, for example, as the subject matter 2B25. If we look down some more, or off to one side, with the center of our camera pointed at something in the room that is dark, such as a black cloth or dark opening of a doorway into a closet where some black clothes are hanging, with no light turned on in the house, the AGC will "gain up" and render the person's face of the subject matter 2B35 very clearly, but the clouds and sky outside will be "washed out" white (e.g., overexposed). Even the mullion and muntins will "whiteout" to some degree.

Thus, contributing to the getting 2B0, most of the bright areas of the subject matter like the sky and sun, come from the getting 2B1, and most of the dark areas like the almost silhouetted face of the subject matter 2B35 come from the getting 2B3. The getting 2B2 will provide much of the mid tones.

This may be achieved, in one implementation, by comparametric image compositing over a manifold defined by the 3D shape of the subject matters. The simplest shape is the plane, and that can be done very accurately, but the face is more complex, being aggregated of lesser accuracy.

Thus, the getting 2B0 can be used to estimate the true subject matter 2B (as an estimate), and the subject matter 2B00, of the reality of the subject matter 2B.

Since the plane can be "gotten" at great accuracy, this may serve as a homographic user-interface in the Spaceglass. Likewise, with other geometric shapes like spheres.

Subject matter gettings may be combined, e.g., by confluence, such as using the Certainty Function of Comparametric Equations theory. Alternatively, a confluence combiner may be used.

In one implementation, confluence is the degree to which entities come together or should come together in agreement. If there is agreement, e.g., if two gettings agree on reality, with confidence, they get combined more certainly. This may include modifications to the theory of Comparametric Image Compositing.

Confluence Compositing

Suppose we wish to conflate two signals "a" and "b". Signals may be weighted by certainties, by confluence, and/or the like. In digital implementations, confluence can be implemented by an exclusive OR gate, e.g., (a+b) (a XOR b) to weight more strongly agreement.

In an analog implementation, consider the product [ab]. The product [a] times [b] is large when [a] and [b] are large. When one of them is negative and the other is positive the product is negative.

Therefore, confluence could be expressed, in one implementation, as:

$$c=(a+b)ab.$$

In an alternative implementation, confluence may use the following:

$$c=(a+b)\exp(ab).$$

Such confluence compositing may be used, in some implementations, for confluence sensor 402, for combining an audio trusion detection with a visual trusion detection, for other forms of multimodal sensory fusion, and/or the like.

In one implementation, to save power, the illumination from the Spaceglass may be adjusted, such as in a manner that is adaptive to various subject matter. For example, subjects that are nearby may be illuminated with less light, whereas subjects that are further may be illuminated with more light, e.g., for (1) best exposure; (2) to save power, energy, and action; and/or the like.

In some implementations, action may include Hamiltonian Action (e.g., the time integral of kinetic energy, T, plus potential energy, V), Lagrangian Action, the time integral of T minus V), and/or the like.

In some implementations, the Principle of Stationary Action may be applied to an orbit of the projective group of coordinate transformations.

An adaptive PEAMS (Power, Energy Action Management System) may, in one implementation, may include: (A) a passive getting of low sensitivity is performed; (B) an analysis is made of the getting, to determine a certainty of the getting: for a getting that is an image exposure, the certainty is a certainty image; (C) If there are areas that are uncertain (e.g., based on comparison with a threshold, standard, and/or the like), a getting of greater sensitivity is performed; and (D) The process is repeated until sufficient exposure sensitivity is attained, such as based on comparison with a threshold, standard, and/or the like.

In some situations, a SPEAMS (Superposimetric Power Energy Action Management System) may be employed. The SPEAMS system, in one implementation, may include: (A) an active getting of low sensitivity and low output is performed; (B) an analysis is made of the getting, to determine a certainty of the getting; for a getting that is an image exposure, the certainty is a certainty image; (C) if there are areas that are uncertain, an active getting of greater sensitivity is performed; (D) the process is repeated until sufficient exposure sensitivity is attained; (E) these results are conflated comparametrically; (F) the resulting confluence image is logged as a lightvector to a getting of low output; (G) the output is increased and the process of multiple gettings (e.g., exposures) is repeated to capture the lightvector resulting from an emission of medium output; (H) each of these lightvectors manifests a superposimetric image space, each having a particular energy cost, i.e. for each lightvector there are multiple gettings that each require a burst of light output of a particular strength (e.g., low output, medium output, etc.); (I) an energy cost function may be computed for each burst of light produced, and these energy cost functions are accumulated as an actional cost, associated with the computation of a superposimetric lightspace; and (J) the process continues until the subject matter or scene is lightspaced to a sufficient degree, e.g., until an error term in a lightspace cost function is minimized sufficiently.

In this manner, action may be substantially conserved.

In some implementations, lightspace can also be computed using the principle of stationary action (Lagrangian) or to conserve Hamiltonian action (total action).

In one implementation, as with a PID (Proportional, Integral, Derivative) controller, we may determine and/or estimate motion in all of its integrals or derivatives. For example, the orbit of the camera or head or eyeglass is estimated in displacement, in a feedback loop, over derivatives and integrals of displacement, motion through space, and/or the like.

In one implementation, this may be achieved via an Abseleration, Absity, Absement, Displacement, Velocity, Acceleration, Jerk, Jounce, etc. signature computed from the motion, estimated motion, parameters, and/or the like.

FIG. 2C depicts an absement-based signal processor in one embodiment.

With reference to the example illustrated in one embodiment in FIG. 2C, a Set Point, denoted "SP" is established as the signal 2C70. This maybe be, for example, an abakographic gesture input by way of a body part, or a drawtool such as the drawing tool 201 as shown, for example, in FIG. 2A. The signal 2C70 may, alternatively, be input by way of a light source held by the user, such as an LED (Light Emitting Diode) light, or an array of LED lights, or a special glove with lights in it, or by a light stick supplied with the spatial imaging glass (TRADEMARK) apparatus. In this way, the Set Point can be a point in space, which is then drawn or moved through space with a particular trajectory, and particular kinematics, sensed, observed, and in reality.

The Principle of Stationary Action may, in one implementation, be computed on the kinematics observed, as compared with the actual kinematics, and thus there is manifested a control system, effectory system, and/or the like, which senses and tracks trajectory and movement, e.g., for general-purpose gesture sensing, abakography, abakographic user-interfaces, toposculpting, and/or the like.

The set point input produces a time-varying waveform signal r(t) which may be an audio signal, a visual signal, or a combination of these, and may also have other components such as olfaction (chemical sensors) and/or the like.

Process 2C10 may, in one implementation, capture aspects of the world, such as objects and their motions, as they actually exist in reality. This reality may be modeled, for example, by way of various instances of the processor 2C35 denoted, mathematically, as K_{-m}, ... K_{-3}, K{-2}, K_{-1}, K0, K1, K2, ... K_n.

A "Process Variable", PV, may be captured (e.g., sensed) from reality and manifested as process variable 2C15. A sum of the Set Point and the negative of the Process Variable, e.g., [SP]−[PV], is computed by the adder 2C20, to provide the error signal 2C25.

The error signal 2C25 is denoted, mathematically, as e(t). In one implementation, the error is an error in whatever units are measured by the Process Variable and the Set Point. For example, this error may be an error in position, displacement, distance, or the like, as sensed by displacement sensors, position sensors, distance sensors, or the like, such as the LiDAR (Light Direction And Ranging) apparatus, such as a Kinect (TRADEMARK) depth sensor, a Primesense (TRADEMARK) depth sensor, and/or a Soft Kinetic (TRADEMARK) depth sensor, which purports to measure "depth" (distance from sensor or displacement, for example).

Control systems may use the sensed quantity, as well as one or both of its time derivative and time integral. Kinematic processors 2C30 compute the kinematics of the signal e(t), e.g., its velocity, acceleration, jerk, jounce, absement, absity, abseleration, abserk, absounce, and/or the like.

The time-derivative of displacement is the rate of change of displacement, and is called velocity. In magnitude or absolute value, we have instead the time-derivative of the distance is speed.

The time-integral of displacement, i.e. the area under the displacement-time graph, is known as absement.

Thus, to a PID controller on the "depth" sensor may, in one implementation, include computing depth, (e.g., in meters, centimeters, and/or the like), as well as its derivative in (e.g., meters-per-second (m/s)) and its integral in (e.g., meter-seconds (ms)), the velocity and absement, respectively. In one implementation, integral and/or derivative may be computed on the depth error, e(t).

Processor K_{−1} is the absement processor, which operates on the absement signal (the time integral of e(t)). Processor K0 operates on e(t). Processor K1 operates on derivative de(t)/dt.

In one implementation, the controller uses absity (integral of the integral of displacement, i.e. the integral of absement) and abseleration signals, as well as acceleration signals. In some implementations, higher derivatives and integrals such as jerk, jounce, abserk, absounce, and/or the like may also be employed.

Processed kinematics signals 2C40 are added in adder 2C45, and this sum is the MV (Manipulated Variable) or SV (Sculpted Variable) denoted, mathematically, as the signal u(t), denoted as signal 2C50 in FIG. 2C.

Kinematic signals are depicted with range or position as the base variable, but this is in no way meant to be limiting. Kinematic signals may alternatively manifest as quantities 2C55 (e.g., momentum and its time-derivatives) and/or as quantities 2C60 (e.g., action and its time-derivatives).

Thus, the gesture-sensing or toposculpting system in the Spaceglass may use principles of physics as a basis for physical modeling and understanding of physical reality in the context of augmediated reality manipulation or sculpting.

FIG. 2D depicts a toposculputing system in one embodiment.

FIG. 2D depicts an embodiment in which a drawing tool 201 is used to draw a two-dimensional manifold in a three-dimensional space, e.g., by extrusion. The drawing tool 201 may, in one implementation, may include an array of light sources, each individually addressable. In one implementation, each light source is addressable as to color, such as using PWM (Pulse Width Modulation) on four color channels: R (Red), G (Green), B (Blue), and I (Infrared). In one implementation, each RGBI source receives a PWM input from a buffer, such as an eight-bit buffer for each color channel, e.g., so that each color is determined by a color word, the color word being 32 bits long. This provides approximately 4,295 million colors (or 4,096 Megacolors) that each light source can express, of which 16 Megacolors are unique in the visible spectrum.

The drawing tool 201 may, in various implementations, take the form of a sword or saber or virtual weapon-like object for playing games like a virtual battle. Alternatively, drawing tool 201 may be a flexible item like light rope, or it may be wearable, such as taking the form of an LED glove, a glove with retroreflective beads responding back passively to the active (extramissive) vision system of one or more extramissive spatial imaging digital eye glass devices, and/or the like.

The drawing tool 201 depicted in the example of FIG. 2D has 48 light sources along its length, each of which contains, in one example, four channels, thus there being a total of 192 light sources therein. As the drawtool is moved through space, e.g., in a long-exposure photograph, leaving behind exposure 2D40, which is shown to the left of the drawing tool 201. The topmost eight of the 48 lamps of the drawing tool 201 are shown magnified, to the left of the exposure 2D40.

This magnified depiction of these eight lamps is shown, labeled as the lamp L1, which makes the exposure E1, and the lamp L2, which makes the exposure E2, as both the lamp L1 and the lamp L2 are turned on at this point in time. The lamp L3 is off. The lamp L5 is on, and the lamp L8 is also on, both also leaving behind their respective trace or streak or smear of light, like the exposure E1 and the exposure E2 from the lamp L1 and the lamp L2, respectively.

The lamps 2D8, of which the lamp L1 through the map L8 are examples, leave behind streaks of light, as the exposure 2D40, which, when the lamps 2D8 are controllably modulated, creates a controllable and addressable two-dimensional manifold exposure. This exposure can, for example, spell out words, text, graphics, or shapes (e.g., the nose cone of a rocket engine), useful for 3D visualization, for example. In the example of text, we can spell out words (e.g., "HELLO WORLD") in space, during a long exposure photograph, or in video, displayed as exposure-integrated video (e.g., photoquantigraphically).

As the drawing tool 201 is moved from left-to-right across the page, it leaves behind exposure 2D40, which gets longer and longer as the drawing tool 201 is moved further and further across the page.

At some point in the "HELLO WORLD" message, a first character, the letter "H", will be "painted" or "drawn" through space, as for example the character exposure 2D51 from a font character generator set, which may also include "fuzzy fonts" (anti-aliased fonts or the tru-type (TRADEMARK) fonts) or full color pictures created in 3D space, as desired.

The set of characters that spell a message or alphabet represent a character exposure 2D60 of which the letter "H" (a character exposure 2D51) is an example. The drawing continues through space, spelling out each letter, with darkness (zero exposure) between the letters, or in some implementations, a background exposure between the letters so that they appear to hover on a 3D ribbon winding through space, first the "H", then the "E", and so on, eventually reaching the fifth letter, "O" as a character exposure 2D55, and then continuing with a space, followed by the letters "W", "O", "R", "L", "D", and so on. In some implementations, drawings, text, and/or the like may trace a ribbon around a house, down the stairs, out of the front door, down the street, and/or the like.

Characters may, in one implementation, be drawn in a Video Orbits stabilized space, as, for example, the person holding the drawing tool 201 is wearing a DEG (digital eye glass) such as the apparatus 1300 that can see the drawing tool 201 as well as a surface such as the tabletop surface 2D70.

The drawing tool 201 emits visible light for a character exposure 2D60, and this visible light does not interfere with the tracking by way of the DEG. In one implementation, the rays 2D21 of infrared light from the apparatus 1300 illuminate drawing tool 201 and then return as the rays 2D22, to be sensed, irrespective of the visible color (RGB) emitted by the drawing tool 201.

Visible rays 2D23 also illuminate the drawing tool 201, and are reflected as rays 2D24 to be recorded by the apparatus 1300. In one implementation, the apparatus 1300 captures video of the drawtool moving through space, while recording the exact position of the drawing tool 201 relative to apparatus 1300 as a function of time. The apparatus 1300 also records the position of the tabletop surface 2D70 relative to the apparatus 1300 as a function of time. Knowing the location of the tabletop (or any other recognizable object in a static scene), as well as the position of the drawing tool 201, each with respect to the apparatus 1300, the relative position of the drawtool with respect to the environment may be determined.

When using the drawtool throughout a space, an environment map may, in one implementation, be constructed of the space, or be downloaded (if available) so that the drawtool can be moved around in the space, whether it be an outdoor landscape, or an interior space in a building, where drawtool can be taken room to room in an empty house and used to draw furniture in mid-air, e.g., so that a user can visualize what the house would look like furnished.

In the latter example, the user 180U does the Sightpainting (TRADEMARK) movement (which is a combination of lightpainting and "painting with looks") to sculpt and create their own reality. In one implementation, effector signals, projections, and/or the like may further be employed to mark, annotate, illustrate, and/or the like the viewed environment. Effector signals may be custom-made, made in real-time, drawn and/or derived from stored records, and/or the like.

In one implementation, a second user 181U can see the abakographs or toposculptures, such as those drawn by the user 180U, can annotate them, add to them, and/or the like.

This may be employed for various forms of collaboration such as 3D visualization, designing a rocket engine together, assisting a patient in a hospital, and/or the like.

In one implementation, another form of collaboration employing Sightpainting may be gaming using, for example, the Unity 3D (TRADEMARK) gaming environment.

For example, user 180U writes the words, e.g., "HELLO WORLD", through space and assigns them a red color. User 180U has thus self-identified as red.

The long-exposure photograph of the words HELLO WORLD appears to hover in 3D space as user 180U can walk around and view the abakograph of the character exposure 2D60 from different angles.

The user 180U can also see this abakograph.

In one game scenario, the user 180U is a "red player" and the user 181U is a "blue player".

The red player tries to "paint the world red", and the blue player tries to paint the world "blue". The red player can touch and even pass through "red paint" (red-colored abakographs) but if the blue player touches an abakograph that is red, the blue player "dies" and loses the game.

Likewise, the blue player, the user 181U, creates the exposure 2D90. Whereas the red player has chosen the "VOXaber of Death" (TRADEMARK) system, a sword like object with 48 LEDs (light emitting diodes), the blue player has chosen the "Blue Rope of Tyburn" (TRADEMARK) system which is an LED light rope that the user 181U has looped into a ring or "noose" to extrude (draw) "Blue Pipes", such as the exposure 2D90, through space.

The players actually both use the same drawtool or type of the drawtool, including flexible light rope that can be attached to a "sword" made of foam rubber (soft so children don't get hurt while playing), or detached to make other flexible shapes. In another implementation, players may use different draw tools and/or types of draw tools within a single application instance.

In one implementation, the drawtool may be included as a promotional item with each DEG sold.

In one implementation, persons not wearing the DEG of the apparatus 1300 can see the words like "HELLO WORLD" if the user 180U continually waves the drawtool back-and-forth. This may help entice non-participant observes to join the game, either by buying or renting Spaceglasses. For example, bystanders will see players waving the lights through space and want to play. A live video feed of some of the abakographs can also be printed to help get people interested in playing, so they are more likely to want to rent the Spaceglasses and join the game. Dedicated players may purchase their own Spaceglasses and get the Xaber (TRADEMARK) system like the drawing tool 201 they can keep. Thus, the embodiment of FIG. 2D can be used as a method of marketing the DEG of the apparatus 1300.

Additionally, the game promotes fitness, for example, as the red player may have imprisoned the blue player in a room by writing "HELLO" across the doorway. The blue player would die if he touched the red text "HELLO", but may, for example, crawl under the right-hand side hand side of the exposure near the character exposure 2D55, where it has lifted off the ground by a small amount.

Crawling around and fitting through tight spaces helps develop both strength and flexibility, and games like Limbo Dance can be played with abakographic lines drawn through space that are visible in the augmediated world.

In another game, various players may draw pipes through space. A blue pipe such as the exposure 2D90 belongs to the blue player. A user is challenged to crawl or jump through the pipe, without touching the sides, and/or then to extrude the pipe longer, each time. The game may begin, for example, with a "hoop" or ring, which gets "pulled out" longer and longer, until all but one player, taking turns, has either fallen or touched the virtual space occupied by the pipe.

In another game scenario, players throw a ball through the pipe without "touching" the sides of the pipe.

In one implementation, the Sightpainting (TRADE-MARK) system may be achieved via the following: the apparatus 1300 senses reference points in the environment, while also tracking the position of a drawing tool 201. Let the comparametric coordinate transformation from the drawing tool 201 to the apparatus 1300 be $g\_\{2,1\}$. Let the transformation from the apparatus 1300 to some surface in the environment like the tabletop surface 2D70 be $g\_\{1,0\}$. The transformation from the drawtool to the environment is thus given by $g\_\{2,0\}=g\_\{2,1\} \, g\_\{1,0\}$.

Moreover, the position of every LED (light emitting diode) in the drawtool, or a selected subset thereof, is recorded as a function of time, along with photographic or videographic images, e.g., high-resolution, of the light streaks of the exposure. Then image based rendering is used to render the abakograph in the coordinates of the position where the user 180U is standing, and specifically, the POE (Point-of-Eye) for each of the user's eyes.

In one implementation, this is performed and updated in real time (e.g., continuously, periodically, on the basis of triggers, and/or the like) as users move through space, and also for other participants, such as the user 181U, whose instances of the apparatus 1300 senses the ray 2D32 and the ray 2D34 from the lamps 2D8 as well as their instances of the exposure 2D40.

The drawing tool 201 used to write "HELLO WORLD" may be marketed and sold, and may be referred to herein in various implementations via a light stick, a voxel stick, a pixel stick, a light sword, a VOX STIX (TRADEMARK) system, a PIX STIX (TRADEMARK) system, a LIGHT SABER (TRADEMARK) system, a Pixel Saber (TRADE-MARK) system, a Pix Saber (TRADEMARK) SYSTEM, a PIXaber (TRADEMARK) system, a VOXaber (TRADE-MARK) system, a LIGHT SWORD (TRADEMARK) system, a LightBroom (TRADEMARK) system, and/or the like.

In one embodiment, a method of marketing DEG (digital eye glass) may include: (A) offering the DEG for sale; (B) providing a free instance of the drawing tool 201, or the loan of a drawing tool 201 as part of a promotional offer, with the DEG; (C) inviting customers to participate in a competition using their drawtool, so-provided; and (D) providing an incentive as an outcome of the competition, thus, indirectly, promoting the DEG product with the drawing tool 201.

In one implementation, when multiple participants are toposculpting or making abakographs, the visible-light recordings from various angles, e.g., from each of separate instances of the apparatus 1300, may be combined to capture more information, and render better abakographs.

Moreover, in some implementations, one or more auxiliary cameras, sensors, light sources, projectors, and/or the like in the environment may be used. For example, in a game space, a surveillance camera may be used from overhead, while the individual players provide their own sousveillance recordings of the activity in which they are participants. The combination of surveillance with sousveillance provides a veillance recording of greater accuracy than either alone.

The cameras may, in one implementation, operate in different modes. For example, the surveillance camera provides high resolution visible light recordings, whereas the sousveillance camera provides visual location information in the "arm's length" close-range accuracy.

Frequency-Division Multiplexing

In some implementations, the drawing tool 201 can operate in a spectral band that is different from the "getting" in which the apparatus 1300 senses position and/or range of objects.

For example, in one implementation, the drawtool can emit visible light that does not contain much energy, power, and/or the like in the infrared portion of the spectrum used by the apparatus 1300 to determine its position. In one implementation, two users of the apparatus 1300 may use frequency-division multiplexing (e.g., via two different frequency bands) so as to not interfere with each other's sensing, nor be interfered with by the drawtool unless the drawtool emits in the infrared (e.g., so the apparatus 1300 can use passive infrared vision to locate it).

To the extent that different players in a game, for example, might use different colored visible lights, such different colors also embody the frequency-division multiplexing that may be employed by gaming systems disambiguate the draw tools of various players.

Alternatively, time-division multiplexing may be used, as for example one drawtool can emit during a first "getting" and another drawtool can emit during a second getting, where the gettings are interleaved or interlaced exposures from two or more instances of the apparatus 1300.

Moreover, the principle of lightspace may be applied (e.g., the principle of superposimetric imaging) to determine the resultant exposure due to each light source.

In this situation, the sources may be disambiguated in lightspace. Moreover, each light source within the drawing tool 201 is modulated separately so that the light due to that source is sensed, such that individual pieces of a toposculpture can be separately manipulated (e.g., individual "threads" of a pipe mesh or pipe sculpture).

FIG. 2E depicts further details of the toposculpting system in one embodiment.

FIG. 2E illustrates various examples of abakographs, such as the abakograph 2E10 which begins with a weak exposure 2E11, as the user moves a light source (or fingertip) through space in a spiral, while increasing the exposure toward the exposure 2E12, and eventually to the exposure 2E13 where the exposure is much stronger. In various implementations, variations in exposure may be user-controllable (e.g., via a drawtool interface, trigger, virtual trigger gesture, pre-set exposure profile, and/or the like), automatic, preset, environmentally triggered, and/or the like.

In one implementation, a trigger may be a 60 ohm rheostat, e.g., salvaged from a toy race car, squeeze trigger that makes the car go faster when squeezed harder. In this way the drawtool is fashioned as a toy gun with a light source that glows more brilliantly as the trigger is squeezed harder. The light is continuously adjustable in output. Thus, the draw tool as a "draw gun" can be drawn from a holster and then used to draw shapes in space that look like beautiful lightpaintings that can be seen from any angle rendered in 3D space.

Alternatively, in an implementation recognizing the fingertip, the effect may be synthesized as the thumb is moved toward the forefinger, e.g., to increase the intensity of a virtual light source. The finger 180F itself is the drawtool, and rather than using a 60 ohm rheostat, the thumb 180TT is brought closer to the finger, with adjustment to the intensity of the virtual lightsource correlated with a detected distance between the fingertip and the thumb tip, an angle between the finger and the thumb 180TT, and/or the like.

In some implementations, as the abakograph is drawn, a clenching gesture can grab it. In one such implementation, the apparatus 1300 detects a flesh-on-flesh contact, e.g., as hands are clasped or fingers clasped.

Flesh-on-flesh contact may be sensed, for example, by 3D position in space, by the deformation of the flesh that happens when it is pressed against other flesh, and/or the like, confirming and sensing the degree of pressure, which forms a continuously variable gesture. Continuously variable gestures are useful in this context as parameterized controllers like, for example, the light dimmer gesture in which the lamp output is proportional to the angle formed between the finger 180F and the thumb 180TT, which shall be called "angle FVT" taken by the apparatus 1300 as the angle of the finger 180F, through the vision system 180V, to the thumb 180TT.

In one implementation, the cosine of angle FVT may be computed and used for adjusting the duty cycle of a PWM driver to the light source, and/or otherwise used to control the level of the virtual light source.

In the case of the virtual light source, the effects of illumination are synthesized (e.g., rendered), such as to capture room illumination by the light source and its instance of the abakograph 2E10.

Various kinds of abakographs can be manipulated. For example, a pipe-shaped instance of the exposure 2D90 is opened up or bent or re-sculpted to the abakograph 2D91 using hand gestures. This polygon extrusion can also be unwrapped into the abakograph 2D92.

Various forms of computer graphics and image-based rendering provide photorealistic sculptures that have high visual appeal, and can be manipulated as art objects, game objects, or for practical and/or industrial purposes, such as designing the pipework of a city, sculpting and building a virtual musical instrument like a hydraulophone from virtual pipes using virtual water flowing through the pipes, which can be toposculpted in a CFD (Computational Fluid Dynamics) environment, and/or the like.

FIG. 2F depicts a hand-based toposculpting mesher in one embodiment.

FIG. 2F shows an embodiment using the finger itself as the drawtool. The finger is fitted, in the illustrated example, with an LED glove such as a "Glove Light" toy. In another implementation, a projection is made on the finger with a light source, which may include detectable structures projected onto the finger, may reflect from reflectors affixed to the finger or a worn glove, and/or the like. In one implementation, is the drawtool may be effectuated synthetically (e.g., just by finger tracking alone). Let's consider the situation where lights are present (in in the bare hand version, we can consider them as virtual lights).

In one implementation, a linear array of eight LEDs is present (or synthesized), and they lay down an abakographic mesh, e.g., defined by an eight by eight (8×8) array of 64 points in the lamps 2F64. In one implementation, the points are modeled as spats and can represent, for example, surveillance cameras and their vantage points, thus allowing a hand gesture of the hand 180MD to sweep out and define a surveillance mesh, or mesh city, or other mesh space.

The mesh may include eight glowing exposures such as the exposure E1 from the lamp L11. The eight instances of the lamps 2F8 define, at a first point in time, the lamp L11, the lamp L21, the lamp L31, . . . , and the lamp L81.

The lamp L11 is moved along to generate the exposure E1, and it turns on and off or varies in output to create an abakograph. At some point in time later, it reappears as the lamp L12, then the lamp L13, and so on, appearing eight times to make eight different parts of the exposure E1.

The lamp L21 also reappears as the lamp L22, then the lamp L23, and so on. Each lamp, all the way down to the lamp L81, traces out a path. For example, e the lamp L81 traces out as the lamp L82, then the lamp L83, as the lamps are considered at various points in time.

In the illustrated implementation, across from left-to-right there is time, and from top to bottom, there is space.

The eight lamps thus trace out a space-time continuum that is sampled (discretized) in space, but almost continuous in time, though we've chosen to sample it as an 8 by 8 (i.e. 64 pixel) array in the illustrated example. The means, apparatus, device, software, firmware, or the like that performs this task of carving up time to match space is called a Mesher (TRADEMARK) method or system. The Mesher allows us to generate a 3D "wireframe" from an abakograph. When applied to a row of parallel lines like the lined paper of a schoolbook, the Mesher generates what looks like graph paper from the lined paper. In our space-time continuum, the Mesher, in one embodiment, determines the time increment that matches the space increment, so that the axes of the mesh are isotropic. By way of analogy, in one embodiment, abakography generates an object in 3D space that resembles a beadless abacus. The Mesher inserts virtual beads on each "wire" (exposure streak-line) of the abacus-like exposure, in such a way that the spacing between the beads matches the spacing between the wires. Then the beads are connected together in a direction perpendicular to the wires, in order to therefore generate the wireframe mesh.

In this way, the finger is able to make "fingerpaintings" in space with real and/or synthesized light sources, to, in one embodiment, generate wireframe models or meshes, which can then be texture-mapped or "painted" with light or with hand gestures, or the like.

Thus, in one implementation, a mesh is defined directly in time, and indirectly in space (e.g., inferred, temporally).

As video is captured of the sweep across, the content can be edited by varying the light output (such as synthetically) in post-production, to achieve any desired pattern after-the-fact.

In one implementation, the user of the digital eye glass 190 may use a drawing tool 201. Each user may track the instances of the drawing tool, and the two or more users may thus experience a shared drawing space (e.g., in the first augmediated-reality space 1000 of FIG. 1A) via the digital eye glass 180 and the digital eye glass 190, without having to create any physical markings during user interaction and/or after user interaction is completed. A recording can be made of the collaboration session, so that the recording may be played back and thus allows the users to review the collaboration session for further study.

This form of computing creates a natural user interface that is free of the need for metaphors, and thus, in one implementation, forms a direct user interface experience.

FIG. 2G depicts an embodiment of an inverse surface and a meta table, which in some implementations may be referred to as a METAtable Sousface (TRADEMARK) system.

FIG. 2G depicts an inverse surface and a meta table in one embodiment. In one implementation, whereas smart surfaces may be controlled by surveillance cameras (e.g., cameras affixed to property, architecture, walls, ceilings, boards, and the like), an inverse instance of the surface 130 may be configured and/or optimized to be tracked by a wearable camera system, such as may be worn, for example, by the user 180U.

In one implementation, gesture tracking may be performed against an object, such as one under sousveillance. In one implementation, sousveillance is the recording, sensing, capturing, and/or the like of an activity by a participant in the activity. In one implementation, the wearable camera is a sousveillance camera, not a surveillance camera, and thus, may provide human-centered coordinates, such as for human-centered interaction design.

In one implementation, gestures performed on or against an object provide a meta-tactile experience and/or information, e.g., where meta information may be affixed, marked, displayed, designated, associated, provided, and/or the like on and/or to the object and/or related objects. In one implementation, such experience and/or information provides haptics (e.g., touching) and/or autohaptics (e.g., touching of the self, sensing when one's own hands come together, and/or the like). In some implementations, haptics and metahaptics combined with gesture sensing may be referred to as meta haptics, where meta information exists at the nexus of haptics and gesture sensing. In some implementations, haptics with one's own body, e.g., touching the hands together, touching the index finger and thumb while touching something else with the middle fingers, and/or the like, may be referred to as "autohaptics." For example, in one implementation, an autohaptic multi-touch gesture may include clenching the thumb and index finger together while touching an object with the remaining three fingers, which form a triangle by the fingertip points, having thus, in one implementation, nine degrees of freedom in 3D space. In one implementation, a tenth degree of freedom may be defined by how hard the thumb and the index finger are squeezed together. In one implementation, a closed flesh loop made by the thumb and index finger may provide input and/or additional parameters for a wide variety of autogestures. In some implementations, an object amenable to meta haptics may be referred to as "metable" and one that is not as "immetable." In one implementation, objects which are beyond a user's reach, touch, grasp, and/or the like may be immetable, e.g., the stars and distant planets, the sun, the moon, the objects 2G140 high near the ceiling in a building with very high ceilings, and/or the like. In one implementation, objects slightly beyond reach like the objects 2G150 may be referred to as "semi-mettable," and may be reached with a meta wand, such as the toposculpting wand 2G160, the drawing tool 201, and/or the like.

In one implementation, immetable objects may be interacted with, e.g., virtually touched with some haptic sensation, though less, in one implementation, than for metable objects. The toposculpting wand 2G160 can, in one implementation, be fitted with a geophone, vibrator, pager motor, the Tactaid (TRADEMARK) system, and/or the like, for example, to convey virtual haptics from a distant object being "wanded." For example, holding up the wand and looking through the ring 2G161, e.g., at a distant galaxy, the wand may vibrate when the Andromeda galaxy is positioned in the ring 2G161. Thus, the ring 2G161 can, in one implementation, operate as a haptic viewfinder, allowing users, for example, to "touch the stars" or otherwise "feel" the sky, near or distant objects, images on a billboard, advertisement, document or computer screen, and/or the like. In one implementation, geophonic body taction may be implemented in the apparatus 1300 such that a user can view the stars and feel certain ones as vibrations in or on the head. In another implementation, the handle of the toposculpting wand 2G160 and/or the apparatus 1300 may be fitted with electrodes configured to produce direct and/or indirect stimuli (e.g., mild, non-painful electric shock) and/or other forms of stimuli, such as to create a sensation of taction in association with remote or distant objects.

In one implementation, the toposculpting wand 2G160 has a user graspable portion that is or has some controls on it. For example, e the user graspable portion can be and/ include a trigger, which, in one implementation, may include a variable resistor. Such trigger rheostats, which come in resistance values of 15, 25, 45, 60, and 90 ohms, may be wired in series with an illumination source, and/or may be sensed by the apparatus 1300 and/or one or more microcontrollers associated with toposculpting wand 2G160 for control of its functions, such as its light L1, light L2, light L3, etc.

In one implementation, the toposculpting wand 2G160 is a toposculpting wand. In one implementation, the toposculpting wand 2G160 may be used for gaming as a "magic wand." In one implementation, the toposculpting wand 2G160 may be used as a sculpting tool, e.g., to shape various objects in 3D space. In one implementation, the toposculpting wand 2G160 may be used for lightvectoring (e.g., painting and sculpting lightvectors), e.g., as a visual art form, as a way of visualizing objects, designing objects, 3D visualization, navigation, and/or the like.

In one implementation, the toposculpting wand 2G160 is (includes) a ring 2G161 or other shape and/or arrangement of light sources, such as color addressable LEDs (Light Emitting Diodes). The ring 2G161 includes the lamp L1, the lamp L2, the lamp L3, etc.

In one implementation, the toposculpting wand 2G160 has a handle 2G164, such as may include a detacheable grip 2G163 which can be used to spin the shaft 2G165 of the toposculpting wand 2G160. In one implementation, this ability to spin the wand generates spheres in long exposure abakographs such as the abakograph 2G168. Spherical abakographs can then be "grasped" in 3D space and can be manipulated, e.g., as "primitives" to design and build other objects.

In one implementation, spherical abakographs like the abakograph 2G168 can also be generated using a metable circular object 2G130, such as a dinner plate, saucer, disk, and/or the like, where a grabbing and spinning gesture is recognized through the sensing and display apparatus 1300, point clouds are determined and extruded, and/or the like. The metable circular object 2G130 may be called a metable object. In one implementation, sensing and display apparatus may employ specific, specialized and/or dedicated effector and/or sensor signals to generate spherical bakographs from the metable circular object 2G130.

Other metable objects like the object 2G120 may, in some implementations, be used to generate abakographs. In one implementation, metatouch is recognized, e.g. if the object is touching the surface 130, if the object is touching the hand 180MS, the hand 180MD, and/or the like. In one implementation, different gestures may be assigned when an object 2G120 is touched by one hand than when it is touched by one hand that is touching another hand (e.g. both hands touch it while the hands are touching each other, or one hand touches it while the other hand touches the first hand without touching it, and/or the like). These examples of meta haptics form unique gestures that have unique effects.

For example, a user holding the toposculpting wand 2G160 in one hand 180MS touches a dinner plate or other object with the other hand 180MD; this gesture may, in one implementation, signify that the user is signaling abakography, and thus the dinner plate is recognized as an abakographic object for meta-bricolage. In one implementation, meta bricolage is the making of virtual objects from real objects, e.g., sitting on a table, collected in a work environment, collected while walking around, and/or the like.

In one implementation, a rocket engine, an exhaust manifold for a motorcycle, a pipe sculpture, and/or the like may be designed by grabbing a dinner plate or the metable circular object 2G130, spinning it to make a sphere, moving the dinner plate through space to make a pipe (extruding a cylinder), grabbing the abakograph 2G168 (such as a sphere object, whether generated by the wand, the dinner plate, by hand gestures, and/or the like, or recalled from a library of 3D objects using hand gestures) in 3D space, putting the two objects together, and/or the like.

In one implementation, some shapes, such as spheres and cylinders, may be pulled from a library of shapes. For example, a hand gesture such as touching a dinner plate with the left hand 180MS while making a drawing shape with the right hand 180MD, may be recognized as a "draw circle" (e.g. draw something like this dinner plate) gesture. In one implementation, the apparatus 1300 and or components may retrieve an image of the touched object, compare it with records in a shape library, and select one or more closest matching shapes. In one implementation, a user may be presented with a plurality of selectable shapes in relation to a touched object, such as where the comparison between the object image and stored shape records yields results differentiable by less than a threshold.

In some implementations, more complicated, intricate, and/or compound shapes may be used and/or created. For example, the user 180U can pick up the dinner plate and wave it through space to make, e.g., a manifold 2G184. The manifold 2G184 be may a curved pipe-like shape. For such a manifold, the user 180U may have waved the dinner plate in a circular arc, e.g., to generate a "sweep" pipe like the gently curved grey plastic elbow fittings used for electrical conduit.

The manifold 2G184 may, in one implementation, be generated by waving a dinner plate, roll of duct tape, Frisbee, and/or the like round object through space in an arc. In one implementation, such manifolds may be created with the toposculpting wand 2G160.

In some implementations, manifolds may be shaped and stretched and moved by reaching for, grasping, grabbing, poking, and/or the like in 2D and/or 3D space. In one implementation, when hands touch both ends of a pipe or sweep or other similar object that has two ends, the object is made to glow a different color, to flash, to flicker, and/or the like, such as to indicate that it has been selected, e.g., the selected object being a manifold 2G189. Once the object selected is highlighted in this manner, hand gestures are authorized for, recognized for, and/or associated with curving or bending of the pipe, such as using the curvature of the fingers to indicate desired curvature of the pipe end. In one implementation, curved fingers of the hand 180MS indicate that a tighter curve radius is desired by the user 180U, so the end of the pipe to the user's left (to the viewer's right in FIG. 2G) is rendered with a tighter curve, than the other end of the pipe which is "straightened out" in response to an "unwrapping" hand gesture.

In one implementation, videographic abakographs may be edited using a CEMENT (Computer Enhanced Multiple Exposure Numerical Technique) that includes operations, such as: operation (1) including capturing object data, as video, images, location data, and/or the like of an object swept through space; and operation (2) including segmenting the object data to make an abakograph. In one implementation, when using the toposculpting wand 2G160, the segmenting is automatic, e.g. if the light L1, light L2, light L3, etc., are modulated and sensed by a lock-in camera, vision system, and/or the like capable of ignoring all but these lights, e.g., using the principle of Superposimetric analysis and Lightspace). Operation (3) includes displaying the edge or rim extrusion of the object integrated over time of a particular gesture getting. In one implementation, the getting is started and stopped with hand gestures, or in the case of the wand, the getting may be started and stopped by squeezing and releasing a trigger 2G162. In one implementation, the getting has a soft start and a soft ending, e.g. by easing the trigger on slightly while moving the toposculpting wand 2G160 so as to "feather" the start or end, as shown in the manifold 2G181 which starts softly on the left, and ends abruptly on the right, where it "joins" the manifold 2G184. In an implementation not using the wand, an un-digital multifinger gesture can be used, such as varying the angle between the thumb and index finger to create a continuous trigger that "feathers" the beginning or ending of an abakograph. In one implementation, abakographs formed by light L1, light L2, light L3, etc., are integrated into toposculptures by interpolating the points and cross-meshing to create a "wireframe" model that is filled in like a continuous curved pipe or the like.

In one implementation, joins between the manifold 2G182, the manifold 2G181, and the manifold 2G184 are made by "pushing into" the manifold 2G184, e.g., drawing the manifold 2G181 or the manifold 2G182 toward the manifold 2G184 with one hand 180MD while making a first with the other hand 180MS to indicate that the manifold 2G184 should have a hole "punched through" it to receive a pipe connection to another pipe.

In one implementation, once the pipes are connected, a fluid flow simulation may be run, e.g., to check for leaks, connections, and the like. For example, when pipes are joined, test fluid is rendered in them of a particular color to show which pipes are connected together in a plumbing circuit.

In one implementation, flowing gently curved pipe circuits may be built and/or generated as whimsical sculptures, practical plumbing, electrical conduit installations, such as may be designed, simulated, and/or tested using the Bricologic (TRADEMARK) system. In one implementation, bricologic is logical (computational) bricolage, e.g., tinkering, using a variety of objects, including everyday household objects, industrial and/or design objects, architectural elements, specially designed and/or tagged objects, and/or the like to build things, e.g., by using the objects for meta gestures, metasculpting, abakography, toposculpting, and/or the like.

For operation (4), the following applies: in one implementation, a pipe like the manifold 2G189 (curved pipe) is rendered as a photoquantigraphic summation of exposures, e.g., over a certain segment of exposures. Such a manifold 2G189 (such as a pipe) may be created, for example, using the toposculpting wand 2G160, e.g., swept from the user's left hand 180MS to the user's right hand 180MD, by a dinner plate, and/or the like object moved accordingly. In an implementation, where the user 180U moves hand 180MS toward the center of the pipe, e.g., wishing to shorten it ("squeeze it inwards"), video frames are removed from the beginning of the recording, so the sum of integrated exposure frames starts later in the sequence. By way of example, an abakograph made from a ten second video exposure will have 600 frames (60 frames per second times 10 seconds). The full exposure is a photoquantigraphic sum from frame 1 to frame 600. Shortening the pipe, at the end of the pipe corresponding to the user's left hand, involves operation (4a) using gesture recognition and/or hand-position recognition, to determine where the hand has moved inward along the pipe; operation (4b) including calculating space-time compensation to convert this change in spatial position to a change in time (e.g. to compensate for acceleration in the original exposure), thus converting the space position to a time position, such as, for example, left hand moves inwards one third of the distance along the pipe, which, for example, corresponds to one quarter the way through the video; operation (4c) including converting the time position to a frame number in the video, which here would be, for example, frame number 150; and operation (4d) including computing a new photoquantigraphic sum from video frames 151 to 600, and displaying or rendering this sum as the new abakograph of the pipe, which no longer includes a contribution from frames 1 to 150.

Likewise, the right hand 180MD may control the ending frame of the summation of integrated exposures. For example, moving the right hand toward the center might change the sum so that instead of going from frame 150 to frame 600, now it might go from frame 150 to frame 400. Thus, a long exposure photograph may be generated as a streak of traces that starts and ends at the hands, and as the hands move, the streak and/or photograph is rendered so it matches the end points of the hands, e.g., by selecting the appropriate frame in the video sequence. Since, in one implementation, the vision system is true 3D, the result can be rendered from any angle where the user is positioned. Also, one or more additional cameras may be affixed in the environment, e.g., to capture high resolution exposures of the wand or object moved through space and thus render it photo realistically if desired (e.g., so it actually looks like the long exposure photographs resulting from car headlights moving down a dark road for example).

For operation (5), the following applies: in one implementation, a meta-space-time continuum operator determines the relationship between space and time, e.g., between space and frame number of the video recordings of the abakograph. The video recordings may, for example, capture photorealistic traces and/or true 3D positions of all points on the extruder object such as the surface 130 (also called an object) or the toposculpting wand 2G160. When the extruder object is the toposculpting wand 2G160, additional meta information may be recorded, such as the position of the trigger 2G162. In some implementations, the extruder may also be a printed letter, a gestured letter, a 2D image, an icon, a nozzle, an extrusion die, a "cookie cutter," and/or the like. For example, if user 180U points to the letter "I" in a newspaper headline, with the left hand 180MS, while pulling an extrusion gesture with the right hand 180MD, an "I" beam is made, by extruding the letter "I". Similarly, virtual "angle iron" beams can be made by pointing to the letter "L" with one hand and extruding it with the other. In one implementation, computer vision can use the exact font of the letter, e.g., so that a user can use various real physical "I" shaped objects like news printed fonts, or cutouts, children's letter blocks, and/or the like, to rapidly make beam designs and test them, e.g., using computer simulation of beam strength, stiffness.

In one implementation, a space-time operator determines which frame of the video corresponds to which position along the beam, so that, for example, equal distances along the beam or other extrusion can be located in the videos.

For operation (6), the following applies: in one implementation, cross-meshing is then applied, e.g., at equal points in space and/or time. The traces shown in FIG. 2G are along the path of extrusion. In some implementations, cross-meshing may be displayed as circles along the pipe, (in one implementation, as "beads" along each of the "wires" of a pipe-shaped abacus that make up the pipe, where each set of beads corresponding to a particular point-in-time are joined with a "wire" to form a circle), e.g., one circle rendered at each unit of distance along the pipe, and/or spaced in accordance with a variable spacing profile.

In this way, a crisscross mesh is generated which may, for example, be rendered as photorealistic glowing light having a pleasing look similar to long-exposure "lightvector painting" photographs generated by summing photoquantigraphically the video frames.

In one implementation, metable objects such as dinner plates, boxes, cardboard which can be cutout with scissors, and/or the like may be used by a user 180U to build, for example, a rocket engine, using glue, tape, scissors, and other objects. In one implementation, the vision system of apparatus 1300 recognizes the glue, tape, scissors, and/or other components, e.g., via image comparisons, to infer that the user is trying to build something, to engage instructional data and/or applications, to determine what the user is trying to build, and/or the like.

In one implementation, the metable sousface may be a surface 130 with an additional apparatus 2G169 that assists in sensing toposculpting gestures by, for example, sensing when the surface 130 is touched, and sensing hand gestures thereupon.

In some implementations, the apparatus 2G169 senses touch upon the table. This may be applied, for example, where the apparatus 1300 has difficulty sensing the difference between fingers that are close but away from the table and fingers that are actually pressing the table. In one implementation, the apparatus 2G169 is another instance of apparatus 1300, e.g., worn by another user 181U, where the ability to "look through the eyes of another person" grants a side-view. In one implementation, a camera on the table looking across may be employed.

In one implementation, the surface 130 includes a lattice of markings on it that are human and/or machine readable, e.g., so that the surface has an array of dots or other shapes on it that help the user orient the hands on the surface. In one implementation, tactile dots may be employed that, when touched, provide stimulus to the fingers, e.g., direct (tactile) and indirect (e.g. by mild electrical stimulus which is hard to localize). Indirect stimulus allows, for example, an object to seem to be felt. Thus, in one implementation, a user 180U placing a left hand on the surface 130 while touching a mid-air virtual object like the manifold 2G189, feel a "tingle" while touching it, such as via mild electric shocks, well below the pain threshold, and/or that have a quality of poor localization (e.g. one can't tell where exactly it is coming from). Alternatively, a clicking sound in the headgear of the apparatus 1300 and/or a vibration can be a cue that users will mistake for touch. In this way, the manifold 2G189 can be made to seem very much "alive" when touched, e.g., seem to really be there in the world, because something of poor localizability happens when it is touched.

In some implementations, a table having a surface 130 (also called a metable object or a metable surface), for being sensed through sousveillance may be referred to as a METAble Sousface (TRADEMARK) system. In one implementation, whereas the surface of a shape, such as an auto body, may be its top, the sousface may be its inside, e.g., what would be seen if the body was taken apart and/or turned upside down.

In one implementation, a sousface is amenable to sousveillance, e.g., a surface that lends itself to be watched rather than a surface that does the watching (such as one with sensors). A sousface may thus, in some implementations, be said to have and/or act as though it has inverse sensors.

In one implementation, an epitrochoid (of which the epicycloid is one example) may be formed by rolling a small disk on the surface of a larger disk. In one implementation, a hypotrochoid (of which the hypocycloid is one example) may be formed by rolling a small disk on the sousface of a larger disk.

In one implementation, taking the limit of large radius of curvature, the hypotrocloid and the eptrocloid may become trocloids (of which the cycloid is an example). In such an implementation, a surface and a souface may merge.

In the described disk examples above, sousface and/or surface may be considered one-dimensional. In a two-dimensional implementation, hypertrocloids may be constructed such as by rolling cylinders, cones, spheres, boxes, and/or the like on other cylinders, cones, spheres, boxes, trays, and/or the like, which may be referred to in some instances as a "hyperroulette." In one implementation, a hypercycloid may be an example of a hypertrocloid that is traced out by a line along the outer surface of an object rolling on a surface and/or sousface (e.g., flat or curved). For example, a light rope, or retro-reflective tape, or colored tape, or a colored line, running lengthwise along the outer edge of a cylinder (e.g., a cardboard mailing tube), rolling across a table during a table during a long-exposure photograph may form an image, photographic document, and/or the like, which may be referred to in some instances as a Topoloid (TRADEMARK) system or a Topoid (TRADEMARK) system. "Topoloid" refers to an abakograph formed as per the above, or a meshed version of the abakograph (i.e. its "wireframe" mesh). In one embodiment, the meshed version is constructed by running the Mesher on the abakograph. In this embodiment, a row of lights together with a line connecting them may be recognized by the apparatus 1300 so that the lights trace out the "wires" of the abacus, and the entire strip of tape is used to draw each crisscross line at a particular point in time, that makes the crisscross lines have the same spacing as the abacus wires. This generates a mesh that resembles a chicken wire, so that the toposculpture is a wireframe model that can then be texture-mapped as desired.

In one implementation, topoloids may be employed within a bricolage approach, including making virtual objects from hyperroulettes, e.g., rolling things on other things while watching them through Spaceglasses that record these actions.

In one implementation, a sousface may have a lip and/or edge, such as a rim positioned around its perimeter (e.g., as in a tray, basin, and/or the like). Such a sousface may be employed for constructing a Bricoloids (TRADEMARK) system and/or a Brichoid (TRADEMARK) system (e.g., from long-exposure bricologic).

In various implementations, different objects may be constructed thusly, e.g., with hands, found objects, and/or the like rolled on a sousface, and/or with one or more different kinds of wands, to wand objects and/or the sousface.

In one implementation, a toposculpting wand 2G160 may include a ring 2G161 including a wheel, disk, and/or the like on a bearing that spins or rotates, such as by way of a motor, rolling it along a sousface, and/or the like. In one implementation, a shaft encoder may be used to encode the space-time continuum of a long exposure video photograph. In one implementation, a motor, actuator, and/or the like may be employed as a shaft encoder, e.g., to turn or sense the turning of the ring 2G161 as it rolls along the surface and/or sousface. In one implementation, the lamp L1, the lamp L2, the lamp L3, etc., may each delineate and/or create a cycloid shape in a long-exposure photograph, such as made while rolling the toposculpting wand 2G160 along a surface and/or sousface. To the extent that surface 130 may be basin-shaped, it may have available various curvatures defined by a major axis (loose curvature), a minor axis (tight curvature), and various other curves and undulations in the surface. Thus surface 130 and the toposculpting wand 2G160 can be used, in various implementations, to generate a wide range of different kinds of hypocycloids as abakographs, e.g., when filmed, photographed, captured by video together, e.g., with 3D cameras of the apparatus 1300 and/or other auxiliary cameras around the surface 130, and/or the like.

Other lights on the toposculpting wand 2G160, e.g. not right at the edge, but further in, may, in one implementation, define hypotrochoids when photographed in a long exposure. A flashing light gives a path of the hypotrochoid that looks, in one implementation, like a dashed curve, e.g., a dotted line bent in the shape of the hypotrochoid. In an implementation, where other shapes are attached to the toposculpting wand 2G160 for rolling along a surface 130, other topoloids/toploids may be created and/or subsequently toposculpted, e.g., further using hand gestures and other forms of interaction, to generate bricoloids, such as models of cities, pipework, pipe networks, space stations, rocket engines, and the like. In one implementation, a cone attached to the ring 2G161 with a row of lights going from apex to base will generate a family of curves in 3D space, including a curve parallel to the surface 130 from the apex of the cone, a hypocycloid from the light at the base of the cone, and various hypotrochoids from the lights there between.

In one implementation, the toposculpting wand 2G160 may also feature planetary gears and/or other gears, such as that turn other parts of the wand at different speeds and at different angles of rotation. For example, the ring 2G161 may drive another ring at right angles to it, so that, in one implementation, a helix is generated rather than a hypotrochoid. The two rings may also be adjustable, in one implementation, so their angle can be changed, e.g., to generate the abakograph of anything in between a helix and a hypotrochoid.

In one implementation, abakographs and/or other apparatus-generated shape may be interpreted as electrical signals, allowing users to create arbitrary signals using the toposculpting wand 2G160 through, e.g., long-exposure photographs and/or video graphs, sculpting the signals by hand gestures, and/or the like.

Thus, in some implementations, the apparatus 1300 may be used to sculpt various objects, such as using hand gestures, hand gestures against objects, hand gestures with objects, the Bricology (TRADEMARK) system of objects in a toposculpting environment, and/or the like. In one implementation, a table, the METAble and/or other similar table, surface, sousface, and/or the like may be employed for one or more of these operations and/or uses.

In one implementation, a surface 130 (a table bearing surface) may be denoted with a metable label 2G110 (such as a "METAble Sousface"), such as in the example of FIG. 2G. In one implementation, the metable label 2G110 is machine readable, e.g., on the sides of the table, the top half of the label being white, in retroflective material, and the bottom half being black, with retroflective letters. Labels, like the metable label 2G110, may be placed around the edges of surface 130, e.g., so that it can be recognized and positioned in 3D space even in total darkness.

In one implementation, total darkness may be afforded by squeezing the trigger 2G162. For example, pressing the trigger can automatically turn off the room lights, such as to make toposculpting easier, more beautiful, and/or visually engaging.

In some implementations, even in the dark, the surface 130 may be visible to the user 180U by way of the apparatus 1300 which may be configured to see in the dark, but additionally, the table may be configured with instances of the metable circular object 2G130 that are illuminated, e.g., to emit visible light during a blanking interval of the apparatus 1300. The metable circular object 2G130 may be called smart dots. The apparatus 1300 senses, in one implementation, at a frame rate of 120 FPS (Frames Per Second) and the metable circular object 2G130 may, accordingly, emit light briefly (e.g., for about one microsecond) during a time when the apparatus 1300 is not responsive to light. Such synchronization allows for system control of the dots, so they can be invisible or visible to the apparatus 1300, as desired. In this way, visibility to the human eye(s) and to the apparatus 1300 may be separately controllable, optimized, and/or the like In some implementations, the metable circular object 2G130 emit infrared light, e.g., to help localization tasks, deliberate exposure to the apparatus 1300 in a visible getting, and/or the like. In one implementation, there are thus three gettings and/or controls of the gettings; (1) human eye exposure; (2) visible light camera exposure of the apparatus 1300; (3) infrared vision system camera of apparatus 1300. In one implementation, there is fourthly a retroreflective quality of the metable circular object 2G130 that interacts with the apparatus 1300, allowing it to localize itself at the table. In yet another implementation, each of the metable circular object 2G130 is a proximity sensor to localize objects on the table, measure how far away they are, measure contact such as by the hand 180MS and the hand 180MD, and/or the like. In another implementation, the table is made of material, such as metal, sensitive to contact with the user's hands, gloves, and/or the like. In another implementation, the smart dots may include holes, e.g., that are threaded for prototyping, so the user can screw objects down to the table for tinkering. The holes can, for example, draw vacuum or provide air pressure like an air hockey table for floating objects to be slid around or sucked down to the table and held there. In one implementation, the table is ferrous, permitting use of magnets as used on optical tables or the like.

Thus, in one embodiment, the table may be used for bricologic and/or computational bricolage.

Geophones may sense touch and effect touch, e.g. the table vibrates to provide vibrotactile haptics.

In some embodiments, the surface 130 may be designed and/or configured specifically for meta haptics. In one such embodiment, a Meta Table (TRADEMARK) system may be constructed having a pattern on it that is retroreflective to the vision system worn by user 180U. Such a vision system, as shown in one example in FIG. 2G, may contain two color cameras, a range camera such as the LiDAR unit 187, various other sensors, and/or the like.

The various other sensors may, for example, include a gesture band 2G190 on the wrist of the hand 180MD. In one implementation, the gesture band 2G190 senses self-gestures by movement, electrical conductivity of the self-skin, by impedance tomography, and/or the like. Thus, when the middle finger 2G199 touches the object 2G193, the gesture may be interpreted differently depending on whether index finger and thumb of the hand 180MD are touching or not. Gesture meaning may, in one implementation, also vary continuously as a function of how hard index finger and thumb of the hand 180MD squeeze together, which may be measured by a gesture band 2G190, e.g., using EMG (muscle signals), vibration, electrically, measuring band strain (e.g., caused by wrist girth) via one or more strain gauges, and/or the like. In one implementation, the vision system in the apparatus 1300 may be configured to perform this task, e.g., such that highly expressive gestures may be used, such as may be based on looping or closure or mating of flesh-on-flesh as another input variable to touch.

In one implementation, input variables such as these allow a user to feel what's happening, objects being created and/or manipulated, and/or the like. Meta taction, as afforded in the above examples, helps provide useful tactile feedback through gestures that are mettable, i.e. on mettable subject matter, as well as gestures that are multiply haptic, like touching with one finger while squeezing other fingers or thumb together in various ways that can be felt by the user and understood by the apparatus 1300 e.g., via processing apparatus 908.

In some implementations, a Meta Table may contain various sensors and/or effectors selected and/or optimized to sense and effect haptics and meta haptics.

In some implementations, a bricological environment can be created anywhere, not just using a table. For example, bricology may be practiced outdoors on the ground, where the sousface is the ground. The ground can be fitted, for example, with geophones and/or other sensors to aid in sousveillance with Spaceglasses or the like. In this context smart ground stakes can be driven into the ground. Such stakes used and/or interfacing with Spaceglasses and/or the apparatus 1300 may, in some implementations, be referred to as sousveyor stakes, which facilitate a bottom-up ("sousvey"), rather than top-down ("survey") hierarchy. For example, any wearer of Spaceglasses can participate in annotating reality, with the curation of properties and physical spaces no longer in the purview of only the surveyors and other officials. In one implementation, souveyor data may include annotations, distances, angles, heights, horizontal locations, landmarks, and/or the like, such as may be stored in association with one or more user identifiers and/or profiles.

In one implementation, the resulting sousveillance creates a participatory world in which individuals can, for example, tinker, create virtual cities, augmediated cities where buildings can be sculpted, and/or the like. In one implementation, even distressed or discarded objects, such as an old cardboard box from a dumpster or curb side, may be held up to position in view of the apparatus 1300, and may have its image manipulated via hand gestures to shape the box into a building, by copying shapes and stretching solid rectangular objects, and then "place" the building into an empty parking lot on the street to envision a skyscraper there.

Thus, in some implementations, toposculpting through bricolology allows design and manipulation of, for example, a city of the future, a space station, a "pipe dreams" musical instrument that runs on water, and/or the like via hand gestures on objects, for example, scrap materials picked up off the street.

Objects and/or toposculpted manifolds may be borrowed and shared. Thus, in one implementation, a user may use a dinner plate to make a rocket engine, and then pass the plate and/or rocket engine design along to another user, who may use the plate to make a pipe organ sculpture, share that with the first user, and/or the like.

In some implementations, bricology may include sharing of objects, e.g., as props that can be extruded, spun, twisted, and/or moved through space, such as to make things using metatouch and meta-haptics.

FIG. 3 depicts another schematic example of the sensing and display apparatus 1300 of FIG. 1E in one embodiment.

FIG. 3 illustrates an example of a software application (programmed instructions to be included in the program 907 of FIG. 1B) which may be used to instruct the user, such as about food preparation in a user's home, using the sensing and display apparatus 1300 of FIG. 1E. There is depicted a shared computer-mediated reality (such as the first augmediated-reality space 1000 of FIG. 1A) on a kitchen countertop as the surface 130 with a sink 341 and a cooktop 334 having burners 331. The secret subject matter 340 is only visible within the group of collaborating users of the digital eye glass 180 and the digital eye glass 190, such as may be reflected in access rights, privileges, roles, and/or the like data stored in a database. The public subject matter 240 is visible to non-participants (persons not involved or not wearing the digital eye glass 180).

Food items 330 on the countertop of the surface 130 may be sensed by the three-dimensional camera system of the digital eye glass 180, and the digital eye glass 190. Data is communicated between the processing apparatus 908 (of FIG. 1A) associated with each of the digital eye glass 180 and the digital eye glass 190, and each processing apparatus 908 is configured to compute a more accurate three-dimensional model of the food items in the first augmediated-reality space 1000.

FIG. 4 depicts another schematic example of the sensing and display apparatus 1300 of FIG. 1A and/or of FIG. 1E, in one embodiment.

FIG. 4 illustrates an example of application of the sensing and display apparatus 1300 to various types of activities that may be facilitated in the first augmediated-reality space 1000 of FIG. 1A, such as health, wellness, personal and group fitness, exercise, entertainment, gaming, music, dance activities, and/or the like all of which may use the sensing and display apparatus 1300 of FIG. 1A and/or of FIG. 1E.

There is depicted a floor having and/or providing a surface 130. The surface 130 may be a desk or a tabletop, and/or the like. A texture is positioned on the floor. The texture may, in one implementation, include a pseudorandom pattern, a pattern that may be deliberately made from pseudorandom tiles, naturally occurring by way of varied texture, dirt, scuff marks, the natural texture of wood grain of a hardwood floor, the natural texture of stone, concrete, marble, rubber and/or carpeting, and/or the like. The texture may, in one implementation, form a pattern 430. The homography of pattern 430 may, through algebraic projective geometry, form a group action under video-orbit software (e.g., included with the program 907 of FIG. 1A) to be executed by the processing apparatus 908 of FIG. 1A, responsive to an output of a three-dimensional camera image provided by the infrared transmitter 186 (which is an example of the first sensory-phenomenon effector 912 of FIG. 1B) and by the infrared receiver 185 (which is an example of the first sensory-phenomenon sensor 910 of FIG. 1B). An example of video-orbit stabilization in one implementation is provided above in reference to FIG. 2B.

In one implementation, the group of coordinate transformations of the floor texture falls in an orbit given by FORMULA {2}.

$$f(x) = \frac{Ax+b}{c\dagger x + d} \qquad \text{FORMULA \{2\}}$$

[A] is a 2 by 2 (2×2) linear operator, [b] is a 2 by 1 (2×1) translation, [c] is a 2 by 1 (2×1) chirp (projective), [d] is a scalar constant, and [x] is a 2 by 1 (2×1) spatial coordinate, and $[x]=[x1, x2]^T$.

Since the floor remains in this orbit, as viewed by a plurality of wearers (e.g., users) of the sensing and display apparatus 1300, the subject matter may be disambiguated from other subject matters not in the same plane as the floor. In accordance with an option, the three-dimensional sensing nature puts the floor itself in a three-dimensional model, and thus points located on this three-dimensional plane may be clustered and segmented. The secret subject matter 340 may include, for example, song lyrics displayed on the surface 130 of the floor, visible to one or more participants, such as in an andantephonic walk. The andantephone is a musical instrument that is played in response to the user walking.

In accordance with an option, the sensing and display apparatus 1300 is used for physical (gymnastic) instruction (such as, yoga, dancing, acting, martial arts, running, sports, etc.) by way of an augmediated reality (virtual three-dimensional) instructor generated by the program 907 of FIG. 1A. In one implementation, the image of the virtual instructor is projected into the first augmediated-reality space 1000 of FIG. 1A by the first sensory-phenomenon effector 912 of FIG. 1B (for example). If more than one user has their own instance of the sensing and display apparatus 1300, a selected instance of the sensing and display apparatus 1300 may provide a projection of the virtual instructor into the first augmediated-reality space 1000 of FIG. 1A; alternatively, the virtual instructor may be provided by an instance of the processing apparatus 908 that is not associated with any instance of the sensing and display apparatus 1300.

In some implementations where there are multiple instances of the sensing and display apparatus 1300 used, the body movements of the user may be scanned by another instance of the sensing and display apparatus 1300, and/or by an instance of the sensing and display apparatus 1300 (or the first sensory-phenomenon effector 912 of FIG. 1B) that is fixed in a stationary position in the environment (the first augmediated-reality space 1000 of FIG. 1A). In some such implementations, the virtual instructor may assist and/or otherwise interact with the actions of the user(s).

In accordance with an option, the sensing and display apparatus 1300 is configured to provide a virtual mirror, e.g., full-length mirror, bathroom mirror, and/or the like (via an effector placed in the first augmediated-reality space 1000 in combination with programmed instructions included with the program 907 of FIG. 1A), and is configurable to scan the user's body, e.g., for fitness tracking purposes (weight gain, body measurements, and/or the like). In accordance with an option, the sensing and display apparatus 1300 may be configured to behave like the mirror through which a body scan may be performed. In some implementations, the sensing and display apparatus 1300 may be configured to passively scan, monitor, track, and/or the like user fitness, body shape, body parameters, and/or the like, such as on a periodic, continuous, and/or triggered basis, and to provide notifications, alerts, recommendations, coupons, and/or the like based thereon, such as by correlating measured body parameters with values associated with notifications.

FIG. 5 depicts an example of a diagram indicating a timing and sequencing operation of the sensing and display apparatus 1300 of FIG. 1E in one embodiment.

FIG. 5 illustrates an example of the timing and sequencing of collaborative spatial imaging provided by the program 907 (FIG. 1A) used with the sensing and display apparatus 1300 of FIG. 1E in one embodiment. A sequencing of the comparametric and/or superposimetric process of the sensing and display apparatus 1300 is depicted in FIG. 5. The sensing and display apparatus 1300 may be configured, in one implementation, to emit a periodic pulse train of extramissive transmissions (e.g., send and receive) such as infrared optical energy, as a pulse train signal 500. The first emission (e.g., from the infrared effector mounted to the sensing and display apparatus 1300) provides a weaker illumination signal 510 (having a relatively weaker strength), followed by a medium illumination signal 520 (having relatively medium strength), and then followed by a stronger illumination signal 530 (having a relatively stronger strength). The illumination signals are spaced apart in time, and emitted from the sensor one after the other towards an object in the first augmediated-reality space 1000 of FIG. 1A.

The program 907 of FIG. 1A may be configured, in one implementation, to include a synthetic aperture imaging constructor (e.g., as programmed instructions) configured to be responsive to a lightspace generated by illuminators (e.g., the effectors) of a participant sharing the first augmediated-reality space 1000 of FIG. 1A. The program 907 may, in one implementation, be configured to include a comparametric compositor 404 (depicted in one example in FIG. 1AA) and/or a superposimetric compositor 405 (depicted in one example, in FIG. 1AA). Further discussion of comparametric and/or superposimetric compositor embodiments are provided above, such as in relation to FIG. 2B.

The medium illumination signal 520, having relatively medium strength, is a normal strength signal resulting in a normal exposure to the three-dimensional camera (a sensor) of the digital eye glass 180 (or the sensing and display apparatus 1300). The weaker illumination signal 510 is a weak signal, such as ¼ (25%) strength, resulting in a three-dimensional camera exposure, e.g., that is two f-stops underexposed. The stronger illumination signal 530 is a relatively stronger signal, such as one that is four times as strong as that of the medium illumination signal 520, resulting in a three-dimensional camera exposure, e.g., that is two f-stops overexposed. The first sensory-phenomenon effector 912 (FIG. 1B) may, in one implementation, send out (e.g., transmit or emit) an initial signal into the first augmediated-reality space 1000, and the first sensory-phenomenon sensor 910 of FIG. 1B may receive the reflections from the objects located in the first augmediated-reality space 1000 of FIG. 1B.

The result is three exposures or three "gettings" of information in which the first getting of the weaker illumination signal 510, is rich in highlight details or details in areas of the getting that may or would otherwise saturate the sensor. A getting is, in one implementation, a receiving of a reflected illumination, reflected from an object located in the first augmediated-reality space 1000 of FIG. 1A, and/or of an original source illumination. The reflection from the stronger illumination signal 530 is rich in shadow detail or rich in weak-signal detail, for example, for more distant objects, or for objects which have weak energy return (e.g., reflected back) to the three-dimensional camera (e.g., the first sensory-phenomenon sensor 910 of FIG. 1B).

The program 907 of FIG. 1B may be configured, in one implementation, to combine these three gettings (the received reflected signals) in order to determine more information from the scene (the first augmediated-reality space 1000) than any one getting might provide individually. The program 907 may, in one implementation, be configured to execute a comparametric analysis on the received (e.g., reflected) data in order to determine a result: e.g., an extended response three-dimensional camera may be provided to facilitate the comparametric analysis by using a comparametric analysis program 406 (depicted in one example in FIG. 1AA and discussed in relation to FIG. 2B).

In another implementation, the sensitivity of the camera (sensor and/or effector) may be adjusted to acquire three-dimensional images that are, e.g., weak, medium, and strong. Once these signals are received, the program 907 is configured to combine them, and then display the combined image to the user(s) via their instance of the second sensory-phenomenon effector 914 of FIG. 1B. Additionally, visible light images may be so acquired.

In some implementations where there is a plurality of users present in the first augmediated-reality space 1000 of FIG. 1B, the program 907 may be configured to include a superposimetric analyzer 407 (depicted in FIG. 1AA and discussed in relation to FIG. 2B), and the program 907 may be configured to determine a superposimetric spatial imaging, such as by using a superposimetric spatial imaging program 408 (depicted in FIG. 1AA and discussed in relation to FIG. 2B).

In one implementation, a first instance of the sensing and display apparatus 1300 is configured to capture three-dimensional scene information or images by way of a pulse train signal 500 (and by using the first sensory-phenomenon sensor 910 and the first sensory-phenomenon effector 912 and the program 907 of FIG. 1B). A second instance of the sensing and display apparatus 1300 is configured to capture three-dimensional information from the same scene (the first augmediated-reality space 1000 of FIG. 1B), using the pulse train signal 509. The two instances of the sensing and display apparatus 1300 may, in one implementation, be configured to work in concert to spatially image a three-dimensional scene, such as according to a timeline having time slots, such as a first time slot 570, a second time slot 571, a third time slot 572, a fourth time slot 573, a fifth time slot 574, and a sixth time slot 575. Each time slot may be assigned to one or more users of the first augmediated-reality space 1000 of FIG. 1A. For example, in the illustrated implementation, the first time slot 570 may be assigned to the first user; the second time slot 571 to the second user; the third time slot 572 to the third user; the fourth time slot 573 to the fourth user; the fifth time slot 574 to the first user; the sixth time slot 575 to the second user, and so on. If more users are present in the first augmediated-reality space 1000, then more time slots may be allocated, e.g., according to the number of users in a sequential order. A non-sequential order may also be used, in some implementations.

For the first time slot 570, there are three divided time sections assigned to the first user of the first augmediated-reality space 1000 of FIG. 1A. During the first time section, the digital eye glass 180 captures a reflection of a weak signal (reflected from an object in the first augmediated-reality space 1000) due to the weaker illumination signal 510 transmitted from the digital eye glass 180 to a scene (the first augmediated-reality space 1000) shared with other users using their own instance of the sensing and display apparatus 1300. During the second time section, the digital eye glass 180 captures a reflection of a medium-strength signal due to the medium illumination signal 520 transmitted from the digital eye glass 180 associated with the first user. During the third time section, the digital eye glass 180 captures reflection of a relatively strong signal due to the stronger illumination signal 530 transmitted from the digital eye glass 180 (of the first user), and then subsequently reflected from a physical object located in the first augmediated-reality space 1000 of FIG. 1B.

For the second time slot 571, there are three divided time sections assigned to the second user of the first augmediated-reality space 1000 of FIG. 1B. During the first time section, the digital eye glass 190 (of the second user) captures a reflection of a weak signal due to a weaker illumination signal 511 transmitted from an effector (such as the first sensory-phenomenon effector 912 of FIG. 1B) positioned on the digital eye glass 190 and transmitted to a scene (first augmediated-reality space 1000) shared by the users (each user involved has their own instance of the sensing and display apparatus 1300). During the second time section, the digital eye glass 190 captures a reflection of a medium-strength signal due to a medium illumination signal 521 transmitted from the digital eye glass 190 (of the second user). During the third time section, the digital eye glass 190 captures a reflection of a strong signal due to a stronger illumination signal 531 transmitted from the digital eye glass 190 (of the second user).

The same process is repeated for the third time slot 572 and the fourth time slot 573 for the third user and the fourth user, respectively. For the fifth time slot 574, the cycle is repeated, back to the first user, and the weaker illumination signal 540, the medium illumination signal 550, and the stronger illumination signal 560 are generated and used (similar to the first time slot 570). Then, the reflections are sensed by the sensors mounted on each instance of the sensing and display apparatus 1300, and then are processed by each instance of the program 907 associated with each (respective) instance of the sensing and display apparatus 1300.

For the sixth time slot 575, the cycle is repeated, back to the second user, and the weaker illumination signal 541, the medium illumination signal 551, and the stronger illumination signal 561 are generated and used (similar to the second time slot 571), etc.

Any type of multiplexing and/or switching may be used in various embodiments and implementations, such as time division multiplexing, frequency domain multiplexing, and/or the like.

In one embodiment, each instance of the sensing and display apparatus 1300 is configured to implement three-dimensional HDR (High Dynamic Range) imaging, such as by programmed instructions included in the program 907 of FIG. 1B, in which the program 907 includes a comparametric compositor, which may be implemented on a Wyckoff Set of three-dimensional images, scans, and/or the like. The comparametric compositor is configured to combine a plurality of different gettings of the same subject matter by using a method 513 (see the example of FIG. 5A). The method 513 may be provided, in one implementation, as executable programmed instructions in the program 907 of FIG. 1B.

FIG. 5A depicts an example of a method 513, to be included as programmed instructions configured to direct the processing apparatus 908 (FIG. 1B) used in the sensing and display apparatus 1300 of FIG. 1B in one embodiment.

The method 513 (of the comparametric compositor) includes operation 502, including, in one implementation, acquiring a Wyckoff Set. Once completed, control is then passed over to operation 504.

Operation 504 includes, determining a comparametric relationship among members of the Wyckoff Set acquired in operation 502. Once completed, control is then passed over to operation 506.

Operation 506 includes, determining a certainty function for each level of each member of the Wyckoff Set. Once completed, control is then passed over to operation 508.

Operation 508 includes, constructing a weighted sum, for example by using FORMULA {3}.

$$\hat{q} = \frac{\sum_i c_i \frac{1}{k} q_i}{\sum_i c_i} \qquad \text{FORMULA \{3\}}$$

In one implementation, [k] are the overall gains or amplitudes of each getting of the Wyckoff Set of gettings, [$c_i$] are the certainties, and [$q_i$] are the photoquantigraphic measurement arrays (e.g., the three-dimensional gettings themselves). Such a composition is called a comparametric compositor 409 (depicted in FIG. 1AA and discussed in relation to FIG. 2B) and implemented in the method 513 of FIG. 5A.

Thus, even a single instance of the sensing and display apparatus 1300 benefits from using the method 513. Data fusion (collection of data) from multiple instances of the sensing and display apparatus 1300 may proceed, e.g., superposimetrically, by using a method 580 (see the example of FIG. 5A). The method 580 may be configured as programmed instructions to be included, in one implementation, in the program 907 of FIG. 1B, and then to be executed by the processing apparatus 908 of the sensing and display apparatus 1300.

Operation 582 includes, acquiring a lightspace set of quantigraphs, [qi] (e.g., a set of different quantigraphs, each quantigraph provided by a different illumination of the same subject matter). Once completed, control is then passed over to operation 584.

Operation 584 includes, determining a superposimetric relationship among different lightvectors of this set. Once completed, control is then passed over to operation 586.

Operation 586 includes, determining a certainty function for each superposimetric law of composition. Once completed, control is then passed over to operation 588.

Operation 588 includes, constructing a weighted sum, such as in accordance with the example in FORMULA {4}.

$$\hat{\hat{q}} = \frac{\sum_i c_i \hat{q}_i}{\sum_i c_i} \quad \text{FORMULA \{4\}}$$

In one implementation, [ci] are the overall gains or amplitudes of the HDR (high definition resolution) image composite due to each source of illumination (i.e. each lightvector). Such a composition is called a superposimetric compositor (implemented, for example, by the method 513 of FIG. 5A).

The program 907 associated with a respective instance of the sensing and display apparatus 1300 is configured, in one implementation, to generate a quantigraph information due to its own light source plus contributions from the light sources in all the other instances of the sensing and display apparatus 1300 involved with the first augmediated-reality space 1000 of FIG. 1B.

The program 907 may be configured, in one implementation, to combine all of these lightspace quantigraphs (one lightspace graph from each instance of the sensing and display apparatus 1300) to form a master lightspace quantigraph, such as to be shared among all the participating instances of the sensing and display apparatus 1300 in the first augmediated-reality space 1000 of FIG. 1B.

In one embodiment, the program 907 of FIG. 1B may include a spatial-imaging multiplexer 410 (such as depicted in one example in FIG. 1AA) configured to multiplex a scanning from the digital eye glass 180 of FIG. 1E, and the digital eye glass 190 of FIG. 1E.

For example, in one implementation, the spatial imaging multiplexer may include a time-division multiplexer 411 (depicted in one example in FIG. 1AA).

In one implementation, the time-division multiplexer (which may be configured as programmed instructions) may be configured to facilitate cooperation with instances of the sensing and display apparatus 1300 worn by participants associated with the first augmediated-reality space 1000 of FIG. 1B. For instance, in one implementation, a variable amplitude multiplexer is configured to: (A) cooperate with instances of the sensing and display apparatus 1300 worn by other participants in the first augmediated-reality space 1000; and (B) provide approximately identical gettings of subject matter in response to different degrees of illumination reflected from the subject matter.

FIG. 6 depicts an example of a real-time augmediated reality environment shared among multiple participants using the sensing and display apparatus 1300 of FIG. 1E in one embodiment.

FIG. 6 illustrates an implementation of collaborative spatial imaging and gesture-based interfacing with physical objects to enable real-time augmediated reality interfaces to be shared among multiple participants using the sensing and display apparatus 1300 of FIG. 1E. The sensing and display apparatus 1300 may be configured, in one implementation, to include a collaborative gesture-based interface 412 (depicted in one example in FIG. 1AA) configured to allow multiple users to interact with real-world three-dimensional physical objects (located in the first augmediated-reality space 1000 of FIG. 1B), such as a trackable box, or other instances of the object 600 located in the first augmediated-reality space 1000 of FIG. 1B.

The surfaces of the object 600 may, in one implementation, be annotated with markers, patterns, and/or three-dimensional geometric patterns, or their naturally occurring vertices, corners, edges, or surfaces may be distinguishable by dirt, scuff marks, irregularities, textures, and/or the like. These surfaces 601 are scanned by the digital eye glass 180 (e.g., associated with a first user), the digital eye glass 190 (e.g., associated with a second user), and the digital eye glass 196 (e.g., associated with a third user). This facilitates shared tactile augmediated reality applications (e.g., to be included in the program 907, or to be included in the sensing and display apparatus 1300 or to be included in a computer not associated with the sensing and display apparatus 1300).

Users experience and/or interact with the first augmediated-reality space 1000 (e.g., with any virtual objects and physical objects in the first augmediated-reality space 1000) of FIG. 1B through their respective instances of the sensing and display apparatus 1300, using interactive gestures while touching one or more real physical objects such as the object 600.

The digital eye glass 180, the digital eye glass 190, and the digital eye glass 196 allow multiple users to interact with these three-dimensional physical instances of the object 600 (located in the first augmediated-reality space 1000 of FIG. 1B), such as a polyhedral object, an object having a flat surface, an object having a recognizable surface texture 602, an image icon 603, a feature recognizable with three-dimensional structures (e.g., corners, vertices, edges), and/or surfaces 601, in the first augmediated-reality space 1000 of FIG. 1B through the sensing and display apparatus 1300. The program 907 of FIG. 1B may be configured, in one embodiment, to execute the programmed instructions configured for recognition of human gestures made in the first augmediated-reality space 1000 of FIG. 1B.

The gesture input 610, the gesture input 611, and the gesture input 612 are recognized by instances of the digital eye glass 180, the digital eye glass 190, and/or the digital eye glass 196, such with the use of three-dimensional detectors and/or sensors, range three-dimensional sensors, and/or the like. A wireless communications module 630, a wireless communications module 631, and a wireless communications module 632 are configured to enable the flow of information, such as a gesture input 610, a gesture input 611, and a gesture input 612 to be transmitted, shared, and to provide and/or facilitate user interaction between the users (or between objects) via their instance of the sensing and display apparatus 1300. The wireless communications module 631 may be configured, in various implementations, for communication via a variety of wireless protocols, such as WiFi, Bluetooth, cellular, CDMA, HSPA, HSDPA, GSM, and/or the like. In one implementation, the pointing gesture is used to draw or annotate information or select indicia on a shared space or shared surfaces, to thus allow interaction among multiple wearers of the digital eye glass 180, the digital eye glass 190, and the digital eye glass 196.

Gesture sensing may be facilitated, in one implementation, by using a gesture-tracking detector. The gesture-tracking detector 413 is depicted in one example in FIG. 1AA.

The gesture-tracking detector 413 may, in one implementation, include a neural network 414 (depicted in one example in FIG. 1AA) configured to implement a cost function, an estimator, and a gesture-tracking detector (which detector is responsive to an input from the estimator). To train the neural network, a cost function is first defined. This cost function represents a logarithmic likelihood of a logistic regression.

In accordance with an option, the sensing and display apparatus 1300 includes a best-fit optimizer 415 depicted in FIG. 1AA.

The best-fit optimizer is configured, in one implementation, to maximize a function for "best fit" through parameter selection. Minimizing the negative of the function may be done, for example, through a gradient descenter (e.g., negating the cost function), thus formulating the best-fit optimizer in the context of a minimization problem by using the gradient descenter 416 (depicted in one example in FIG. 1AA).

The best-fit optimizer may be configured, for example. to maximize a LOG (logarithm) likelihood function. To prevent over fitting to the training data, a regularizer 417 may be used in some implementations; the regularizer 417 is depicted in one example in FIG. 1AA.

The regularizer 417 implements a regularization term by adding the square of each parameter at the end of the cost function. These regularization terms will punish the cost function as the parameters become large. An overflow penalizer 418 may be used, and is depicted in one example in FIG. 1AA.

The overflow penalizer may be configured, in one implementation, to compute a value that increases as the magnitude of any of the parameters increases. An example of an overflow penalizer is an adder in which there is a magnituder on each input to the adder, so that the output is the sum of the absolute values of the inputs. However, since the absolute value function has a discontinuity in its first derivative, at the origin, the overflow penalizer is an adder with a magnitude squarer on each input. A magnitude squarer multiplies each input by its complex conjugate (i.e. $[y]=[x]\dagger[x]$) to give the magnitude squared of the input. The overflow penalizer adds the sum of the square magnitudes of each parameter to the cost function. This prevents or discourages (reduces the occurrence of) a floating point overflow. The training cost function $J(\theta)$ is provided, in one implementation, by the example of FORMULA {5}.

$$J(\theta)=l(\theta)+R(\theta,\lambda) \quad \text{FORMULA \{5\}:}$$

The term $[l(\theta)]$ is the logistic regression for minimization, provided by FORMULA {6}.

$$l(\theta) = -\frac{1}{s} \sum_{i=1}^{s}\sum_{j=1}^{c} [y_j^{(i)}\log(h_\theta(x^{(i)}))_j + (1-y_j^{(i)})\log(1-(h_\theta(x^{(i)}))_j)] \quad \text{FORMULA \{6\}}$$

In one implementation, [s] denotes the total number of training cases, and [c] denotes the total number of output gestures. The objective of this function is to add up the cost from each of the training cases. Thus, [i] is used to denote the current training cases that are being used to calculate the cost. $[h\theta (x(i))]$ denotes the estimation resulting from forward propagation. After calculating the estimate from forward propagation, a logistic function may be used to rescale that number between 0 and 1.

The term $R(\theta, \kappa)$ is the regularization term provided by FORMULA {7}.

$$R(\theta,\lambda) = \frac{\lambda}{2s}\left[\sum_{i=1}^{n}\sum_{j=1}^{p}(\theta_{i,j}^{(i)})^2 + \sum_{i=1}^{c}\sum_{j=1}^{n}(\theta_{i,j}^{(2)})^2\right] \quad \text{FORMULA \{7\}}$$

In one implementation, [n] denotes the total number of nodes in the hidden layer, and [p] denotes the total number of nodes in the input layer, which is the number of pixels found in each of the training images. Training the neural network includes, in one implementation, collecting the training data, such as by using a spatial-imaging sensor such as a depth-sensing three-dimensional camera. For example, the sensing and display apparatus 1300 may include programmed instructions (to be included in the program 907) configured to train the sensing and display apparatus 1300 to recognize human gestures, such as the following: (A) the framing gesture (e.g., both hands form the corners in diagonal of each other, to frame a scene or object within or beyond the hands of the user), (B) a finger pointing gesture, and/or the like. In some implementations, a human-gesture recognition program 419, gesture library, and/or the like may be used (depicted in one example in FIG. 1AA).

The program 907 may, in one implementation, be configured to facilitate data collection. Collecting a large amount of training data is a way to improve the performance of a learning method (programmed instructions used in the program 907). In the setting (in the first augmediated-reality space 1000), sample data may be collected by recording additional gesture samples, e.g., by wearing the sensing and display apparatus 1300 (in daily usage) continuously (for an extended period of time). High accuracy may be achieved by constantly streaming user gestures and labeling the gesture with the correct identification labels, number, indicia, tags, ratings, and/or the like. This may, in one implementation, be effected in a social networking site, with a community of users each having their instance of the sensing and display apparatus 1300. This continuous data collection approach results in continued improvement to the learning software; the learning software 424 (depicted in one example in FIG. 1AA) may be used.

In one implementation, in order to avoid over fitting the training data, fuse software (e.g., configured as programmed instructions) may be implemented (included with the program 907). Analogous to a physical fuse in an electric circuit which blows (stops conducting current) when too much current is consumed, the fuse software may be configured to blow (e.g., stop operations) when triggered, such as when too much time is consumed for fitting, training, data collecting, and/or the like. In one implementation, the fuse software may be implemented in accordance with a method having operation (A), operation (B), and operation (C).

Operation (A) includes, splitting data between training data and test data. For example, a separated 80% of the data is identified as training data, and the remaining 20% is identified as test data. Once completed, control is passed on to operation (B).

Operation (B) includes, on every iteration of neural net training, running a forward propagation to acquire a gesture prediction accuracy and cost on both training and test sets. Control is passed on to operation (C).

Operation (C) includes, considering the cost on both training and test sets along with the number of training iterations.

At some point (e.g., around 2000 iterations), the cost of the test data starts to increase while the cost of the training data is still decreasing. This implies that after approximately 2000 iterations, the neural network is being over trained to the training data; that is, for the case where the neural network is left to train forever, the neural network might only match items in the training data, and may reject most everything else.

In accordance with an option, the program 907 includes programmed instructions for achieving, for the training stage of the neural network, an accuracy of approximately 99.8%. The cross-validation of the trained neural network achieves an accuracy of approximately 96.8%. For example, the performance in frames-per-second (FPS) of only the gesture-recognition software may be approximately 100 FPS while the performance of the sensing and display apparatus 1300, including gesture recognition software, is approximately 30 FPS.

FIG. 7 depicts another example of a real-time augmediated reality shared among multiple participants (users) using the sensing and display apparatus 1300 of FIG. 1E in one embodiment.

More specifically, FIG. 7 illustrates an example of collaborative spatial imaging and gesture-based interfacing with virtual or physical objects using the sensing and display apparatus 1300 of FIG. 1E. There is depicted an example of the digital eye glass 180 used with a virtual bubbles metaphor, in one implementation, in which a virtual object or a real object 700 is touched by a hand 710 of a user of the bubble metaphor (a thing that acts like a bubble). A bubble is, in the illustrated example, a symbol of an icon, in which the icon appears as a bubble, and behaves like a bubble (to some extent) to the user via the user interface 800 of FIG. 8A. The program 907 may be configured, in one implementations, to include a bubble-metaphor generator 420 (depicted in one example in FIG. 1AA) in which, for example, images of bubbles (e.g., three-dimensional) appear on the user interface 800 (to the user). For example, in one implementation, when a hand intersects the sphere of the bubble image, the bubble image changes to a motion picture (e.g., video image), animated graphic, interactive animation (e.g., such as may be sensitive to the position of user appendages and/or objects in the environment), and/or the like of a bubble bursting (also shown in the examples of FIG. 8B and FIG. 8C); then, the bursting bubble 720 disappears from the screen (the user interface 800). In some implementations, a bubble is an example of a menu item or a menu icon.

The bubble-metaphor generator 420 may, in one implementation, be configured to define a sphere and the volumetric contents of volume of the sphere by using FORMULA {8}.

$$\frac{4}{3}\pi r^3 \quad \text{FORMULA \{8\}}$$

In one implementation, [r] is the radius of the sphere (the bubble). The volume of a sphere is zero since its surface exists on a set measure of zero in the three-dimensional space.

However, the volume contained inside a sphere is [4π r 3] and this volume therefore has a non-zero measure in three-dimensional space. Similarly, a point cloud of data from the hand 710 of the user is calculated and when the hand 710 and/or its point cloud intrudes upon the volume and/or point cloud of the sphere, an interference signal is generated by the program 907.

The program 907 may, in one implementation, be configured to execute an operation, including calculating the strength of the interference signal, such as according to a Neyman-Pearson constant false alarm rate, and statistically thresholded to burst the bubble when the intrusion is sufficient. In one implementation, a statistical significance test may be performed upon the degree of point cloud intrusion of an appendage of the user (fingers, hand, legs, feet, and/or the like) into the volume of the sphere (the bubble).

The program 907 may be configured, in one implementation, to execute an operation including, performing such measure of the degree of intrusion into a sphere (or other shape); the programmed instructions for executing this operation may be referred to as a spherical volumetric intrusion estimator 421 (depicted in one example in FIG. 1AA); when such an estimator is thresholded or used as a trigger for other actions, the programmed instructions may be referred to as a volume-intrusion detector 422 (depicted in FIG. 1AA). The volume-intrusion detector 422 is configured to detect the intrusion of a spherical volume (the bubble) and/or other volume of any shape.

The bubble-metaphor generator 420 includes programmed instructions to be included, in one embodiment, in the program 907, and is configured, in one implementation, to create a video image, animated graphic, interactive animation, and/or the like of one or more bubbles, balloons, balls, or other two-dimensional or three-dimensional shapes and/or icons, and causes each shape to vanish (or self-destruct, or burst) when the point cloud of all or a part of a user's body intersects to a sufficient and/or specified degree with the interior area or volume of the two-dimensional or three-dimensional shape.

In accordance with an option, a bubble-bursting program 423 (depicted in one example in FIG. 1AA, and may be called a bubble-bursting metaphor) may include one or more representations of physical objects, e.g., balls, that may be used, and when touched by the user, are interacted upon to become bubbles (e.g., virtual icons). Using physical objects (real objects in the first augmediated-reality space 1000 of FIG. 1A) may add an element of taction to the bubble-metaphor generator as described previously for the table top, floor surface and/or the like.

The sensor (e.g., receiver) of both instances of the sensing and display apparatus 1300 may, in one implementation, receive an image illuminated by the effectors of the instances of the sensing and display apparatus 1300, so in the case of two instances of the sensing and display apparatus 1300, each instance of the sensing and display apparatus 1300 captures six gettings: three gettings from the light source of the sensing and display apparatus 1300, and three gettings as the scene (the first augmediated-reality space 1000) appears illuminated by effectors associated with the other instance of the sensing and display apparatus 1300. These sets of differently exposed and differently illuminated images provide additional spatial information, though not merely photometric stereo, but also, in some implementations, a three-dimensional spatial imaging and sensor fusion.

FIG. 8A depicts a schematic example of a user interface 800 for use with the sensing and display apparatus 1300 of FIG. 1E in one embodiment.

In some implementations, the user interface 800 includes (and is not limited to) a first interface section configured to display phenomena derived from a first augmediated-reality space 1000 via the interface assembly 902 (FIG. 1A) configured to convey sensor signals 904 and effector signals 906 with the first augmediated-reality space 1000. The user interface 800 also includes a second interface section configured to display phenomena derived from a second augmediated-reality space 1002 via the interface assembly 902 configured to face, detect, interact with, and/or the like a second augmediated-reality space 1002. The second interface module 905 is configured to convey sensor signals 904 and effector signals 906 with the second augmediated-reality space 1002. The effector signals 906 are user presentable, at least in part, in any one of the first augmediated-reality space 1000 and the second augmediated-reality space 1002.

The user interface 800 is provided, in one implementation, by the program 907 of FIG. 1A. FIG. 8A depicts a schematic example of the user interface 800 using bubbles (as icons) for a first set-up operation. In some implementations, such as to attain aesthetic minimalism and physical safety, once the finger enters the field of view, the bubbles rise toward the field of view 802 in the user interface 800. The field of view 802 is associated with an effector of the sensing and display apparatus 1300 projecting the user interface 800 to the eye of the user of the sensing and display apparatus 1300. The user interface 800 is for use by a user 801. The user interface 800 is viewable through the sensing and display apparatus 1300. In one implementation, the field of view 802 within the user interface 800 may include a grid; the grid includes one or more cells, such as may be arranged as a matrix (e.g., as in a spreadsheet). In the example of FIG. 8A, the cells are shown as rectangles that are identical in size and laid out in a regular rectangular grid of non-overlapping cells. However, in other implementations, the grid and/or its cells may be of different sizes, shapes, orientations, and/or the like, may overlap, may be laid in a triangular lattice, honeycomb arrangement, and/or any other regular or irregular pattern. The user interface 800 includes one or more bubbles and/or a bubble set 803 (or sets), such as may be arranged and/or collected in one or more groups or sets. By way of example, there are depicted four instances of the bubble set 803, including a work bubble 804, a media bubble 805, a play bubble 806, and a social bubble 807, and/or the like. In one implementation, each bubble of the bubble set 803, once selected, allows the user to view a setting, application, collection of data, and/or the like associated with the selected bubble.

FIG. 8B depicts a schematic example of a user interface 800 for use with the sensing and display apparatus 1300 of FIG. 1E in one embodiment. FIG. 8B depicts a schematic example of the user interface 800 using bubbles (as icons) for a second set-up operation. An application folder may be opened, in one implementation, by popping the icon associated with the application folder, such as may be detected via gesture-recognition techniques (e.g., programed instructions to be used in the program 907); once the application folder is opened, the other bubbles blow out of the field of view 802. In one implementation, an application folder includes a collection of applications and/or selectable icons, shortcuts, bubbles, and/or the like associated therewith.

FIG. 8C depicts a schematic example of a user interface for use with the sensing and display apparatus 1300 of FIG. 1E in one embodiment. FIG. 8C depicts a schematic example of the user interface 800 using bubbles (as icons) for a third set-up operation. An application folder is opened, in one implementation, by popping the application folder, such as may be detected using gesture-recognition techniques; once the application folder is opened, the other bubbles blow out of the field of view 802.

FIG. 9A depicts a schematic example of the user interface 800 for use with the sensing and display apparatus 1300 of FIG. 1E in one embodiment. FIG. 9A depicts a schematic example of the folder selection in the user interface 800. Folder icons may, in one implementation, spiral vertically about the imaginary x-axis of the field of view 802. Other forms of animation may be employed in other implementations.

FIG. 9B depicts a schematic example of the user interface 800 for use with the sensing and display apparatus 1300 of FIG. 1E in one embodiment. FIG. 9B depicts a schematic example of the folder selection in the user interface 800. The folders are now in view, and ready for finger selection.

FIG. 10A depicts a schematic example of a user interface 800 for use with the sensing and display apparatus 1300 of FIG. 1E in one embodiment. FIG. 10A depicts the schematic example of the application selection in the user interface 800. Applications are selected and entered in the field of view 802 similarly to the folders. In one implementation, a ratio of 1 to 5 (approximately) may be used for the three-dimensional opaque logo to bubble ratio, for icons of the software applications.

FIG. 10B depicts a schematic example of a user interface 800 for use with the sensing and display apparatus 1300 of FIG. 1E in one embodiment. FIG. 10B depicts a schematic example of application selection in the user interface 800. Logos of selected applications may, in one implementation, spiral, rotate, and/or the like rapidly to a top corner of the user interface 800. In one implementation, a ratio of 1 to 10 (approximately) is used for sizing the logo to a cell (e.g., one that is part of a 3×3 grid of cells).

FIG. 11A depicts a schematic example of a user interface 800 for use with the sensing and display apparatus 1300 of FIG. 1E in one embodiment. FIG. 11A depicts a schematic example of the settings selection used in the user interface 800. Once the finger (of the user 801) is tracked on the top right section of the field of view 802, a settings bubble, button, and/or the like 808 emerges in one implementation. This may occur, for example, both within an application (for local settings) and from the home screen (for global settings). The user interface 800 thus, in one implementation, includes a settings bubble 808.

FIG. 11B depicts a schematic example of a user interface for use with the sensing and display apparatus 1300 of FIG. 1E in one embodiment. FIG. 11B depicts a schematic example of the level selection in the user interface 800. In one implementation, once settings are selected, the setting may spiral inwards about the rightmost column of the grid. The settings bubble 808 may include, connect to, and/or provide access to, for example: a setting type 810 (for setting up brightness), a setting type 811 (for setting up loudness), a setting type 812 (for setting up a network connection), a setting type 813 (for setting up a meditation mode), and/or the like.

FIG. 11C depicts a schematic example of a user interface 800 for use with the sensing and display apparatus 1300 of FIG. 1E in one embodiment. FIG. 11C depicts a schematic example of a setting selection (in the user interface 800) for gummy settings; for example, once the brightness setting is selected, a gummy line is stretched from the center of the brightness setting icon to the finger of the user. In one implementation, the scale controls the magnitude.

FIG. 12 depicts a schematic example of a user interface 800 for use with the sensing and display apparatus 1300 of FIG. 1E in one embodiment. FIG. 12 depicts a schematic example of a meta view (a bird's eye view) of a visual search menu for the user interface 800.

FIG. 13 depicts a schematic example of the sensing and display apparatus 1300 (also called a hardware array) of FIG. 1E in one embodiment. FIG. 13 depicts a schematic example of the hardware used in the sensing and display apparatus 1300 in one implementation. The sensing and display apparatus 1300 may, for example, include a first phenomenon interface 1302 configured to interface with a first augmediated-reality space 1000, and a second phenomenon interface 1306 configured to interface with a second augmediated-reality space 1002. An example of the first phenomenon interface 1302 includes the interface assembly 902 of FIG. 1A and/or FIG. 1B.

In accordance with an option, the first phenomenon interface 1302 includes a first sensory phenomenon effector (such as the first sensory-phenomenon effector 912 of FIG. 1B) and a first sensory phenomenon sensor (such as the first sensory-phenomenon sensor 910 of FIG. 1B) each configured to operatively interact with the first augmediated-reality space 1000. The second phenomenon interface 1306 includes a second sensory phenomenon effector (such as the second sensory-phenomenon effector 914 of FIG. 1B) and a second sensory phenomenon sensor (such as the second sensory-phenomenon sensor 916 of FIG. 1B) each configured to operatively interact with the second augmediated-reality space 1002. An example of the first sensory phenomenon effector includes the first sensory-phenomenon effector 912 of FIG. 1B, and an example of the first sensory phenomenon sensor includes the first sensory-phenomenon sensor 910 of FIG. 1B. An example of the second sensory phenomenon effector includes the second sensory-phenomenon effector 914 of FIG. 1B, and an example of the second sensory phenomenon sensor includes the second sensory-phenomenon sensor 916 of FIG. 1B.

In accordance with an option, a processing assembly 1304 is configured to operatively couple to the first phenomenon interface 1302 and the second phenomenon interface 1306. The processing assembly 1304 is configured to operatively interact with the first sensory phenomenon effector, the first sensory phenomenon sensor, the second sensory phenomenon effector, and the second sensory phenomenon sensor. An example of the processing assembly 1304 includes the processing apparatus 908 of FIG. 1A and/or FIG. 1B. and may, in one implementation, be configured to operatively couple to the first phenomenon interface 1302 and the second phenomenon interface 1306.

The sensing and display apparatus 1300 includes (for example) the first phenomenon interface 1302. The first phenomenon interface 1302 may include a spatial-imaging sensor configured to include a finger tracker, a depth camera, and/or the like. The first phenomenon interface 1302 may be an example of a combination of the first sensory-phenomenon sensor 910 and/or the first sensory-phenomenon effector 912 of FIG. 1B. The first phenomenon interface 1302 is configured, in some implementations, to detect, monitor and/or track the wearer's (e.g., user's) appendages (hands, fingers, arms, legs, feet, and/or the like). Examples of the first phenomenon interface 1302 includes a camera, a three-dimensional spatial sensor, a three-dimensional scanning device, a three-dimensional sensing device, and/or the like. The processing apparatus 908 may be configured to execute spatial-imaging software. The apparatus 1300 further includes a second phenomenon interface 1306 configured to be wearable. The second phenomenon interface 1306 may be configured to be a head-mounted display, a see-through head-mounted display, a binocular head-mounted display, and/or the like.

The apparatus 1300 also, in one embodiment, includes the processing assembly 1304, which, in one implementation, is an example and/or component of the processing apparatus 908 of FIG. 1A, and may include a central processing unit and/or a graphics-processing unit, and/or the like.

The apparatus 1300 also includes, in one embodiment, the second phenomenon interface 1306, such as a spatial-imaging display that may include a head mounted display unit (to form a binocular optical see-through head mounted display, for example). In one implementation, the second phenomenon interface 1306 is configured to permit the viewer to view the first augmediated-reality space 1000 and to view the second augmediated-reality space 1002 of FIG. 1A (e.g., at the same time). In one implementation, a depth map 1308 is provided by the first phenomenon interface 1302 to the processing assembly 1304 (and/or to the program 907 of FIG. 1A). The second phenomenon interface 1306 is an example of a combination of the second sensory-phenomenon sensor 916 and/or the second sensory-phenomenon effector 914 of FIG. 1B.

The depth map 1308 is, in one implementation, a digital map of the physical artifacts identified in the scene (e.g., in the first augmediated-reality space 1000 of FIG. 1A) by the first phenomenon interface 1302.

FIG. 14 depicts a schematic example of the apparatus 1300 of FIG. 13 in one embodiment. The apparatus 1300 provides a combination of components configured to facilitate augmediated reality functionality. The apparatus 1300 may be implemented in a personal computer (such as, for example, a desktop, a laptop, a tablet, or a smart phone, and/or the like). In one implementation, the apparatus 1300 may be implemented as a device that may be worn on the head of the user as a pair of eye glasses. In one implementation, the apparatus 1300 includes hardware components configured to provide the user interface 800 of FIG. 8A, and a set of software applications (e.g., programmed instructions in the program 907 of FIG. 1A).

In one implementation, the apparatus 1300 is configured to facilitate viewing in a stereoscopic three-dimensional image on the second phenomenon interface 1306. The apparatus 1300 is configured to operate through and/or recognize all or any subset of user-gestural movements in the augmediated reality environment (e.g., in the first augmediated-reality space 1000 of FIG. 1A). The apparatus 1300 may, in one implementation, be configured to recognize controlled movements (gestures) of the user's body and/or appendages (e.g., fingers, hands, arms, legs, feet, and/or the like), such as to simulate interaction with computerized projections (such as, for example, a virtual keyboard) that are projected by an effector device. The effector device may project images in two-dimensions and/or three-dimensions that may be viewed in one or more coordinate systems. Such coordinate systems may be, for example, anchored to either the second phenomenon interface 1306 or the body, or registered to real world objects in the first augmediated-reality space 1000.

In addition, computerized applications (programmed instructions such as, productivity solutions, games, media, and/or the like) may, in one implementation, be controlled in a three-dimensional augmediated reality (e.g., in the first augmediated-reality space 1000 or the second augmediated-reality space 1002) through the apparatus 1300, such as with use of the user's finger, hand and/or arm movements in the space in front of the second phenomenon interface 1306, and may be registered in relation to physical components such as, for example, surfaces, window-sills and doorframes.

The apparatus 1300 can be configured for a variety of uses, such as, for example: gymnastic instruction, such as dancing, martial arts, track running, sports instruction, and/or the like in which an augmediated reality (e.g., virtual three-dimensional) instructor demonstrates movement. With two or more users wearing the apparatus 1300, the augmediated reality instructor is configured to correct the movement of the students (users) through cross-recognition of the movement through the apparatus 1300. The apparatus 1300 can be configured for a variety of uses, such as, for example: viewing full-stereoscopic three-dimensional movies that are fixed relative to a user's head, or to a surface. The apparatus 1300 can be configured for a variety of uses, such as, for example: an augmediated reality keyboard, where the tracked finger swipes through the keys and constructs words using logic, programmed instructions, and/or the like, such as those described below in SOFTWARE APPLICATIONS. Further examples are described below in SOFTWARE APPLICATIONS. In some implementations, the components of apparatus 1300 may be reduced, miniaturized, and/or the like, such as to fit, for example, on a pair of eye-glass frames in which the components of the apparatus 1300 may be imbedded in the frame of the eye-glass frame. The apparatus 1300 includes a cooperative combination of hardware devices and software (programmed instructions) configured to control the user interface 800 (FIG. 8A) and a set of software applications.

Referring to FIG. 13, in accordance with an option, the apparatus 1300 includes a combination of a first phenomenon interface 1302, a second phenomenon interface 1306, and a processing assembly 1304.

In accordance with another option, the apparatus 1300 includes the processing assembly 1304 operatively coupled to a first interface module 903 configured to operatively couple to the first phenomenon interface 1302, and also operatively coupled to a second interface module 905 configured to operatively couple to the second phenomenon interface 1306.

In accordance with yet another option, the apparatus 1300 includes an interface system. The interface system includes the first interface module 903 configured to operatively couple to the first phenomenon interface 1302, the second interface module 905 configured to operatively couple to the second phenomenon interface 1306, and a third interface configured to operatively couple to the processing assembly 1304.

In one implementation, the apparatus 1300 includes a first phenomenon interface 1302 configured to detect sensory phenomena (such as, visual phenomena, audio phenomena, tactile phenomena, and/or the like) received from the first augmediated-reality space 1000 of FIG. 1A. The first phenomenon interface 1302 may also, in one implementation, be configured to provide and/or transmit sensory phenomena (such as, an image, etc.) to the first augmediated-reality space 1000 of FIG. 1A. In one implementation, the first phenomenon interface 1302 may also be configured to be oriented (pointed) away from the eye of the user and toward the first augmediated-reality space 1000.

In one implementation, the first phenomenon interface 1302 includes a first phenomena sensor and a first phenomena effector. Reference to a first phenomena sensor may include one or more single instances (one) of the first phenomena sensor. It will be appreciated that reference to a first phenomena effector may include one or more single instances (one) of the first phenomena effector. The first phenomena sensor may, for example, include a spatial-imaging sensor, a depth camera, a finger-tracking camera (including respective software), and/or the like. Examples of the depth camera include: (i) the Asus (TRADEMARK) Xtion Pro (TRADEMARK) system; (ii) the Leap-Motion (TRADEMARK) system; (iii) the Creative (TRADEMARK) Interactive Gesture Camera; (iv) the PMD (TRADEMARK) CamBoard nano, and/or the like. The first phenomena effector may include a speaker, a lamp, an illumination device, a video or holographic projector, a laser, and/or the like.

In one implementation, the first phenomenon interface 1302 (e.g., by way of the first phenomena sensor) is configured to calculate, generate, and/or provide a depth map 1308 to the processing assembly 1304. The first phenomenon interface 1302 is configured to provide (return) coordinates and spatial orientation of various physical components (such as surfaces, windows, doorways) located in the first augmediated-reality space 1000 of FIG. 1A. The depth map 1308 is configured to allow tracking of the physical components (objects), such as for registration purposes. The first phenomenon interface 1302 may, in one implementation, include a finger-tracking depth camera configured to provide the depth map 1308. The first phenomenon interface 1302 is configured to transfer or transmit the depth map 1308 to a memory assembly 909 (FIG. 1A) coupled to the processing assembly 1304. Software (programmed instructions) stored in the memory module is configured to use the depth map 1308, such as to track the appendages of the user (finger, hand, arm, leg, foot) and/or physical component is located in the first augmediated-reality space 1000 (such as, a door frame, a window, a surface, ad/or the like). The depth map 1308 may be accessed and/or used by other software applications (programmed instructions) that are used with the apparatus 1300. The software stored in the memory assembly 909 may, in one implementation, be configured to calculate the physical [X,Y,Z] coordinates of the tracked item based on the depth map 1308 provided by the camera. The [X,Y,Z] mapping (depth or dimensional mapping) may occur within a coordinate system associated to the body of the user and/or the apparatus 1300 itself, or to a registered plane (e.g., associated with a physical object), for example.

For some implementations where the user wears the apparatus 1300, the first phenomenon interface 1302 faces and/or is otherwise oriented in a direction of a field of view of the user (also called the first augmediated-reality space 1000 of FIG. 1A). In one implementation, the field of view of the user is an eye forward viewing direction. For example, in one implementation, the field of view of the user may be a direction in which the user may be able to view the location of the user's fingers. For the case where the user is typing on a virtual keyboard, the user's fingers may be tracked by the first phenomenon interface 1302, even if the user is looking elsewhere. In one implementation, the second phenomenon interface 1306 faces a direction toward (e.g., is oriented toward) the eyes of the user (the second augmediated-reality space 1002 of FIG. 1A).

By way of example, the first augmediated-reality space 1000 may be, represent, and/or be associated to a physical place in which at least two users having their own instance of the apparatus 1300 may interact within the first augmediated-reality space 1000 (e.g., collaborate, compete, fight, and/or the like), by user interaction with the sensory phenomena (within the first augmediated-reality space 1000) provided by at least one or more instances of the apparatus 1300 associated with at least one or more users.

By way of example, the first augmediated-reality space 1000 may be, represent and/or be associated with a physical place in which at least one user has an instance of the apparatus 1300 and may interact within the first augmediated-reality space 1000 by user interaction with the sensory phenomena (within the first augmediated-reality space 1000) provided by the first phenomenon interface 1302 of the apparatus 1300.

The second phenomenon interface 1306 is configured, in one implementation, to detect sensory phenomena received from a user (such as tracking eye movements, facial expressions, and/or the like). The second phenomenon interface 1306 may also be configured to provide and/or transmit sensory phenomena (such as an image, video, graphics, sound, and/or the like) to the user in a second augmediated-reality space 1002 of FIG. 1A. The second phenomenon interface 1306 may also, in one implementation, be configured to be oriented (e.g., pointed) toward an eye or both eyes of the user and away from the first augmediated-reality space 1000. In other implementations, the second phenomenon interface 1306 may be configured to be oriented toward an area that is behind, above, below, around, remote, and/or the like with respect to the user.

In one implementation, the second phenomenon interface 1306 includes a second phenomena sensor and a second phenomena effector. Reference to a second phenomena sensor may include one or more single instances (one) of the second phenomena sensor. Reference to a second phenomena effector may include one or more single instances (one) of the second phenomena effector. The second phenomena sensor may, in various implementations, include a spatial-imaging sensor, a depth camera, a finger-tracking camera (including respective software), and/or the like. The second phenomena effector may, in one implementation, include an audio output (e.g., earpiece), and/or a display unit configured to display images to the eye of the user.

The processing assembly 1304 may be referred to in some instances as a spatial-imaging processing assembly, and is an example of the processing apparatus 908 of FIG. 1A. Examples of the processing assembly include a central processing unit, a graphics processing unit, microprocessor, application-specific integrated circuit (ASIC) and/or the like. The processing assembly 1304 may be configured, in one implementation, to compute spatial positions and orientations of objects, such as of the skeleton of fingers, hands or arms, and/or other appendages of the user, based on the information provided by and/or received from the first phenomenon interface 1302. The processing assembly 1304 is configured to execute programmed instructions, and may, in some implementations, be configured with and/or coupled to networking connectivity (wireless or wired). In one implementation, the processing assembly 1304 may be configured to provide a signal representing sensory phenomena (e.g., spatial images) to the second phenomenon interface 1306 (in the second augmediated-reality space 1002 of FIG. 1A). The processing assembly 1304 may include for example: a mobile phone, a mobile computer (e.g., attached to and/or built into a belt), a stationary computer (e.g., placed on a desk), and/or the like.

The processing assembly 1304 is configured to execute software (programmed instructions) and configured, in one embodiment, to calculate spatial coordinates of positions and orientations of fingers, hands, and/or arms (of the user and/or of the users in the first augmediated-reality space 1000), such as based on the information included in the depth map 1308.

The apparatus 1300 may, in one implementation, include a user-wearable frame configured to be worn by the user (such as a head-mountable frame, eye-glass frame, visor, mask, and/or the like), and may also be configured to support any combination of the components of the apparatus 1300.

Software Applications

The software applications (programmed instructions), described below, may be configured to cooperate with the apparatus 1300. In one implementation, the software applications are configured to use the depth map 1308 (FIG. 13) stored in the memory assembly 909 of FIG. 1A. The depth map 1308 is provided by the first phenomenon interface 1302 (e.g., via a sensor associated therewith), such as to the processing assembly 1304. Various software applications may be configured to produce graphical images based on the depth map 1308, and to display the graphical images to the user (e.g., via the second phenomenon interface 1306). In one implementation, the graphical images depict corresponding movements of a tracked finger, hand, arm, leg, foot, wand, and/or other user appendage and/or physical component (e.g., window, door, surface, and/or the like) located in the first augmediated-reality space 1000.

Examples of the software applications include a user-interface application configured to manage the user interface 800 (depicted in FIG. 8A) for a shooting game. The software applications are configured to facilitate user interaction techniques and user tracking (of gestures); for example, in one implementation, the index finger of the user may be tracked as a barrel of a gun, and the shortening of the distance between the thumb end and the palm (by bending the thumb), indicates the user's desire to trigger the firing of a virtual gun. The software applications are configured to augment images, such as virtual targets displayed in the first augmediated-reality space 1000 of FIG. 1A, in which the targets may be shot at with the virtual gun, and the images are displayed to the user, via the second phenomenon interface 1306.

An example of the software application includes an augmediated reality shooting game. The software application is configured to facilitate user interaction techniques and user tracking (e.g., in a similar way as that used in the shooting game). The software application is configured to display a virtual target that is registered relative to the real physical world and/or objects therein. The virtual target is shot at using a virtual gun or weapon. The registration (between the virtual target and the physical object) may occur by the tracking of the physical components (e.g., room components), such as by way of the depth map 1308.

An example of a software application may include an augmediated reality keyboard. The software application is configured to provide and/or display graphics to the user: a virtual keyboard exists underneath the field of view shown by the second phenomenon interface 1306 to the user. Once the interaction technique (e.g., user gesturing motion) is detected by a sensor of the apparatus 1300, such as "Open Hand Raising/Lowering Keyboard" gesture, the software is configured to cause an image of the keyboard to rise and enter the field of view of the user. In one implementation, the virtual keyboard may be fixed within a coordinate system of the second phenomenon interface 1306, of the user's body, relative to a registered physical component, relative to an orientation of the apparatus 1300, and/or the like. In one implementation, the software is configured to interact with the user in the following manner. A user gesture is used by the user for an Open Hand Raising/Lowering Keyboard gesture. Once an opened hand is visible (e.g., at least a threshold number of finger tips, e.g., two) for more than a predetermined amount of time (e.g., one second), the software is configured to raise the augmediated reality keyboard to the field of view of the user. The user may initiate a "Swiping Finger Input Device" gesture that the software is configured to respond thereto. The software is configured to detect a gesture in which the open hand gesture may be disabled (e.g., by closing the hand, or tracking just one finger), and in response, the software causes the image of the augmediated reality keyboard to be lowered to remove the keyboard from the field of view of the user. The lowering of the image of the augmediated reality keyboard may be accomplished once the hand (of the user) is open again for more than a predetermined amount of time (e.g., one second).

In one implementation, the software may be configured to respond to another user interaction technique, including a swiping finger input device. The user swipes through the desired keys of the augmediated reality keyboard. This may be achieved, in one implementation, by fixing both the tracked finger's motion as well as the static location of the keys to the same z plane. In this example configuration, the [X,Y,Z] coordinate system may be fixed to the second phenomenon interface 1306, the user's body, to an orientation of the apparatus 1300, to a registered physical component in the first augmediated-reality space 1000 such as a desk or sphere, and/or the like. Once both the input motion and the static keys are fixed to the same object (e.g., plane, surface), by moving the finger, the user may allow the input device to swipe along the [X,Y] coordinates within such a coordinate system, as such: the [X,Y] coordinates of the finger are returned from the first phenomenon interface 1302 (e.g., via the depth map 1308) and are updated in the scene (the first augmediated-reality space 1000). As the [X,Y] coordinates of the finger change, the keys (each fixed in their location in relation to the second phenomenon interface 1306, body or object) are intersected by the fingers. Each key that is intersected may trigger an action event that may propagate its key ID (identifier) to one or both of a local and a back end process. The communication with a backend process may be, for example, via network communications. In one implementation, the back end process determines what word was intended to be written, such as via pattern recognition and/or natural language processing, and returns the intended word, or word suggestions. In another example configuration, the [Z] parameter is not fixed, and the finger itself may intersect with the virtual keys hovering in space. In yet another example configuration, the virtual keys may appear as three-dimensional shapes (e.g., bumps, spheres, cubes, buttons, lights, and/or the like) on top of a surface or object, or hovering in the coordinate system fixed to the second phenomenon interface 1306 or user's body, and the finger may finger press on these bumps to achieve typing. In other implementations, appendages other than or in addition to the finger (e.g., a stylus or wand, arms, hands, groups of fingers, legs, feet, and/or the like) may be employed for typing and/or other interaction with a virtual keyboard.

An example of a software application may include a news reading application (news carousel). In one implementation, the software may be configured to: (A) display (to the user) graphics including transparent shapes (e.g., bubbles) with article/media titles (e.g., as opaque three-dimensional mesh rendered letters) therein; and (B) rotate the graphics about a visually displayed axis and/or an invisible vertical axis. The axis may be fixed relative to the second phenomenon interface 1306, to the user's body, and/or to a vertical axis within a tracked room in the first augmediated-reality space 1000. A carousel may be tracked as well. In an implementation of the last case (where the vertical axis is within a tracked environment), if the user turns away from the carousel, the transparent shapes encapsulating the text would disappear, and when the user turns back, the text would reappear in the last location that the text occupied while in the field of view of the user. As the text is swiped left and right, e.g., by using an interaction technique such as a "Bunched Swipe" gesture, the articles revolve about the axis. The article (media) closest to the user may be selected, e.g., by using an interaction technique such as a "Squeeze to Move and Pop" gesture. Once the article is popped, the body of the article grows within the field of view; the article gets bigger than a single transparent shape (e.g., bubble), or the article remains the size of the transparent shape; the user may read the article.

The software is configured to facilitate a user-interaction technique, such as recognition of a bunched swipe gesture. A number of fingers may be bunched together, and this gesture may be tracked, such as by detecting the tip of the index finger and the tip of the middle finger, and then tracking the tips together returning a set of [X,Y,Z] coordinates from the depth map 1308; a swiping gesture by the user in any direction may then, in one implementation, cause rotation, e.g., of the virtual carousel, about the vertical axis in that respective rotation direction.

The software is configured to facilitate a user-interaction technique, such as a squeeze to move and pop gesture. An article within the transparent encapsulation shape (e.g., a bubble) may be selected, and moved based on the degree of squeezing which may, in one implementation, be determined in accordance with the following example:

Operation (1) includes recognition of a moving squeeze gesture; for example, the tracked distance between the index finger and thumb is measured. If the bubble is above a certain threshold (e.g., 5 centimeters), and below another threshold (e.g., 10 centimeters) the shape is moved along the direction of motion of the hand (similar to dragging a mouse in three-dimensional space).

Operation (2) includes recognition of a popping squeeze gesture. If the distance is below both the thresholds, the shape is popped, and in this case the body of the article grows to fill the field of view. In an example configuration, the user sees the un-popping of a shape (i.e. the shape re-encapsulates the body of the article or media) when the bunched swipe gesture (motion) is applied to an article or media item.

Operation (3) includes recognition of a no motion. The software is configured to detect if the distance is above both thresholds and the shape was in motion, and whether the shape becomes still. If the shape was originally still, the shape will remain still.

An example of a software application may include multiple stereoscopic three-dimensional presentations on surfaces. In one implementation, the software is configured to track the user in accordance with the following example: using a surface-tracking technology such as a fiducial marker, or the hardware system's native physical component depth tracker, the position and orientation of one or more surfaces (e.g., walls) in an environment may be tracked. In one implementation, the software may be configured to present graphical images to the user, such as by the following example: a stereoscopic or otherwise two-dimensional and/or three-dimensional image(s) (e.g., movie, internet web page, virtual bookshelf, virtual art gallery, and/or other media presentation) is fixed in relation to the one or more tracked surfaces for viewing. In one implementation, complimentary segments of the same movie frame or media item may be displayed on different walls and, in a further implementation, their cumulative effect provides the illusion of depth in all directions for a single frame. In another implementation, all presentation types may be interacted with (e.g., to perform the operations start, stop, forward, reverse, pause, scroll, use keyboard in, pan, zoom, rotate) using the tracked hand.

An example of a software application may include virtual sculpting. In one implementation, this software may be configured to present a virtual shape (e.g., polyhedron such as a cube) that may be fixed relative to a tracked surface and/or object (e.g., have one face coplanar with a tracked physical component such as a desk), or in space in front of the user. In one implementation, the tracked hand's skeleton may be used to sculpt the virtual object and change its configuration, by sculpting any point of interaction between the tracked hand and the virtual object (e.g., using a realistic clay sculpting metaphor whereby the polygon is dynamically dented inwards toward the center of mass as a finger intersects with it). In one implementation, using a virtual menu (palette) that appears to hover on top of the user's depth-tracked arm, the user may dip his other hand into the palette that hovers above the hand and use the other hand to apply effects, such as texture, color, transparency or opacity, brightness, and/or the like to the cube. In another implementation, the object may be a composite of multiple other objects that may be grouped in layers. In such an implementation, a selection menu item may permit the tracked hand to indicate a layer/object selection, and then a sculpt/texture menu item may permit the tracked hand to sculpt or texture the selected item.

An example of a software application includes an augmediated reality instructor in the room with or without multiple students (users). In one implementation, the software may be configured to track user movements, for example: the physical component that is tracked in this case is the room (e.g., a surface such as a floor). In an example mode of operation, the software facilitates a game of "Boxing against Muhammad Ali", and the user's clenched fists are tracked. In another example mode of operation, the software facilitates "Group yoga instruction", and the body of the first user is tracked by the second user's depth camera. In one implementation, the animation of the augmediated reality instructor appears in the same position orientation and scale to both users within world coordinates, as their position, rotation and scale are mutually tracked using a social tracker method.

In one implementation, the software is configured to facilitate a game "Boxing against Muhammad Ali", in which the software is configured to present a graphical image of a life-sized, three-dimensional (stereo or otherwise) augmediated reality instructor (such as, a virtual Mohammad Ali) that appears facing toward the user from a near distance as seen through the second phenomenon interface 1306 of the apparatus 1300. The virtual figure is connected and/or registered to the physical component tracking (e.g., the floor). The virtual figure may punch the user, who may duck and avoid a punch (thus gaining points) or may receive a punch (thus losing points), or may punch the virtual figure (thus receiving points) as the game progresses.

In one implementation, the software is configured to facilitate a game "Yoga Instruction", in which the software is configured to operate a first mode, including individual yoga instruction; on top of the floor, an augmediated reality instructor is superimposed in the augmediated reality environment. In the case of yoga, for example, the augmediated reality instructor is positioned at a distance from the user, facing the user and showing the user the correct yoga motions. The user imitates the motions provided by the augmediated reality instructor in such an event.

In one implementation, the software is also configured to operate a second mode, including yoga instruction and correction; to achieve this interaction, one example configuration includes two or more users facing each other at a distance above a particular threshold (such as, 5 meters). A sensor (e.g., depth camera) of a first user operates to track a skeleton of a second user, and vice versa. Next, the augmediated reality instructor will be superimposed between the users, and based on the skeletal tracking, turn to the relevant user and correct his form and provide relevant instruction for various yoga movements. In another example configuration, another separate sensor (e.g., depth camera) may face a single user wearing the second phenomenon interface 1306 (depicted in FIG. 13), and the augmediated reality instructor may correct the motions of the single user based on the user's skeletal position.

An example of a software application may include an augmediated reality strategy, life-simulation game, simulator and/or the like that is tracked to a physical surface, such as using marker-less tracking and seen in three-dimensional space. In one implementation, the software is configured to include a mode for a user interaction technique and tracking; the hand of the user may interact with (e.g., smack, high-five, caress, and/or the like) an avatar/structure within the virtual world. The virtual sandbox of the game/simulator may be fixed relative to a surface or physical component that is tracked (such as a bed, a floor and/or a ceiling). The software may be further configured, in one implementation, to present a graphical image, such as, upon interaction with the user's hand, an avatar may react with a particular animation sequence (e.g., when "smacked", the avatar will jump). In one implementation, registered user gestures are correlated to displayed outputs, such as animation sequences, via records stored in a database (e.g., including linked gesture and output tables).

An example of a software application may include a social tracker. In one implementation, the software is configured to track user gestures associated with social interactions, and may be implemented using a marker-based and/or marker-less tracking strategy (e.g., in one implementation of a marker, a glow-in-the-dark, or otherwise visible under lighting fiducial, or other physical tracker, such as may be attached to a part of the apparatus 1300). In one implementation, the marker-based tracking system is configured to improve tracking. Additionally, this approach may use a unique identifier (ID) for each pair of glasses (e.g., in the example, each marker may be and/or have a unique ID), that may, in one implementation, be connected by the users' data via their social network username if selected and/or desired. As such, social network information may be exchanged between users of this system. Since the tracker is previously identified by the system, one user may know the position and orientation of another user by observing his head (wearing glasses). This may permit, for example, a bubble graphic popping out and becoming fixed to a user's instance of the second phenomenon interface 1306, with information about the user. Additionally, this ID tracker may, in one implementation, permit the identification of users whose faces are obscured by the glasses, who may otherwise not be able to be identified with face-identification software.

For example, in one implementation, the software (social tracker) may be configured to operate in a first mode (a) and a second mode (b). In the first mode (a), the software is configured to facilitate connectivity between instances of the apparatus 1300 (e.g., two way connectivity and/or multi way connectivity). In this mode, provided that the glasses are connected to a network, social network information is exchanged between the users via a social interface. If they are friends on a social network, they may view common friends, photographs, etc. on the user interface 800 in their instance of the apparatus 1300. If they are not friends, they may request each other's friendship using guidelines similar to the following examples, such as may be enforced by program 907.

A first guideline (for the social tracker software) includes a non-friend mode: in one implementation, the only permissible thing to do with a non-friend (requested party) is to send a special form of friend request. However, before such a request is sent, information about the requested party may be shown to the requestor's instance of the second phenomenon interface 1306. This information may arrive at the requestor's glasses during or after the requested party was tracked by the requestor's camera. In one implementation, the information does not include the requested party's name, only his face, for example so that the same degree of information behind a non-digital face to face exchange may occur in this system, prior to establishing friendship. Additionally, the face-only request may, in one implementation, prevent and/or limit future search, stalking, inbox spamming, and/or the like.

A second guideline (for the social tracker software) includes a friend mode: in one implementation, any information that is currently permissible by a given social network API for exchange between friends may similarly be exchanged in this digital social system. The second mode (of the social tracker software) includes interaction between a user of the apparatus 1300 and a person who does not have or use an instance of the apparatus 1300 (one way connectivity). This may refer, in some implementations, to any situation in which party A (observer having the apparatus 1300) receives information, e.g., via a social network from observing the face of Party B, who is not wearing an instance of the apparatus 1300.

Regarding privacy (for the social tracker software), the software is configured, in one implementation, to facilitate an accept mode, in which in any instance of the apparatus 1300, the user may give user permission to be tracked bare-face (this may be toggled and disabled), in exchange for the right to track others. In one implementation, a user cannot have only one privacy privilege (i.e. either the right to track, or the right to be tracked) at any given moment, but may have both.

An example of a software application may include a racing game or a spaceship game. In one implementation, the software may be configured to facilitate user interactions and present graphical images to the users (via the apparatus 1300). The hands are tracked and a virtual vehicle displayed on the apparatus 1300, and the software reacts to the relative positions of the hands in space (e.g., the vertical/horizontal offset between the hands, which cumulatively act, for example, as a steering wheel, joystick, throttle, gear shift, and/or the like). In one example implementation, this may be achieved by measuring such offsets, which are used to control the rotation of the steering wheel. In another example implementation, the distance of the hands from the camera may control another aspect of the vehicle's trajectory (e.g., the altitude or pitch of an aeronautical vehicle). The fingers (e.g., thumbs) may also be tracked, in order to provide additional instructions for the logic of the game (e.g., the pressing down of an upright thumb toward its fist could make the spaceship shoot). In another implementation, the right thumb controls acceleration/changing gears, and the left thumb controls braking/changing gears.

An example of a software application may include a point cloud implementation. In one implementation, the software may be configured to track physical components and/or virtual components, such as in the first augmediated-reality space 1000 of FIG. 1A. In one implementation, component tracking includes the obtaining of a point cloud (e.g., from the depth sensor). The depth image, described in this example as an image which assigns a value at every pixel containing the z-depth of the coincident scene point from a ray through that pixel, may be supplied in one implementation using a camera which is pre-calibrated with a pinhole camera model. This model supplies a focal length and principal point, defining how the sensor's lens scales pixels in real-valued metrics (e.g., millimeters). Every pixel in the depth image in this example produces a three-dimensional point by subtracting the principal point, dividing by the focal length, and then scaling by the z-depth value at that pixel. This represents that an infinite ray begins at that two-dimensional pixel on the image sensor plane, and is projected into the scene, intersecting some three-dimensional physical location at a distance consistent with the z-depth value at that pixel of the depth image. This yields a three-dimensional point cloud, per-frame, from each image in the two-dimensional depth sensor. The combination of point clouds from several frames occurs in this example, as the user moves about the environment, yielding a larger, registered three-dimensional scene point cloud that is larger than a single image frame may collect. This may be achieved, in one implementation, using computer vision techniques to match similar points from different frames, representing the same physical points in the scene. By analyzing how these static three-dimensional point locations move in the two-dimensional image or the three-dimensional point cloud as the user moves about the environment, the system deduces the motion of the user (in the form of a three-dimensional rotation matrix and three-dimensional translation vector) as well as the structure in the scene, a technique referred to in some implementations as simultaneous localization and mapping (SLAM), or structure-from-motion (SFM). In one implementation, the user may do this in real-time, so that as the user moves about the environment, rotates his head in-place, and/or the like, the user may combine three-dimensional point clouds from different views into a consistent coordinate system, yielding a larger three-dimensional scene map in a common coordinate frame over which common graphics may be placed and, e.g., held motion-less, regardless of user motion.

User Interface

The following provides a description of the user interface 800 of FIG. 8A in one embodiment. The user interface 800 is configured to be controllable by use of the apparatus 1300, such as via user gestures, motions, and/or the like. In one implementation, there are various levels to the user interface 800. For example, there are four levels, including: Level (1): home screen level; Level (2): folder level; Level (3): application level and file level; and, Level (4): settings level.

Level (1): Home Screen Level

An icon may represent a software application and/or data. In one implementation, the icon may be represented by a bubble icon or any shaped icon. In one implementation, a bubble icon is a semi-translucent sphere resembling a bubble. The icon may include an application logo. For example, inside the bubble icon there may be a three-dimensional opaque or mostly opaque application logo. In one example design, the ratio of logo to surrounding sphere may be approximately 1:5. Together, the bubble icon and the application logo may include effects that elicit and/or are associated with bubble-like behavior such as: reflecting (e.g., at least in part) an image of the user, reflecting the sunlight, simulating air flowing on the bubble and changing bubble shape slightly, simulating another physical object pressing against the bubble and changing its shape slightly, and/or the like.

The following is a description of some user-interaction techniques usable with the apparatus 1300 in some embodiments.

A first user-interaction technique includes the translation and rotation technique, such as moving of and/or through icons displayed on the user interface 800.

A translation and rotation method includes, in one implementation, a "Relative Hand Motion Hover-Over Pre-Selection" mode. This mode allows navigation quickly between the icons in the user interface 800 without a need for depth perception of hand relative to icon. Instead, the relative direction of tracked hand motion moves a virtual indicator of a selectable icon. In an effort to provide visual feedback, in one example design, the currently hovered-over (homing targeted) bubble may be slightly opaquer than its neighbors, and its hue may be more saturated. Inner illumination may be a third example design for the virtual indication of selectability. The hovered-over icon may be selected using any of a variety of selection techniques. The hovered-over icon may change if the hand moves in the direction of a new icon, which would in turn, become the new homing target (e.g., to select the rightmost icon from the particular row of icons in the field of view (FIG. 9A and FIG. 10A), the user moves the tracked hand right). To move to a new row of icons (e.g., open the contents of a folder) right after the folder has been selected—as the next level of icons is emerging into the field of view—the user moves his hand away from the camera. Once the user does so, an icon from the same column, in the next row, becomes highlighted.

Another example of the translation and rotation method may include a "Squeeze to Move Translation" mode. The tracked distance between two fingers (e.g., index finger and thumb) is measured. If this condition and/or measurement is above a certain threshold (e.g., 5 centimeters), and below another threshold (e.g., eight centimeters) the nearest shape may be moved, according to the direction of the tracked hand. In one example implementation, the edges of the icon stick to the locations of the two fingers, and once the fingers are spread, physically realistic warping (of the icon) during finger motion may be effectuated. This continues to occur until the upper threshold distance is passed, after which the icon remains put. In another example, the centroid between the two fingers is tracked, and the icons move along its path.

Another selection technique includes the popping of icons. A method for popping of icons may include a "Squeeze to Pop Selection" gesture. In this example selection interaction technique, if the distance between fingers is below the lower threshold (e.g., 5 centimeters), this triggers the popping of the icon, releasing of icon contents, the opening of the application whose logo is inside the icon (e.g., bubble), and/or the like. Another method for popping an icon includes a "Finger to Pop Selection" gesture; intersection of a tracked fingertip with the icon triggers its opening/popping. Another method for popping an icon includes a "Grab to Pop Selection" gesture; the clenching of a fist may be tracked, e.g., from a starting mode of at least two fingers ("open"), to an ending mode of all fingers closed, a closed fist, and/or the like ("closed"), e.g., to trigger the opening/popping of an icon.

In one implementation, the software of the apparatus 1300 is configured to provide an animation technique. An example of an animation technique includes a "Cycle Bubble Animation" technique. Once the apparatus 1300 is turned on, a number of bubbles enter a limit cycle into the field of view from the lower right screen, such as via an arc trajectory, to the center screen. Once the bubbles do so, the bubbles begin to line up in a row along the middle row of field of view in a 3×3 grid.

Another example of an animation technique includes an Inward/Rolodex Cycle technique, which may include the emerging of a new level of icons, once a folder icon is selected. Additionally, in the case of the home screen level of icons (top level), for example, after the opening animation sequence (e.g., cycle bubble animation) completes, the icons are momentarily underneath the field of view (FIG. 8A). In this initial state case, the Inward/Rolodex Cycle technique may commence automatically after a predetermined short period of time (e.g., 0.5 seconds), without the selection of an icon. In one example implementation, the icons of the folder (one level below the folder icon) enter the field of view by cycling rapidly [270°] about the lower horizontal line in the 3×3 grid from behind the line and then above it toward the user, stopping within the lower third of the field of view. This cycle improves the speed of high frequency multiple icon selection, and provides a framework for muscle memory on the path to particular end applications (e.g., facilitates efficient usability for end applications). Other example implementations include, but are not limited to, a vertical rise of the next row of icons.

The following describes an example of a method of progression at the HOME SCREEN LEVEL, in one implementation, using the following operations:

Operation (a) includes presenting a greeting animation (for a Cycle of Bubbles).

Operation (b) includes executing an interaction technique. If an open hand is detected by the gesture-recognition camera for at least a particular threshold (e.g., one second) four bubble icons appear from below and enter the bottom third of the field of view (the bottom three squares in the 3×3 grid (see FIG. 8A).

Operation (c) includes if the home screen icons are in the field of view, and available, e.g., for one or more of Finger to Pop, Grab to Pop, or Squeeze to Pop selection techniques (see FIG. 8C).

Level (2): Folder Level

In one implementation, the x axis lies along the bottom of the field of view 802 (e.g., the lower line in the grid). The following is an example progression at the folder level, which uses a method having the following operations in one implementation:

Operation (a) includes interaction with an interaction technique. A selection technique occurs (e.g., the "play" folder is selected).

Operation (b) includes displaying four folder icons that enter the lower field of view via an inward spiral (see FIG. 9A and FIG. 9B).

Operation (c) includes interacting with a "Relative Hand Motion Hover-Over Pre-selection mode" gesture, so that a different icon may be selected.

Operation (d) includes determining whether another subfolder is selected. If detected, then operation is returned to operation (a); otherwise if a game icon is selected, then the operation proceeds to level 3 (to play the game).

Level (3): Application and File Level

An end application is a software application configured to provide (display) a leaf of the tree of icons. For example, in one implementation, the tree of icons may be a n-ary tree, e.g., in which each node has at most n children. In another implementation, the nodes may have different maximum number of children, an unconstrained number of children, and/or the like.

In one implementation, a spiraling logo occurs when a bubble is popped, such as via a selection technique. In one design, a three-dimensional icon of the application begins spiraling very rapidly about a vector from the lower left to the upper right as the icon moves from the lower left to the upper right toward the top right cell of the 3×3 grid and/or array. During the transition, in one implementation, the icon is gradually minimized to approximately a 1:10 icon-to-cell ratio (see FIG. 10B). This provides visual feedback about the state of the apparatus 1300, in case a non-invasive application decides to remain open without having any items in the field of view (e.g., waiting for a person to come into the field of view), or in standby mode.

A software application is configured in one implementation to provide a "Jumping out of the Bubble" effect. When a component (displayed on the user interface 800) associated with an application has been selected, the component may appear to be entering the field of view by scaling up from previously invisible miniature versions within the icon. The following is an example of progression at the application and file level, using the following method having the following operations in one implementation: Operation (a) includes spiraling logo and simultaneous opening of the application by the application jumping out of the recently popped bubble (e.g., see FIG. 10A and FIG. 10B). Operation (b) includes permitting the user interface 800 to take over the field of view.

Level (4): Settings Level

A "Settings Selection Technique" gesture includes the following, in one implementation: when inside an application, contextual settings will exist in every application that wants to make use of them. One example of a selection method and location for settings icon is as follows: the icon may be selected by entering the hand into the field of view, in the upper half of the rightmost column of the 3×3 grid for a predetermined amount of time (e.g., two seconds). Then a bubble will appear in the top right cell, which may later be selected, such as via Finger Selection methods (e.g., see FIG. 11A).

A settings screen (of the user interface 800) is a screen in which once the settings icon is selected; a number of vertically stacked icons (for example, initially four) enter the rightmost column of the field of view, such as via vertical rolodex cycling (e.g., see FIG. 11B). The icons may, in one implementation, represent the settings icon categories, and may be shaded with a silver hue that is semi-transparent, in one implementation.

A "Chewing Gum Toggling of Settings" (see, e.g., FIG. 11C) is configured for a setting selection that may include moving along a spectrum of values and/or selecting a value and/or degree within a continuum (e.g., a brightness level). In one implementation, when a setting category is selected, the icon pops and a line is formed between the location of the popped icon and the edge of the user's finger. In one particular design, the line may be curved, and as the finger moves away from the original icon location the line becomes straighter, as would a piece of chewing gum. In one implementation, once the line is stretched away from the static center of the icon, a three-dimensional number on the center of the magnitude line and/or vector indicates what value and/or percentage is reached (e.g., the longer the line, the higher the number). In one implementation, for discrete, non-continuous, non-spectral, and/or the like settings (e.g., discrete selection such as Wi-Fi network selection in the Wi-Fi settings), vertical Rolodex Cycling about the right edge of the field of view will present additional options that may be selected via other gestures.

In one implementation, a meditation mode is one in which non-emergency calls, messages, and application uses are blocked for the amount of time pre-specified, or until the button is toggled. A user interface component indicating time feedback (e.g., a sand timer) may be displayed to indicate time passed thus far.

The following is an example of progression at the settings level, in one implementation, and includes a method having operations similar to the following example: Operation (a) includes having local settings in each individual application, which are accessible via a settings selection technique. Operation (b) includes: displaying, once a local settings top right icon is selected, a rolodex cycle of vertically stacked settings icons, which may cycle clockwise or counterclockwise and/or enter a right column of the 3×3 grid about the axis formed by the rightmost column, similarly to the horizontal selection of a folder icon. Operation (c) includes displaying (if a spectral setting is selected) a Chewing Gum Toggling of Settings. If a discrete settings item is selected, another set of icons enters the field of view for selection.

Level (5): Overarching User Interface Themes and Gestures

LEVEL 5 provides implementations for themes and gestures in various implementations. For example. additional interaction techniques may include a gun hand motion used in a shooting game, to indicate shooting a picture or a video. Another example includes parallel two-handed raising and lowering of a flat desktop of icons, in which the icons enter from under the field of view upwards, and back down again to remove from the field of view. An option includes rotating of a virtual knob, to change continuous settings (e.g., brightness). Another option includes using a zoom feature, in which motion from a flat hand whose palm is facing up (e.g., the palm spends a predetermined amount of time flat, before the Come to Zoom motion is initiated) to fingers simultaneously bent (similar to the "come here" natural gesture) for zoom. Another implementation uses only one finger that changes from straight to bent, while the remaining finger or fingers are statically bent. Another implementation includes the ability to hold the zoom level constant by removing the hand from the field of view. Another option includes a Zoom Out gesture. This gesture may be identical to the Come to Zoom gesture, except that the gesture starts with all the fingers bent (e.g., clenched into a fist) for a predetermined amount of time (e.g., one second). The zoom out occurs when the fingers unbend. Another option includes the thumb-up gesture, which may be used for liking (indicating approval) of a picture on a social network, or within the native operating system.

Another option for LEVEL 5 includes an elevation gesture and the icon search mode (e.g., see FIG. 12). Example (i) includes an elevation gesture; this is, in one implementation, an aid to the search mode detailed below, and consists of a gesture of pushing the bubbles upwards into the field of view with one or two hands. The pushing may be done, for example. by extending the user's forearm or forearms under the field of view with his palm or palms open and aimed upwards. As the user's palm or palms move upwards into the field of view, the icons rise (e.g., in a manner resembling the behavior of naturally occurring bubbles that are blown upwards from below). Example (ii) includes a search mode or a bird's eye view of the icons tree; this facilitates a visual search. The following provides a description of an example of a search progression in one implementation: Operation (a) includes a visual search having an ability to elevate the entire set of user-interface icons, and their sub-folder icons (e.g., see FIG. 12) into the field of view using the elevation gesture, and dynamically scale the display such that all icons from the root icons to the leaf icons are inside the field of view. Then, the lower leaves of the tree may be accessed in this fashion. Operation (b) includes manipulating the tree (e.g., where the tree is flexible to rotation and/or scaling), such as though the logos, and the icons are facing the user.

Another LEVEL 5 option includes in one implementation, having bubbles assume natural physical characteristics. For example, Operation (a): when the tracked hand moves in close proximity to the bubbles, the bubbles move faster away from the hand. However, if the bubbles are farther away from the hand, they move progressively slower away from it. Operation (b): when a bubble icon is popped or opened using one of the selection techniques, there is a distinct "pop" sound. Operation (c): in visual-search mode, as normal icon bubble rows are blown away with said rapid gestures, they momentarily and physically accurately blow out of the field of view, and in a non-natural but mirroring fashion, they re-enter the field of view in pre-specified locations. Notifications and alerts: a variety of example techniques may be employed to gain the user's attention in case of notification, within various implementations, for example:

Operation (a) includes once an application at a leaf of the file structure tree has a notification, its icon propagates to the level of the tree (e.g., 4-ary tree) of icons that is currently in view, squeezes to the center of the four icons with a red hue and a number appears on top of the traditional logo in the same scale, indicating the number of unread messages.

Operation (b) includes propagating a red hue for a leaf's icon, up toward whatever parent node is currently in the field of view, simultaneously inserting a miniature red bubble inside the parent's bubble with the leaf's logo and alert number.

Operation (c) includes the selection path to the leaf application that triggered the notification, may be either the traditional Selection path or a shortcut selection path that is instantiated with a shortcut gesture.

Operation (d) includes a miniature bubble representing the notification that is triggered within a leaf application may "stick out" of the parent bubble (which is currently in the field of view), allowing for a shortcut to the leaf.

Level (6): Application Tiling on Surfaces

In one implementation, a virtual canvas is an oriented planar surface on top of which three-dimensional virtual graphics may be overlaid. The canvas may be configured to add a third dimension as the canvas may be oriented, and the canvas may be seen from different angles, as a painting on a wall would look different to the human eye from different angles and orientations. In another implementation, three-dimensional graphics may be placed in relation to it.

In an example scenario, a user walks into a room, for example, a living room, and sits on a couch (wearing the sensing and display apparatus, e.g., configured as glasses). In front of the user there is a coffee table, a TV screen, and walls (e.g., one in front and one to the side). In one implementation, the software is configured to detect candidate canvases which may serve as surfaces on which to overlay graphics from the computer. In this example case, the canvases are the coffee table, TV screen, and/or the two walls. These surfaces may be indicated, to the user, in the second phenomenon interface 1306 with a visual indication (e.g., as semi-transparent filled oriented rectangles, indicating the size and orientation of these canvases). In one example, all open applications are at the bottom of the screen, shown as thumbnails/bubble icons. Consider, for example, an email window, a Facebook window, or a Microsoft Word document. The user may drag each application thumbnail using one or more of the interaction techniques discussed above (e.g., "Squeeze to Move" gesture to translate, then "Squeeze to Pop" gesture for opening and placement), one-by-one, to each of the candidate canvases.

In an example implementation, the software is configured to detect the chosen canvas via programmed instructions associated with a method similar to the following example.

Operation (a): in one example, the user selects a thumbnail for the application icon that the user wishes to display, and drags the thumbnail towards appropriate given canvas. In one implementation as the thumbnail is moved along this trajectory, a line is being traced out from an origin (e.g., from the second phenomenon interface 1306 or user's shoulder or base of the user's finger). This trajectory is intersected with each of the candidate planes, and a determination is made whether the trajectory has been intersected successfully, as the thumbnail is translated toward the canvas (e.g., the translation occurring above a predetermined distance from the icon's initial location toward the canvas, such as 20 centimeters). When said icon is close enough, the software may, in one implementation, deduce which application goes with which canvas, and automatically updates the graphics onto that canvas at the correct orientation. In another implementation, a user may direct which canvas to direct particular graphics, such as by exhibiting a gesture such as a flick or a throw, directing selected graphics and/or other display elements at a given canvas, surface, and/or the like.

Operation (b): in one example, once all applications have been assigned to a canvas, the software uses the depth map 1308 of FIG. 13 (which may be taken as static/unchanging for this example scenario) and is able to track the user's head in three-dimensional space (e.g., rotation and translation) as the user's head moves. Using the depth map 1308 as the coordinate system, the user may then get up and physically move about the environment, however the state of each canvas is maintained. Then, as the user moves between the canvases, the applications remain as they were originally chosen (assigned), and they are updated based on the user's current head orientation and position. In another example configuration in implementations this head-tracking/scene mapping scenario, the coordinate system of the second phenomenon interface 1306 (FIG. 13) is fixed and the room/physical components' three-dimensional map is tracked.

Operation (b): in another example, the user may put multiple applications on the same canvas, side-by-side. To select one of these chosen canvases for updating, the user may, for example, use a five-finger gesture to "select" a canvas. This may specify, in one implementation, that the user wants to adjust this display and/or the contents of the canvas, and the canvas may indicate graphically that it is selected for manipulation (e.g., the canvas starts blinking). Then, using a virtual vector calculated between the user's two hands, the application real-estate may be stretched, shrunk, or rotated (in-plane), using the magnitude, or angle of the vector.

Variations or modifications to the design and construction of the apparatus 1300, within the scope of the apparatus 1300, are possible based on the disclosure herein. Such variations or modifications, if within the spirit of the apparatus 1300, are intended to be encompassed within the scope of claimed subject matter.

Additional Description

The following clauses are offered as further description of the examples of the apparatus. Any one or more of the following clauses may be combinable with any another one or more of the following clauses and/or with any subsection or a portion or portions of any other clause and/or combination and permutation of clauses. Any one of the following clauses may stand on its own merit without having to be combined with another other of the clauses or with any portion of any other clause, etc. Clause (1): a sensing and display apparatus, comprising: an interface assembly including: a first interface module configured to exchange sensor signals and effector signals with a first space; and a second interface module configured to exchange effector signals with a second space, the effector signals being user presentable, at least in part, in at least one of the first space and the second space. Clause (2): a sensing and display apparatus, comprising: an interface assembly including: a first interface module configured to interface with at least one sensor signal representing sensory phenomenon received from a first space; and a second interface module configured to interface with at least one effector signal representing sensory phenomenon to the first space and to the second space. Clause (3): the apparatus of any clause mentioned in this paragraph, wherein: the at least one sensor signal and the at least one effector signal are presentable, at least in part, for user-sensory consumption in any one of the first space and the second space. Clause (4): the apparatus of any clause mentioned in this paragraph, further comprising: a processing apparatus being operatively coupled to the interface assembly, and configured to process the at least one sensor signal being interfaced with the interface assembly, and to process the at least one effector signal being interfaced with the interface assembly. Clause (5): the apparatus of any clause mentioned in this paragraph, further comprising: sensory-phenomenon sensors configured to transmit the at least one sensor signal derived from sensory phenomena received from the first space, and also configured to transmit the at least one sensor signal derived from sensory phenomena received from the second space. Clause (6): the apparatus of any clause mentioned in this paragraph, further comprising: sensory-phenomenon effectors configured to transmit the at least one effector signal associated with sensory phenomena to the first space, and also configured to transmit the at least one effector signal associated with sensory phenomenon to the second space. Clause (7): the apparatus of any clause mentioned in this paragraph, wherein: the interface assembly is configured to interface with the at least one sensor signal representing sensory phenomena received, via the sensory-phenomenon sensors, from the first space, and also representing sensory phenomena received from the second space, and also configured to interface with the at least one effector signal representing sensory phenomena, via sensory-phenomenon effectors, to the first space and to the second space. Clause (8): the apparatus of any clause mentioned in this paragraph, wherein: the first space is configured to be accessible by users; and the second is configured to be accessible by a single user. Clause (9): the apparatus of any clause mentioned in this paragraph, wherein: the at least one sensor signal is derived from any one of an audio sensory phenomenon, a visual sensory phenomenon, and a tactile sensory phenomenon. Clause (10): the apparatus of any clause mentioned in this paragraph, wherein: the at least one effector signal is derived from any one of an audio sensory phenomenon, a visual sensory phenomenon, and a tactile sensory phenomenon. Clause (11): the apparatus of any clause mentioned in this paragraph, wherein: the sensory-phenomenon sensors and the sensory-phenomenon effectors include: a first sensory-phenomenon sensor configured to transmit a sensor signal derived from sensory phenomena from the first space; and a first sensory-phenomenon effector configured to transmit an effector signal associated with sensory phenomena to the first space. Clause (12): the apparatus of any clause mentioned in this paragraph, wherein: the sensory-phenomenon sensors and the sensory-phenomenon effectors include: a second sensory-phenomenon effector configured to transmit an effector signal having sensory phenomena to the second space; and a second sensory-phenomenon sensor configured to transmit a sensor signal derived from the sensory phenomena from the second space. Clause (13): the apparatus of any clause mentioned in this paragraph, wherein: the first sensory-phenomenon sensor and the first sensory-phenomenon effector face a direction of a field of view of the user in the first space; and the second sensory-phenomenon effector and the second sensory-phenomenon sensor face a direction toward eyes of the user in the second space. Clause (14): the apparatus of any clause mentioned in this paragraph, wherein: the processing apparatus is configured to route the sensor signals between the first space and the second space. Clause (15): the apparatus of any clause mentioned in this paragraph, wherein: the processing apparatus is configured to route the effector signals between the first space and the second space. Clause (16): the apparatus of any clause mentioned in this paragraph, wherein: the interface assembly includes: the first interface module configured to interface with a first sensory-phenomenon sensor, the first sensory-phenomenon sensor configured to transmit a sensor signal derived from sensory phenomena received by the first sensory-phenomenon sensor from the first space; and the second interface module configured to interface with a first sensory-phenomenon effector, the first sensory-phenomenon effector configured to transmit an effector signal associated with sensory phenomena to the first space. Clause (17): the apparatus of any clause mentioned in this paragraph, wherein: the interface assembly includes: a third interface module configured to interface with a second sensory-phenomenon effector, the second sensory-phenomenon effector configured to transmit an effector signal having sensory phenomena to the second space; and a fourth interface module configured to interface with a second sensory-phenomenon sensor, the second sensory-phenomenon sensor configured to transmit a sensor signal derived from the sensory phenomena received by the second sensory-phenomenon sensor from the second space. Clause (18): the apparatus of any clause mentioned in this paragraph, wherein: the processing apparatus is configured to route a sensor signal received from a first sensory-phenomenon sensor to the second space via a second sensory-phenomenon effector. Clause (19): the apparatus of any clause mentioned in this paragraph, wherein: the processing apparatus is configured to route a sensor signal received from a second sensory-phenomenon sensor to the first space via a first sensory-phenomenon effector. Clause (20: the apparatus of any clause mentioned in this paragraph, further comprising: a user-wearable interface configured to facilitate user wearing. Clause (21): the apparatus of any clause mentioned in this paragraph, further comprising: a frame assembly being configured to fixedly support any one of: sensory-phenomenon sensors configured to transmit the at least one sensor signal derived from sensory phenomena received from the first space, and also configured to transmit the at least one sensor signal derived from sensory phenomena received from the second space; and sensory-phenomenon effectors configured to transmit the at least one effector signal associated with sensory phenomena to the first space, and also configured to transmit the at least one effector signal associated with sensory phenomena to the second space. Clause (22): the apparatus of any clause mentioned in this paragraph, further comprising: a frame assembly being configured to fixedly support any one of: a head-mountable assembly; a digital eye glass; a LiDAR unit; a vision system; an optical sensor; a display unit; a removable shade; an infrared transmitter; an infrared receiver; and a geophone. Clause (23): a method, comprising: receiving a sensor signal representing at least one sensory phenomenon received from a first space and from a second space; and providing an effector signal representing at least one effectory phenomenon to the first space and to the second space. Clause (24): the method of any clause mentioned in this paragraph, further comprising: processing the sensor signal and the effector signal. Clause (25): the method of any clause mentioned in this paragraph, further comprising: routing the sensor signal between the first space and the second space. Clause (26): the method of any clause mentioned in this paragraph, further comprising: routing the effector signal between the first space and the second space. Clause (27): a display apparatus, comprising: an interface assembly configured to interface with a first space and with a second space, and configured to convey sensor signals and effector signals associated with the first space and the second space; a processing apparatus operatively coupled to the interface assembly and configured to process the sensor signals and the effector signals conveyed by the interface assembly; and a memory assembly configured to tangibly embody a processing program including a sequence of programmed instructions configured to direct the processing apparatus to execute operations on the sensor signals and the effector signals. Clause (28): a user interface, comprising: a first interface section configured to display phenomena derived from a first space; and a second interface section configured to display phenomena derived from a second space. Clause (29: an apparatus, comprising: a first phenomenon interface configured to operatively interface with a first space; and a second phenomenon interface configured to operatively interface with a second space. Clause (30: the apparatus of any clause mentioned in this paragraph, wherein: the first phenomenon interface includes a first sensory phenomenon effector and a first sensory phenomenon sensor each configured to operatively interact with the first space. Clause (31: the apparatus of any clause mentioned in this paragraph, wherein: the second phenomenon interface includes a second sensory phenomenon effector and a second sensory phenomenon sensor each configured to operatively interact with the second space. Clause (32: the apparatus of any clause mentioned in this paragraph, further comprising: a processing assembly configured to operatively couple to the first phenomenon interface and the second phenomenon interface, and further configured to operatively interact with the first sensory phenomenon effector, the first sensory phenomenon sensor, the second sensory phenomenon effector, and the second sensory phenomenon sensor. Clause (33): a manifoldizer for the apparatus of any clause mentioned in this paragraph, said manifoldizer comprising: a gesture sensor for sensing a gesture of a body part of a wearer of the apparatus; a manifold generator responsive to a manifold starting gesture detected by the gesture sensor; a manifold contact detector for detection of contact between the wearer and a manifold; a manifold display generator responsive to an output of the manifold contact generator. Clause (34): a toposculpter, including the manifoldizer of any clause mentioned in this paragraph, and further including: a manifold integrator responsive to a substantially continuous manifold continuation gesture. Clause (35): A manifoldized display generator, including the manifoldizer of any clause mentioned in this paragraph, the manifold display generator for displaying an output of a virtual or real device. Clause (36). The manifoldized display generator of any clause mentioned in this paragraph, wherein: said manifold display generator displays a two-dimensional manifold comprising a rigid planar patch, embedded in a three-dimensional augmediated environment visible to said wearer of said digital eye glass. Clause (37). An abakographic user-interface comprising: a three-dimensional vision system, a processor, and a display, the processor including an exposure-integrator, the exposure integrator responsive to an input from the three-dimensional vision system. Clause (38). The user-interface of any clause mentioned in this paragraph, including: a manifold-dimension sensor and a gesture sensor, the gesture sensor responsive to an output of the manifold dimension sensor. Clause (39). The user-interface of any clause mentioned in this paragraph, wherein: the real-world physical object comprises a two dimensional manifold, and wherein the manifold dimension sensor determines whether a gesture is made along an abakograph, to an abakograph from within the manifold, or to an abakograph from within three-dimensional space not on the manifold. Clause (40): A three-dimensional sculpting system for generating manifolds in space, including: a three-dimensional vision system; an exposure integrator; and a display for showing an output of the exposure integrator, the exposure integrator accumulating exposures. Clause (41): The system of any clause mentioned in this paragraph, further including: a gesture sensor for sensing a gesture for initiating an exposure accumulation of the exposure integrator. Clause (42): the system of any clause mentioned in this paragraph, wherein: the gesture sensor for sensing a gesture for terminating an exposure accumulation of the exposure integrator. Clause (43). The system of any clause mentioned in this paragraph, wherein: the exposure integrator for generating a temporally growing manifold in three-dimensional space. Clause (44). The system of any clause mentioned in this paragraph, further comprising: a tangency sensor for determining a tangency of a body part of a user to a path defined by the temporally growing manifold. Clause (45). A method for abakographic compositions, the method comprising: allocating and clearing an exposure buffer; sensing a degree of exposure strength of an exposer; sensing a location, in three-dimensional space, of an exposer; adding to the exposure buffer, by an amount proportional to the exposure strength, in association with the location of the exposer. Clause (46). The method of any clause mentioned in this paragraph, wherein: the degree of exposure strength being a binary quantity determined by a gesture sensor. Clause (47). The method of any clause mentioned in this paragraph, wherein: the exposer is a light source, and the exposure strength is a degree of illumination of the light source. Clause (48). The method of any clause mentioned in this paragraph, wherein: the exposer is a fingertip, and the exposure strength is determined by a continuously variable hand gesture. Clause (49). The method of any clause mentioned in this paragraph, further comprising: initiating by a gesture sensor an abakograhic composition, the gesture sensor sensing a "gun" gesture of an index finger and thumb. Clause (50). The method of any clause mentioned in this paragraph, wherein: the exposure strength continuously variable by an angle between the thumb and the index finger. Clause (51). A method for toposculpting, the method comprising: allocating and clearing a toposculpting buffer, the method comprising: sensing a degree of exposure strength of an exposer; sensing a location, in three-dimensional space, of an exposer; adding to the toposculpting buffer, by an amount proportional to the exposure strength, in association with the location of the exposer. Clause (52). The method of any clause mentioned in this paragraph, wherein: sensing the location includes sensing tangency of a planar portion of a body part of a user of the method, to a toposculpture in progress, at a point of contact with the toposculpture at its most recent point, the exposure strength proportional to an output of the sensing tangency. Clause (53). A spaceglass apparatus for viewing scannable subject matter, comprising: a spatial imaging camera; a processor responsive to at least one output of the spatial imaging camera; a spatial imaging display selected from the group consisting of a holographic video display, a stereoscopic video display, and an aremac, stereoscopic display, wherein the spatial imaging display is responsive to at least one output of the processor, and wherein the spatial imaging display provides a Point-of-Eye image derived from at least some of the scannable subject matter. Clause (54). The apparatus of any clause mentioned in this paragraph, wherein the spatial imaging camera comprises a 3D camera. Clause (55): The apparatus of any clause mentioned in this paragraph, wherein: the processor includes a taction detector. Clause (56). The apparatus of any clause mentioned in this paragraph, wherein: the processor includes a homography in-trusion detector. Clause (57). The apparatus of any clause mentioned in this paragraph, wherein: the processor includes a spherical volumetric intrusion detector. Clause (58). The apparatus of any clause mentioned in this paragraph, wherein: the processor includes a bubble metaphor generator. Clause 59: The apparatus of any clause mentioned in this paragraph, wherein: the processor simulates a bubble menu, and a bubble menu selector responsive to an intrusion into a volume of a sphere of radius r located a distance of less than r from a part of a body of a user of the apparatus, the part of the body of the user being statistically significant in its degree of intrusion into the volume. Clause 60: A shared augmediated reality system for spaceglasses, comprising: a first spaceglass for use by a first user of the shared augmediated reality system, wherein the first spaceglass comprises a first spatial imaging camera; a second spaceglass for use by a second user of the shared augmediated reality system, wherein the second spaceglass comprises a second spatial imaging camera, wherein the first and second spatial imaging cameras are configured for spatial imaging of a subject matter; and a spatial imaging multiplexer for multiplexing a scanning from the first and second spatial imaging cameras. Clause 61: The shared augmediated reality system of any clause mentioned in this paragraph, wherein: the spatial imaging multiplexer is a time-division multiplexer. Clause 62: A digital eye glass apparatus for being viewed by one or both eyes of a wearer of the digital eye glass, comprising: at least one sensor for sensing light from a plurality of different directions; a processor responsive to at least one input from said sensor; and a display responsive to an output of said processor, wherein said display provides a point-of-eye image. Clause 63: The digital eye glass apparatus of any clause mentioned in this paragraph, wherein: said sensor is a 3D camera. Clause 64: The digital eye glass apparatus of any clause mentioned in this paragraph, wherein: the 3D camera implements 3D HDR imaging. Clause 65: The digital eye glass apparatus of any clause mentioned in this paragraph, wherein: the 3D camera includes a time-division multiplexer in cooperation with other 3D cameras worn by other participants in a shared computer-mediated reality environment. Clause 66: The digital eye glass apparatus of any clause mentioned in this paragraph, wherein: the 3D camera includes a variable amplitude multiplexer in cooperation with other 3D cameras worn by other participants in a shared computer-mediated reality environment, the variable amplitude multiplexer providing approximately identical gettings of subject matter in response to different degrees of illumination of the subject matter. Clause 67: The digital eye glass apparatus of any clause mentioned in this paragraph, wherein: the processor includes a synthetic aperture imaging constructor responsive to a lightspace generated by illuminators of more than one participant sharing a computer-mediated reality. Clause 68: A spaceglass system, comprising: one or more spaceglasses for spatially imaging subject matter in view of the spaceglasses, and further comprising: at least one 3D camera; a processor responsive to at least one input from the at least one 3D camera; a display responsive to an output of said processor, the display providing an EyeTap point-of-view rendering responsive to spatial information present in the subject matter. Clause 69: The system of any clause mentioned in this paragraph, wherein: the processor includes a comparametric compositor. Clause 70: The system of any clause mentioned in this paragraph, further comprising: a first spaceglass and a second spaceglass, and wherein the processor is used with the second spaceglass. Clause 71: The system of any clause mentioned in this paragraph, further comprising: a first spaceglass and a second spaceglass, and wherein the processor is used with the second spaceglass, and wherein the first and second spaceglasses are worn by two separate users, and wherein the processor including a superposimetric compositor. Clause 72: A spatial imaging device comprising: a lightspace analysis glass; a processor responsive to an output of said lightspace analysis glass; a lightspace synthesis glass responsive to an output of said processor; and a lightspace collinearizer. Clause 73: A gesture recognizing processor-implemented method, comprising: tracking a first environmental object in an environment via at least one sensor; assigning at least one environmental object identifier to the first environmental object; identifying at least one spatial coordinate associated with the first environmental object; associating a coordinate system with the environmental object identifier based on the at least one spatial coordinate. Clause 74: The method of any clause mentioned in this paragraph, further comprising: mapping a gesture of a second environmental object in relation to the coordinate system via the at least one sensor. Clause 75: The method of any clause mentioned in this paragraph, wherein: mapping a gesture further comprises: generating a point cloud in association with the second environmental object. Clause 76: The method of any clause mentioned in this paragraph, wherein: mapping a gesture further comprises: identifying at least one second environmental object spatial coordinate of the second environmental object; and determining a relation between the second environmental object spatial coordinate and the spatial coordinate of the first environmental object. Clause 77: The method of any clause mentioned in this paragraph, wherein: the relation comprises a relative displacement. Clause 78: The method of any clause mentioned in this paragraph, wherein: the relation comprises a relative orientation. Clause 79: The method of any clause mentioned in this paragraph, wherein: the sensor comprises a depth camera. Clause 80: The method of any clause mentioned in this paragraph, wherein: identifying the at least one second environmental object spatial coordinate comprises: generating a depth map in association with the second environmental object. Clause 81: The method of any clause mentioned in this paragraph, further comprising: generating an extended depth map by combining the depth map associated with the second environmental object with at least one supplemental depth map. Clause 82: The method of any clause mentioned in this paragraph, wherein: determining a relation between the second environmental object spatial coordinate and the spatial coordinate of the first environmental object further comprises: comparing the depth map associated with the second environmental object with a first environmental object depth map. Clause 83: The method of any clause mentioned in this paragraph, wherein: the first environmental object is a frame. Clause 84: The method of any clause mentioned in this paragraph, wherein: the first environmental object is a surface. Clause 85: The method of any clause mentioned in this paragraph, wherein: the surface is a table surface. Clause 86: The method of any clause mentioned in this paragraph, wherein: the surface is a wall. Clause 87: The method of any clause mentioned in this paragraph, wherein: the surface is a display screen. Clause 88: The method of any clause mentioned in this paragraph, wherein: the second environmental object is a user body part. Clause 89: The method of any clause mentioned in this paragraph, wherein the user body part is a user's palm and thumb, and wherein identifying at least one second environmental object spatial coordinate comprises identifying at least one relative position of the user's palm and thumb. Clause 90: The method of any clause mentioned in this paragraph, wherein: tracking a first environmental object in an environment further comprises: generating at least one point cloud associated with the first environmental object. Clause 91: The method of any clause mentioned in this paragraph, further comprising: generating an extended point cloud by combining the at least one point cloud associated with the first environmental object with at least one supplemental point cloud. Clause 92: An apparatus, comprising: at least one input sensor; at least one output display; at least one computational device communicatively coupled to the at least one input sensor and at least one output display, wherein the at least one computational devices is configured to issue processor-readable program instructions, comprising: determining the spatial position of at least one appendage via the at least one input sensor; selecting at least one display item based on the spatial position; and presenting the at least one display item via the at least one output display. Clause 93: An apparatus, comprising: at least one sensor configured to detect the relative spatial position of at least a first environmental object and a second environmental object; at least one computational device issuing program instructions configured to recognize the relative spatial position and configure at least one display component; and at least one output display configured to display the at least one display component. Clause 94: The apparatus of any clause mentioned in this paragraph, wherein: the at least one sensor comprises a depth camera configured to produce a depth map. Clause 95: The apparatus of any clause mentioned in this paragraph, wherein the computational device recognizes the relative spatial position based on the depth map. Clause 96: The apparatus of any clause mentioned in this paragraph, wherein the computational device recognizes the relative spatial position based on first and second point clouds associated, respectively, with the first environmental object and the second environmental object. Clause 97: The apparatus of any clause mentioned in this paragraph, wherein the computational device recognizes the relative spatial position as a touch gesture based on intersection of the first and second point clouds. Clause 98: The apparatus of any clause mentioned in this paragraph wherein the at least one display component comprises a virtual keyboard and the second environmental object comprises a user body part. Clause 99: The apparatus of any clause mentioned in this paragraph, wherein the first physical object is a surface and wherein the virtual keyboard is anchored to a coordinate system associated with that surface within the at least one output display. Clause 100. The apparatus of any clause mentioned in this paragraph, wherein the relative spatial position further includes a relative spatial motion. Clause 101. The apparatus of any clause mentioned in this paragraph, wherein the relative spatial motion comprises a swipe. Clause 102. The apparatus of any clause mentioned in this paragraph, wherein the swipe is a bunched swipe. Clause 103. The apparatus of any clause mentioned in this paragraph, wherein the relative spatial motion comprises at least one of a moving squeeze and a popping squeeze. Clause 104. The apparatus of any clause mentioned in this paragraph, wherein the first environmental object comprises a surface, wherein the at least one computational device is configured to track the surface, and wherein the at least one output display is configured to fix at least one media presentation to the tracked surface. Clause 105. The apparatus of any clause mentioned in this paragraph, wherein the at least one media presentation is fixed in a stereoscopic presentation. Clause 106. The apparatus of any clause mentioned in this paragraph, wherein the at least one media presentation includes application data. Clause 107. The apparatus of any clause mentioned in this paragraph, wherein the relative spatial position indicates an association between the surface and the at least one media presentation. Clause 108. The apparatus of any clause mentioned in this paragraph, wherein the relative spatial position includes a drag-and-drop of the at least one media presentation to the surface. Clause 109. The apparatus of any clause mentioned in this paragraph, wherein the second environmental object comprises a gesturing hand, wherein the first environmental object comprises a virtual model in a virtual environment, and wherein the at least one computational device issues program instructions to configure the at least one display component representing the virtual model by sculpting any point of contact between the gesturing hand and the virtual model. Clause 110. The apparatus of any clause mentioned in this paragraph, wherein the at least one computational device issues program instructions to associate at least one unique identifier to at least one of the first environmental object and the second environmental object, the unique identifier being connected to social network data associated with a user. Clause 111. The apparatus of any clause mentioned in this paragraph, wherein the program instructions to associate at least one unique identifier include instructions to apply a marker to at least one of the first environmental object and the second environmental object via the at least one output display. Clause 112. The apparatus of any clause mentioned in this paragraph, wherein the computational device is configured to issue program instructions to recognize the unique identifier and wherein the output display is configured to display at least some of the social network data associated with the user. Clause 113. The apparatus of any clause mentioned in this paragraph, wherein the at least one sensor is configured to detect a thumbs-up user gesture, and the at least one computational device issues program instructions to associate a feedback with the unique ID. Clause 114. The apparatus of any clause mentioned in this paragraph, configured as a pair of glasses. Clause 115. A user interface managing processor-implemented method, comprising: providing a plurality of icons for display via at least one head-mounted output display, the plurality of icons configured for selection via at least one gesture tracking sensor; receiving user gesture data via the at least one gesture tracking sensor, the user gesture data indicating selection of a selected icon of the plurality of icons; accessing a hierarchy of icons based on the selection of the selected icon; and providing part of the hierarchy of icons for display via the at least one head-mounted output display based on the selected icon. Clause 116. The method of any clause mentioned in this paragraph, wherein providing the plurality of icons for display further occurs only when the at least one gesture tracking sensor senses an icon summoning gesture. Clause 117. The method of any clause mentioned in this paragraph, wherein the icon summoning gesture comprises presenting an open hand for at least a threshold period of time. Clause 118. The method of any clause mentioned in this paragraph, wherein the plurality of icons are presented using at least one cycle bubble animation. Clause 119. The method of any clause mentioned in this paragraph, wherein the icons are bubble icons. Clause 120. The method of any clause mentioned in this paragraph, wherein the user gesture data comprises a relative hand motion hover-over pre-selection. Clause 121. The method of any clause mentioned in this paragraph, wherein the user gesture data comprises a squeeze-to-move translation. Clause 122. The method of any clause mentioned in this paragraph, wherein the user gesture data comprises a squeeze-to-pop selection. Clause 123. The method of any clause mentioned in this paragraph, wherein at least one of the plurality of icons includes an application logo. Clause 124. The method of any clause mentioned in this paragraph, wherein: providing part of the hierarchy of icons for display via the at least one head-mounted output display includes: displaying at least one animation of the selected icon in response to the user gesture data. Clause 125. The method of any clause mentioned in this paragraph, wherein: the at least one animation comprises an inward/rolodex cycle. Clause 126. The method of any clause mentioned in this paragraph, wherein: the hierarchy of icons include a folder level and an application/file level. Clause 127. The method of any clause mentioned in this paragraph, wherein: the hierarchy of icons includes a settings level. Clause 128. The method of any clause mentioned in this paragraph, wherein: the hierarchy of icons further includes a settings sublevel associated with at least one display parameter. Clause 129. The method of any clause mentioned in this paragraph, wherein: the at least one display parameter comprises a continuous display parameter, and further comprising: receiving selection of the at least one settings sublevel icon associated with the at least one display parameter via the at least one gesture tracking sensor; determining a relative spatial position of the settings sublevel icon and at least one user body party; providing via the output display an interface element comprising a line stretching from the settings sublevel icon to the user body part; and adjusting the at least one display parameter and a length of the line based on the relative spatial position. Clause 130. A gesture recognizing apparatus, comprising: a memory; a processor coupled to the memory and configured to issue a plurality of program instructions stored in the memory, the program instructions comprising: track a first environmental object in an environment via at least one sensor; assign at least one environmental object identifier to the first environmental object; identify at least one spatial coordinate associated with the first environmental object; associate a coordinate system with the environmental object identifier based on the at least one spatial coordinate. Clause 131. The apparatus of any clause mentioned in this paragraph, further comprising: map a gesture of a second environmental object in relation to the coordinate system via the at least one sensor. Clause 132. The apparatus of any clause mentioned in this paragraph, wherein map a gesture further comprises: generate a point cloud in association with the second environmental object. Clause 133. The apparatus of any clause mentioned in this paragraph, wherein map a gesture further comprises: identifying at least one second environmental object spatial coordinate of the second environmental object; and determining a relation between the second environmental object spatial coordinate and the spatial coordinate of the first environmental object. Clause 134. The apparatus of any clause mentioned in this paragraph, wherein the relation comprises a relative displacement. Clause 135. The apparatus of any clause mentioned in this paragraph, wherein the relation comprises a relative orientation. Clause 136. The apparatus of any clause mentioned in this paragraph, wherein the sensor comprises a depth camera. Clause 137. The apparatus of any clause mentioned in this paragraph, wherein identify the at least one second environmental object spatial coordinate comprises: generate a depth map in association with the second environmental object. Clause 138. The apparatus of any clause mentioned in this paragraph, further comprising: generate an extended depth map by combining the depth map associated with the second environmental object with at least one supplemental depth map. Clause 139. The apparatus of any clause mentioned in this paragraph, wherein; determine a relation between the second environmental object spatial coordinate and the spatial coordinate of the first environmental object further comprises: compare the depth map associated with the second environmental object with a first environmental object depth map. Clause 140. The apparatus of any clause mentioned in this paragraph, wherein the first environmental object is a frame. Clause 141. The apparatus of any clause mentioned in this paragraph, wherein the first environmental object is a surface. Clause 142. The apparatus of any clause mentioned in this paragraph, wherein the surface is a table surface. Clause 143. The apparatus of any clause mentioned in this paragraph, wherein the surface is a wall. Clause 144. The apparatus of any clause mentioned in this paragraph, wherein the surface is a display screen. Clause 145. The apparatus of any clause mentioned in this paragraph, wherein the second environmental object is a user body part. Clause 146. The apparatus of any clause mentioned in this paragraph, wherein: the user body part is a user's palm and thumb, and wherein identifying at least one second environmental object spatial coordinate comprises identifying at least one relative position of the user's palm and thumb. Clause 147. The apparatus of any clause mentioned in this paragraph, wherein tracking a first environmental object in an environment further comprises: generating at least one point cloud associated with the first environmental object. Clause 148. The apparatus of any clause mentioned in this paragraph, further comprising: generating an extended point cloud by combining the at least one point cloud associated with the first environmental object with at least one supplemental point cloud. Clause 149. A user interface managing apparatus, comprising: a memory; a processor coupled to the memory and configured to issue a plurality of program instructions stored in the memory, the program instructions comprising: provide a plurality of icons for display via at least one head-mounted output display, the plurality of icons configured for selection via at least one gesture tracking sensor; receive user gesture data via the at least one gesture tracking sensor, the user gesture data indicating selection of a selected icon of the plurality of icons; access a hierarchy of icons based on the selection of the selected icon; and provide part of the hierarchy of icons for display via the at least one head-mounted output display based on the selected icon. Clause 150. The apparatus of any clause mentioned in this paragraph, wherein providing the plurality of icons for display further occurs only when the at least one gesture tracking sensor senses an icon summoning gesture. Clause 151. The apparatus of any clause mentioned in this paragraph, wherein the icon summoning gesture comprises presenting an open hand for at least a threshold period of time.

Clause 152. The apparatus of any clause mentioned in this paragraph, wherein the plurality of icons are presented using at least one cycle bubble animation. Clause 153. The apparatus of any clause mentioned in this paragraph, wherein the icons are bubble icons. Clause 154. The apparatus of any clause mentioned in this paragraph, wherein the user gesture data comprises a relative hand motion hover-over preselection. Clause 155. The apparatus of any clause mentioned in this paragraph, wherein the user gesture data comprises a squeeze-to-move translation. Clause 156. The apparatus of any clause mentioned in this paragraph, wherein the user gesture data comprises a squeeze-to-pop selection. Clause 157. The apparatus of any clause mentioned in this paragraph, wherein at least one of the plurality of icons includes an application logo. Clause 158. The apparatus of any clause mentioned in this paragraph, wherein: provide part of the hierarchy of icons for display via the at least one head-mounted output display includes: display at least one animation of the selected icon in response to the user gesture data. Clause 159. The apparatus of any clause mentioned in this paragraph, wherein the at least one animation comprises an inward/rolodex cycle. Clause 160. The apparatus of any clause mentioned in this paragraph, wherein the hierarchy of icons include a folder level and an application/file level. Clause 161. The apparatus of any clause mentioned in this paragraph, wherein the hierarchy of icons includes a settings level. Clause 162. The apparatus of any clause mentioned in this paragraph, wherein the hierarchy of icons further includes a settings sublevel associated with at least one display parameter. Clause 163. The apparatus of any clause mentioned in this paragraph, wherein the at least one display parameter comprises a continuous display parameter, and further comprising: receive selection of the at least one settings sublevel icon associated with the at least one display parameter via the at least one gesture tracking sensor; determine a relative spatial position of the settings sublevel icon and at least one user body party; provide via the output display an interface element comprising a line stretching from the settings sublevel icon to the user body part; and adjust the at least one display parameter and a length of the line based on the relative spatial position. Clause 164. A gesture recognizing non-transitory medium, comprising: program instructions issuable by a processor coupled to the medium to cause the processor to: track a first environmental object in an environment via at least one sensor; assign at least one environmental object identifier to the first environmental object; identify at least one spatial coordinate associated with the first environmental object; associate a coordinate system with the environmental object identifier based on the at least one spatial coordinate. Clause 165. The medium of any clause mentioned in this paragraph, further comprising: map a gesture of a second environmental object in relation to the coordinate system via the at least one sensor. Clause 166. The medium of any clause mentioned in this paragraph, wherein; map a gesture further comprises: generate a point cloud in association with the second environmental object. Clause 167. The medium of any clause mentioned in this paragraph, wherein map a gesture further comprises: identify at least one second environmental object spatial coordinate of the second environmental object; and determining a relation between the second environmental object spatial coordinate and the spatial coordinate of the first environmental object. Clause 168. The medium of any clause mentioned in this paragraph, wherein the relation comprises a relative displacement. Clause 169. The medium of any clause mentioned in this paragraph, wherein the relation comprises a relative orientation. Clause 170. The medium of any clause mentioned in this paragraph, wherein the sensor comprises a depth camera. Clause 171. The medium of any clause mentioned in this paragraph, wherein: identify the at least one second environmental object spatial coordinate comprises: generate a depth map in association with the second environmental object. Clause 172. The medium of any clause mentioned in this paragraph, further comprising: generate an extended depth map by combining the depth map associated with the second environmental object with at least one supplemental depth map. Clause 173. The medium of any clause mentioned in this paragraph, wherein: determine a relation between the second environmental object spatial coordinate and the spatial coordinate of the first environmental object further comprises: compare the depth map associated with the second environmental object with a first environmental object depth map. Clause 174. The medium of any clause mentioned in this paragraph, wherein the first environmental object is a frame. Clause 175. The medium of any clause mentioned in this paragraph, wherein the first environmental object is a surface. Clause 176. The medium of any clause mentioned in this paragraph, wherein the surface is a table surface. Clause 177. The medium of any clause mentioned in this paragraph, wherein the surface is a wall. Clause 178. The medium of any clause mentioned in this paragraph. wherein the surface is a display screen. Clause 179. The medium of any clause mentioned in this paragraph, wherein the second environmental object is a user body part. Clause 180. The medium of any clause mentioned in this paragraph, wherein the user body part is a user's palm and thumb, and wherein identifying at least one second environmental object spatial coordinate comprises identifying at least one relative position of the user's palm and thumb. Clause 181. The medium of any clause mentioned in this paragraph, wherein tracking a first environmental object in an environment further comprises: generating at least one point cloud associated with the first environmental object. Clause 182. The medium of any clause mentioned in this paragraph, further comprising: generating an extended point cloud by combining the at least one point cloud associated with the first environmental object with at least one supplemental point cloud. Clause 183. A user interface managing medium, comprising: program instructions issuable by a processor coupled to the medium to cause the processor to: provide a plurality of icons for display via at least one head-mounted output display, the plurality of icons configured for selection via at least one gesture tracking sensor; receive user gesture data via the at least one gesture tracking sensor, the user gesture data indicating selection of a selected icon of the plurality of icons; access a hierarchy of icons based on the selection of the selected icon; and provide part of the hierarchy of icons for display via the at least one head-mounted output display based on the selected icon. Clause 184. The medium of any clause mentioned in this paragraph, wherein providing the plurality of icons for display further occurs only when the at least one gesture tracking sensor senses an icon summoning gesture. Clause 185. The medium of any clause mentioned in this paragraph, wherein the icon summoning gesture comprises presenting an open hand for at least a threshold period of time. Clause 186. The medium of any clause mentioned in this paragraph, wherein the plurality of icons are presented using at least one cycle bubble animation. Clause 187. The medium of any clause mentioned in this paragraph, wherein the icons are bubble icons. Clause 188. The medium of any clause mentioned in this paragraph, wherein the user gesture data comprises a relative hand motion hover-over pre-selection. Clause 189. The medium of any clause mentioned in this paragraph, wherein the user gesture data comprises a squeeze-to-move translation. Clause 190. The medium of any clause mentioned in this paragraph, wherein the user gesture data comprises a squeeze-to-pop selection. Clause 191. The medium of any clause mentioned in this paragraph, wherein at least one of the plurality of icons includes an application logo. Clause 192. The medium of any clause mentioned in this paragraph, wherein provide part of the hierarchy of icons for display via the at least one head-mounted output display includes: display at least one animation of the selected icon in response to the user gesture data. Clause 193. The medium of any clause mentioned in this paragraph, wherein the at least one animation comprises an inward/rolodex cycle. Clause 194. The medium of any clause mentioned in this paragraph, wherein: the hierarchy of icons include a folder level and an application/file level. Clause 195. The medium of any clause mentioned in this paragraph, wherein: the hierarchy of icons includes a settings level. Clause 196. The medium of any clause mentioned in this paragraph, wherein: the hierarchy of icons further includes a settings sublevel associated with at least one display parameter. Clause 197. The medium of any clause mentioned in this paragraph, wherein the at least one display parameter comprises a continuous display parameter, and further comprising: receive selection of the at least one settings sublevel icon associated with the at least one display parameter via the at least one gesture tracking sensor; determine a relative spatial position of the settings sublevel icon and at least one user body party; provide via the output display an interface element comprising a line stretching from the settings sublevel icon to the user body part; and adjust the at least one display parameter and a length of the line based on the relative spatial position. Clause (198): The method of clause 115, where said icons are abakographs. Clause (199): The method of clause 115, where said icons are derived from abakographs. Clause (200): The method of clause 115, where said icons are toposculptures. Clause (201): The method of clause 115, where said icons each correspond to one trace of an abakographic exposure. Clause (202): The method of clause 115, where said icons are each a bead on an abakograph. Clause (203): The method of clause 134, where said icon, when selected, is rendered movable along said abakograph.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of all claimed subject matter is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
   at least one spatial imaging device configured to sense a real-world environment of the apparatus;
   at least one head-mounted output display;
   at least one computational device communicatively coupled to the at least one spatial imaging device and at least one head mounted output display, wherein the at least one computational device is configured to execute program instructions that cause the at least one computational device to:
   determine a spatial coordinate system corresponding to data generated by the at least one spatial imaging device from the real-world environment;
   process data generated by the at least one imaging device to determine spatial coordinates corresponding to movement of a real-world object within the real-world environment indicating a location of the real-world object within the spatial coordinate system;
   generate an interactive, virtual N-dimensional manifold corresponding to a collection of points derived from the spatial coordinates corresponding to the real-world object, the interactive, virtual N-dimensional manifold having one or more associated virtual coordinates mapped by the spatial coordinate system indicating a user interactive space within the spatial coordinate system; and
   display one or more virtual images or objects by the at least one head-mounted output display corresponding to the virtual coordinates associated with the interactive, virtual N-dimensional manifold.

2. The apparatus of claim 1, wherein the interactive, virtual N-dimensional manifold is generated from synthesizing a time-integral of the determined spatial coordinates associated with movement of the real world object through the spatial coordinate system.

3. The apparatus of claim 1, wherein the display of the one or more virtual images are perceived by a user of the apparatus as a visual indication of a location of the interactive, virtual N-dimensional manifold in a virtual or augmented reality field of view of the user of the apparatus.

4. The apparatus of claim 1, wherein the at least one computational device is configured to execute further program instructions that cause the at least one computational device to:
   process data generated by the at least one imaging device to determine spatial coordinates corresponding to a user interaction with the interactive, virtual N-dimensional manifold;
   determine a particular user interaction from the associated virtual coordinates and the determined spatial coordinates corresponding to the user interaction with the interactive, virtual N-dimensional manifold; and
   display one or more virtual images or objects by the at least one head-mounted output display in response to the determined user interaction.

5. The apparatus of claim 4, wherein the interactive, virtual N-dimensional manifold is an interactive virtual user interface configured to receive user input and generate an interaction with the apparatus.

6. The apparatus of claim 4, wherein the determined user interaction edits, shapes, or sculpts the virtual coordinates associated with the interactive virtual N-dimensional manifold.

7. The apparatus of claim 1, wherein the at least one computational device is configured to execute further program instructions that cause the at least one computational device to:
 process data generated by the at least one imaging device to determine spatial coordinates corresponding to a user interaction with the interactive, virtual N-dimensional manifold;
 determine a particular user interaction from the associated virtual coordinates and the determined spatial coordinates corresponding to the user interaction using a dimensional hierarchy of user interaction with the interactive, virtual N-dimensional manifold; and
 display one or more virtual images or objects by the at least one head-mounted output display in response to the determined user interaction.

8. The apparatus of claim 1, wherein the interactive, virtual N-dimensional manifold is an interactive virtual user interface configured to receive user input and generate an interaction with the apparatus.

9. The apparatus of claim 1, wherein the interactive, virtual N-dimensional manifold is one of a 1-dimensional manifold, 2-dimensional manifold, and 3-dimensional manifold.

10. The apparatus of claim 1, further comprising one or more communication interfaces, wherein the at least one computational device is configured to execute further program instructions that cause the at least one computational device to:
 transmit, via at least one communications interface, data used generate the interactive, virtual N-dimensional manifold corresponding to the collection of points derived from the spatial coordinates.

11. The apparatus of claim 1, further comprising one or more communication interfaces wherein the at least one computational device is configured to execute further program instructions that cause the at least one computational device to:
 receive, via at least one communication interface, data indicating input of user interaction with the interactive, virtual N-dimensional manifold by another apparatus, and
 display one or more virtual images or objects by the at least one head-mounted output display in response to the received data.

12. The apparatus of claim 1, further comprising one or more communication interfaces wherein the at least one computational device is configured to execute further program instructions that cause the at least one computational device to:
 receive, via at least one communication interface, data indicating an interactive, virtual N-dimensional manifold corresponding to a collection of points derived from spatial coordinates determined by another apparatus, and
 display one or more virtual images or objects by the at least one head-mounted output display in response to the received data.

13. The apparatus of claim 12, wherein the at least one computational device is configured to execute further program instructions that cause the at least one computational device to:
 process data generated by the at least one imaging device to determine spatial coordinates corresponding to a user interaction with the interactive, virtual N-dimensional manifold from another apparatus;
 determine a particular user interaction from the associated virtual coordinates and the determined spatial coordinates corresponding to the user interaction using a dimensional hierarchy of user interaction with the interactive, virtual N-dimensional manifold from another apparatus; and
 display one or more virtual images or objects by the at least one head-mounted output display in response to the determined user interaction.

14. The apparatus of claim 1, wherein the virtual spatial coordinates are mapped to the real-world object and at least one of the one or more virtual images or objects when displayed is perceived by the user as appearing on or in place of the real-world object.

15. The apparatus of claim 14, wherein the real-world object is one of a wand, a stylus, a physical component located in the environment, and a personal computer including: a cell phone, a smart phone, a camera phone, or a tablet computer.

16. The apparatus of claim 1, wherein the real-world object is a user body part.

17. An apparatus, comprising:
 at least one spatial imaging device;
 at least one head-mounted output display;
 at least one computational device communicatively coupled to the at least one spatial imaging device and at least one head mounted output display, wherein the at least one computational device is configured to execute program instructions that cause the at least one computational device to:
 determine a spatial coordinate system corresponding to data generated by the at least one spatial imaging device;
 determine one or more interactive, virtual N-dimensional manifolds, each manifold having one or more associated virtual coordinates mapped by the spatial coordinate system;
 process data generated by the at least one imaging device to determine spatial coordinates corresponding to a user interaction with at least one virtual N-dimensional manifold;
 determine a particular user interaction from the associated virtual coordinates and the determined spatial coordinates using a dimensional hierarchy associated with possible user interaction with the at least one N-dimensional manifold; and
 display one or more virtual images or objects by the at least one head-mounted output display in response to the determined user interaction.

18. The apparatus of claim 17, wherein the at least one computational device is configured to execute further program instructions that cause the at least one computational device to:
 generate a first taction signal associated with a first dimension from the determined spatial coordinates; and
 generate a second taction signal associated with a different dimension from the determined spatial coordinates,
 wherein determining a user interaction includes determining a level of taction based on the first and second taction signals.

19. The apparatus of claim 18, wherein the one or more interactive, virtual N-dimensional manifolds include a plurality of manifolds, and determining a user interaction includes selecting one of the plurality of manifolds based on the determined level of taction.

20. The apparatus of claim 17, wherein at least one virtual image or object is associated with the at least one interactive, virtual N-dimensional manifold and the at least on virtual image is displayed based on the one or more associated virtual coordinates of the at least one interactive, virtual N-dimensional manifold.

21. The apparatus of claim 17, wherein the shape or configuration of the at least one interactive, virtual N-dimensional manifold is edited or sculpted based on the determined user interaction.

22. The apparatus of claim 17, wherein determining a particular user interaction includes determining a user gesture from the determined spatial coordinates and wherein a same user gesture results in one of two different user interactions based on the dimensional hierarchy of user interaction with the at least one interactive, virtual N-dimensional manifold.

23. The apparatus of claim 17, further comprising one or more communication interfaces wherein the at least one computational device is configured to execute further program instructions that cause the at least one computational device to:

receive, via at least one communication interface, data indicating input of user interaction with the interactive, virtual N-dimensional manifold by another apparatus, and display one or more virtual images or objects by the at least one head-mounted output display in response to the received data.

\* \* \* \* \*